(12) United States Patent
Fang et al.

(10) Patent No.: US 12,058,003 B2
(45) Date of Patent: *Aug. 6, 2024

(54) SYSTEM, METHOD, AND APPARATUS TO SUPPORT MIXED NETWORK COMMUNICATIONS ON A VEHICLE

(71) Applicant: Sonatus, Inc., Sunnyvale, CA (US)

(72) Inventors: Yu Fang, Palo Alto, CA (US); Yixiang Chen, Palo Alto, CA (US); Xuanran Zong, Sunnyvale, CA (US); Robin Reed, Redwood City, CA (US)

(73) Assignee: Sonatus, Inc., Sunnyvale, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/675,340

(22) Filed: Feb. 18, 2022

(65) Prior Publication Data

US 2022/0173972 A1 Jun. 2, 2022

Related U.S. Application Data

(63) Continuation of application No. 17/027,167, filed on Sep. 21, 2020, now Pat. No. 11,411,823.

(Continued)

(51) Int. Cl.
*H04L 12/40* (2006.01)
*G07C 5/00* (2006.01)
(Continued)

(52) U.S. Cl.
CPC .......... *H04L 41/0893* (2013.01); *G07C 5/008* (2013.01); *H04L 41/28* (2013.01);
(Continued)

(58) Field of Classification Search
CPC ..... H04L 41/0893; H04L 41/28; H04L 47/20; H04L 2012/40215; H04L 2012/40273
See application file for complete search history.

(56) References Cited

U.S. PATENT DOCUMENTS

| | | | |
|---|---|---|---|
| 6,292,731 B1 | 9/2001 | Kirchhoffer et al. | |
| 7,702,739 B1 | 4/2010 | Cheng et al. | |

(Continued)

FOREIGN PATENT DOCUMENTS

| | | | |
|---|---|---|---|
| CN | 103019167 A | 4/2013 | |
| CN | 103685000 A | 3/2014 | |

(Continued)

OTHER PUBLICATIONS

Chapin, Peter C., et al., "Authorization in Trust Management: Features and Foundations", Retrieved on Dec. 2, 2020 (Dec. 2, 2020) from <http://lemuria.cis.vtc.edu/-pchapin/papers/chapin-skalka-wang-ACMCS2008.pdf> entire document, 48 pages.

(Continued)

*Primary Examiner* — Hee Soo Kim
(74) *Attorney, Agent, or Firm* — GTC Law Group PC & Affiliates

(57) ABSTRACT

An example system includes a vehicle having a first network and a second network of a different type than the first network; and a converged network device (CND) interposed between the first network and the second network and comprising a plurality of ports on the first network; wherein: the CND facilitates communications between the first and the second networks; and a first port of the plurality mirrors a second port of the plurality.

17 Claims, 70 Drawing Sheets

Related U.S. Application Data

(60) Provisional application No. 63/024,383, filed on May 13, 2020, provisional application No. 62/986,444, filed on Mar. 6, 2020, provisional application No. 62/911,249, filed on Oct. 5, 2019, provisional application No. 62/911,248, filed on Oct. 5, 2019, provisional application No. 62/903,462, filed on Sep. 20, 2019.

(51) Int. Cl.
  H04L 9/40       (2022.01)
  H04L 41/0893    (2022.01)
  H04L 41/28      (2022.01)
  H04L 43/0876    (2022.01)
  H04L 47/20      (2022.01)
  H04L 61/3015    (2022.01)
  H04L 61/4511    (2022.01)
  H04W 4/40       (2018.01)

(52) U.S. Cl.
  CPC ......... *H04L 43/0876* (2013.01); *H04L 47/20* (2013.01); *H04L 61/3025* (2013.01); *H04L 61/4511* (2022.05); *H04L 63/0236* (2013.01); *H04W 4/40* (2018.02); *H04L 2012/40215* (2013.01); *H04L 2012/40273* (2013.01)

(56) References Cited

U.S. PATENT DOCUMENTS

| | | | |
|---|---|---|---|
| 8,705,527 B1 * | 4/2014 | Addepalli | H04L 1/008 |
| | | | 370/389 |
| 9,355,507 B1 | 5/2016 | Lee et al. | |
| 9,380,428 B1 | 6/2016 | Dame et al. | |
| 9,470,579 B2 | 10/2016 | Ritter et al. | |
| 9,634,892 B2 | 4/2017 | Das | |
| 9,852,636 B2 | 12/2017 | Chow et al. | |
| 9,871,819 B2 | 1/2018 | Liyanage et al. | |
| 10,573,168 B1 | 2/2020 | Razak et al. | |
| 10,616,176 B2 | 4/2020 | Lei et al. | |
| 10,650,621 B1 | 5/2020 | King et al. | |
| 10,759,424 B2 | 9/2020 | Misu et al. | |
| 10,945,199 B2 | 3/2021 | Omiya et al. | |
| 10,951,728 B2 | 3/2021 | Lepp et al. | |
| 11,072,356 B2 | 7/2021 | Mong et al. | |
| 11,165,651 B2 | 11/2021 | Fang et al. | |
| 11,228,496 B2 | 1/2022 | Fang et al. | |
| 11,252,039 B2 | 2/2022 | Fang et al. | |
| 11,287,150 B2 | 3/2022 | Guan et al. | |
| 11,349,717 B2 | 5/2022 | Fang et al. | |
| 11,362,899 B2 | 6/2022 | Fang et al. | |
| 11,386,229 B2 | 7/2022 | Adams et al. | |
| 11,411,823 B2 | 8/2022 | Fang et al. | |
| 11,538,287 B2 | 12/2022 | Fang et al. | |
| 11,721,137 B2 | 8/2023 | Fang et al. | |
| 11,736,357 B2 | 8/2023 | Fang et al. | |
| 11,750,462 B2 | 9/2023 | Fang et al. | |
| 11,772,583 B2 | 10/2023 | Fang et al. | |
| 11,805,018 B2 | 10/2023 | Fang et al. | |
| 11,824,722 B2 | 11/2023 | Fang et al. | |
| 2001/0033225 A1 | 10/2001 | Razavi et al. | |
| 2004/0267410 A1 | 12/2004 | Duri et al. | |
| 2005/0075760 A1 | 4/2005 | Moisel et al. | |
| 2005/0108444 A1 | 5/2005 | Flauaus et al. | |
| 2006/0089938 A1 | 4/2006 | Leonard et al. | |
| 2006/0155438 A1 | 7/2006 | Tsunoda et al. | |
| 2007/0229350 A1 | 10/2007 | Scalisi et al. | |
| 2008/0119983 A1 | 5/2008 | Inbarajan et al. | |
| 2008/0147250 A1 | 6/2008 | Oesterling et al. | |
| 2008/0195257 A1 | 8/2008 | Rauch | |
| 2008/0258939 A1 | 10/2008 | Smith et al. | |
| 2009/0125153 A1 | 5/2009 | Yang et al. | |
| 2009/0187968 A1 | 7/2009 | Roese et al. | |
| 2009/0207818 A1 | 8/2009 | Tsai et al. | |
| 2009/0256690 A1 * | 10/2009 | Golenski | G08G 1/205 |
| | | | 340/425.5 |
| 2010/0169353 A1 | 7/2010 | Soetarman | |
| 2010/0269155 A1 | 10/2010 | Droms et al. | |
| 2010/0332584 A1 | 12/2010 | Ramakrishnan et al. | |
| 2011/0078299 A1 | 3/2011 | Nagapudi et al. | |
| 2011/0153149 A1 | 6/2011 | Jeon et al. | |
| 2011/0260884 A1 | 10/2011 | Yi et al. | |
| 2011/0269441 A1 | 11/2011 | Silver | |
| 2012/0139489 A1 | 6/2012 | Gaul et al. | |
| 2013/0159489 A1 | 6/2013 | Cha et al. | |
| 2013/0303192 A1 | 11/2013 | Louboutin et al. | |
| 2013/0311774 A1 | 11/2013 | Larson et al. | |
| 2014/0173076 A1 | 6/2014 | Ravindran et al. | |
| 2014/0215491 A1 | 7/2014 | Addepalli et al. | |
| 2014/0277935 A1 | 9/2014 | Daman et al. | |
| 2014/0325602 A1 | 10/2014 | Kwon et al. | |
| 2014/0350768 A1 | 11/2014 | Filippov et al. | |
| 2014/0359185 A1 | 12/2014 | Sawal et al. | |
| 2015/0071115 A1 * | 3/2015 | Neff | H04L 43/12 |
| | | | 370/254 |
| 2015/0149017 A1 | 5/2015 | Attard et al. | |
| 2015/0200969 A1 | 7/2015 | Leung et al. | |
| 2015/0210287 A1 | 7/2015 | Penilla et al. | |
| 2015/0228130 A1 | 8/2015 | Zinner et al. | |
| 2015/0244806 A1 | 8/2015 | Renac et al. | |
| 2015/0276415 A1 | 10/2015 | Shrinath et al. | |
| 2016/0031441 A1 | 2/2016 | Foley | |
| 2016/0133063 A1 | 5/2016 | Lim et al. | |
| 2016/0163136 A1 | 6/2016 | Lee et al. | |
| 2016/0197776 A1 | 7/2016 | Das | |
| 2016/0255154 A1 | 9/2016 | Kim et al. | |
| 2016/0269225 A1 * | 9/2016 | Kirchmeier | H04L 12/40 |
| 2016/0275158 A1 | 9/2016 | Baset et al. | |
| 2016/0294605 A1 | 10/2016 | Searle et al. | |
| 2016/0328197 A1 | 11/2016 | Bai et al. | |
| 2017/0054574 A1 | 2/2017 | Wu et al. | |
| 2017/0126810 A1 | 5/2017 | Kentley et al. | |
| 2017/0147989 A1 | 5/2017 | Onimaru | |
| 2017/0161973 A1 | 6/2017 | Katta et al. | |
| 2017/0210228 A1 | 7/2017 | Katayama et al. | |
| 2017/0228410 A1 | 8/2017 | Slusar | |
| 2017/0248965 A1 | 8/2017 | Wellman et al. | |
| 2017/0251339 A1 | 8/2017 | Addepalli et al. | |
| 2017/0339095 A1 | 11/2017 | Lei et al. | |
| 2017/0359128 A1 | 12/2017 | Xi et al. | |
| 2018/0007161 A1 | 1/2018 | Hwang et al. | |
| 2018/0017404 A1 | 1/2018 | Mendels et al. | |
| 2018/0072250 A1 * | 3/2018 | Kim | H04L 63/08 |
| 2018/0076970 A1 | 3/2018 | Han et al. | |
| 2018/0131524 A1 | 5/2018 | Shin et al. | |
| 2018/0189323 A1 | 7/2018 | Wheeler | |
| 2018/0191636 A1 * | 7/2018 | Wang | H04L 47/762 |
| 2018/0205703 A1 | 7/2018 | Grau | |
| 2018/0232235 A1 | 8/2018 | Gaur et al. | |
| 2018/0237039 A1 | 8/2018 | Mong et al. | |
| 2018/0261020 A1 | 9/2018 | Petousis et al. | |
| 2018/0267530 A1 | 9/2018 | Sugaiwa et al. | |
| 2018/0270230 A1 | 9/2018 | Schmidt et al. | |
| 2018/0286152 A1 * | 10/2018 | Iwaasa | G07C 5/0841 |
| 2018/0287815 A1 * | 10/2018 | Yamamoto | H04L 12/40006 |
| 2018/0293809 A1 | 10/2018 | James et al. | |
| 2018/0357561 A1 | 12/2018 | Selvarajan et al. | |
| 2018/0367525 A1 | 12/2018 | Kassimis et al. | |
| 2019/0007794 A1 | 1/2019 | Thakur et al. | |
| 2019/0020985 A1 * | 1/2019 | Dai | H04L 63/0227 |
| 2019/0079842 A1 * | 3/2019 | Chae | G06F 11/3006 |
| 2019/0095650 A1 | 3/2019 | Midgley | |
| 2019/0097932 A1 | 3/2019 | Buczek et al. | |
| 2019/0098472 A1 | 3/2019 | Yoshihara | |
| 2019/0108049 A1 | 4/2019 | Singh et al. | |
| 2019/0129778 A1 | 5/2019 | Olson et al. | |
| 2019/0141133 A1 | 5/2019 | Rajan et al. | |
| 2019/0141142 A1 | 5/2019 | Filippou et al. | |
| 2019/0207862 A1 | 7/2019 | Kajio et al. | |
| 2019/0215185 A1 | 7/2019 | Hellenthal | |
| 2019/0258252 A1 | 8/2019 | Muta et al. | |
| 2019/0260800 A1 | 8/2019 | Shalev et al. | |
| 2019/0334763 A1 | 10/2019 | Cawse et al. | |

(56) References Cited

U.S. PATENT DOCUMENTS

| | | |
|---|---|---|
| 2019/0349071 A1 | 11/2019 | Saxena et al. |
| 2019/0356574 A1 | 11/2019 | Schoch |
| 2019/0379683 A1 | 12/2019 | Overby et al. |
| 2019/0394089 A1 | 12/2019 | Barrett et al. |
| 2019/0394305 A1 | 12/2019 | Kim et al. |
| 2020/0036717 A1 | 1/2020 | Akella et al. |
| 2020/0057630 A1 | 2/2020 | Cho et al. |
| 2020/0090504 A1 | 3/2020 | Kadar et al. |
| 2020/0145252 A1 | 5/2020 | Torisaki et al. |
| 2020/0160633 A1 | 5/2020 | Zhang et al. |
| 2020/0164882 A1 | 5/2020 | Beiderbeck et al. |
| 2020/0186449 A1 | 6/2020 | Tofighbakhsh et al. |
| 2020/0208998 A1 | 7/2020 | Xiang et al. |
| 2020/0209002 A1 | 7/2020 | Hou et al. |
| 2020/0210336 A1 | 7/2020 | Bräutigam et al. |
| 2020/0218531 A1 | 7/2020 | Kushwaha et al. |
| 2020/0252339 A1 | 8/2020 | McKeefery et al. |
| 2020/0257317 A1 | 8/2020 | Musk et al. |
| 2020/0259919 A1 | 8/2020 | Lepp et al. |
| 2020/0264632 A1 | 8/2020 | Sugimoto |
| 2020/0267080 A1 | 8/2020 | Joshi et al. |
| 2020/0341956 A1 | 10/2020 | Bayer et al. |
| 2020/0342691 A1 | 10/2020 | Saers et al. |
| 2020/0346628 A1 | 11/2020 | Whitfield |
| 2020/0361487 A1 | 11/2020 | Sakamoto et al. |
| 2020/0389469 A1 | 12/2020 | Litichever et al. |
| 2020/0406910 A1 | 12/2020 | Ruan et al. |
| 2020/0413408 A1 | 12/2020 | Bailey et al. |
| 2021/0021497 A1* | 1/2021 | Brinkman ............... H04L 12/40 |
| 2021/0024035 A1 | 1/2021 | Nakashima et al. |
| 2021/0026617 A1 | 1/2021 | Maru et al. |
| 2021/0070321 A1 | 3/2021 | Serizawa et al. |
| 2021/0075800 A1 | 3/2021 | Paraskevas et al. |
| 2021/0092018 A1 | 3/2021 | Fang et al. |
| 2021/0092019 A1 | 3/2021 | Fang et al. |
| 2021/0144068 A1 | 5/2021 | Mo et al. |
| 2021/0155267 A1 | 5/2021 | Goto et al. |
| 2021/0155269 A1 | 5/2021 | Oba |
| 2021/0171042 A1 | 6/2021 | Hayakawa et al. |
| 2021/0173911 A1 | 6/2021 | Ohashi et al. |
| 2021/0192867 A1 | 6/2021 | Fang et al. |
| 2021/0197831 A1 | 7/2021 | Choi et al. |
| 2021/0234760 A1 | 7/2021 | Fang et al. |
| 2021/0234761 A1 | 7/2021 | Fang et al. |
| 2021/0234762 A1 | 7/2021 | Fang et al. |
| 2021/0234763 A1 | 7/2021 | Fang et al. |
| 2021/0234767 A1* | 7/2021 | Ricci ..................... G06F 21/629 |
| 2021/0258189 A1 | 8/2021 | Toyoda et al. |
| 2021/0264693 A1 | 8/2021 | Rueck et al. |
| 2021/0310217 A1 | 10/2021 | Akiyama et al. |
| 2021/0407220 A1 | 12/2021 | Fang et al. |
| 2022/0070063 A1 | 3/2022 | Fang et al. |
| 2022/0078084 A1 | 3/2022 | Fang et al. |
| 2022/0131751 A1 | 4/2022 | Fang et al. |
| 2022/0131752 A1 | 4/2022 | Fang et al. |
| 2022/0131753 A1 | 4/2022 | Fang et al. |
| 2022/0131755 A1 | 4/2022 | Fang et al. |
| 2022/0173969 A1 | 6/2022 | Fang et al. |
| 2022/0173970 A1 | 6/2022 | Fang et al. |
| 2022/0173971 A1 | 6/2022 | Fang et al. |
| 2022/0231917 A1 | 7/2022 | Fang et al. |
| 2022/0271971 A1 | 8/2022 | Newald et al. |
| 2022/0297635 A1 | 9/2022 | Fang et al. |
| 2023/0150523 A1 | 5/2023 | Fang et al. |
| 2023/0154244 A1 | 5/2023 | Fang et al. |
| 2023/0154245 A1 | 5/2023 | Fang et al. |
| 2023/0154246 A1 | 5/2023 | Fang et al. |
| 2023/0158974 A1 | 5/2023 | Fang et al. |
| 2023/0158975 A1 | 5/2023 | Fang et al. |
| 2023/0161583 A1 | 5/2023 | Fang et al. |
| 2023/0298398 A1 | 9/2023 | Fang et al. |
| 2023/0298399 A1 | 9/2023 | Fang et al. |
| 2023/0298400 A1 | 9/2023 | Fang et al. |
| 2023/0298401 A1 | 9/2023 | Fang et al. |
| 2023/0298402 A1 | 9/2023 | Fang et al. |
| 2023/0298403 A1 | 9/2023 | Fang et al. |
| 2023/0298404 A1 | 9/2023 | Fang et al. |
| 2023/0298405 A1 | 9/2023 | Fang et al. |
| 2023/0298406 A1 | 9/2023 | Fang et al. |
| 2023/0316817 A1 | 10/2023 | Fang et al. |
| 2023/0360448 A1 | 11/2023 | Fang et al. |
| 2023/0396634 A1 | 12/2023 | Fang et al. |

FOREIGN PATENT DOCUMENTS

| | | |
|---|---|---|
| CN | 106961437 A | 7/2017 |
| CN | 107409079 A | 11/2017 |
| CN | 107819736 A | 3/2018 |
| CN | 107925594 A | 4/2018 |
| CN | 208401892 U | 1/2019 |
| DE | 102006023137 A1 | 11/2007 |
| EP | 2959654 A1 | 12/2015 |
| KR | 20010027471 A | 4/2001 |
| KR | 100310412 B1 | 9/2001 |
| WO | 2001026332 | 4/2001 |
| WO | 2007050406 A1 | 5/2007 |
| WO | 2020150872 A1 | 7/2020 |
| WO | 2021055952 A1 | 3/2021 |
| WO | 2021055955 A1 | 3/2021 |
| WO | 2021178979 A1 | 9/2021 |
| WO | 2021178979 A8 | 10/2021 |
| WO | 2022218554 A1 | 10/2022 |
| WO | 2023059938 A1 | 4/2023 |
| WO | PCT/US2023/032346 | 9/2023 |

OTHER PUBLICATIONS

Chen, Wai, et al., "Ad hoc peer-to-peer network architecture for vehicle safety communications", IEEE Communications Magazine, vol. 43, No. 4, 2005, pp. 100-107.

Nguyen-Duy, Jonathan, "Smart Cars: A Peek Into the Future of Converged Networks", Jan. 9, 2018, 4 pages.

PCT/US2020/051817, "International Application Serial No. PCT/US2020/051817, International Search Report and Written Opinion mailed Feb. 24, 2021", Sonatus, Inc., 23 pages.

PCT/US2020/051817, "International Application Serial No. PCT/US2020/051817, Invitation to Pay Additional Fees and, Where Applicable, Protest Fee mailed Dec. 1, 2020", Sonatus, Inc., 2 pages.

PCT/US2020/051825, "International Application Serial No. PCT/US2020/051825, International Search Report and Written Opinion mailed Jan. 13, 2021", Sonatus, Inc., 15 pages.

PCT/US2021/021421, "International Application Serial No. PCT/US2021/021421, International Search Report and Written Opinion mailed Jul. 21, 2021", Sonatus, Inc., 19 pages.

PCT/US2021/021421, "International Application Serial No. PCT/US2021/021421, Invitation to Pay Additional Fees and, Where Applicable, Protest Fee mailed May 10, 2021", Sonatus, Inc., 2 pages.

Wakikawa, Ryuji, et al., "Design of Vehicle Network: Mobile Gateway for MANET and NEMO Converged Communication", Sep. 2, 2005, 2 pages.

Wang, Yujing, et al., "Adapting a Container Infrastructure for Autonomous Vehicle Development", Cornell University Library/Computer Science/Software Engineering, Nov. 19, 2019, [online] [retrieved on Jun. 22, 2021 (Jun. 22, 2021)] Retrieved from the Internet < URL: https://arxiv.org/abs/1911.01075>, entire document,, 6 pages.

U.S. Appl. No. 17/570,018, filed Jan. 6, 2022, Pending.
U.S. Appl. No. 17/570,060, filed Jan. 6, 2022, Pending.
U.S. Appl. No. 17/570,125, filed Jan. 6, 2022, Pending.
U.S. Appl. No. 17/525,290, filed Nov. 12, 2021, Pending.
U.S. Appl. No. 17/570,822, filed Jan. 7, 2022, Pending.
U.S. Appl. No. 17/570,853, filed Jan. 7, 2022, Pending.
U.S. Appl. No. 17/525,427, filed Nov. 12, 2021, Pending.
U.S. Appl. No. 17/570,738, filed Jan. 7, 2022, Pending.
U.S. Appl. No. 17/674,239, filed Feb. 17, 2022, Pending.
U.S. Appl. No. 17/674,281, filed Feb. 17, 2022, Pending.
U.S. Appl. No. 17/674,309, filed Feb. 17, 2022, Pending.

(56) References Cited

OTHER PUBLICATIONS

"Automotive testing and Engineering services", 2022, 20 pages.
20864819.6 , "European Application Serial No. 20864819.6, Extended European Search Report mailed Jun. 28, 2023", Sonatus, Inc., 9 pages.
20865060.6 , "European Application Serial No. 20865060.6, Extended European Search Report mailed Jul. 10, 2023", Sonatus, Inc., 8 pages.
Felser, Max , et al., "Coexistence Standardization of Operation Technology and Information Technology", Proceedings of the IEEE, IEEE. New York, US, vol. 107, No. 6,, Jun. 1, 2019, pp. 962-976.
Herber, Christian , et al., "Real-time capable CAN to AVB ethernet gateway using frame aggregation and scheduling", 2015 Design, Automation & Test in Europe Conference & Exhibition (DATE), EDAA,, Mar. 9, 2015, pp. 61-66.
Ishak, Mohamad Khairi, et al., "Vehicle Sensors Programming BAsed on Controller Area Network (CAN) Bus Using Canoe", 2019, 4 pages.
PCT/US2020/051817 , "International Application Serial No. PCT/US2020/051817, International Preliminary Report on Patentability mailed Mar. 31, 2022", Sonatus, Inc., 22 pages.
PCT/US2021/021421 , "International Application Serial No. PCT/US2021/021421, International Preliminary Report on Patentability mailed Sep. 15, 2022", Sonatus, Inc., 17 pages.
PCT/US2022/046292 , "International Application Serial No. PCT/US2022/046292, International Search Report and Written Opinion mailed Mar. 7, 2023", Sonatus, Inc., 18 pages.
PCT/US2022/046292 , "International Application Serial No. PCT/US2022/046292, Invitation to Pay Additional Fees and, Where Applicable, Protest Fee mailed Jan. 11, 2023", Sonatus, Inc., 2 pages.
PCTUS2020051825 , "International Application Serial No., International Preliminary Report on Patentability mailed Mar. 31, 2022", Sonatus, Inc., 16 pages.
U.S. Appl. No. 18/123,203, filed Mar. 17, 2023, Pending, Yu Fang.
U.S. Appl. No. 18/123,208, filed Mar. 17, 2023, Pending, Yu Fang.
U.S. Appl. No. 18/235,481, filed Aug. 18, 2023, Pending, Yu Fang.
U.S. Appl. No. 18/244,147, filed Sep. 8, 2023, Pending, Yu Fang.
202080080424.7 , "Chinese Application No. 202080080424.7, First Office Action and Search Report mailed Oct. 12, 2023", Sonatus, Inc., 11 pages.
202217011087 , "Indian Application Serial No. 202217011087 First Examination Report, mailed Jan. 12, 2024", Sonatus, Inc., 6 pages.
PCT/US2023/032346 , "International Application Serial No. PCT/US2023/032346, International Search Report and Written Opinion mailed Nov. 27, 2023", Sonatus, Inc., 3 pages.

\* cited by examiner

| END POINT | NETWORK ZONE | LOCAL ADDRESS | EXTERNAL ADDRESS |
|---|---|---|---|
| CONTROLLER1 | ZONE1 | ID161 | IPv6_X1 |
| SENSOR1 | ZONE2 | IPv4/IPv6_1 | IPv6_X2 |
| SENSOR2 | ZONE1 | ID84 | IPv6_X3 |
| CONTROLLER2 | ZONE2 | IPv4/IPv6_2 | IPv6_X4 |
| INTERFACE CIRCUIT1 | ZONE2 | IPv4/IPv6_3 | IPv6_X5 |
| CONTROLLER3 | ZONE2 | IPv4/IPv6_4 | IPv6_X6 |

*FIG. 62*

PORT MIRRORING  TRAFFIC MONITORING  COUNTERS

| SAVE CONFIGURATION | START PORT MIRRORING | READ STATE |

SWITCH 0
FROM  TO
☐  ☐  ICU (PORT 0)
☐  ☐  RR_CAMERA (PORT 1)
☐  ☐  ADAS_PRK (PORT 2)
☐  ☐  CLUSTER (PORT 3)
☐  ☐  HUD (PORT 4)
☐  ☐  ISL (PORT 6)
☐  ☐  INTERNAL (PORT 7)
☐  ☐  HOST CPU (PORT 8)

FILTERS
INGRESS FILTER MODE
[ALL ▾]
INGRESS FILTER
*A MAC ADDRESS*
EGRESS FILTER MODE
[ALL ▾]
EGRESS FILTER
*A MAC ADDRESS*

SWITCH 1
FROM  TO
☐  ☐  O/S MIRR_DRIV (PORT 0)
☐  ☐  O/S MIRR_PASS (PORT 2)
☐  ☐  FRT_CAMERA (PORT 4)
☐  ☐  HU (PORT 6)
☐  ☐  INTERNAL (PORT 7)

FILTERS
INGRESS FILTER MODE
[ALL ▾]
INGRESS FILTER
*A MAC ADDRESS*
EGRESS FILTER MODE
[ALL ▾]
EGRESS FILTER
*A MAC ADDRESS*

DOWNSAMPLE INGRESS TO EVERY $N^{TH}$ PACKET
[ALL ▾]
DOWNSAMPLE INGRESS TO EVERY $N^{TH}$ PACKET
[ALL ▾]
MIRRORING TIMEOUT
[N MILLISECONDS ▾]

*FIG. 63*

SYSTEM, METHOD, AND APPARATUS TO SUPPORT MIXED NETWORK COMMUNICATIONS ON A VEHICLE

CROSS-REFERENCE TO RELATED APPLICATIONS

This application is a continuation of and claims priority to U.S. patent application Ser. No. 17/027,167, filed Sep. 21, 2020 and entitled "SYSTEM, METHOD, AND APPARATUS TO SUPPORT MIXED NETWORK COMMUNICATIONS ON A VEHICLE (SONA-0006-U01)", now issued as U.S. Pat. No. 11,411,823 on Aug. 9, 2022.

Application Ser. No. 17/027,167 (SONA-0006-U01) claims benefit of priority to the following provisional applications: U.S. Application Ser. No. 62/903,462, filed Sep. 20, 2019 entitled "SYSTEM, METHOD AND APPARATUS FOR A MIXED VEHICLE NETWORK" (SONA-0001-P01); U.S. Application Ser. No. 62/911,249 filed Oct. 5, 2019 entitled "SYSTEM, METHOD AND APPARATUS FOR A MIXED VEHICLE NETWORK" (SONA-0002-P01); U.S. Application Ser. No. 62/911,248, filed Oct. 5, 2019 entitled "SYSTEM, METHOD AND APPARATUS FOR CLOUD-BASED INTERACTIONS WITH A MIXED VEHICLE NETWORK" (SONA-0003-P01); U.S. Application Ser. No. 62/986,444, filed Mar. 6, 2020 entitled "SYSTEM, METHOD AND APPARATUS FOR IMPLEMENTING CONFIGURABLE DATA COLLECTION FOR A VEHICLE" (SONA-0004-P01); and U.S. Application Ser. No. 63/024,383, filed May 13, 2020 entitled "SYSTEM, METHOD AND APPARATUS TO TEST AND VERIFY A VEHICLE NETWORK" (SONA-0005-P01).

Each of the foregoing patents and applications is incorporated herein by reference in its entirety for all purposes.

BACKGROUND

Vehicle communication networks are utilized to connect sensors, actuators, controllers, and communication devices throughout a vehicle. Recent trends have been increasing the burden on these vehicle communication networks, with more devices being connected, more data passing between devices, lower latency requirements to meet vehicle performance, safety, and emissions requirements, and added vehicle features. Additionally, consumers expect increasing connectivity and features that increase the burdens on vehicle communication networks. These trends are expected to continue, and to accelerate, for the foreseeable future.

Traditional vehicle communication networks (CAN, LIN, FlexRay, MOST, LVDS, etc.) suffer from a number of drawbacks and challenges. These vehicle communication networks have been developed to meet the particular challenges of a vehicle environment, and have accordingly developed separately from other networks, such as computer local area networks, wide area networks, massively interconnected networks (e.g., the internet), and wireless networks. Most vehicle networks consist of a data link layer and an application layer, utilizing robust and dedicated equipment such as a Controller Area Network (CAN) bus, with dedicated or shared wiring between devices utilizing specific data protocols (e.g., J1939, OBD, etc.). A modern vehicle may have multiple network buses, with specific commands and communications available, and limited customization and data speed available. E.g., CAN buses typically operate at up to about 1 Mbps, with high capability CAN buses operating up to about 10 Mbps. Additionally, CAN buses experience latency greater than 25 ms, and generally higher from about 60 ms to 500 ms, depending upon the configuration, the traffic on the CAN, the priority for particular messages, and the like.

As the number of devices and the data rate demand from the devices increases, traditional vehicle communication networks require the implementation of higher performance buses. Because the automotive industry is a high volume industry with a very low tolerance for failure of components, automotive manufacturers utilize the same components for a long time, and across a broad range of vehicles—including sharing of components across manufacturers. Additionally, a change to a nominally more capable component may introduce risks, integration costs, re-certification burdens for a given application, or have other undesirable consequences to the system. Accordingly, even if vehicle communication networks transition to a higher capability network configuration, it is desirable to keep network types segregated in the system, and to keep a large number of legacy devices (e.g., CAN compatible) in a system for a long period of time.

Data collection from vehicles includes a number of additional challenges. For example, data collection operations are subject to regulation and liability risks, especially with data collection that may include private information, personally identifiable information, and/or liability related information. Data collectors, including entities that may have ownership or possession of sensitive data are subject to risk while holding data, for example in the event of inadvertent or malicious access to the data. With regard to vehicle data being collected, a large amount of data may be collected, and a large number of purposes for collecting the data may be present, increasing the risks relative to other general data storage applications. Accordingly, it may be desirable to control data collection, storage, and access, to reduce risks, and it may further be desirable to include verification of data access, partitioning or other exclusion of data when the data is not being used, and the like.

Data collection for vehicles is further complicated by the amount and type of data to be communicated between the vehicle and external devices, where the network system of the vehicle is limited by constraints of a mobile application, expenses and/or bandwidth limitations incurred by high data rates and/or large data transfers. Even in light of the foregoing, customer demands, market expectations, increasing requirements for efficiency of vehicle operations, and the increase of functional capability for data related applications are continuing to proliferate the aggregate amount of data to be transferred, the number of off-vehicle applications utilizing transferred data, the number of purposes that the data may be utilized for, and the number of users or entities having a legitimate need for portions of the transferred data. Additionally, applications utilizing the data continue to increase in sophistication and capability, increasing the data demand for the limited available transfer resources, and increasing the cost and complexity of logistical control and storage of the transferred data. For example, higher capability pathing or operational algorithms related to the vehicle, increasing automation of vehicle functions, increasing demand for prognostic determinations and/or maintenance support, and increasing media streams (both the number of media streams and the quality of those media streams) all drive for increased demand in data rates, stored data amounts, and the number of entities or applications accessing the stored data.

SUMMARY

The description herein references vehicle applications as a non-limiting example and for clarity of the present description. However, embodiments herein are applicable to other applications having similar challenges and/or implementations. Without limitation to any other application, embodiments herein are applicable to any application having multiple end points, including multiple data sources, controllers, sensors, and/or actuators, and which may further include end points present in distinct or distributed network environments, and/or applications having historical or legacy networking or communication systems that may be transitioning (within a given system, as a class of systems, and/or as an industry) to newer and/or more capable networking or communication systems. Example and non-limiting embodiments include one or more of: industrial equipment; robotic systems (including at least mobile robots, autonomous vehicle systems, and/or industrial robots); mobile applications (that may be considered "vehicles", or not) and/or manufacturing systems. It will be understood that certain features, aspects, and/or benefits of the present disclosure are applicable to any one or more of these applications, not applicable to others of these applications, and the applicability of certain features, aspects, and/or benefits of the present disclosure may vary depending upon the operating conditions, constraints, cost parameters (e.g., operating cost, integration cost, operating cost, data communication and/or storage costs, service costs and/or downtime costs, etc.) of the particular application. Accordingly, wherever the present disclosure references a vehicle, a vehicle system, a mobile application, industrial equipment, robotic system, and/or manufacturing systems, each one of these are also contemplated herein, and may be applicable in certain embodiments, or not applicable in certain other embodiments, as will be understood to one of skill in the art having the benefit of the present disclosure.

The disclosure herein, as reflected in the described embodiments, has recognized that the complexities and other challenges set forth preceding have synergistic effects that cause the complexity of the vehicle data environment to be even greater than the sum of the individual contributions from each challenge.

As one example, the increasing number of entities or applications accessing the data increases the likelihood that individual data requests will overlap—for example with multiple entities requesting the same or similar data. Further, the increasing number of entities or applications accessing the data increases the likelihood that members of the accessing group will share similar authorization levels, such that the data access for individual members of the entity or application group will benefit from data management.

In another example, regulations regarding sensitive data are increasing, which increases the data management requirements of the system generally, but also increases the likelihood that data management may be subjected to multiple constraints at a given time, and/or changing constraints over time as regulations change, and/or based on the relevant jurisdiction(s) that may change as the location of the vehicle changes.

In yet another example, the complex environment of presently known and transitioning vehicle network architectures—for example vehicles having mixed network types and/or partitioned networks—increase the complexity of data access for individual entities that, without certain aspects of the present disclosure, may otherwise be required to determine requesting parameter specifications for particular data elements, and to update those requesting parameters as vehicle network architectures evolve. In view of the increasing number of entities requesting data access, the aggregate cost to the automotive support market increases non-linearly, as each of the entities incurs the costs to track requesting parameter specifications. Additionally, the trajectory of additional entities requesting data access is moving toward entities that are positioned further away in the technological knowledge space from core automotive functions, and accordingly the intricacies and idiosyncrasies of vehicle and/or automotive applications, including on-vehicle network configurations, specific data descriptions, data requesting and communication protocols, industry standards or customs for presenting information, and the like, are becoming less well known on average for each incremental new entity, further increasing the cost volume function (e.g., the cost over time for a given entity to meet desired data collection deliverables, where the given entity may be an automotive manufacturer, and/or a vehicle market, a geographic market, and/or an industry such as the automotive industry, the passenger car industry, etc.). For example, consider a notional cost volume function such as:

COST=# of entities*basic learning cost*adapting to transition cost trajectory*data trajectory cost*regulatory adaptation cost*data access/ storage liability cost The described COST function is a non-limiting notional example to demonstrate how various challenges and complications with regard to presently known systems interact and synergize to increase the costs to meet future data collection functions for vehicle applications. The cost parameters described are not intended to cover all costs related to the challenges present for the automotive data collection industry or presently known systems. Parameters may be averages or other complex functions, and the values of particular parameters will generally not be known with specificity. In addition, the units of the COST may be expressed in monetary values, as a resource (e.g., engineering hours, computation time, etc.) to meet data collection targets over time, as another non-monetary unit such as equivalent emissions, customer satisfaction, risk incurred, public perception losses or gains, etc. The # of entities parameter reflects generally the number of entities accessing vehicle data over time; the basic learning cost reflects the costs for new entities to learn the specifics of data collection requirements and protocols for a specific vehicle, vehicle type, market, etc.; the adapting to transition cost trajectory reflects the costs to adapt to changing vehicle network configurations, including network types and organization, and interactions with end points or devices on those networks; the data trajectory cost reflects the increasing demand for data collection from relevant vehicles over time, including data communication, storage, and resulting functional consequences such as not being able to support a desired application or costs to enhance data communication infrastructure; the regulatory adaptation cost reflects the costs associated with an increasing number of regulations, an increasing number of regulatory frameworks, and/or an increasing number of regulating entities; and the data access/ storage liability cost reflects the costs incurred for compliance and security of data, and/or losses incurred due to data breaches, unauthorized use, premature expiration of data, or the like.

Without limitation to any other aspect of the present disclosure, aspects of the disclosure herein reduce and/or eliminate any one or more of: a cost per entity added to a data collection system, a basic learning cost for a new entity to implement an application utilizing collected data, an adaptation cost to changing vehicle network configuration(s), a cost incurred to meet the increasing demand for data collection, a cost to adapt to a changing regulatory environment, and/or a cost to secure data and/or losses incurred for breaches or unauthorized use. Certain embodiments and/or aspects of the disclosure herein may address one or more of the described cost parameters. Certain embodiments and/or aspects of the disclosure herein may increase one or more given cost parameters, but nevertheless be beneficial by decreasing the overall cost function for a target vehicle, vehicle type, entity, industry, etc. Certain embodiments and/or aspects of the disclosure herein may increase one or more given cost parameters, but provide other benefits such as improved functionality. In certain embodiments, improved functionality may be achieved at an increased cost, but at a lower cost than previously known systems configured to achieve a similar improved functionality.

Without limitation to any other aspect of the present disclosure, embodiments herein provide for operation of a system having multiple networks thereon, with end point devices distributed across networks, and provide for operations utilizing data, communications, and/or commands with end point devices without requiring specific knowledge of the locations, capabilities, and/or data configuration for at least some of the applications, circuits, and/or other operators within the system. Embodiments herein provide for configuration of network management, allowing for changes in end point device locations within the system, adaptation to system failures or off-nominal operations, and/or updates to the system that may occur during stages of manufacturing, body building, service, upfits or upgrades, replacement of parts, maintenance, campaigns, changes in parts, and/or changes in industry standards. Embodiments herein provide for monitoring of network status and/or performance for networks on the vehicle, including monitoring when the vehicle is intermittently connected to an outside device. Embodiments herein provide for configuration changes to the monitoring operations, including changes in the networks monitored, parameters monitored, execution of monitoring events, and the like. Embodiments herein provide for monitoring operations of end point devices, network communications, communications between specific end points (on the same or distinct networks), and configuration of these. Embodiments herein provide for network traffic control, regulation, and/or support, both on a particular network, or between networks. Embodiments herein provide for selected distribution of network management, monitoring, and control functions, including providing for incorporation of functions within existing controllers, distributing functions between controllers, providing for redundancy and off-nominal operation support, variations of these between similar systems while supporting full functionality, and combinations of these. Embodiments herein provide for monitoring operations of end point devices, network communications, and communications between specific end points, where a monitoring application or device communicates with a first network, and monitors a second network. Embodiments herein provide for monitoring any network, network zone, flow, device group, virtual group, or the like that may be present within the system.

Embodiments herein include operation of a mixed network system to provide for application mission support including control, monitoring, data collection, configuration, and/or updating. Embodiments herein include allowing for active control of devices, end points, controllers, flows, device groups, functions of the vehicle, applications of the vehicle, or the like, which may be on any network of the vehicle and/or distributed across more than one network of the vehicle, and from devices, applications, or controllers that may communicate with any network of the system. Additionally or alternatively, embodiments herein may support active control of devices after changes to the controlled devices, end points, controllers, flows, device groups, functions of the vehicle, and/or applications of the vehicle, with a selected level of knowledge of the changes by the controlling device, application, or controller, including without any knowledge of the changes. Embodiments herein including allowing for active monitoring, service event execution, and/or test execution of devices, end points, controller, flows, device groups, functions of the vehicle, applications of the vehicle, or the like, which may be on any network of the vehicle and/or distributed across more than one network of the vehicle, from devices, applications, or controllers that may communicate with any network of the system. Additionally or alternatively, embodiments herein may support active monitoring, service event execution, and/or test execution of devices after changes to the controlled devices, end points, controllers, flows, device groups, functions of the vehicle, and/or applications of the vehicle, with a selected level of knowledge of the changes by the controlling device, application, or controller, including without any knowledge of the changes.

Embodiments herein support mixed and/or scalable network topologies, including mixed networks, and/or multiple instances of a given network type (e.g., separated and/or partially separated networks). The number and arrangement of networks may be provided to support any aspect of the vehicle design, operation, and life cycle management, including at least: allowance for a mix of legacy devices with newer devices; separation of network physical location and function; changes to the vehicle during service, maintenance, upgrades, and/or model changes; and/or reduction and/or compartmentalization of design efforts and/or integration efforts. Without limitation, embodiments herein support dual zone network architectures, and/or n-zone network architectures.

Embodiments herein support consolidation of controls that may otherwise be distributed around the system, for example to reduce the number of controllers and/or processing devices that must be installed, integrated, and/or have interfaces therebetween, to reduce physical risk to the network system, to reduce a cost of the network system, and/or to reduce a footprint of the network system (e.g., reducing an overall footprint of the vehicle and/or allowing a shift of the footprint in whole or part to another system of the vehicle). Embodiments herein support data management and access in a mixed network vehicle, including abstracting data providers from data consumers, implementing data authorization, security, and compartmentalization, reducing network traffic, and managing capability differences between end points, devices, controllers, flows, device groups, networks, and the like.

Embodiments herein provide for configuration of mixed network control devices, including interfaces to allow for configuration of network management, network control, and network monitoring applications. Embodiments herein provide for configuration of mixed network control sub-components, including interfaces therefore, such as for devices that interface between networks, and facilitate gathering, encapsulation, and/or processing of communications from a first network for communication onto a second network.

Embodiments herein provide for configuration of mixed network control devices and/or sub-components selectively utilizing an external tool (e.g., a service tool, manufacturing tool, diagnostic tool, consumer device, etc.) which may be coupled to the mixed network control device with a direct connection, wireless connection, cellular connection, or other communicative connection. In certain embodiments, configuration tools herein may be external tools, web applications, mobile applications, dedicated or proprietary applications, or combinations of these.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

BRIEF DESCRIPTION OF THE FIGURES

FIG. 62 is a schematic, illustrative, example of a local DNS table.

FIG. 63 is a schematic, illustrative, example of vehicle communications data.

DETAILED DESCRIPTION

Figure 1:
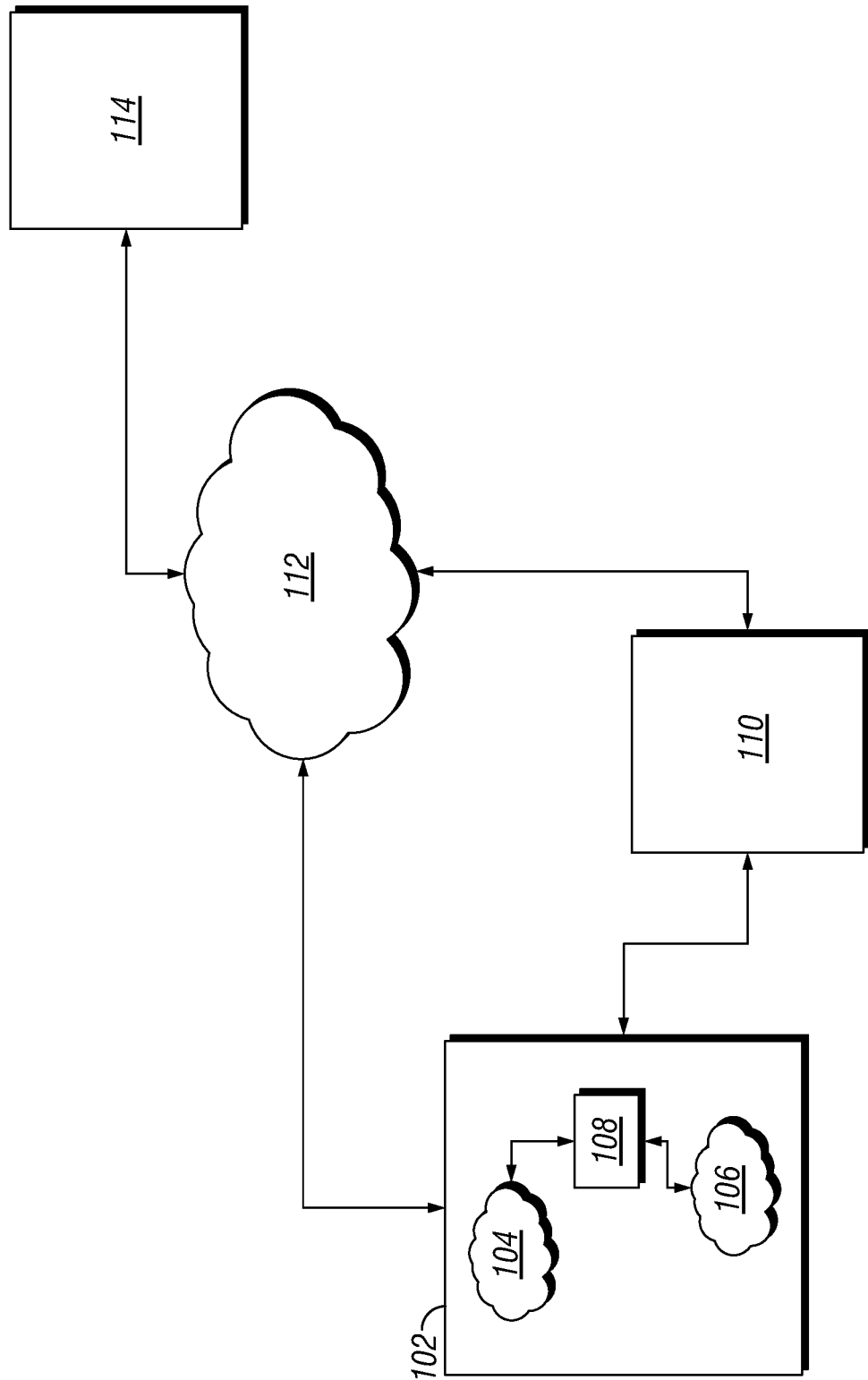
FIG. 1 is a schematic diagram of an example system for regulating networks on a vehicle according to certain embodiments of the present disclosure.

Referencing FIG. 1, an example system schematically depicts aspects of embodiments of the present disclosure. The example system includes an application 102 (e.g., a vehicle) having a first network 104 and a second network 106 thereon. A network, as utilized herein, should be understood broadly, and may include one or more aspects such as: the hardware implementation (e.g., wires and wiring configurations, applicable standards such as connectors, insulation, shielding, wire requirements such as gauging, twisting, coaxial arrangements, etc.), implementations of any layer (e.g., from the ISO 7 layer model, such as: application layer, presentation layer, session layer, transport layer, network layer, data link layer, and/or physical layer; although a given network may have fewer layers, and/or layers organized in a distinct manner); and/or may be wired or wireless in whole or part. Without limitation to any aspect of the present disclosure, example and non-limiting networks include a Controller Area Network (CAN), a Media Oriented Systems Transport (MOST) network, a Local Interconnect Network (LIN), a FlexRay network, a Time-Triggered Protocol (TTP) network, a Low-Voltage Differential Signaling (LVDS) network, and/or an Ethernet implemented network. In certain embodiments, one or more networks may be an electrical signal zone (e.g., a device providing data and/or receiving commands as an electrical signal, such as a voltage value, a frequency value, and indicated resistance value, or the like), such as a sensor or actuator electrically coupled to an interpreting device that is capable to receive information from, and/or pass information or commands to, one or more electrical devices on the electrical signal zone.

An example system includes the first network 104 being of a different type than the second network 106. As utilized herein, two networks having different types should be understood broadly, and includes networks having different protocols, at least one layer distinct from each other (e.g., having a distinct application layer, presentation layer, etc.), two networks that are not operationally compatible (e.g., a device coupled to one of the networks will not function on the second network without changes to connections, communications, or other aspects), and/or two networks that are not message compatible (e.g., messages configured for a first one of the networks could not be directly placed on the second one of the networks, due to a distinction such as addressing, frame construction, message logic compatibility, etc.). An example system includes the first network 104 being an Ethernet implemented network, and the second network 106 of a different type, such as a CAN network and/or a LIN network.

The example system further includes a converged network device (CND) 108 interposed between the first network 104 and the second network 106, and structured to facilitate communications between the first network 104 and the second network 106. The CND 108 interposed between the networks 104, 106 includes embodiments wherein the CND 108 passes communications between the networks 104, 106, for example receiving a communication from the first network 104, translating the communication for the second network 106 (e.g., encapsulating all or a portion of the communication into a message for the second network 106; converting aspects of the communication such as device addresses, bit depths for data, and/or unit values for data; and/or adding or removing aspects of the communication such as priority information, message delivery requests or requirements, industry standard information such as message identifiers, etc.). In certain embodiments, the CND 108 does not physically pass communications, or just passes a portion of the communications, but may regulate, manage, provide permissions, suppress messages, or otherwise control other devices (e.g., switches, routers, gateways, repeaters, or the like) that perform operations to pass communications between the networks. Accordingly, the CND 108 interposed between the networks 104, 106 may, in certain embodiments, be physically positioned between the networks 104, 106, where communications passing between the networks 104, 106 are physically received by a component of the CND 108. In certain embodiments, the CND 108 interposed between the networks 104, 106 may have visibility to communications on the networks 104, 106, and control devices to regulate the passing of messages between the networks. In certain embodiments, the CND 108 interposed between the networks 104, 106 may have visibility of end points on the networks 104, 106, and control devices to regulate the passing of messages between the end points of each network 104, 106.

One of skill in the art, having the benefit of the present disclosure, can readily arrange a CND 108 according to one of these interposition schemes, and/or according to a combination of more than one of these interposition schemes, having information ordinarily available when contemplating a particular system. Certain considerations when designing an interposition scheme for a CND 108 for a given system include, without limitation, include: the number and type of networks on the vehicle; the capabilities of the individual networks (e.g., throughput, bandwidth, address availability, broadcast/unicast/multi-cast availability and desirability of each network and/or end points on a network, requirements and/or availability of acknowledgement for each network and/or end points, and/or requirements and/or availability of encryption for each network and/or end points); the availability, position, and/or control over network implementing controllers (e.g., presence and ownership of switching devices; access to instructions, such as firmware or buffers, for available devices; and/or the connectivity of available devices to the one or more networks, such as whether the devices are arranged to implement desired message passing between networks, desired redundancy, and/or desired failure mode response); capability of network implementing controllers (e.g., buffer sizing and availability, message rate capacity, processing capacity); hardware cost considerations for adding CND-specific components to the system; hardware cost considerations for providing capability for CND operations in other components of the system; integration cost considerations and system capability to implement additional CND-specific components and/or adding capability for CND operations in other components of the system); the number, type, and/or message throughput of end points that utilize cross-network communications; the expected change of any one or more of these aspects over the life of the vehicle (e.g., due to service events, upgrades, and/or campaign events such as product recall events related to the vehicle); and/or the expected change of any one or more of these aspects over a life cycle of a related group of vehicles (e.g., a related fleet of vehicles; model year of vehicles; and/or a group of model years relevant to the system, such as vehicles expected to have a similar network infrastructure, with variance to the distribution of devices, changes to the network, or the like).

In the example of FIG. 1, a first external device 110 is depicted as communicatively coupled to the application 102. The first external device 110 is directly coupled to the application 102, which may include a directed wired connection (e.g., to a service port, OBD port, or other available connection) and/or a wireless connection (e.g., a WiFi connection such as an IEEE 801.11 compatible connection, and/or a Bluetooth connection). The first external device 110 may connect to a specific network (e.g., the first network 104 or the second network 106), and/or may connect to another device (e.g., the CND 108 and/or a device regulated by the CND 108) that manages communications with the external device 110. Whether the external device 110 is coupled to a network 104, 106 or another device such as the CND 108, in certain embodiments the CND 108 is capable to manage communications such that the external device 110 receives only authorized communications, and further to manage communications such that the external device 110 may request communications from an end point on any network 104, 106 and nevertheless receive the requested information. In certain embodiments, the first external device 110 may be a service tool, original equipment manufacturer's (OEM's) tool, a manufacturer's tool, a body builder's tool, and/or an application (e.g., an application communicating through a computing device such as a laptop, desktop, mobile device, and/or mobile phone; e.g., an application operated by an owner, servicer personnel, fleet manager, or the like).

In the example of FIG. 1, a second external device 114 is depicted in communication with the application 102 and/or the first external device 110 through a cloud connection 112. The cloud connection 112 may be a connection of any type, including a mobile connection (e.g., a modem on the application 102 connecting using cellular data or another data service), an internet connection, a wide area network (WAN), and/or combinations of these. The cloud connection 112 may access the application 102 through a transceiver, which may form a part of the CND 108 and/or be regulated, at least in part, by the CND 108. In certain embodiments, an application 102 may have more than one transceiver, where one or more, or all, of the transceivers are regulated, at least in part, by the CND 108. In certain embodiments, the CND 108 may regulate certain vehicle communications (e.g., from certain networks, end points, devices, types of data, flows, and/or applications on the vehicle), but not other communications.

An end point, as used herein, should be understood broadly. An end point is an organizing concept for access to a network 104, 106 of the vehicle, and may include a specific device (e.g., an engine controller, a transmission controller, a door controller, an infotainment system, etc.), a group of devices having a single network access (e.g., multiple devices communicating together through a single network access point, where the network 104, 106 and/or the CND 108 may have visibility to the individual devices, or may only have visibility to the communications from the end point as a group). For example, a door controller (not shown) may be an end point for one of the networks 104, 106, with communications for underlying devices (e.g., door position sensor, door lock actuator and position, window actuator and position, etc.) passing to the network 104, 106 through the door controller end point, where the CND 108 may have visibility to the underlying devices (e.g., a message indicating door position, that includes identifiers that the door position sensor is sending the message), or may have visibility only to the door controller end point (e.g., the message indicating the door position is known to be provided by the door controller, but the CND 108 does not know which underlying device may have sent the message). One of skill in the art, having the benefit of the present disclosure and information ordinarily available about a contemplated system, can readily determine which devices in the system are end points for each network 104, 106. Certain considerations for determining end point arrangements include, without limitation: the availability of hardware ports on the network(s); the distribution of vehicle controllers; the messages that are to be passed between vehicle controllers; the regulating options (e.g., message rates, priorities, data collection, message configuration, identity information of components, addressing management between networks and with external devices, etc.) as set forth in the present disclosure that are to be available for a given end point; the desired granularity of data control (e.g., permissions for specific devices to provide or request information; permissions for applications either on-vehicle or off-vehicle to provide or request information; security authorization and type, such as per-user, per-entity, per-device, per-application, per-flow, etc.); and/or redundancy options that are to be available for the given system (e.g., redundancy of network communications capability, redundancy of control operations and related devices, and/or redundancy of CND operations where CND components are distributed in more than one location of the vehicle).

An application, as utilized herein, should be understood broadly. An example application includes a group of related vehicle functions or operations, for example speed control (e.g., of the vehicle, or a sub-component of the vehicle such as an engine or a driveline), anti-lock brake system (ABS) operations, an advanced driver-assistance system (ADAS), performance control (e.g., achieving a torque request, speed request, or other performance request from an operator), or other function of the vehicle. An example application includes a group of related functions apart from the vehicle, such as an application to support geolocation and/or navigation, to request and/or process service information about the vehicle, and/or a third-party application interacting with the operator (e.g., to find a nearest hotel, selected event, etc.). Applications may be implemented by the vehicle manufacturer, a supplier, an original equipment manufacturer, a body builder, a third party, the operator, service personnel, or the like. Applications, as used herein, provide an organizing concept that may be utilized to relate certain data, certain end points, and/or related functions of the vehicle. In certain embodiments, the CND 108 can utilize an application to identify a data source, a data destination, permissions available for the application, priority information related to the application, or the like, to implement certain data regulating operations herein.

A flow, as utilized herein, should be understood broadly. An example flow includes a related group of data (e.g., speed data, temperature data, audio-visual data, navigation data, etc.), a related group of functions (e.g., among vehicle functions, extra-vehicle functions such as service operations and/or data collection, aggregations between related vehicles, and/or combinations of these that are related for a particular system), a related group of devices (e.g., door actuators), and/or a related group of applications. Flows, as used herein, provide an organizing concept that may be utilized to relate certain data, certain end points, certain applications, and/or related functions of the vehicle or apart from the vehicle. In certain embodiments, the CND 108 can utilize a flow to identify a data source, a data destination, permissions available for the flow, priority information related to the flow, or the like, to implement certain data regulating operations here. In certain embodiments, the utilization of the flow allows the CND 108 to perform separate operations that may involve the same end points to support the desired network management. For example, a vehicle speed management application may have a high priority, and a speedometer end point may be associated with the vehicle speed management application. In the example, if the vehicle speed is being communicated to support the vehicle speed management application, then the CND 108 applies a high priority to the vehicle speed message. However, if the vehicle speed is being communicated to support a trip planning flow (e.g., where a trip planning flow is present and does not have a high priority), the CND 108 may apply a lower priority to the vehicle speed message. In a further example, a failure of a vehicle controller, portion of a network, or other off-nominal condition may result in the migration of the vehicle speed management application to another controller in the system, whereby the vehicle speed message is being communicated (e.g., where the backup controller is on another network) to support the vehicle speed management application, and the CND 108 may apply a higher priority to the vehicle speed message. The utilization of flows and applications to organize the components of the system allows for the same or similar information to be regulated by the CND 108 in a differential manner to support various functions, allowing for improvements in the performance and security of network regulation operations (e.g., reducing unnecessary cross-network traffic, and providing information only as needed), and supports additional functionality relative to previously known systems, such as redundancy support, distributed control, and granular cross-network messaging.

A service group, as utilized herein, should be understood broadly. An example service group includes a related group of applications for the vehicle. The related group of applications may be entirely positioned on the vehicle (e.g., one or more vehicle systems, functions, or other applications of the vehicle), and/or may include aspects that are positioned on external devices (e.g., with supporting processing, data collection or storage, externally sourced data used by the service group, etc.) which may be a web application, web tool, cloud application, service application, or the like. In certain embodiments, any group of local communicating devices may be logically related as a service group. The utilization of service groups to organize the components and/or applications of the system allows for the same or similar information to be regulated by the CND 108 in a differential manner to support various functions, allowing for improvements in the performance and security of network regulation operations (e.g., reducing unnecessary cross-network traffic, providing information only as needed, and/or regulating communications with external devices), and supports additional functionality relative to previously known systems, such as redundancy support, distributed control, and granular cross-network messaging.

Regulated components, as utilized herein, and without limitation to any other aspect of the present disclosure, include any components of a system that are regulated with respect to communications, including data collection, subscriptions, data requests, access to external devices and/or addresses, access to network zones, access to end points, utilization of communication resources (e.g., network zone bandwidth, external communication portals, total data limits or quantities, etc.). Regulated components include, without limitation, one or more of: end points, flows, applications, controllers, service groups, interface circuits, network zones, external communication portals, external devices, source addresses, destination addresses, vehicle functions, entities associated with any of these, users associated with any of these, and/or user roles associated with any of these.

Figure 2:
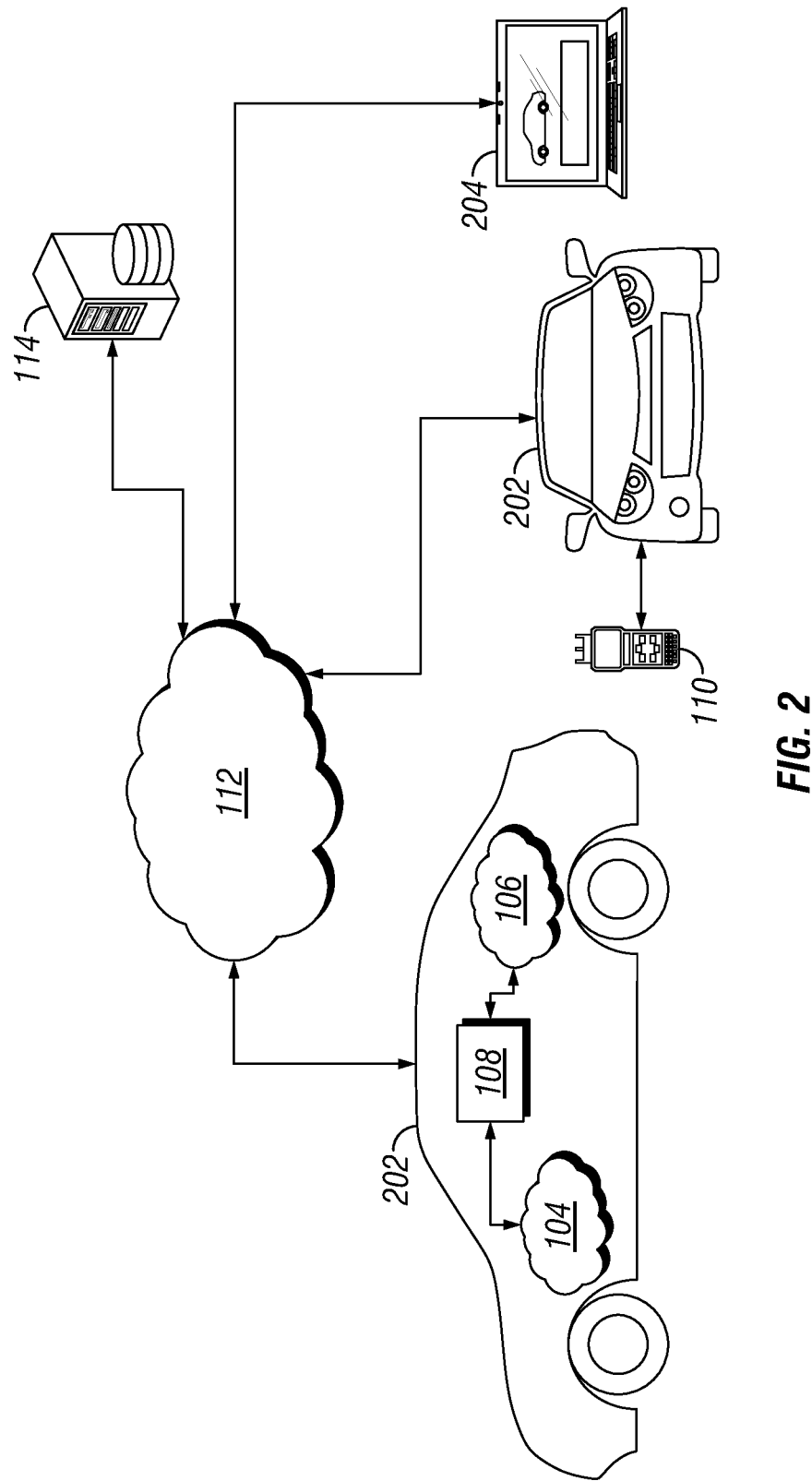
FIG. 2 is a schematic diagram of an example system for regulating networks on a vehicle according to certain embodiments of the present disclosure.

Referencing FIG. 2, an example system includes a vehicle 202 having a first network 104, a second network 106, and a CND 108 interposed between the networks 104, 106. The example system depicts the vehicle 202 communicatively coupled to an external device 110, similar to the depiction of FIG. 1, and/or communicatively coupled to a second external device 114. The example of FIG. 2 depicts another external device 204 communicatively coupled to the vehicle 202, through the cloud connection 112 in the example. The third external device 204 is depicted schematically as a laptop, for example as operated by a fleet service manager, owner, and/or vehicle representative (e.g., a warranty administrator). The example of FIG. 2 is an illustrative depiction to show additional context options and a specific application as a vehicle, but is otherwise similar to the system of FIG. 1.

Figure 3:
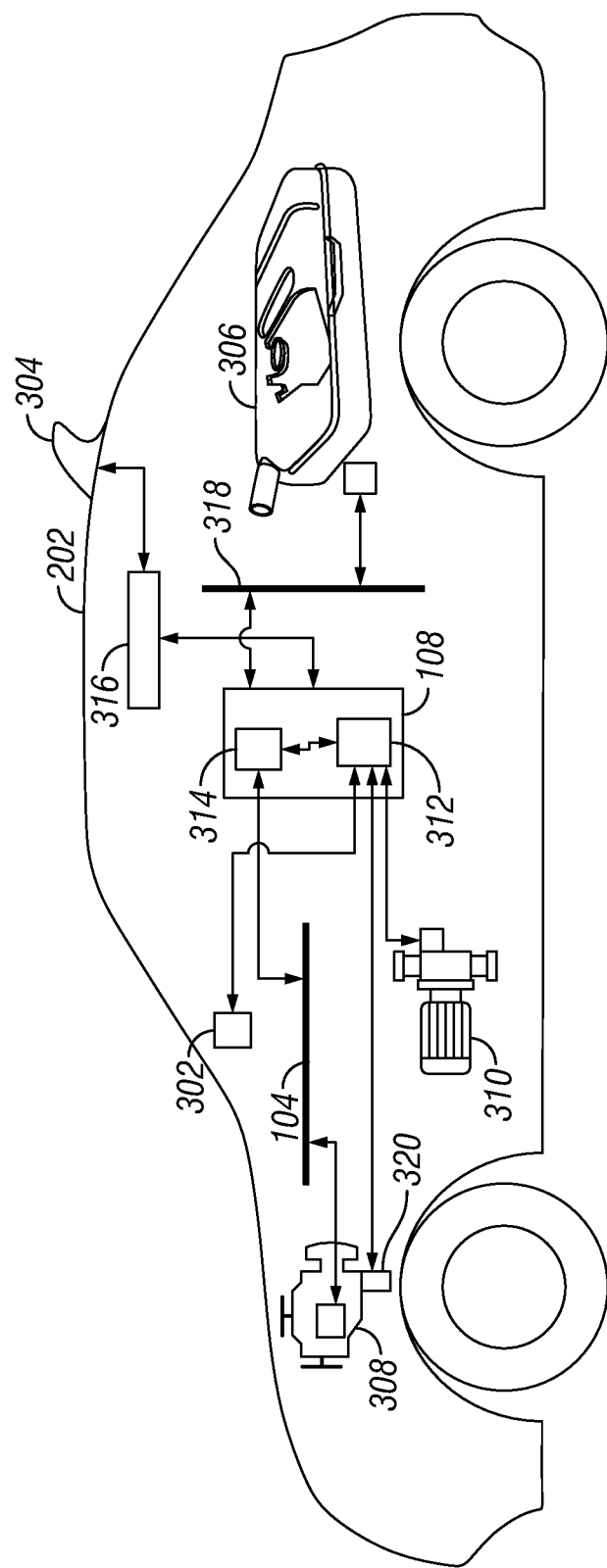
FIG. 3 is a schematic diagram of an example system for regulating networks on a vehicle according to certain embodiments of the present disclosure.

Referencing FIG. 3, an example embodiment including a vehicle 202 is schematically depicted, illustrating certain further details that may be present in certain embodiments. The example system includes the vehicle 202 having a first network 104 and a second network, and a CND 108 interposed between the first network 104 and the second network. In the example of FIG. 3, the second network is an Ethernet network with devices (e.g., an interactive dashboard 302, a door actuator 310, and a transmission controller 320) coupled to an Ethernet switch 312. In the example of FIG. 3, a third network 318 is shown, with a fuel tank sensor 306 coupled to the CND 108. In the example, the third network 318 may be of the same type as one of the other networks, for example segregated from the other networks to improve the cost of installation, risk management, or for other considerations, and/or the third network may be of a different type to support devices—for example a sensor operating on a LIN network. The third network 318 may communicate with the CEG 314, the Ethernet switch 312, or another device (not shown) of the CND 108.

The example of FIG. 3 includes a first device 308 on the first network 104 (e.g., a controller for a prime mover, in the example of FIG. 3), and a number of devices (e.g., an interactive dashboard 302, a fuel tank sensor 306, and a door actuator 310, in the example of FIG. 3) on the second network. The system includes one of the devices 302, 310, 320 on the second network communicating to the first device 308 via the CND 108. For example, the door actuator 310 may lock the door when the vehicle 202 moves, pulling the vehicle movement information (e.g., engine speed, gear position, vehicle speed, and/or a state parameter such as a "VEHICLE MOVING" Boolean value, bit mask, or the like) from the first device 308.

The arrangement of FIG. 3 is a non-limiting example. Additionally or alternatively, a given device (e.g., the prime mover 308) may appear as a single end point or as multiple end points, for example the controller of the prime mover 308 may provide numerous parameters to the first network 104, which may each be provided with an identifier and operate as separate end points (e.g., engine temperature from an engine temperature sensor), and/or may include parameters provided by the prime mover 308 controller as such (e.g., engine temperature from the engine controller).

To illustrate an example of FIG. 3, the first network 104 may be a CAN bus network, where the desired data (e.g., a vehicle movement indicator) is provided according to considerations for the CAN network, and as a CAN message. The door actuator 310 is provided on the second network, for example an Ethernet network where the door actuator 310 is on a port of the second network. The port for the door actuator 310 may be a physical port (e.g., a port of an Ethernet switch 312 dedicated for the door actuator 310) or a virtual port (e.g., an address location for the second network, which may be on a shared physical port with one or more other devices). In the example of FIG. 3, the door actuator 310 cannot receive the CAN message indicating vehicle movement, and the CND 108 interprets a request from the door actuator 310 for the vehicle movement indication, retrieves the message from the first network 104, and sends the message to the door actuator 310 over the second network.

The operations performed to send the message may vary with the application. For example, the CND 108 may publish to devices on the second network that certain parameters are available from the first network 104 (and/or third network 318), and provide selected parameters to devices directly (e.g., providing the vehicle movement indicator to requesting devices), or publish data values representing parameters that are available to subscribing devices for those parameters (e.g., utilizing a broker—not shown—to make subscribed parameters available). In certain embodiments, the CND 108 may limit publication of parameters available to devices, end points, applications, and/or flows that are authorized to see those parameters are available. Stated differently, different devices on the second network may see a different list of parameters available, depending upon the authorization of those devices and/or applications or flows associated with those devices. In certain embodiments, the CND 108 may limit provision of the parameters to devices, end points, applications, and/or flows that are authorized to receive those parameters—for example by denying a subscription request for a parameter and/or suppressing the sending of a parameter to an unauthorized device despite the subscription. Accordingly, in certain embodiments, a device may be able to see that a parameter is available (e.g., in a published list of available parameters), but be unable to receive data values of the parameter. In certain embodiments, a device may be limited to seeing available parameters that the device is authorized to receive.

In certain embodiments, a device may have only limited availability to receive a parameter, for example the CND 108 may limit the rate of a data value to support reduced network utilization, data security considerations (e.g., limiting the accuracy, resolution, and/or data rate of sensitive parameters such as vehicle position), and/or to support proprietary considerations (e.g., limiting the accuracy, resolution, and/or data rate of parameters that may relate to a proprietary control operation, for example to limit the ability for an application to reverse engineer or otherwise determine how the control operation functions).

In certain embodiments, the CND 108 determines which parameters to publish, to provide, and the conditions to provide them, based upon stored data defining permissions and/or capabilities of devices, end points, applications, flows, and the like. In certain embodiments, the CND 108 further accesses stored data defining processing or adjustment operations to the data, for example encapsulation operations (e.g., to pass CAN messages to an Ethernet network), unit conversions, time stamp definitions, and the like. In certain embodiments, the CND 108 determines the authorization for applications and/or flows that are on vehicle, off vehicle (e.g., operating on an external device such as 110, 114, 204), or combined on and off vehicle. In certain embodiments, the CND 108 may support prioritization of data flow, including the rate at which devices provide information or receive information, based upon a prioritization of the related device, end point, application, flow, or other parameter. In certain embodiment, the CND 108 may support differential prioritization based upon the vehicle status or operating condition, for example using a first priority scheme during startup operations, a second priority scheme during run-time operations, a third priority scheme when the vehicle is moving, etc. In certain embodiments, the CND 108 may be responsive to any defined vehicle condition, such as charging, regenerating, aftertreatment operations, control regimes (e.g., cruise versus operator control), emergency conditions, fault conditions, a service condition, or the like.

The example CND 108 of FIG. 3 includes a first device 314 that communicates with the first network 104. An example first device 314 includes a configurable edge gateway (CEG), that reads communications from the first network 104, and provides them to the second network 106. In certain embodiments, the first device 314 translates the communications for the second network, for example encapsulating the communication, a portion of the frame of the communication, and/or a payload of the communication, into a message for the second network. In certain embodiments, the first device 314 is capable to request communications from devices on the first network 104, for example requesting a parameter that is available but is not currently being communicated onto the first network 104. In certain embodiments, the first device 314 is not a part of the CND 108, but is controlled by the CND 108, for example by responding to command from the CND 108, accessing stored data that is written, in whole or part, by the CND 108, or through other operations as provided throughout the present disclosure.

The example CND 18 of FIG. 3 includes a second device 312 that communicates with the second network. An example second device 312 includes an Ethernet switch, which may be configurable, that reads communications from the second network. In certain embodiments, the second device 312 receive messages from the first network 104 through the first device 314, for example receiving messages in a format that is communicable on the second network. An example first device 314 includes a CEG that communicates to the Ethernet switch through a port on the Ethernet switch that is provided for messages from the first device 314. Accordingly, FIG. 3 provides an illustration of a second device 310 on a second network, that communicates with the first device 308 via the CND 108.

An example system includes an external device 110, 114, 204 that communicates with the CND 108. In the example of FIG. 3, the external device 110, 114, 204 may communicate through a transceiver 304, and/or via direct access to a network of the vehicle 202 (e.g., using a service port, OBD port, WiFi, Bluetooth, etc.). The external device is structured to adjust a configuration of the CND 108—for example by changing the stored data that provides for published available data, associated permissions, defined applications, defined flows, defined end points, defined devices, and the like. In certain embodiments, the external device has an associated permission value, and the CND 108 permits changes according to the associated permission value, for example blocking adjustments to changes associated with certain networks, devices, end points, applications, flows, or the like.

An example system includes the first network as a bus network, which may further be a CAN bus network. An example system includes the second network as an Ethernet network, which may have any selected topology such a data bus architecture. In certain embodiments, the Ethernet network may have a data bus architecture as a hardware topology, but operate in a distinct manner logically (e.g., as a switched network).

Figure 4:
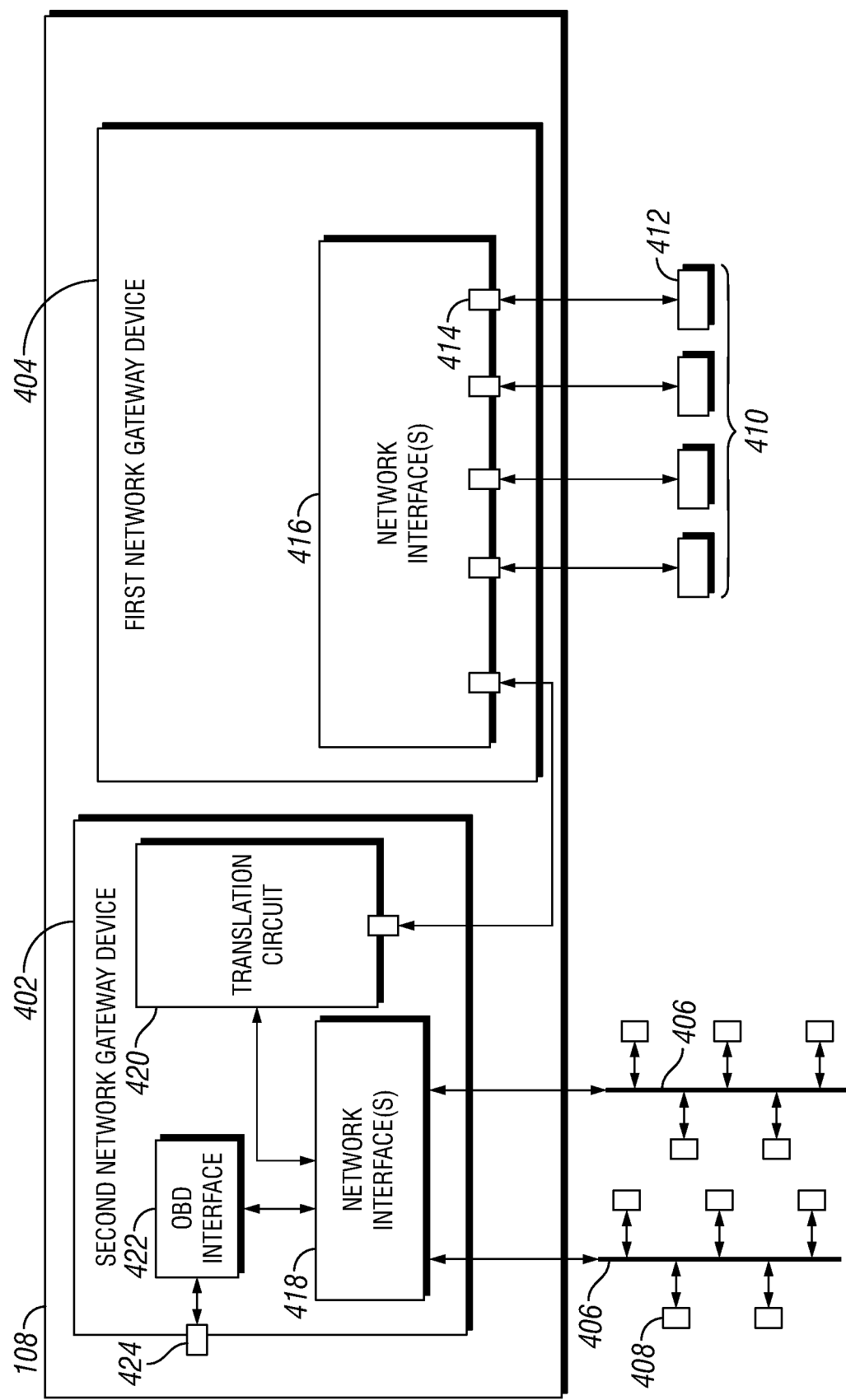
FIG. 4 is a schematic diagram of a converged network device (CND).

Referencing FIG. 4, an example system includes a CND 108 having a first network gateway device 404 and a second network gateway device 402. In the example of FIG. 4, the first network gateway device 404 is a CEG that accesses one or more CAN based networks 406, each having one or more end points 408—for example devices coupled to the CAN network 406 that provide communications to, and/or receive communications from, the respective CAN network 406. The example of FIG. 4 depicts two CAN networks 406, which may be arranged for convenience of integration (e.g., to divide components of the vehicle logically by function, by position in the vehicle, and/or any other arrangement such as a related group of components communicating on a common CAN network 406). In the example, the first network gateway device 404 communicates with both CAN networks 406, although the CND 108 may include, and/or may be configured to regulate, more than one CEG, for example having one CEG accessing each CAN network 406, and/or each CEG accessing a subset of the CAN networks 406 on the vehicle. The example of FIG. 4 depicts bus networks 406, and the networks 406 are described as CAN networks for purposes of illustration, but the networks 406 may be of any type as described throughout the present disclosure. The end points 408 may be any type of end point capable to communicate with the network 406, such as a controller, smart sensor or actuator, or other device capable to provide communications to the network 406, and/or receive communications from the network 406.

The example of FIG. 4 describes the CND 108 as including the network gateway devices 402, 404, but the CND 108 may be separate from one or more of the network gateway devices 402, 404, and may configure operations of the network gateway devices 402, 404, for example by adjusting stored data thereon, adjusting stored data accessible to the devices 402, 404, providing commands thereto, and/or performing any other operations as set forth throughout the present disclosure.

In the example of FIG. 4, the second network gateway device 402 is an Ethernet switch that accesses an Ethernet based network 410, depicted schematically as a number of end points 412 communicating with a number of ports 414 of the Ethernet switch 404. The ports 414 are depicted schematically, and may be logical ports, hardware ports, or combinations of these. The physical topology of the Ethernet network 410 may be a bus arrangement, a hub arrangement, a star arrangement, or any other type of network topology, and which may be distinct from the logical topology of the Ethernet network 410. The second network gateway device 402 is depicted as having a network interface 416, which may include the physical port connection(s). In certain embodiments, the second network gateway device 402 is a configurable Ethernet switch, which may include a processor, computer readable storage (e.g., to store instructions, configuration information, buffering for data communication and/or collection operations, and the like). These aspects are not shown for clarity of the depiction and the present description, but they may be present on the second network gateway device 402, within a same housing as the second network gateway device 402, on a separate board (e.g., mounted on a separate printed circuit board) from the network interface 416 and/or from the remainder of the second network gateway device 402, positioned on another device in the system and in communication with the second network gateway device 402 (e.g., on the first network gateway device 404, on a vehicle controller, and/or on another controller in the system), and/or distributed across a combination of these locations.

In the example of FIG. 4, the first network gateway device 404 includes one or more network interface(s) 418 (and/or network interface circuit) that communicatively couple the first network gateway device 404 to the network(s) 406, and a translation circuit 420 that configures messages from the Ethernet network 410 for communication to the network(s) 406, and/or that configures messages from the network(s) 406 for communication to the Ethernet network 410. Additionally or alternatively, the translation circuit 420 configures messages for passage from one of the network(s) 406 to another one of the network(s) 406—for example where the networks 406 are of different types, utilize different protocols, would otherwise have conflicting source or destination information, and/or otherwise have distinct characteristics that are managed by the first network gateway device 404 to ensure message compatibility, successful mission operation of the vehicle, and/or to implement any other configuration operations as set forth in the present disclosure. The translation circuit 420 is depicted schematically as a single device, but may be implemented as one or more devices, for example with a number of translation circuit 420 components each implementing a type of configuration, interacting with a type of network 406, to distribute processing and/or memory operations of the translation circuit 420, or for any other reason according to the particular system. In the example of FIG. 4, the first network gateway device 404 provides messages to the Ethernet switch in response to a corresponding message on the CAN based network 406. In the example of FIG. 4, the first network gateway device 404 provides the message to a port 414 of the Ethernet switch. In the example of FIG. 4, any messages provided from the networks 406 appear on the Ethernet network 410 as a message on the port between the translation circuit 420 and the network interface 416, and is received from the Ethernet network 410 through the port between the translation circuit 420 and the network interface 416. The translation circuit 420 allows for configuration operations between messages, such end points on each network 406, 410 can communicate therebetween, as regulated by the CND 108.

The example of FIG. 4 further includes an on-board diagnostic (OBD) interface 422, which in the example communicates with a dedicated OBD port 424. The example of FIG. 4 is non-limiting for purposes of illustration, and the OBD interface 422 may be associated with any network, or more than one network (e.g., to support multiple OBD tools that may connect to the vehicle). An example embodiment includes the OBD interface 422 associated with the second network gateway device 402, for example where the OBD system is largely CAN based, allowing for reduced traffic between the translation circuit 420 and the network interface 416, as many of the OBD parameters are native to one or more of the CAN networks 406. The OBD interface 422 may alternatively be present on the Ethernet network 410, or present on more than one network 406, 410 of the system. Regardless of the location of the OBD interface 422 and the network 406, 410 origination of OBD related data, OBD requests and information can be made available to the OBD port 424 (which may be a physical connection, a wireless connection, or another external connection including a mobile data connection) via operations of the CND 108 to authorize and provide cross-network communication from end points of any of the networks 406, 410. Additionally, the example of FIG. 4 utilizes an OBD interface 422 as a non-limiting example, but any type of special, dedicated, and/or proprietary interface may be provided in a similar manner, with an interface and port that can make any data from any end point on a network 406, 410 available, subject to configurable regulation by the CND 108.

An example system includes the CND 108 interposed between an electrical sensor and one of the networks 406, 410, and structured to provide a sensed value on the network in response to an electrical response of the electrical sensor. For example, one of the networks 406 may be an electrical connection to the second network gateway device 402, with a corresponding end point 408 as the electrical sensor, and whereby the translation circuit 420 converts the electrical signal from the sensor to a communication for the respective network (e.g., network 410, or another network 406). In the example, the translation circuit 420 may perform processing operations on the electrical signal, such as analog/digital (A/D) processing, determination of indicated bits, determination of an indicated value, de-bouncing of the signal, filtering of the signal, diagnostic bit detection (e.g., determination of a fault, and conversion to a corresponding fault value; and/or conversion of predetermined voltage values to a corresponding fault value), saturation management (e.g., limiting outputs to predetermined values), slew limitations (e.g., applying rate-of-change limits to the indicated value), and the like. Electrical signals from the sensor, where present, may be voltage values, frequency values, indicated resistance values, or any other type of sensor electrical value as known in the art.

In another example, a system includes the CND 108 interposed between an electrical actuator and one of the networks 406, 410, and structured to provide a command value from the network as a configured electrical response to the electrical actuator. For example, one of the networks 406 may be an electrical connection to the second network gateway device 402, with a corresponding end point 408 as the electrical actuator, and whereby the translation circuit 420 converts the communication from the respective network (e.g., network 410, or another network 406) to an electrical signal for the actuator. In the example, the translation circuit 420 may perform processing operations on the electrical signal, such as digital-to-analog processing, determination from indicated bits to corresponding values, diagnostic bit provision, saturation management, slew limitations, and the like. Electrical signals to the actuator, where present, may be voltage values, frequency values, modulated values, or any other type of actuator electrical value as known in the art. In certain embodiments, an electrical actuator may additionally have sensing values (e.g., position feedback, acknowledgement, etc.), and/or other feedback values (e.g., certain electrical values indicating the actuator has a fault condition, is non-responsive, is stuck, is saturated, etc.) which may be provided on the same or a distinct electrical connection, and which may logically be part of the same network 406 or a distinct network (e.g., actuation on one network 406, and feedback on a second network 406).

It can be seen that the embodiment of FIG. 4 provides for communication between end points on distinct networks, without the end points requiring knowledge about how communications to other end points are to be performed, or where other end points are positioned. Without limitation to any other aspect of the present disclosure, the embodiment of FIG. 4 provides the capability for operation of vehicle networks with devices distributed across distinct networks, including networks of a different type. Additionally, the embodiment of FIG. 4 provides for operation of the vehicle as devices move between networks, without limitation to whether the device has changed communication capability. For example, a first device on a CAN network that is moved to the Ethernet network can continue to function, with appropriate configuration of the CND 108, as messages that were utilized by the device from the CAN network can be moved to the Ethernet network and made available to the device in the new position. In certain embodiments, the migrated device can continue to utilize previous algorithms (e.g., the same local control)—for example computer readable instructions specifically built for the specifics of the former CAN messages, including bit depth, resolution information, message rates, floating/fixed point data nature, and the like, with the CND 108 configured to encapsulate the entire original CAN message into an Ethernet message (e.g., a frame, a packet, and/or in a specified manner), such that the migrated device can receive the former CAN message as originally presented and utilized by that same local control. Accordingly, the embodiment of FIG. 4, and the principles set forth in relation to FIG. 4, allow for changes in the end point device mix between networks, whether across a number of vehicles (e.g., changes that occur over a course of design revisions, model years, or the like) or within a same vehicle (e.g., changes that occur during service, upgrades or changes to end points, upgrades, upfits, recall replacements, etc.), with only an update to the CND 108 configuration to support the changes. In certain embodiments, the embodiment of FIG. 4 and the principles set forth in relation to FIG. 4 allow for changes in the end point device mix between networks without requiring an update to the CND 108 configuration, for example where a range of end points are contemplated to be available in more than one possible network location and/or configuration, and where the CND 108 is configured to determine the end point arrangement present on the vehicle and to utilize a selected configuration (e.g., from among two or more available configurations) accordingly. Accordingly, the embodiment of FIG. 4, and the principles set forth in relation to FIG. 4, further allow for changes to the end point device mix between networks, at least within a predetermined range of end point devices and configurations, to support vehicle operations without any changes to the vehicle, and even with only intermittent or no communication with external devices for configuration of the CND 108.

Figure 5:
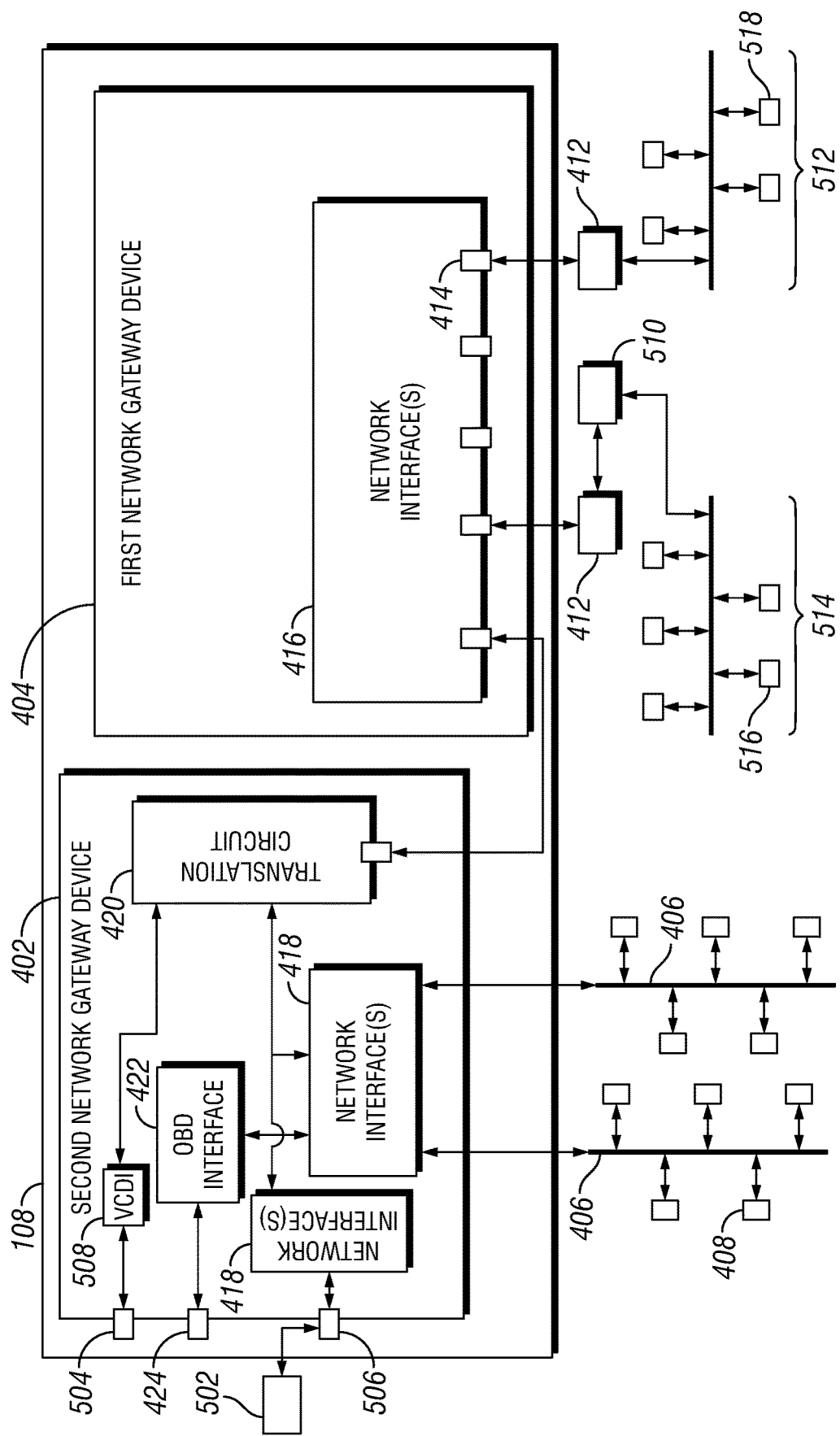
FIG. 5 is a schematic diagram of a converged network device (CND).

Referencing FIG. 5, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 5 is generally consistent with the embodiment of FIG. 4, with some differences depicted to highlight certain aspects of the present disclosure. The example of FIG. 5 includes additional interfaces 504, 506, which may be separate networks or network zones relative to the networks 406. The example of FIG. 5 depicts a vehicle control device interface (VCDI) 508, which may be an interface to a vehicle controller (e.g., engine controller, transmission controller, anti-lock brake system (ABS) controller, advanced driver-assistance system (ADAS) controller, door controller, battery controller, head unit, interactive dashboard, etc.) of any type, including a controller providing communications at the end point 504, and/or an electrical interface such as to a sensor, actuator, or combined sensor and actuator. The example of FIG. 5 depicts an additional interface 506 to an end point 502, which may be a communicative device of any type as understood in the art or set forth herein. In the embodiment of FIG. 5, network interface circuits 418, 508 are depicted between the end points 408, 502 and the translation circuit 420, to allow for the translation circuit 420 to interface with numerous network types that may be present on the vehicle. The interface circuits 418, 508 may be positioned with the translation circuit 420, or located elsewhere and communicatively coupled to the associated network(s) and to the translation circuit 420. The example of FIG. 5 additionally depicts networks 512, 514 that are communicatively coupled to the first network gateway device 404 through end points 412 on same network as the network interface 416. In certain embodiments, the CND 108 does not have or need specific knowledge about the networks 512, 514 or associated end points 516, 518, as communications to the networks 512, 514 are provided through the end points 412. However, the CND 108 is structured to provide communications from networks in communication with the second network gateway device 402, such as networks 406, and/or networks interfaced at end points 504, 506. Communications from the second network gateway device 402 may provide the requested information (e.g., ambient temperature, door position, vehicle speed), for example as an encapsulated payload that provides the information, or as a native message (e.g., a CAN message indicating ambient temperature, door position, vehicle speed; and/or a LIN message having associated sensor information). Accordingly, end points 516, 518 can send and receive tunneled messages with networks 406 (or other networks) in a shared format, or otherwise receive information from any network on the vehicle, subject to regulation by the CND 108.

Figure 6:
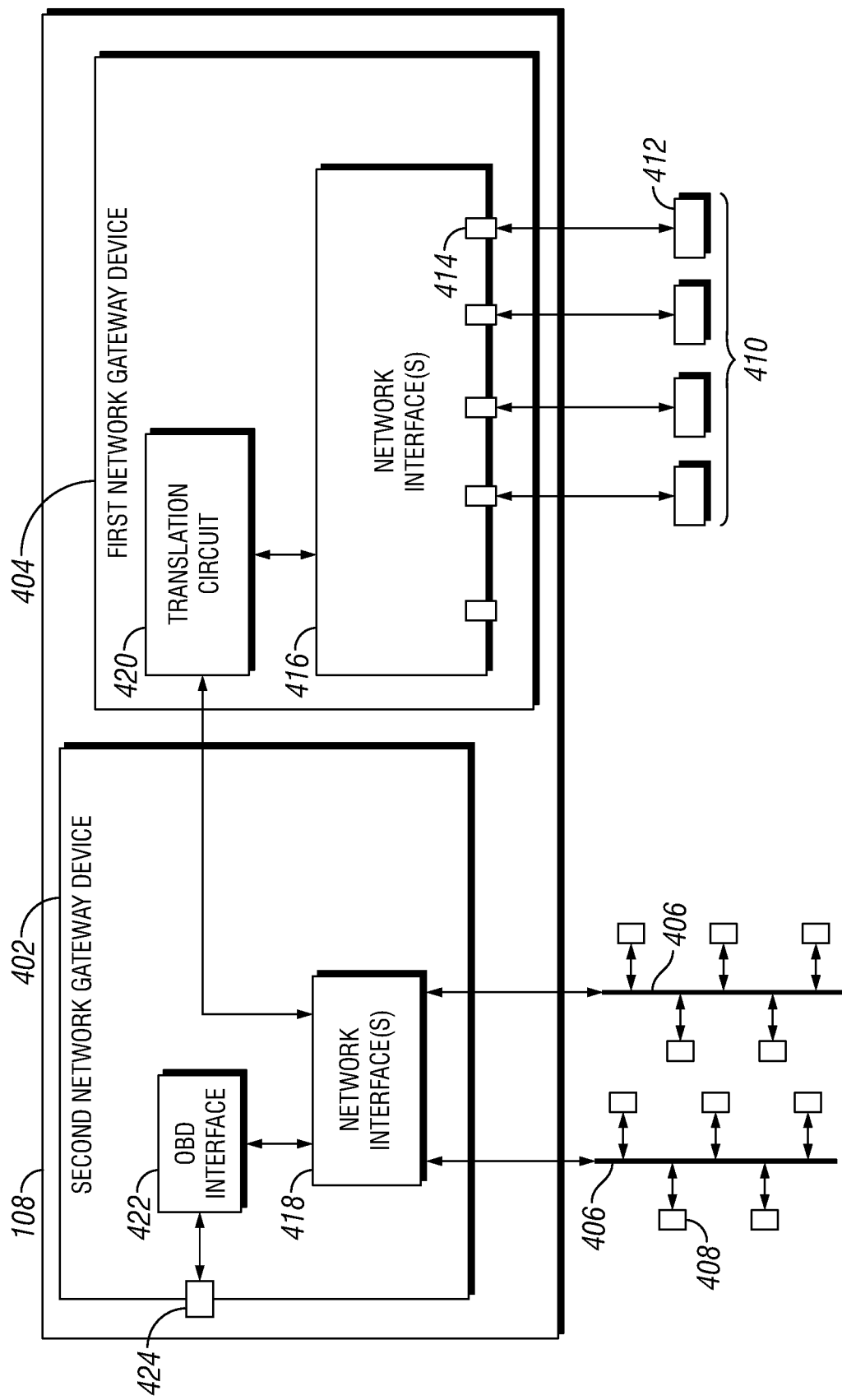
FIG. 6 is a schematic diagram of a converged network device (CND).

Referencing FIG. 6, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 6 is generally consistent with the embodiment of FIG. 4, with some differences depicted to highlight certain aspects of the present disclosure. Without limitation to any of the flexibility of arrangements depicted in FIG. 4, the example of FIG. 6 depicts the translation circuit 420 positioned in the first network gateway device 404.

Without limitation to any other aspect of the present disclosure, co-location as depicted in FIG. 6, and as utilized herein, can indicate physical co-location (e.g., the translation circuit 420 positioned within a shared housing with the first network gateway device 404, and/or on a same board with the first network gateway device 404) and/or logical co-location (e.g., the grouping of operational responsibility of implementing hardware, such as connections, connectivity, operational instructions, stored data, data storage, and/or processing resources, etc.). The determination of a co-location scheme depends upon the purpose of the co-location (e.g., sharing hardware resources, reducing external interfaces, simplifying and/or diversifying risk profiles of the co-located components and/or of other components in the system related to the co-located components); the nature of the co-located components (e.g., hardware implementations, processing and/or memory resources related to the co-located components); the division of ownership of the co-located components (e.g., manufacturer, supplier, service party, vehicle owner, vehicle operator); operational responsibility of components and/or the vehicle (e.g., warranty, operational liability, service, insurance, uptime responsibility, etc.); and/or integration responsibility of components (e.g., installation, design, meeting a footprint requirement, tradeoffs between components, and/or ability to influence these). Accordingly, in certain embodiments, co-locating components may include one or more of: positioning components within a shared housing or group of housings; positioning components in a selected geometric proximity; positioning components in a selected logical arrangement (e.g., associating in a same flow or group of flows, associating in a same application or group of applications, providing operational constraints such as parameter naming, memory assignment, execution order, or the like); positioning components in a selected risk profile arrangement (e.g., positioning in a same impact zone, a same temperature environment, a same NVH environment, a same EMI environment, subject to a same failure mode (e.g., electrical, logical, fault, physical impact, and/or dependency on a physical component such as a pump, cooling system, etc.)); on a same board; and/or within a shared memory location (e.g., computer readable instructions positioned in a shared memory location, and/or executed by a same processor resource). In the example, NVH is the "noise, vibration, and harshness" environment, and EMI is the "electro-magnetic interference" environment. One of skill in the art, having the benefit of the present disclosure and information ordinarily available when contemplating a particular system, can readily determine implementations of components that are co-located as set forth in the present disclosure. It can be seen that components arranged in one or more of the described co-location schemes may be co-located for certain embodiments, or not co-located for other embodiments, and/or may be co-located for the purposes of certain operating conditions, but not co-located for the purposes of other operating conditions. Certain considerations to determine whether components are to be co-located, and the selected co-location scheme for those components, include (without limitation): the purpose of the co-location; operational costs of resources (e.g., communications, processing resources, operational limitations to the vehicle mission, operational impact to the vehicle mission such as cooling requirements, power consumption, and the like); capital costs of resources (e.g., computing power, network infrastructure, memory resources, individual component quality or capability requirements, shielding requirements, data throughput whether intra-vehicle or extra-vehicle, etc.); integration costs for components (e.g., footprint availability and cost, interface management, design flexibility and lock-down trajectory, and/or ability to trade-off and/or optimize with other aspects of the system); and/or the ability to distribute costs to other interested parties related to the system (e.g., suppliers, manufacturers, customers, and/or service parties; and which may include the ability to distribute increased costs related to increased capabilities, and/or to trade costs between interested parties).

In the example of FIG. 6, the translation circuit 420 may provide communications by, without limitation, populating and/or reading from a shared memory with the network interface 416, and/or by communicating with a port 414 (not shown).

Figure 7:
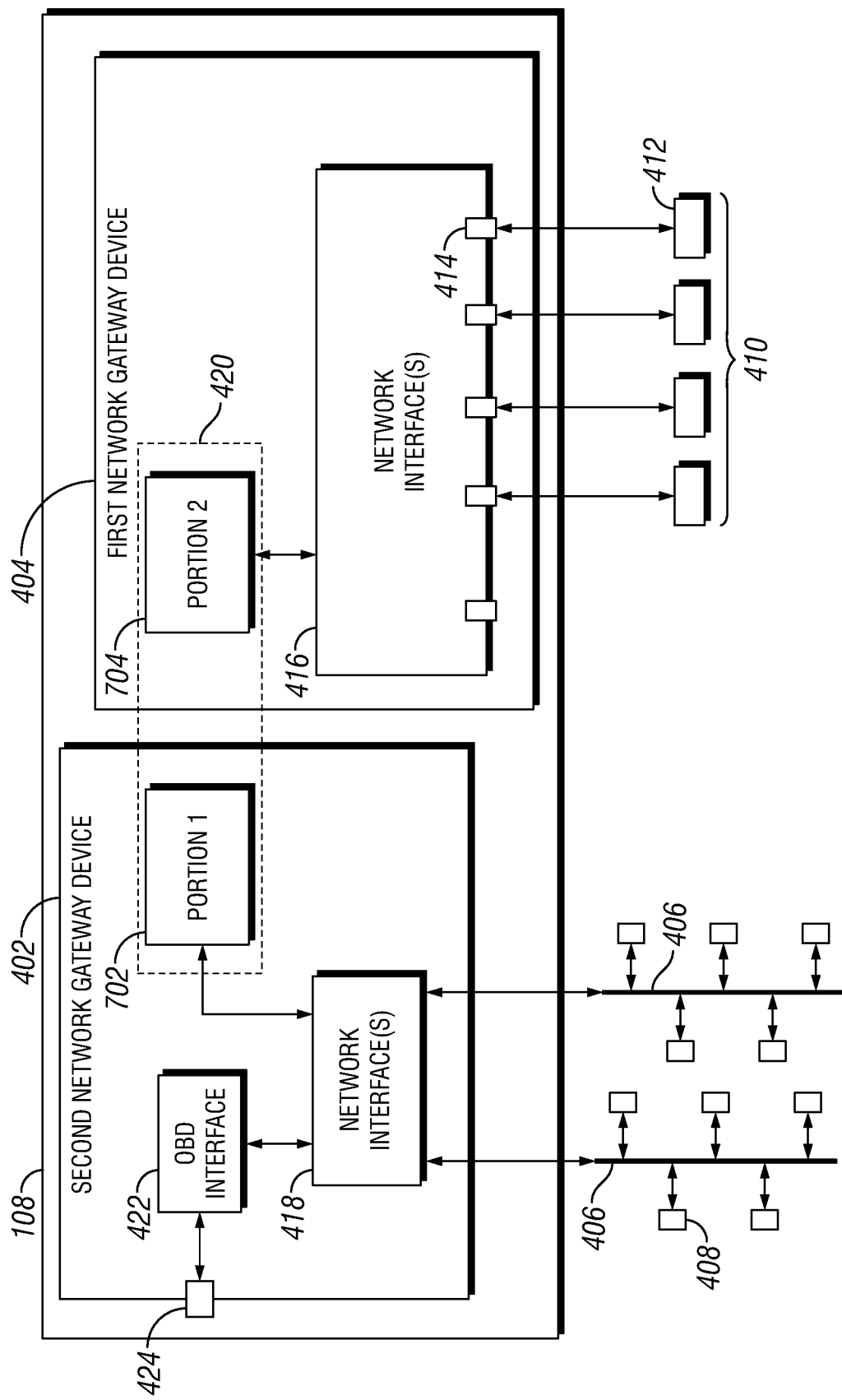
FIG. 7 is a schematic diagram of a converged network device (CND).

Referencing FIG. 7, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 7 is generally consistent with the embodiment of FIG. 4, with some differences depicted to highlight certain aspects of the present disclosure. Without limitation to any of the flexibility of arrangements depicted in FIG. 4, the example of FIG. 7 depicts the translation circuit 420 having a first portion 702 co-located with the second network gateway device 402 and a second portion 704 co-located with the first network gateway device 404. The portions 702, 704 of the translation circuit 420 may be separated for any reason, including at least separating translation operations by network (e.g., which network 406 is being serviced), by predetermined end points, by flows, by translation operation (e.g., processing of frame information, processing of payload information, managing capability differences by down-sampling, up-sampling, buffering, providing communication commands, encapsulation of a message into another message format, etc.), and/or by direction of communication (e.g., direction between selected networks, between the gateway devices, between end points, between flows, or combinations of these).

Figure 8:
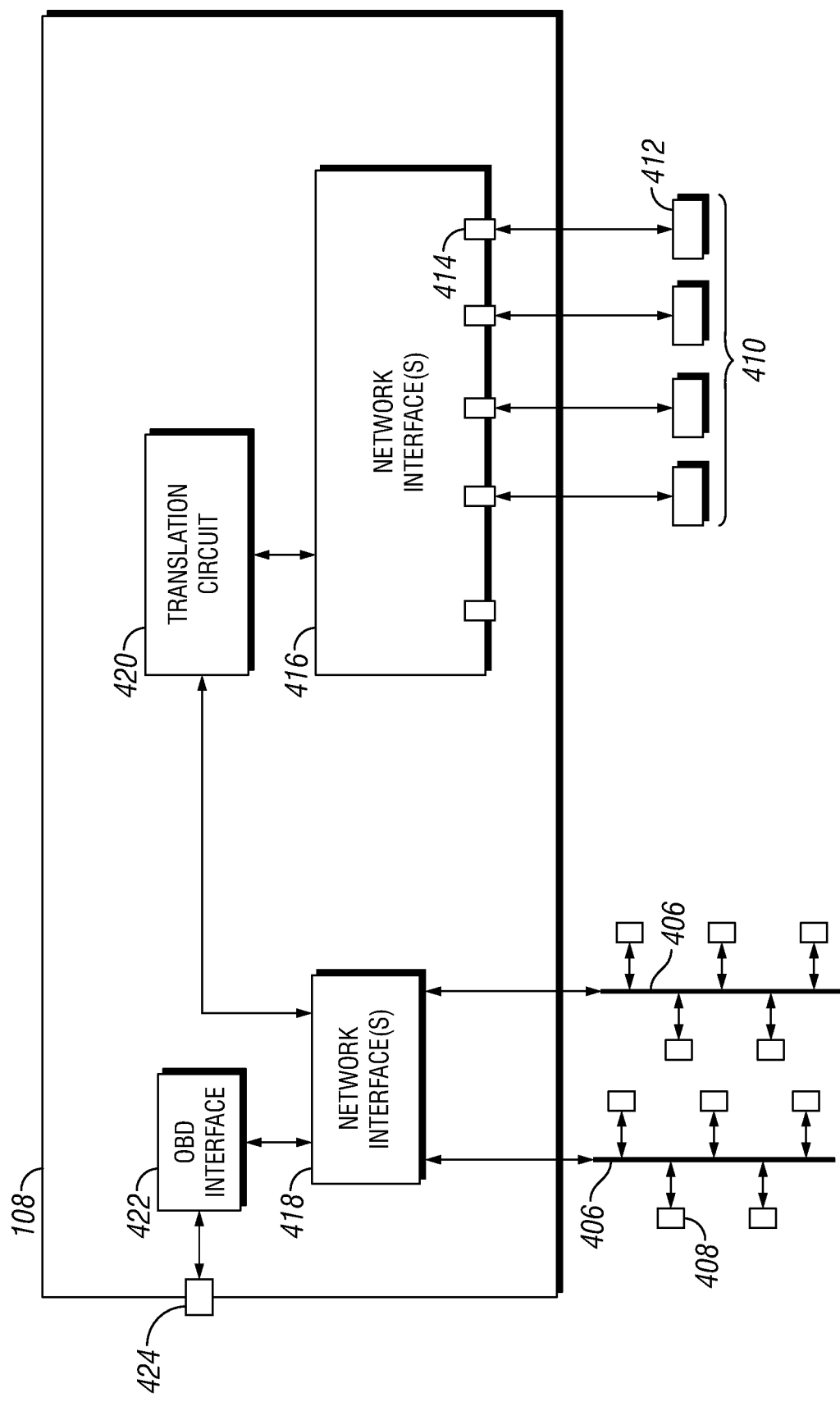
FIG. 8 is a schematic diagram of a converged network device (CND).

Referencing FIG. 8, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 8 is generally consistent with the embodiment of FIG. 4, with some differences depicted to highlight certain aspects of the present disclosure. In the example of FIG. 8, the first network gateway device and the second network gateway device are co-located, and omitted as being depicted as part of the CND 108. In certain embodiments, the CND 108 of FIG. 8 may alternatively be a combined gateway device that is regulated by the CND 108, rather than forming a part of the CND 108. In certain embodiments, one or more portions of the combined gateway device(s) may form a part of the CND 108, with other portions of the combined gateway device(s) regulated by the CND 108.

A policy, as utilized herein and without limitation to any other aspect of the present disclosure, includes a description of data to be collected, such as data parameters, collection rates, resolution information, priority values (e.g., ordering data collection values for selection in response to off-nominal conditions where not all data collection parameters can be serviced, etc.). In certain embodiments, a policy further includes event information, which may be stipulated as parameter or quantitative based events (e.g., a given data value exceeds a threshold, etc.), and/or categorical events (e.g., a particular fault code, operational condition or state, or vehicle location/jurisdiction occurs). In certain embodiments, a policy further includes an event response, such as data values to be captured in response to the occurrence of the event, and/or other changes in the data collection scheme such as increased or reduced data collection rates, changes in collected resolution, or the like. In certain embodiments, an event response further includes a time frame associated with the event occurrence, for example a time period after the event occurrence to utilize the adjusted data collection scheme, and/or a time period preceding the event occurrence (e.g., utilizing a rolling buffer or other data collection operation, providing temporary information that can subsequently be captured if the event occurs). In certain embodiments, changes to the data collection scheme for an event can include multiple changes—for example changes over a period of time, further changes based upon the progression of the event (e.g., if the event severity gets worse), and/or criteria to determine that an event is cleared. In certain embodiments, changes to a data collection scheme may be implemented based on event related clearance of the same or another event, for example implementing a data collection change until a next shutdown event of the vehicle, until a service technician clears the event, for a selected number of shutdown events occurs, or the like. A policy may additionally or alternatively include parameters for performing any regulating operations for any regulated components as set forth throughout the present disclosure.

The utilization of a policy herein may reference a partial policy, for example the implied policy that would be implemented in response to a single data collection scheme from a single user, wherein the full policy is prepared, verified, and communicated to the vehicle after one or more partial policies are aggregated. The utilization of a policy herein may reference an unverified policy, for example after a policy responsive to a number of users is aggregated, but verification operations of the policy are not yet completed (e.g., before it is determined if the data collection implied by the policy can be performed). The utilization of a policy herein may reference a previously applied policy (e.g., a policy present on a vehicle before an updated version of the policy is communicated to the vehicle and/or implemented on the vehicle). The utilization of a policy herein may reference an updated policy, for example a verified policy that is pending for communication to the vehicle and/or confirmed by the vehicle (e.g., from the CND 108).

Figure 9:
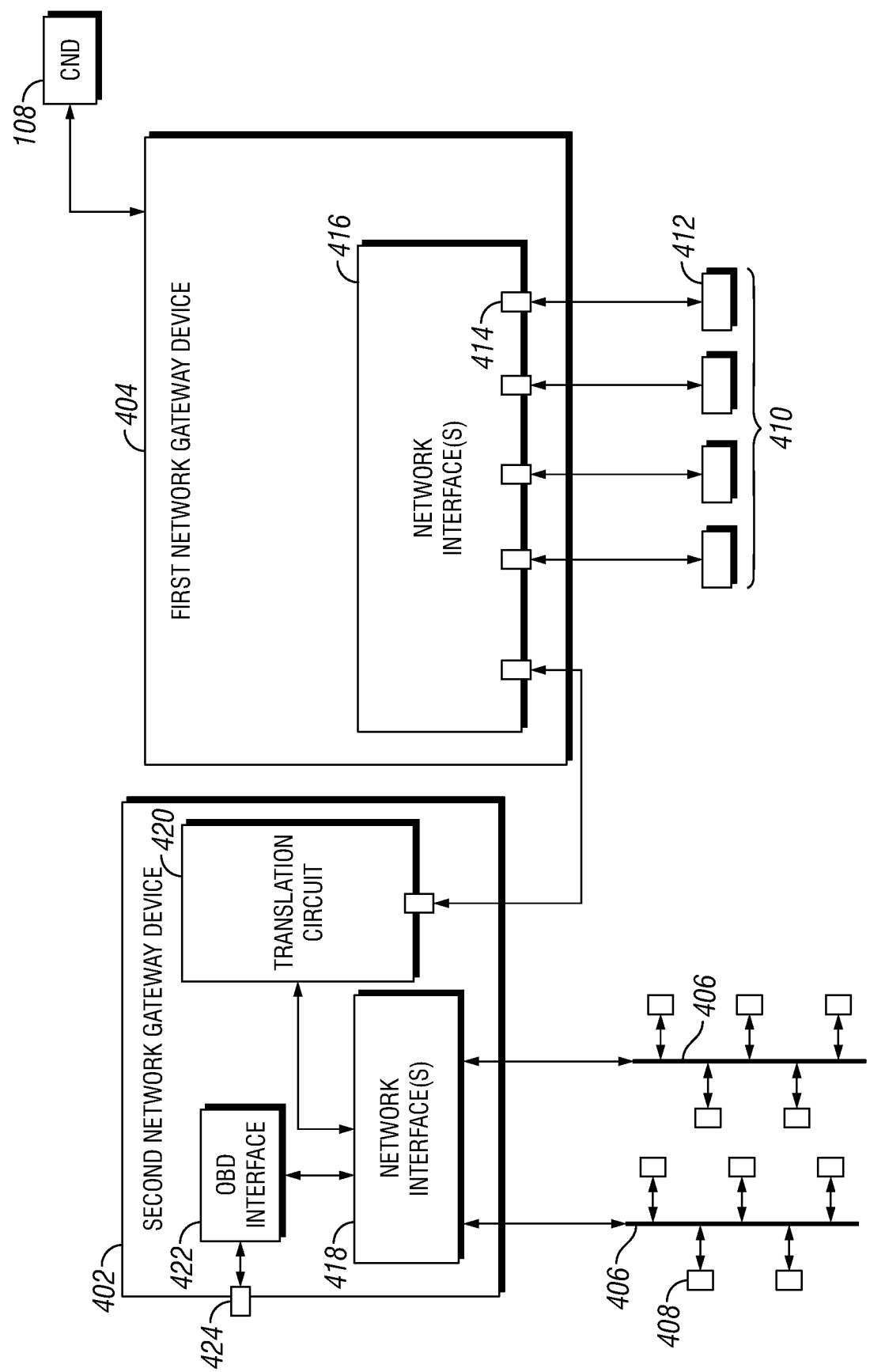
FIG. 9 is a schematic diagram of a converged network device (CND).

Referencing FIG. 9, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 9 is generally consistent with the embodiment of FIG. 4, with some differences depicted to highlight certain aspects of the present disclosure. In the example of FIG. 9, the first network gateway device 404 and the second network gateway device 402 are not co-located, and the CND 108 is depicted in communication with the first network gateway device 404. The CND 108 may be in communication with any one or more of the network gateway device(s), and/or may be positioned at least partially on one or more of the network gateway device(s). Additionally or alternatively, the CND 108 may regulate communication between the networks by accessing and/or adjusting a memory location (e.g., a policy, configuration instructions, a configuration table, or the like) available to one or more of the network gateway device(s), where a relevant portion of the instructions (if any) may be passed to other network gateway device(s) if the CND 108 does not communicate directly with those devices. In certain embodiments (not shown), the CND 108 may communicate to one or more of the network gateway devices utilizing one or more of the networks, for example at a port 414 of the first network gateway device 404. In certain embodiments, the CND 108 may be positioned, at least partially, on one or more of the network gateway devices, co-located with one or more of the network gateway devices, and/or included (at least partially) in a component of one or more of the network gateway devices (e.g., a translation circuit and/or a network interface circuit).

Figure 10:
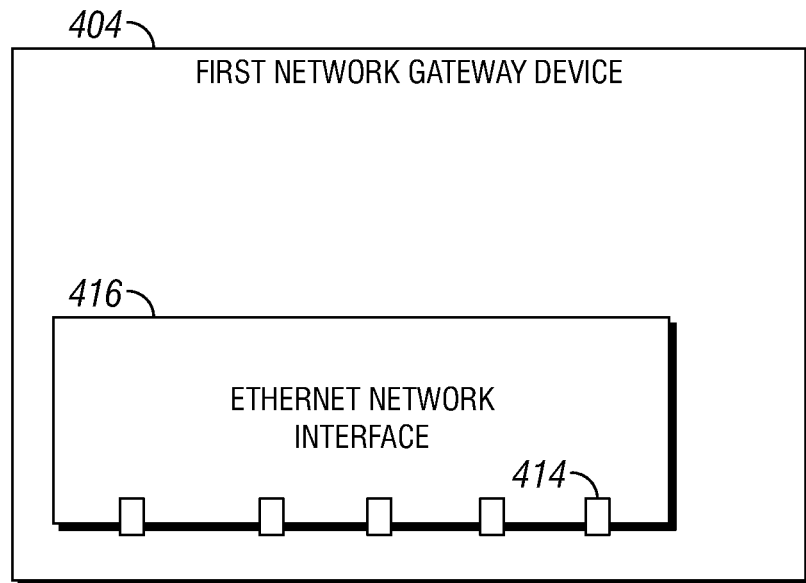
FIG. 10 is a schematic diagram of a configurable ethernet switch.

Referencing FIG. 10, an example first network gateway device 404 is depicted. In the example of FIG. 10, the first network gateway device 404 is a configurable Ethernet Switch, including an Ethernet network interface 416 (or Ethernet network interface circuit) having a number of ports 414 for communication with an Ethernet network. The ports 414 may be physical ports, logical ports, or a combination thereof.

Figure 11:
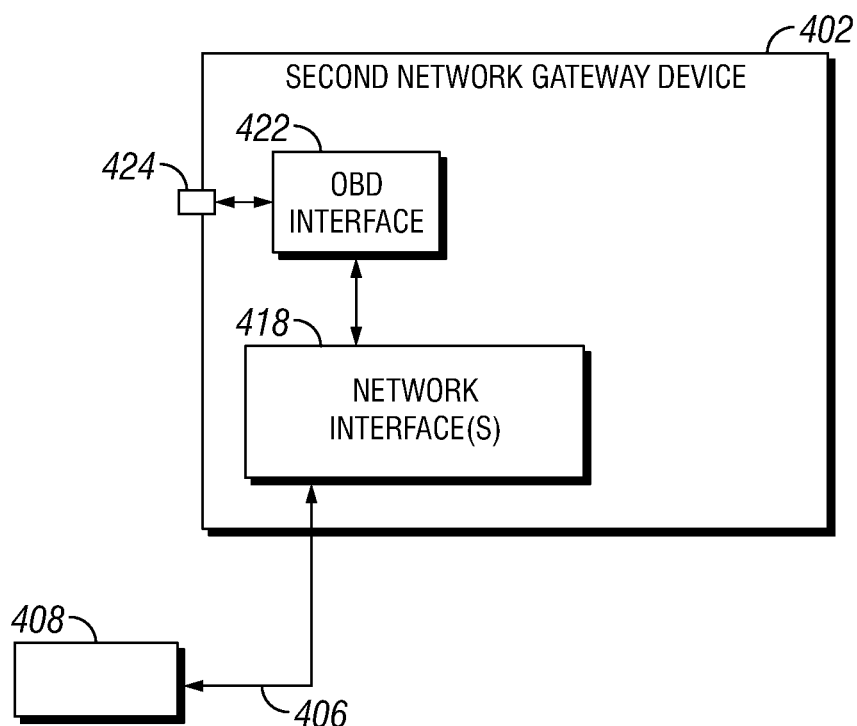
FIG. 11 is a schematic diagram of a configurable edge gateway.

Referencing FIG. 11, an example second network gateway device 402 is depicted. In the example of FIG. 11, the second network gateway device 402 is a configurable edge gateway (CEG), providing translation between a secondary network 406 and a primary network interface (e.g., an Ethernet network such as network 410). The utilization of secondary and primary to reference networks merely indicates a logical arrangement of networks, where interfaces to other networks than the primary are referenced as edge interfaces (e.g., interfaced with an edge gateway). In certain embodiments, the primary network may have a higher capability (e.g., bandwidth, throughput, and/or resource dedication), a greater number of devices or end points thereon, a migration target network (e.g., over the life of a vehicle, a group of vehicles, a period of model years, etc.) for end points over time, and/or a main entry network for external communications (e.g., over-the-air updates, configuration updates, data collection, etc.), although a particular embodiment may have some, all, or none of these considerations present for a network considered as a primary network. The example of FIG. 11 depicts an optional OBD interface 422, which may be present elsewhere in the system, or not present in the system.

Figure 12:
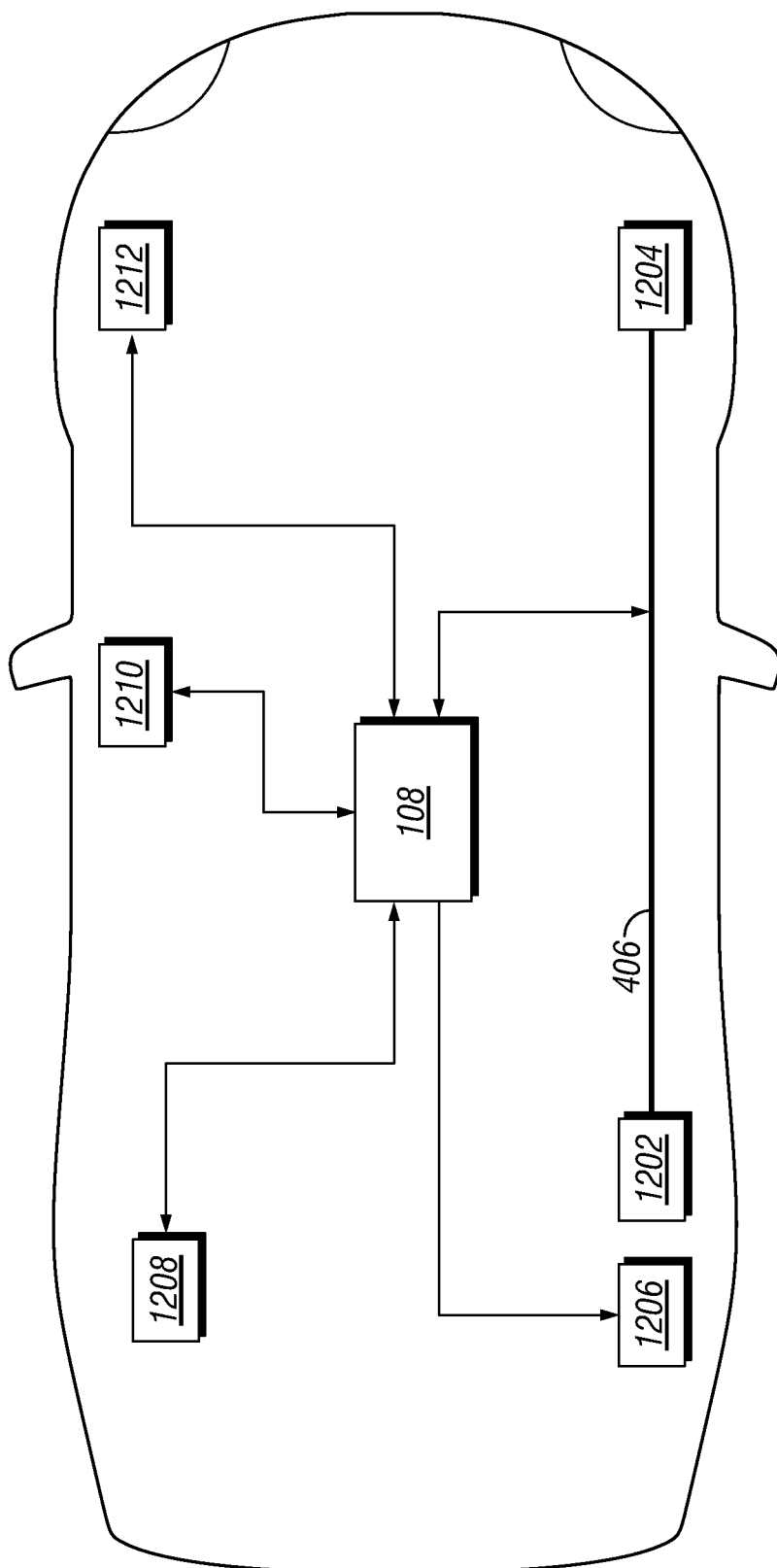
FIG. 12 is a schematic diagram of an example system for regulating networks on a vehicle according to certain embodiments of the present disclosure.

Referencing FIG. 12, a vehicle having a number of networks thereon, where communications between the networks are regulated by a CND 108, is schematically depicted. The arrangement of FIG. 12 is provided to illustrate certain aspects of the present disclosure, and is a non-limiting arrangement. The example of FIG. 12 includes end points 1202, 1204 (e.g., one or more vehicle controllers) coupled to a first network 406, and a number of end points 1206, 1208, 1210, 1212 coupled to a second network (e.g., an Ethernet network, with a switch co-located with the CND 108 and/or at least partially separate from the CND 108). In the example of FIG. 12, the controllers 1202, 1204, 1206, 1208, 1210, 1212 are able to pass communications, as regulated by the CND 108, between disparate networks of the vehicle. In certain embodiments, a given controller can be switched between networks, and communications with other controllers within the vehicle, and/or communications external to the vehicle, can be maintained, and further can be maintained whether the related controllers (or external controllers, applications, or devices) have knowledge of the switch or not.

Figure 13:
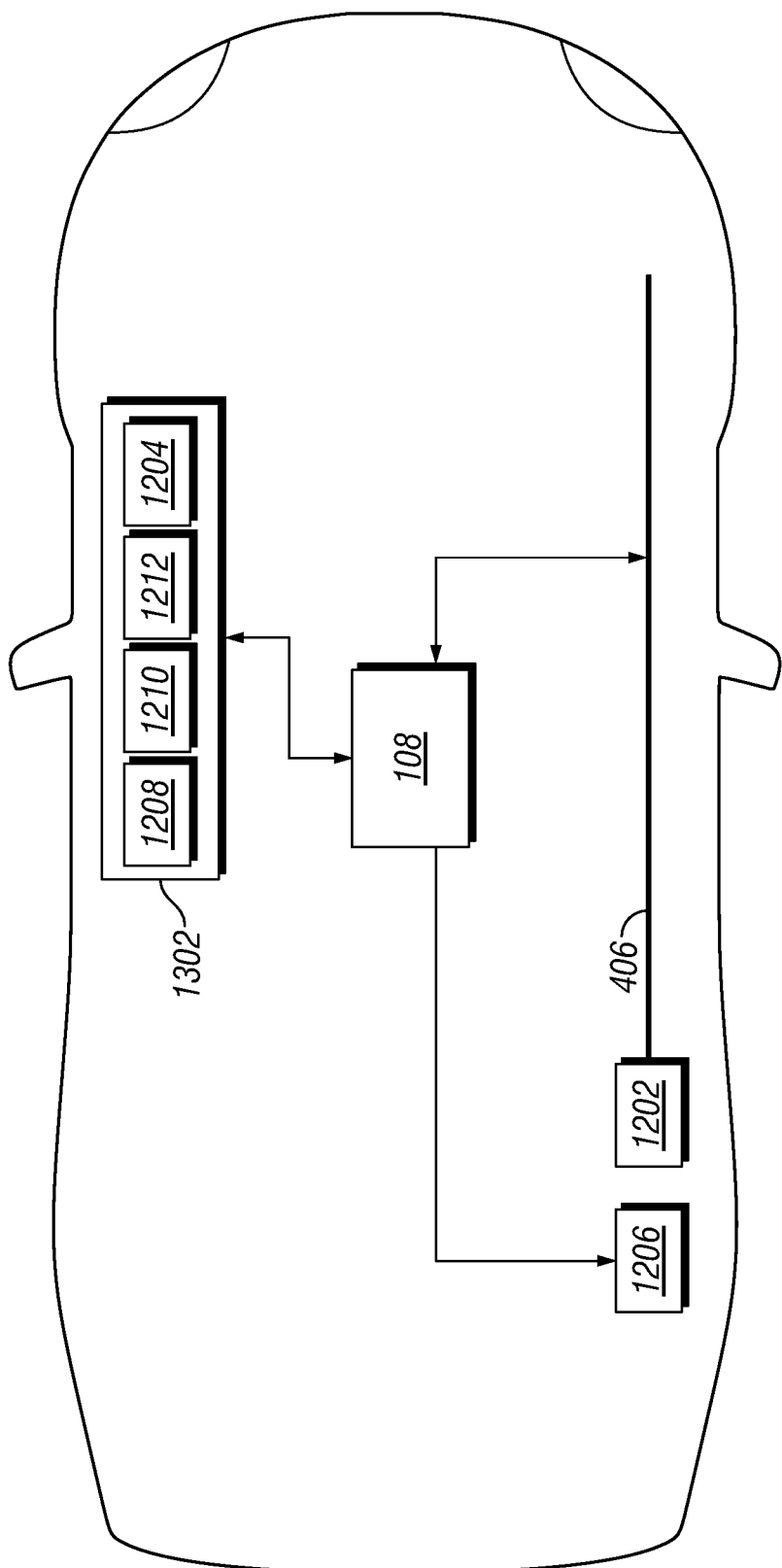
FIG. 13 is a schematic diagram of an example system for regulating networks on a vehicle according to certain embodiments of the present disclosure.

Referencing FIG. 13, a vehicle having a number of networks thereon, where communications between the networks are regulated by a CND 108, is schematically depicted. For purposes of illustration, the example of FIG. 13 includes the same networks and set of controllers as the example of FIG. 12. In the example of FIG. 13, the controllers 1204, 1208, 1210, and 1212 have been co-located 1302, and the controller 1204 has additionally been moved from the first network 406 to the second network. The co-location 1302 of the controllers 1204, 1208, 1210, 1212 can be any implementation, including consolidation of the controllers into a lesser number of housings (e.g., 1-3 total housings instead of 4), onto a lesser number of boards (e.g., 1-3 boards, instead of 4), and/or utilizing at least partially shared computing resources (e.g., shared processing, shared memory, shared caches, and/or combinations of these). In certain embodiments, the utilization of the CND 108 allows for the arrangement of FIG. 13, including the consolidation of vehicle controllers, by providing for communication regulation, and maintained connectivity, with only a configuration update to the CND 108, and/or with consolidation changes of vehicle controllers that fit within available predetermined configurations of the CND 108 (and thereby can be implemented without an update to the CND 108). Additionally, the consolidation of controllers may provide a number of benefits, such as reduction in network costs, reduction in network traffic, selected distribution of risk (e.g., arrangement of controller positions and/or network routing in a lower risk, or diversified risk, position; and/or reduction of risk to another system component utilizing the footprint gains and/or cost savings of the controller consolidation). In certain embodiments, the consolidation of controllers may enable deeper sharing of information between controllers (e.g., due to increased available network capacity, bypassing of network limitations with shared controllers, and/or utilization of shared memory resources), which may allow for more capable operations of the controllers, and/or operations previously unavailable because the shared information between controllers was not as readily available. In certain embodiments, the CND 108 further enables the consolidation of controllers, by de-coupling the controller locations from end point locations (not shown) that are required to be distributed (e.g., sensors and actuators that need to be placed in certain locations to perform their function no longer need to be located near the respective controller due to operations of the CND 108, and/or CEG 402). In certain embodiments, the consolidation of controllers allows for reduced costs and/or increased capability, for example by reducing hardware costs for shared computing resources, enabling higher capability (e.g., processing power and/or memory) computing resources, or combinations of these. The operations of the CND 108 thus allow for consolidation operations of vehicle controllers that were not previously available. In certain embodiments, the example of FIG. 13 may be a consolidation of controllers relative to FIG. 12, and/or an illustration of an unrelated embodiment.

Figure 14:
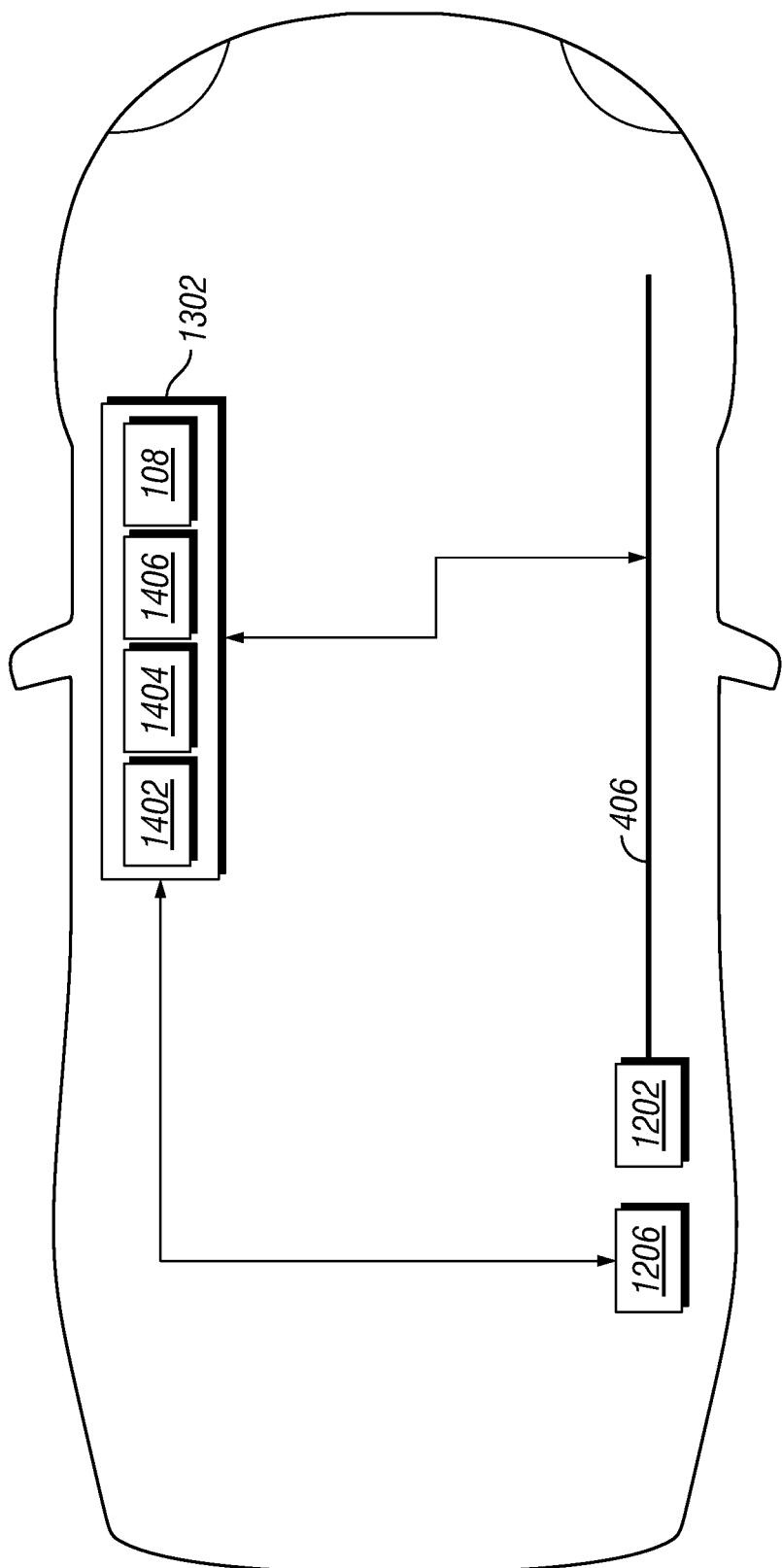
FIG. 14 is a schematic diagram of an example system for regulating networks on a vehicle according to certain embodiments of the present disclosure.

Referencing FIG. 14, a vehicle having a number of networks thereon, where communications between the networks are regulated by a CND 108, is schematically depicted. For purposes of illustration, the example of FIG. 14 includes the same networks and a similar set of controllers as the example of FIG. 12. In the example of FIG. 14, the co-located 1302 controllers include a set of controllers 1402, 1404, 1406, and the CND 108 depicted as a controller on the co-located 1302 controller. The CND 108 may be positioned, at least in part, on one or more of the co-located controllers 1402, 1404, 1406, and/or may be separate as depicted. In certain embodiments, the example of FIG. 14 may be a further consolidation of controllers relative to FIG. 13, and/or an illustration of co-located 1302 controllers unrelated to the examples of FIGS. 12 and 13.

Figure 15:
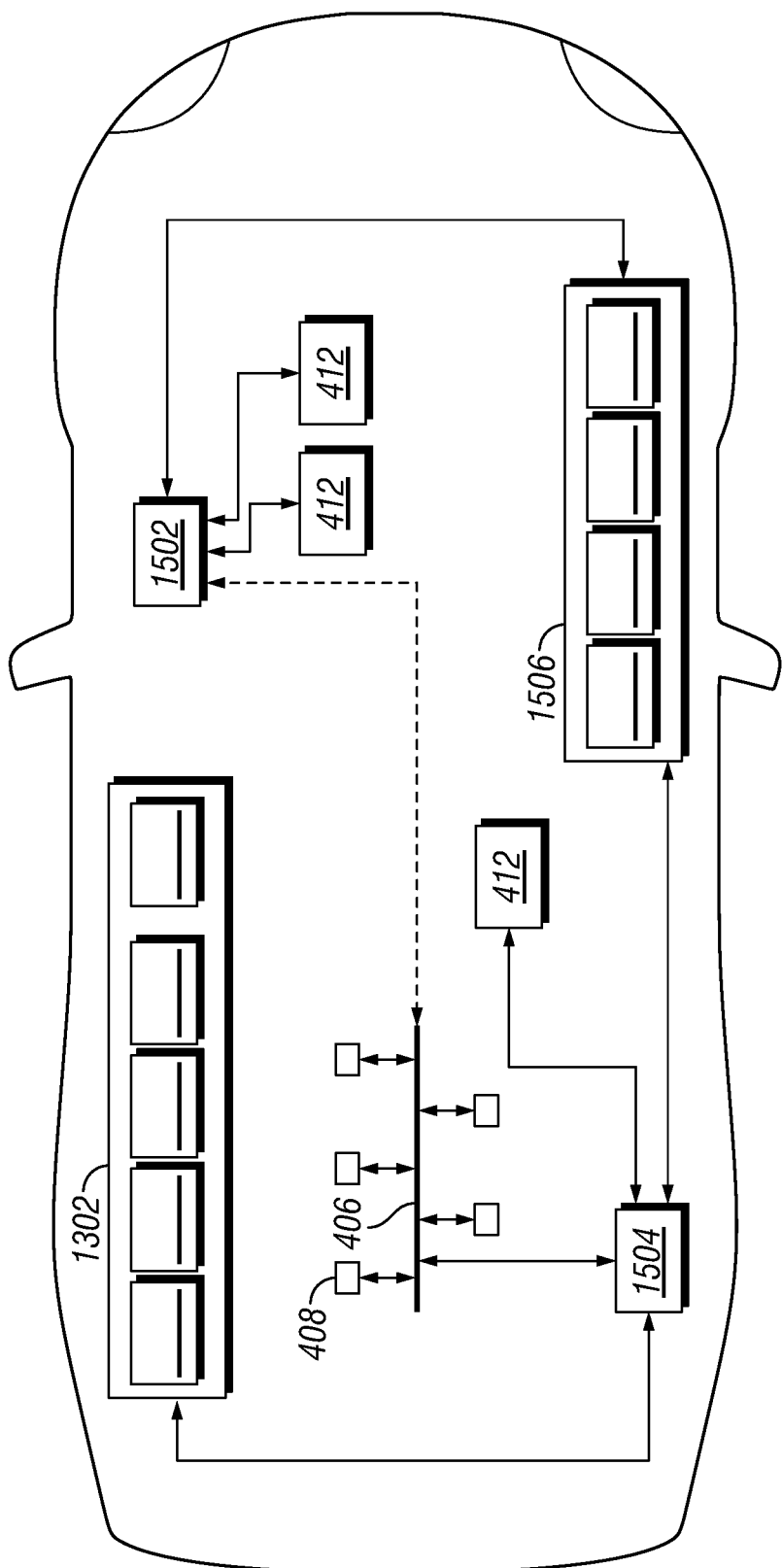
FIG. 15 is a schematic diagram of an example system for regulating networks on a vehicle according to certain embodiments of the present disclosure.

Referencing FIG. 15, a vehicle having a number of networks thereon, where communications between the networks are regulated by a CND 1502, 1504, is schematically depicted. For purposes of illustration, the example of FIG. 15 utilizes two consolidated controllers 1302, 1506, each including a group of co-located vehicle controllers as set forth throughout the present disclosure. The example of FIG. 15 includes a first CND 1502 (or CND portion) interposed between a first network 406 and a second network (end points 412 directly coupled to the CND 1502 and the consolidated controller 1506 directly coupled to the CND 1502), and a second CND 1504 (or CND portion) interposed between the first network 406 and a second network (end points 412 directly coupled to CND 1504 and the consolidated controller 1302 directly coupled to the CND 1502). In certain embodiments, the second network associated with the first CND 1502 may be a separate network relative to the second network associated with the second CND 1504, but may be a same type of network (e.g., an Ethernet network) and/or may utilize the same or electrically coupled hardware relative to each other. The example of FIG. 15 illustrates the CND 1504 as having primary network regulation for the first network 406, but regulation of the first network 406 may be distributed, shared, regulated according to end points, applications, and/or flows, or the like. In certain embodiments, regulation of the second network(s) may be performed by only one of the CNDs 1502, 1504, and/or distributed, shared, regulated according to end points, applications, and/or flows.

A number of representative aspects of FIG. 15 are described following, any one or more of which may be present in certain embodiments. An example aspect of FIG. 15 includes shared regulation of networks by the CNDs 1502, 1504, with either of the CNDs 1502, 1504 fully or partially capable to support regulation of all networks, for example if an end point, network, the other CND (or portion), and/or controller experiences a failure, a fault, or diminished operational capability. An example aspect of FIG. 15 includes primary regulation of networks by one the CNDs 1502, 1504, with the other CND capable to fully or partially support regulation of the networks, for example if an end point, network, primary CND, and/or controller experiences a failure, fault, or diminished operational capability. An example aspect of FIG. 15 includes one or more of the consolidated controllers 1302, 1506 capable to at least partially assume control operations for the other of the consolidated controllers 1506, 1302 if one of the consolidated controllers loses capability, connectively with an end point, or the like. In certain embodiments, the CNDs 1502, 1504 are capable to pass parameters that were previously only available to the original controller 1302, 1506 in response to the assumption of the control operations by the replacement controller 1506, 1302. In certain embodiments, the redundant network routing availability is usable by the CNDs 1502, 1504, to provide at least partial connectivity between end points that lose connection when a part of the network goes down. The CNDs 1502, 1504 may provide equivalent parameters (e.g., another end point that is capable to provide equivalent data), substitute parameters (e.g., another end point that is capable to provide a substitute or backup parameter that is usable, at least partially, as a substitute for the lost parameter), the same parameters (e.g., where the data from the original end point, or the same data value from another end point, can be routed through the remaining network infrastructure), and/or may provide managing parameters such as controller hand-off communications, heart beat or status communications, or the like. In certain embodiments, one or both of the CNDs 1502, 1504 or CND portions may be co-located with another system component, such as one of the consolidated controllers 1302, 1506. In certain embodiments, network routing for networks on the vehicle is provided to yield distinct risk profiles for networks on the vehicle, reducing the risk of a single failure rendering the vehicle inoperable for the mission, and/or inoperable for at least a limp home operation, controlled shutdown, data capture, or the like. In certain embodiments, controller, CND, and/or consolidated controller locations may be selected to provide distinct risk profiles for related devices, reducing the risk of a single failure rendering the vehicle inoperable for the mission, and/or inoperable for at least a limp home operation, controlled shutdown, data capture, or the like. In certain embodiments, network routing for networks on the vehicle is provided to yield a lower operating cost, installation cost, integration cost, overall risk profile, distribution of weight and/or footprint of components on the vehicle, or the like.

Figure 16:
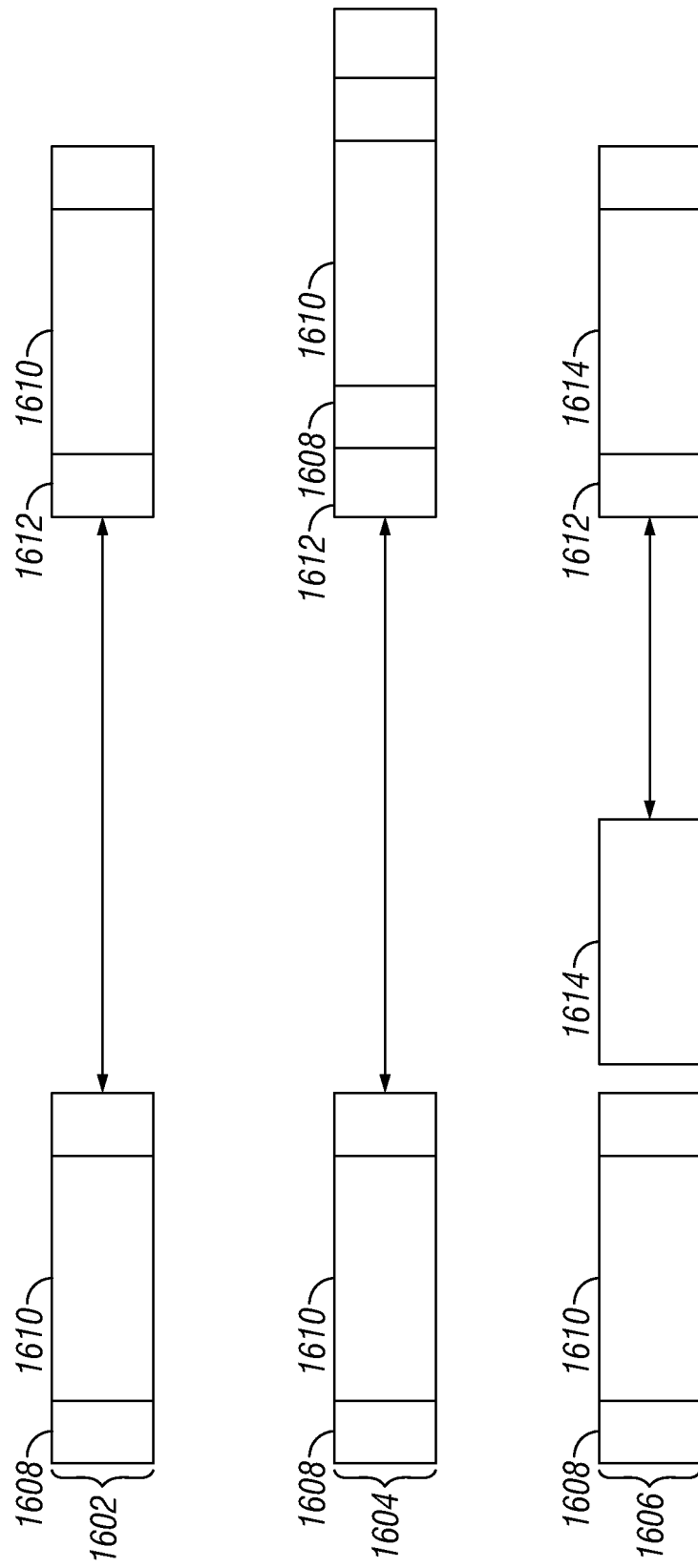
FIG. 16 depicts illustrative operations to process a message.

Referencing FIG. 16, a number of illustrative examples of message translation and/or message encapsulation embodiments are schematically depicted. The examples of FIG. 16 are illustrative to depict certain aspects of the present disclosure, but are non-limiting to the disclosure. In certain embodiments, operations depicted in FIG. 16 may be performed in whole or part by a CEG, a CES, a translation circuit, and/or the CND, and in certain embodiments operations depicted in FIG. 16 may be regulated by the CND. The first example message translation 1602 includes a message from a first network having a payload 1610 and other frame information 1608. The other frame information may include headers, trailing aspects and/or termination bits, and further may be determined by the relevant protocol, network type, source end point, destination end point, or other aspects as known in the art. In certain embodiments, the payload 1610 may be the message data, a data value expressed by the message, or other information considered to be the content of the message. However, in certain embodiments, for certain operations, during certain operating conditions, and/or for certain end points, the payload 1610 may be some other aspect of the message. For example, a network monitoring operation may utilize a time stamp, acknowledgement information, source and/or destination information, or other portions of the message as the payload. The example message translation 1602 includes separating the payload 1610, and packaging the payload into a new frame (or packet) 1612, within information configured for the target network. Additionally or alternatively, the new frame 1612 may include adjustment of an identifier (e.g., a source or destination), a time stamp, or other information allowing end points on disparate networks to be abstracted from knowledge about each other. In certain embodiments, the payload 1610 may be processed, for example to change units utilized, bit depth (e.g., 2 bytes versus 4 bytes), expressed precision, floating point or fixed point conversions, or the like.

The second example message translation 1604 includes the original message 1608, 1610, and is fully encapsulated within a new frame 1612, for example to provide a target end point with the original message as provided by the original source (e.g., allowing a previously developed algorithm to operate as-is, without having to translate to a new message; to allow for certain network monitoring operations utilizing the full original message, etc.). In certain embodiments, either the original payload 1610 or message frame 1608 may be processed, for example processing the payload as described preceding, updating a source identifier, time stamp, or the like to a new convention that is translated to abstract end points from each other, but providing otherwise equivalent or systematically adjusted information.

The third example message translation 1606 includes the original message 1608, 1610, with an adjusted payload 1614. The adjustment to the payload 1614 can include translation of the payload 1614 in some manner (e.g., a corrected value, a virtually sensed or modeled value based on the original payload 1610, an up-sampled or down-sampled payload 1610, or the like), and may additionally or alternatively include processing of the payload. The third example message translation 1606 describes an adjusted payload 1614, although an adjustment may additionally or alternatively be performed on other portions of the message frame 1608. In the third example message, a new frame 1612 is applied for communication to another network.

Figure 17:
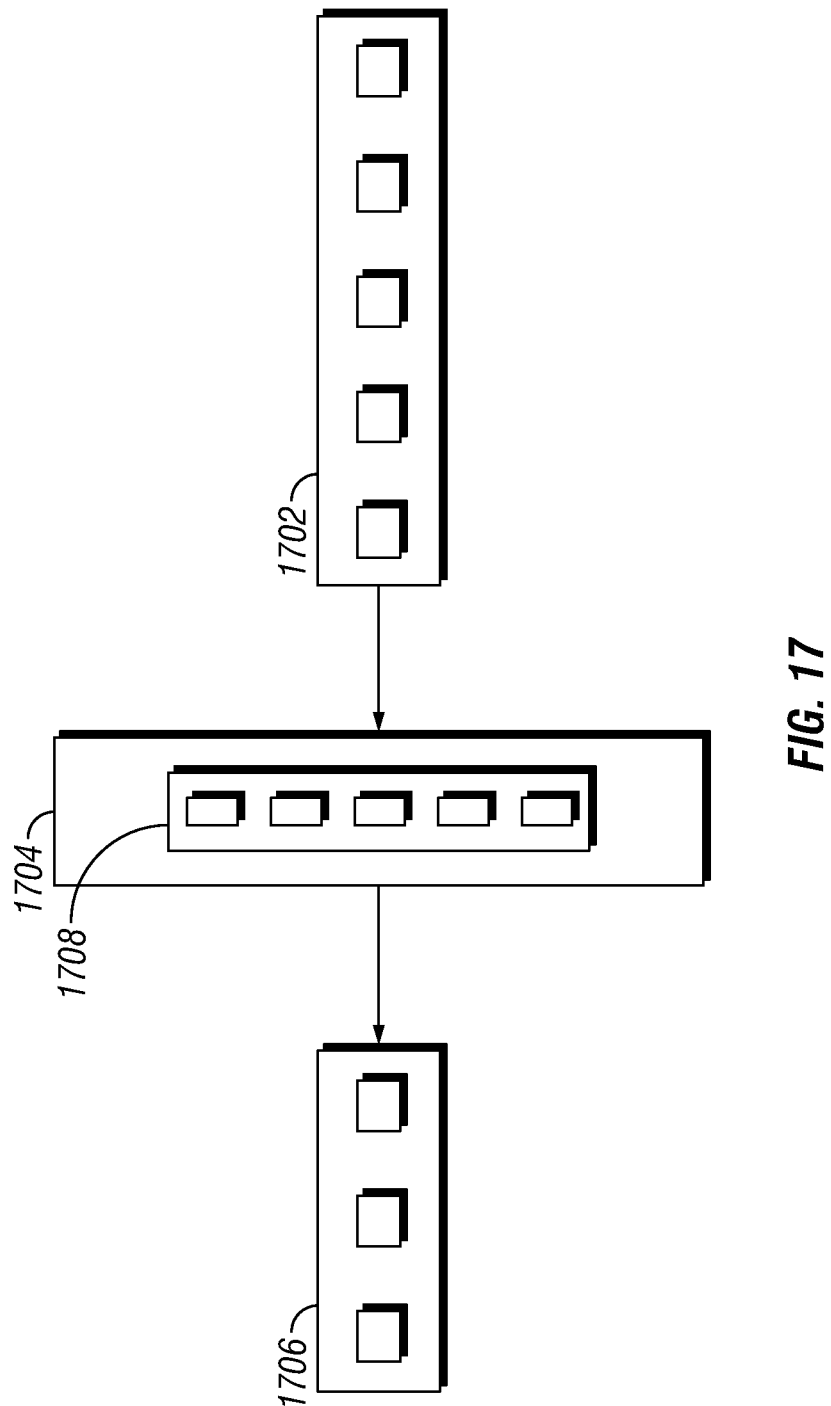
FIG. 17 depicts illustrative operations to down-sample a message.

Referencing FIG. 17, a schematic depiction of an operation to down-sample a sequence of messages 1702 is schematically depicted. In the example of FIG. 17, a message sequence 1702 (e.g., a series of five communications, in the example) is received, for example, at a network interface circuit of one of the network gateway devices. In the example of FIG. 17, the down-sampling operation is responsive to any down-sampling operations described herein, for example to match a receiving end point data rate, to provide the data represented by the messages 1702 at a scheduled rate, to manage bandwidth on a network of the vehicle and/or for extra vehicle communications, to preserve buffer memory, or for any other purpose, including any down sampling operations of the present disclosure. In the example of FIG. 17, the down-sampling device 1704, which may be a translation circuit, network interface circuit, the CND, a circuit associated with the CND, a circuit regulated by the CND, or the like, generates a translated sequence of messages 1708 (e.g., processed as depicted in FIG. 16 and the related disclosure, and/or according to any other message translation and/or message processing operations set forth herein). The example of FIG. 17 depicts the translated sequence of messages 1708 for clarity of the description. However, the translated sequence of messages 1708 may not all be present at the same time, for example as messages are translated and sent they may be removed, deleted, expire from a cache, etc. The sequence of messages 1708 is depicted to illustrate aspects of the present disclosure. Additionally or alternatively, translation of the messages 1708 may be performed after down-sampling operations are performed, for example to reduce utilization of processing resources. For example, some of the messages may be eliminated as a part of the down-sampling before the translation operations (e.g., replacement of frame portions or metadata, encapsulation, processing of the payload and/or frame portions, etc.) are performed. In the example of FIG. 17, a down-sampled sequence of messages 1706 is provided and communicated, for example to a different network gateway device, to a different network of the vehicle from which the first sequence of messages 1702 is received, to an external device (e.g., service tool, cloud server, operator's mobile device, etc.), and/or stored on a memory storage device on the vehicle (e.g., for later data collection operations, as a part of stored vehicle data, etc.). In the example, the five messages of the original sequence 1702 are down-sampled to three messages of the down-sampled sequence 1706. The down-sampling operations can include converting selected messages from the original sequence 1702, for example changing an original 10 ms data stream 1702 to a down-sampled 20 ms data stream 1706 by utilizing every other data message. The down-sampling operations may, additionally or alternatively, include interpolation of data messages between original values. For example, where the original data stream 1702 is a 40 ms data stream, and the down-sampled data stream 1706 is a 100 ms data stream, the down-sampling may include either taking the closest-in-time messages, or performing an interpolation operation (e.g., applying a linear fit, spline fit, polynomial fit, or other interpolation operation for spanning data points), to be utilized as the down-sampled messages 1706.

Spanning data points or values, as utilized herein, indicate data values in the down-sampled messages 1706 that do not align in time with a corresponding original data message 1702. Non-spanning data points or values, as utilized herein, indicate data values in the down-sampled messages 1706 that align in time, or are synchronized, with the corresponding original data message 1702. It will be understood that messages of the original data message 1702 and down-sampled messages 1706 may additionally or alternatively have a phase difference, and accordingly, in certain embodiments, any or all of the original data messages 1702 may be non-spanning messages. In certain embodiments, even where a phase difference between the original data message 1702 and the down-sampled messages 1706 are present, certain messages of the original data messages 1702 may be treated as non-spanning or synchronized data messages, for example to provide a baseline down-sampled message 1706 stream that follows the progression character (e.g., in the time domain) of the original data message 1702 stream, and/or where any phase difference can be ignored for the purpose of devices or operations utilizing the down-sampled message 1706 (e.g., where such devices or operations have a response time, a required reaction time, or the like, that is significantly greater than the magnitude of any such phase difference).

In a further example, synchronized data values (e.g., every $5^{th}$ data value when converting from 40 ms to 100 ms) may be utilized directly, or may also utilize a fitting function (e.g., to provide a smooth, filtered, or otherwise processed stream of data values). In certain embodiments, it may be desirable to utilize actual data values provided from the first data stream 1702 as the down-sampled data values 1706, where minor transient behavior from the different time steps is either not relevant to how the down-sampled data value 1706 is utilized, or where time stamp data is also communicated with the messages and accordingly the differential time steps between messages can be accounted for in processes that utilize the down-sampled data 1706. In certain embodiments, it may be desirable to utilize smoothed data values that simulate the time response behavior of the underlying data, which may be managed utilizing interpolated data for spanning data values (e.g., processes that are responsive to a rate-of-change in the down-sampled data 1706, such as threshold checks on the rate-of-change). In certain embodiments, for example where a downstream process is particularly sensitive to time variation of the data messages 1702 (e.g., a derivative portion of a PID controller), it may be desirable to ensure that all down-sampled data messages 1706 are generated from the same process, and interpolation operations (or smoothing, filtering, or moving average values) may be performed to generate both spanning and non-spanning data values 1706. In certain embodiments, down-sampled data messages 1706 may further include metadata or other embedded information indicating whether the message corresponds directly to an original data message 1702 or is a processed message (e.g., allowing more than one use for the down-sampled data messages 1706, diagnostic operations for a device providing the original data message 1702, and/or for any other purpose).

It can be seen that the down-sampling operations of FIG. 17 allow for communication between devices and/or procedures having differing data rate capabilities, expectations, and/or usage rates of the down-sampled data. Additionally, down-sampling operations of FIG. 17 allow for reduction in network utilization while providing sufficient data for devices and/or procedures to perform the intended functions, and with expected time domain response (e.g., derivative behavior, integrating behavior, step change response, etc.) for proper functionality of devices and procedures that may rely upon the time dynamics of communicated data values. It can be seen that the down-sampling operations of FIG. 17 allow for a progressive updating of communication aspects (e.g., components, devices, procedures, and/or operations each communicatively interacting with a network and/or other components, devices, procedures, and/or operations) of a mobile application having a mixed network configuration and/or a mix of legacy communication aspects (e.g., having a lower data rate capability and/or data rate expectation, and/or distinct network protocols, characteristics, message types, and the like) with updated communication aspects (e.g., having a higher data rate capability and/or data rate expectation, and/or distinct network protocols, characteristics, message types, and the like).

Figure 18:
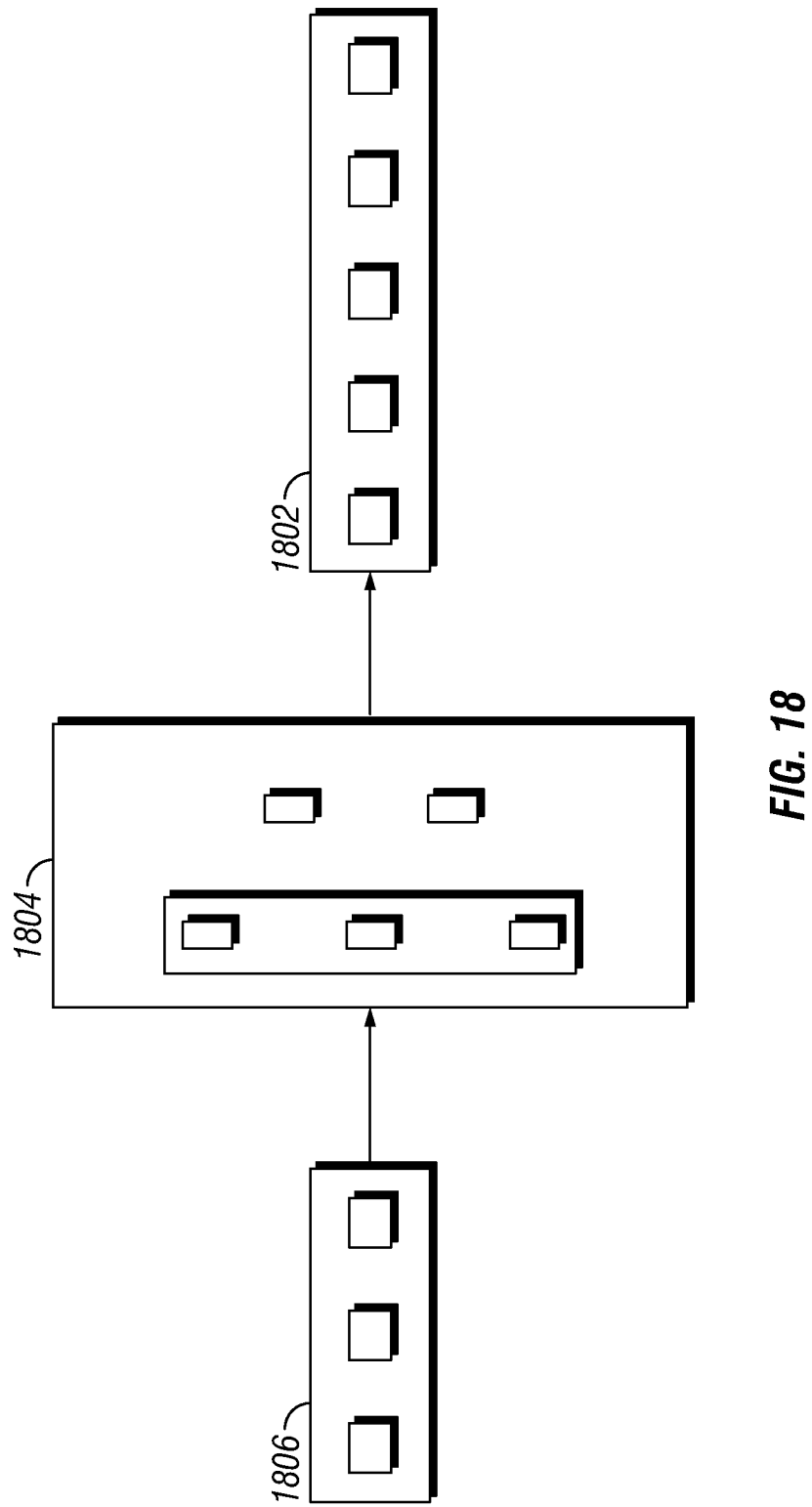
FIG. 18 depicts illustrative operations to up-sample a message.

Referencing FIG. 18, a schematic depiction of an operation to up-sample a sequence of messages 1802 is depicted. In the example of FIG. 18, a message sequence 1806 (e.g., a series of three communications, in the example) is received, for example, at a network interface circuit of one of the network gateway devices. In the example of FIG. 18, the up-sampling operation is responsive to any up-sampling operations described herein, for example to match a receiving end point data rate, to provide the data represented by the messages 1806 at a scheduled rate, to manage bandwidth on a network of the vehicle and/or for extra vehicle communications, to preserve buffer memory, or for any other purpose, including any up sampling operations of the present disclosure. In the example of FIG. 18, the up-sampling device 1804, which may be a translation circuit, network interface circuit, the CND, a circuit associated with the CND, a circuit regulated by the CND, or the like, generates a translated sequence of messages 1808 (e.g., processed as depicted in FIG. 16 and the related disclosure, and/or according to any other message translation and/or message processing operations set forth herein, and). The example of FIG. 18 depicts the translated sequence of messages 1808 for clarity of the description. However, the translated sequence of messages 1808 may not all be present at the same time, for example as messages are translated and sent they may be removed, deleted, expire from a cache, etc. The sequence of messages 1808 is depicted to illustrate aspects of the present disclosure. Additionally or alternatively, translation of the messages 1808 may be performed after up-sampling operations are performed, for example to reduce utilization of processing resources.

For example, some of the messages may be eliminated or adjusted as a part of the up-sampling before the translation operations (e.g., replacement of frame portions or metadata, encapsulation, processing of the payload and/or frame portions, etc.) are performed. In the example of FIG. 18, an up-sampled sequence of messages 1802 is provided and communicated, for example to a different network gateway device, to a different network of the vehicle from which the first sequence of messages 1806 is received, to an external device (e.g., service tool, cloud server, operator's mobile device, etc.), and/or stored on a memory storage device on the vehicle (e.g., for later data collection operations, as a part of stored vehicle data, etc.). In the example, the three messages of the original sequence 1806 are up-sampled to five messages of the up-sampled sequence 1802. The up-sampling operations can include converting selected messages from the original sequence 1806, for example changing an original 50 ms data stream 1806 to an up-sampled 20 ms data stream 1802 by inserting one or more generated messages 1810. The up-sampling operations may, additionally or alternatively, include interpolation and/or extrapolation of data messages between original values. For example, where the original data stream 1806 is a 50 ms data stream, and the up-sampled data stream 1802 is a 20 ms data stream, the up-sampling may include either taking the closest-in-time messages, or performing an interpolation and/or extrapolation operation (e.g., applying a linear fit, spline fit, polynomial fit, moving average, and/or a low-pass filtered progression between available data points and/or between an available data point and a predicted next data point), to be utilized as the up-sampled messages 1802.

Spanning data points or values, as utilized herein, indicate data values in the up-sampled messages 1802 that do not align in time with a corresponding original data message 1806. Non-spanning data points or values, as utilized herein, indicate data values in the up-sampled messages 1802 that align in time, or are synchronized, with the corresponding original data message 1806. It will be understood that messages of the original data message 1806 and up-sampled messages 1802 may additionally or alternatively have a phase difference, and accordingly, in certain embodiments, any or all of the original data messages 1806 may be non-spanning messages. In certain embodiments, even where a phase difference between the original data message 1806 and the up-sampled messages 1802 are present, certain messages of the original data messages 1806 may be treated as non-spanning or synchronized data messages, for example to provide a baseline up-sampled message 1802 stream that follows the progression character (e.g., in the time domain) of the original data message 1806 stream, and/or where any phase difference can be ignored for the purpose of devices or operations utilizing the up-sampled message 1802 (e.g., where such devices or operations have a response time, a required reaction time, or the like, that is significantly greater than the magnitude of any such phase difference).

In a further example, synchronized data values (e.g., every other data value when converting from 50 ms to 20 ms, such as the 0 ms phase value and the 100 ms phase value) may be utilized directly, or may also utilize a fitting function (e.g., to provide a smooth, filtered, or otherwise processed stream of data values). In certain embodiments, it may be desirable to utilize actual data values provided from the first data stream 1806 as the up-sampled data values 1802, for example where minor transient behavior from the different time steps is either not relevant to how the up-sampled data value 1802 is utilized, or where time stamp data is also communicated with the messages and accordingly the differential time steps between messages can be accounted for in processes that utilize the up-sampled data 1802. Accordingly, in certain embodiments, each message of the up-sampled data values 1802 may correspond directly to one or more of the first data stream 1806 values (e.g., selecting a synchronized one, a closest one, and/or a most recent one (e.g., holding the communicated value until a next value is available) of the first data stream 1806 values).

In certain embodiments, it may be desirable to utilize smoothed data values that simulate the time response behavior of the underlying data (e.g., original messages 1806), which may be managed utilizing interpolated/extrapolated data for spanning data values (e.g., processes that are responsive to a rate-of-change in the up-sampled data 1802, such as threshold checks on the rate-of-change), and/or also for non-spanning data values. In certain embodiments, for example where a downstream process is particularly sensitive to time variation of the data messages 1806 (e.g., a derivative portion of a PID controller), it may be desirable to ensure that all up-sampled data messages 1802 are generated from the same process, and interpolation/extrapolation operations (and/or smoothing, filtering, and/or moving average values) may be performed to generate both the spanning and non-spanning up-sampled data values 1802. In certain embodiments, non-spanning up-sampled data values 1802 are utilized directly (e.g., to provide an up-sampled data 1802 stream having the actual content of the data messages 1806 to the extent possible), and spanning up-sampled data values are processed as described herein. In certain embodiments, all original messages 1806 are provided in the up-sampled data 1802 stream, with additional non-spanning messages added to achieve the data rate of the up-sampled data 1802 stream (e.g., to provide all of the original messages 1806, and additionally support the up-sampling rate). In certain embodiments, up-sampled data messages 1802 may further include metadata or other embedded information indicating whether the message corresponds directly to an original data message 1806 or is a processed message (e.g., allowing more than one use for the up-sampled data messages 1802, diagnostic operations for a device providing the original data message 1806, and/or for any other purpose).

In certain embodiments, spanning up-sampled data values 1802 may be determined based on predicted values between non-spanning data values, which may be performed based on a virtual sensor (e.g., a model of the value utilizing other information available in the system) and/or an extrapolation fitting operation. In certain embodiments, determination of spanning up-sampled data values 1802 additionally or alternatively includes providing predicted and/or interpolated/extrapolated values that provide an expressed rate of change of the up-sampled data values 1802 determined according to the original data values 1806 and/or adjusted according to the characteristics of a device, component, operation, and/or procedure utilizing the up-sampled data values 1802. For example, up-sampling operations may include performing a predictive operation and/or interpolation/extrapolation to determine a rate of change for the value, and providing a final spanning up-sampled data value 1802 that provides the predicted rate of change for the up-sampled data value 1802. In certain embodiments, operations to provide the up-sampled data values 1802 include an operation to determine a rate of change (or derivative) determination operation in a device utilizing the up-sampled data values 1802, and adjusting the rate of change of the up-sampled data values 1802 in response to parameters of the rate of change determination in the device—for example interpreting data related to a time step utilized for the derivative operation (e.g., $\Delta T/5$ ms, or change-in-temperature per 5 milliseconds) and/or a time constant (e.g., a time constant of a low-pass filter, a time constant implicit in a moving average calculation, etc.), where the up-sampled data value 1802 is adjusted to provide a desired response in the rate of change calculations that will be performed on the up-sampled data values 1802. For example, where up-sampling operations have a significant difference in time steps between the original data value 1806 and the up-sampled data value 1802 (e.g., 50 ms to 5 ms), operations such as a linear interpolation/extrapolation of data values may provide significant distortion to the output of, for example, a low-pass filter operated by a device utilizing the up-sampled data value 1802, which may be configured to process true 5-ms data. Accordingly, in the example, operations to up-sample the original data values 1806 may include adjusting the original data values 1806 in accordance with a predicted response of a 5-ms device determining the values, which may provide significant differences in trajectory of the up-sampled data value 1802 between non-spanning data points relative to simple linear extrapolation, moving averages, or the like. Operations to adjust the expressed rate of change may be performed for up-sampled data 1802, and/or for down-sampled data 1706, or may be omitted.

In certain embodiments, configuration information for up-sampling and/or down-sampling operations, such as: whether non-spanning original data values 1702, 1806 are to be utilized directly; metadata to be stored with up-sampled and/or down-sampled data 1802, 1706; processing operations to be performed on spanning and/or non-spanning data values; whether all original data values 1702, 1806 are to be communicated; operations to provide an expressed rate of change in the up-sampled and/or down-sampled data 1802, 1706; and/or parameters of a rate of change determination in a device utilizing the up-sampled and/or down-sampled data 1802, 1706 (e.g., filter constants, derivative operations, etc.), may be provided in a memory storage location accessible to a controller and/or circuit performing up-sampling and/or down-sampling operations. Any such configuration information may be provided in whole or part at design time, such as when configuring a mobile application and devices communicating with various networks of the mobile application, and/or may be provided or updated during run-time operations. In certain embodiments, one or more aspects of the configuration information for up-sampling and/or down-sampling operations may be provided as a part of a policy, configuration instructions, and/or a configuration table, which may be accessible to a CND 108 regulating communications between devices on separate networks of the mobile application. In certain embodiments, one or more aspects of the configuration information for up-sampling and/or down-sampling operations may include default values which may be adjusted and/or updated, including as a part of a policy, configuration instructions, and/or a configuration table.

Figure 19:
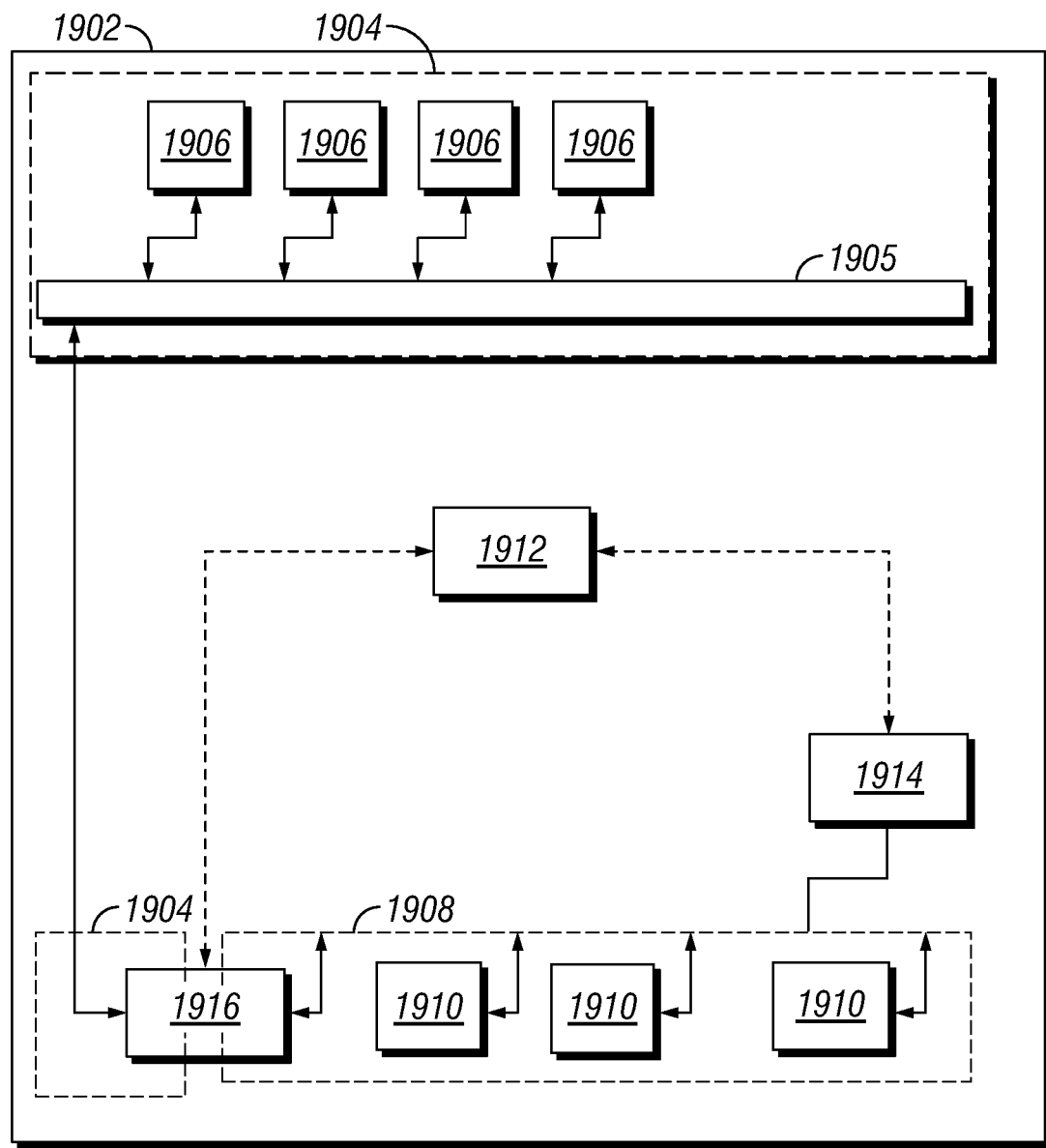
FIG. 19 is a schematic diagram of a system for regulating networks on a vehicle according to certain embodiments of the present disclosure.

Referencing FIG. 19, an example system, which may form a part of a mobile application 1902 or vehicle, includes a first network zone 1904 of a vehicle having a first interconnected number of end points 1906, and a second network zone 1908 having a second interconnected number of end points 1910. The example system includes a CND 1912 interposed between the network zones 1904, 1908, where the CND 1912 regulates communications between end points 1906 and end points 1910. In the example of FIG. 19, the first network zone 1904 is a first network, the second network zone 1908 is a second network, and the networks 1904, 1908 are networks having different network types. In the example of FIG. 19, the first network zone 1904 includes a common data bus 1905, e.g., such as a CAN bus, and the second network zone 1908 utilizes a distributed topology, for example with devices 1910 in communication with a switch 1914, which may be a configurable ethernet switch (CES). In the example of FIG. 19, a configurable edge gateway 1916 (CEG) communicates with the first network zone 1904, and is able to read messages from and/or provide messages to the common data bus 1905. In the example of FIG. 19, the CEG 1916 communicates with the CES 1914 on the second network zone 1908, and the CEG 1916 may appear to the CES 1914 as an end point device of the second network zone 1908, and/or may be associated with a physical and/or logical port of the second network zone 1908.

In the example of FIG. 19, the CND 1912 performs operations to regulate communications between end points 1906, 1910 by configuring operations of the CEG 1916 and/or CES 1914. The arrangement of FIG. 19 is a schematic depiction for clarity of the present description, depicting distinct components for the CND 1912, CEG 1916, and CES 1914. However, the CND 1912, CEG 1916, and CES 1914 may be combined in whole or part, provided in a same housing and/or on a same circuit board, and/or sub-divided in whole or part. Additionally or alternatively, one or more aspects, or all, of the CND 1912, CEG 1916, and/or CES 1914 may be positioned with another controller in the mobile application 1902, such as a vehicle controller, and/or with a controller associated with an end point 1910. The network zones 1904, 1908 are depicted having separated physical components, but the network zones 1904, 1908 may be separated logically (e.g., as separate virtual networks on a single physical backbone) and/or may be separated in whole or part by a combination of physical and/or logical structures. An example embodiment includes the network zones 1904, 1908 separated physically as depicted. An example embodiment includes the first network zone 1904 as a CAN bus network, and the second network zone 1908 as an ethernet based network. An example embodiment includes the first network zone 1904 as a legacy network having end points 1906 that are legacy devices and/or legacy compatible devices, and the second network zone 1908 having end points 1910 that are new, updated, upgraded, and/or migrated devices.

Example operations to regulate communications between end points 1906, 1910 include, without limitation operations such as those described following. Operations to regulate may be performed for end points, for associated groups of end points, and/or for network zones. Associated groups of end points may be associated according to flows, applications, service groups, controllers, vehicle functions, source addresses for communications, and/or destination addresses for communications. In certain embodiments, applications, service groups, and/or flows may be provided with an identifier as an implementation to associate related components such as end points. Operations to regulate may be performed by, without limitation, the CND, a network gateway, a network interface circuit, and/or a gateway interface circuit. Regulating operations are described in the context of certain example regulating devices throughout the present disclosure, but embodiments may be configured to have other devices perform the regulating. Example communication and/or regulating operations include:

- providing a communication between a first end point 1906 and a second end point 1910 (in either direction), including configuring the communication (e.g., protocols, message information, metadata, parameter units, etc.) for the receiving network zone and/or end point device;
- encapsulating a message from the first network zone 1904 and providing the encapsulated message to the second network zone 1908;
- determining if a requesting device (and/or associated flow) on one of the network zones (1904, 1908) has permission to request a communication from a device on the other one of the network zones, and providing the communication in response to the permission determination;
- adjusting at least one of a data rate, requested resolution, and/or requested response time of a communication between devices of the network zones based on a permission determination for a requesting device, a communication performance of a requesting and/or a providing device, and/or a network performance parameter (e.g., current available bandwidth, absolute or current network capability, network utilization, etc.) of one or both network zones, and/or a priority value associated with a requesting device (and/or associated flow) for a communication;
- performing an up-sampling and/or down-sampling operation on the communicated data between the network zones;
- mirroring communications from a first end point 1906 to a port of the second network zone 1908, including encapsulating, configuring, processing, and/or up-sampling or down-sampling the mirrored communications;
- providing a communication from a first end point 1906 to a device coupled to the second network zone 1908, such as a diagnostic device, OBD device, service tool, manufacturing tool, OEM tool, and/or network monitoring device, and/or where providing the communication includes encapsulating, configuring, processing, and/or up-sampling or down-sampling the provided communications, and/or where the provided communications may be unicast, multi-cast, and/or provided as a subscription service;
- providing a communication from a second end point device 1910 to a device coupled to either the first network zone 1904 or the second network zone 1908, such as a diagnostic device, OBD device, service tool, manufacturing tool, OEM tool, and/or network monitoring device, and/or where providing the communication includes encapsulating, configuring, processing, and/or up-sampling or down-sampling the provided communications, and/or where the provided communications may be unicast, multi-cast, and/or provided as a subscription service;

providing a communication from a device coupled to the second network zone 1908, such as a diagnostic device, OBD device, service tool, manufacturing tool, OEM tool, and/or network monitoring device, to a first end point 1906, and/or where providing the communication includes encapsulating, configuring, processing, and/or up-sampling or down-sampling the provided communications, and/or where the provided communications may be unicast, multi-cast, and/or provided as a subscription service;

further providing the communication as a command value, for example where the first end point 1906 executes operations relating to the mission of the mobile application in response to the command value (e.g., setting a set point, target value, or threshold in response to the command value);

providing a communication from a device coupled to the second network zone 1908, such as a diagnostic device, OBD device, service tool, manufacturing tool, OEM tool, and/or network monitoring device, to a first end point 1906, and/or where providing the communication includes encapsulating, configuring, processing, and/or up-sampling or down-sampling the provided communications, and/or where the provided communications may be unicast, multi-cast, and/or provided as a subscription service;

further providing the communication as a test execution value, for example where the first end point 1906 executes operations relating to an active text execution operation of the mobile application in response to the command value (e.g., performing certain operations for a service test, active diagnostic operation, or the like);

providing a communication from a first end point 1906 to a number of second end point 1910 devices, where the provided communications are configured to meet a super-set of the requirements of the second end point 1910 devices (e.g., data rates, resolution, units, etc.), and where the provided communications may be unicast, multi-cast, and/or provided as a subscription service;

parsing a communication value from a first device (e.g., a first end point 1906, second end point 1910, and/or device coupled to a network zone 1904, 1908 such as a diagnostic device, OBD device, service tool, manufacturing tool, OEM tool, and/or network monitoring device), determining a target device (e.g., communication recipient and/or communication provider responsive to the communication value) in response to the parsed communication value, and configuring communications of the target communication recipient and/or communication provider in response to the parsed communication value. For example, the communication value may include a generic and/or normalized component identifier (e.g., turbine temperature, front passenger door actuator, etc.), and the CND 1912 determines the respective end point(s) 1906, 1910 corresponding to the component identifier according to the current configuration of the mobile application, and may further determine communication routing, encapsulation, processing, and the like to translate between the first device and the target device(s). For example, such operations allow for the configuration and placement of devices on network zones to be changed, while not requiring that devices, service personnel, or other requestors keep track of the specific configuration and placement of devices;

additionally or alternatively, such operations include the CND 1912 storing configuration information in response to a configuration change (e.g., replacement or moving of a device from one network zone to another, changes to the communication parameters or capabilities of the device, etc.), and/or performing run-time determinations to confirm the location, identity, configuration, communication parameters and/or capabilities of devices, which may be utilized during run-time operations and/or stored for later utilization and/or as a default configuration subject to further updates;

performing any one or more of these operations on a group or sub-group of devices, for example where devices are consolidated in relation to a single end point 1906, 1910 but may be treated as separate devices by other end points or devices in communication with a network zone 1904, 1908 (e.g., a diagnostic device, OBD device, service tool, manufacturing tool, OEM tool, and/or network monitoring device). For example, such operations allow for multiple configurations, updates, and/or upgrades of the mobile application where a first configuration has two (or more) devices with separate end points 1906, 1910, and a second configuration has the two (or more) devices utilizing a single end point 1906, 1910 (and/or the two devices consolidated into a single device). Example and non-limiting embodiments include consolidation of multiple sensors communicating to a network zone 1904, 1908 through a single interface (e.g., a smart sensor having network communication capability, a multiplexed signal, etc.), and/or replacing an interface of multiple components behind a single network interface (e.g., a single communicating device, such as an edge gateway or a configurable edge gateway, that interfaces to a single network zone 1904, 1908 as a single end point 1906, 1910 and manages communications for related devices). In a further example, such operations allow for devices to communicate across network zones without regard to changes in the configuration, to support upgrades and updates that relate to device relationships with end points 1906, 1910, and to support backwards compatibility (e.g., a later configuration, a later control distribution among devices, and the like, where operations of the CND 1912 allow an earlier system having a distinct configuration to support the updated configuration and/or control distribution among devices);

additionally or alternatively, such operations include the CND 1912 storing configuration information in response to a configuration change (e.g., intervention of a single end point between more than one device and a network zone, consolidation of devices, etc.), and/or performing run-time determinations to confirm the location, identity, configuration, communication parameters and/or capabilities of devices, and/or consolidation status of devices, which may be utilized during run-time operations and/or stored for later utilization and/or as a default configuration subject to further updates;

performing any one or more of these operations on a group or sub-group of devices, for example where devices are distributed between more than one end point 1906, 1910 but may be treated as a single devices by other end points or devices in communication with a network zone 1904, 1908 (e.g., a diagnostic device, OBD device, service tool, manufacturing tool, OEM tool, and/or network monitoring device). For example, such operations allow for multiple configurations, updates, and/or upgrades of the mobile application where a first configuration includes a device with a single end point 1906, 1910, and a second configuration has the device (or portions thereof) utilizing more than one end point 1906, 1910 (and/or a previously consolidated device made up of two or more separate devices in the second configuration). Example and non-limiting embodiments include separation of a group of sensors communicating to a network zone 1904, 1908 through a single end point 1906, 1910 (e.g., a smart sensor having network communication capability, a multiplexed signal, etc.) into one or more sensors each having a separate end point 1906, 1910 (and/or sub-groups of the multiple sensors each having a separate end point). In a further example, such operations allow for devices to communicate across network zones without regard to changes in the configuration, to support upgrades and updates that relate to device relationships with end points 1906, 1910, and to support backwards compatibility (e.g., a later configuration, control distribution among devices, and the like, where operations of the CND 1912 allow an earlier system having a distinct configuration to support the later configuration);

additionally or alternatively, such operations include the CND 1912 storing configuration information in response to a configuration change (e.g., division of devices behind a single end point on a single network zone into more than one end point and/or across more than one network zone), and/or performing run-time determinations to confirm the location, identity, configuration, communication parameters and/or capabilities of devices, and/or consolidation status of devices, which may be utilized during run-time operations and/or stored for later utilization and/or as a default configuration subject to further updates;

implementation of a service oriented architecture, wherein the CND 1912 determines available services (e.g., data parameters available for communications, command values available for execution, and/or configurations of these such as rate information, units, resolution, precision, accuracy, availability descriptions, dependent data and/or operating conditions, etc.), publishes the available services, and/or determines subscribing clients (e.g., devices, flows, and/or end points) for the available services;

additionally or alternatively, such operations include the CND 1912 determining permissions and/or authorization for publishing available services, for seeing available services (and/or portions of the available services), and/or subscribing to available services;

additionally or alternatively, such operations include the CND 1912 determining subscribing entities as an end point, a device, a flow, and/or an external device such as a diagnostic device, OBD device, service tool, manufacturing tool, OEM tool, and/or network monitoring device;

additionally or alternatively, such operations include the CND 1912 determining a priority of service oriented communications, which may be dependent upon the publishing device, end point, or related flow, and/or dependent upon the subscribing device, end point, or related flow;

additionally or alternatively, such operations include the CND 1912 adjusting the service oriented architecture operations in response to operating conditions (e.g., mobile application operating conditions, network status of one or more affected network zones, communication status of one or more external devices, etc.);

additionally or alternatively, such operations include the CND 1912 accessing stored information setting forth available services, publication parameters (permissions, priority, related operating conditions, etc.), and/or subscribing entity information;

additionally or alternatively, such operations include the CND 1912 updating stored information in response to one or more of: a received update, such as a policy description, a service configuration description, etc.; run-time updates from end-points, devices, and/or flows, for example, and without limitation, executed during start-up or shut-down operations of the mobile application;

additionally or alternatively, such operations include the CND 1912 implementing a service oriented architecture based on run-time operations, with or without storing the information and/or updating the stored information; and/or additionally or alternatively, allowing updates to the stored information, run-time updates to the stored information, and/or run-time operations implementing the service oriented architecture, in response to a priority and/or a permission associated with the device, end point, and/or flow requesting the update and/or run-time implementation;

additionally or alternatively, operations of an example CND 1912 include adjusting operations of any one or more of the foregoing in response to operating conditions of the mobile application (e.g., adjusting communication operations during certain operations, such as: high power operation; high transient operation; shutdown operation; start-up operation; a selected operating mode such as vocational operation, power take-off (PTO) operation, charging operation, cruise control operation, autonomous vehicle operation, etc.). Adjustments to communication may be qualitative (e.g., allowing or disallowing certain communication types, certain communication priority thresholds, etc., during certain operating conditions; and/or capturing certain data values during certain operating conditions as a data capturing event), quantitative (e.g., controlling a rate of communications, a network zone utilization, external device communication rates, etc.), or a combination of these (e.g., controller a rate of communications for certain communication types, etc.) of these, and may include increasing or decreasing capability of communications according to the operating condition and/or the communication type (e.g., providing for decreased device communication capability during shut-down operations, but increasing external device communication capability during the shut-down operations; increasing device communication capability for certain devices or flows, but reducing device communication capability for other devices or flows during start-up operations, etc.);

additionally or alternatively, operations of an example CND 1912 include adjusting operations of any one or more of the foregoing in response to off-nominal operating conditions relating to the mobile application, where the off-nominal operating conditions include conditions such as: degradation of a network zone (e.g., loss of throughput, loss of communication with one or more end points of a network zone, injection or presence of noise onto a network zone, injection of traffic onto a network zone, a physical failure of at least a portion of the network zone, etc.); a fault condition of one or more devices (e.g., where the CND 1912 adjusts a data source related to the faulted device, adjusts a data rate related to the faulted device, implements a back-up data source for the faulted device, re-routes data to a back-up data recipient for data provided to the faulted device, implements an event driven data collection scheme where the fault of the device is an event, etc.); a lost control function of a vehicle controller (e.g., where the lost control function indicates that the vehicle controller is lacking a data value to perform its mission; where the lost control function indicates that the vehicle controller has lost communication with the associated network zone; and/or where the lost control function is an indication, by the vehicle controller or another controller in the system, that the vehicle controller is not able to perform its mission or a part of its mission). Further example operations of the CND 1912, in response to the off-nominal conditions, include one or more of:

- providing a data value to a vehicle controller from an alternate source (e.g., from a different end point, network zone, etc., and which may include encapsulating, configuring, processing, and/or up-sampling or down-sampling the alternate source communications, which may result in communications that are identical to the original data value that was lost, or alternative communications that may be sufficient as a backup data value for the vehicle controller);
- providing a data value to a second vehicle controller to replace all or a portion of the lost control function of the vehicle controller, for example where a second vehicle controller is configured to act as a backup for the vehicle controller, where the second vehicle controller may be fully capable to perform the lost control function and/or may be capable to perform alternate operations (e.g., with more limited capability) in place of the lost control function; the data value provided to the second vehicle controller may be a same data value as provided to the vehicle controller, an alternate source communication (e.g., having a distinct data rate, resolution, units, precision, etc.), or another data value altogether (e.g., where the second vehicle controller utilizes a distinct data set to perform the fully capable or alternate operations). Additionally or alternatively, the CND 1912 is capable to provide data from any network zone 1904, 1908 to the vehicle controller and/or to the second vehicle controller, which may themselves be on any network zone 1904, 1908;
- suppressing communication of one or more data values in response to the off-nominal condition, for example where a fault condition, device or end point loss, or the like indicates that the one or more data values are not being utilized; where the one or more data values are low priority in view of the off-nominal condition; and/or where the one or more data values are indicated as invalid in view of the off-nominal condition (e.g., sensor values from a sensor having a fault or failed condition);
- shifting of communications from a first network zone (e.g., a degraded network zone) to a second network zone, such as when end points and/or devices are reachable through more than one network zone (e.g., where the zones are logically separated but physically coupled, where more than one physical route is available between relevant end points (e.g., reference FIG. 15), and/or where a second vehicle controller and/or a second end point coupled to the second network zone is capable to perform the operations (or a portion thereof, and/or an alternate thereof) of a first vehicle controller and/or first end point coupled to the first network zone;
- repeating communications from a first network zone (e.g., a degraded network zone) on a second network zone;
- shifting an end point from a first network zone (e.g., a degraded network zone) to a second network zone, for example where the shifted end point is physically coupled, or couplable, to both the first network zone and the second network zone (e.g., where the separation between the network zones is a logical separation, and/or where the end point is reachable through more than one network zone, such as depicted in FIG. 15), where operations of the CND 1912 include adjusting an addressing, protocol, encapsulation operations, and/or any other operations to effect the shift of the end point, which may further include updating the location of the shifted end point with other devices/end points in the system, or translating communications with other devices/end points in the system without notification of the shift;
- combinations of these, such as shifting an end point from a first network zone to a second network zone, and shifting related communications to the second network zone and/or repeating related communications on the second network zone;

regulate communications between end points of a first network zone (and/or one or more additional network zones) and an external device (e.g., a diagnostic device, OBD device, service tool, manufacturing tool, OEM tool, network monitoring device, operator device, cloud computing device, and/or a third party application), where the regulating between end points of the first network zone and the external device(s) including any one or more of the foregoing operations, and/or may further include: limiting communications according to off-nominal conditions of a component (e.g., an end point, device, flow, network zone, etc.) of the system; limiting communications according to an operating condition of the mobile application; limiting communications according to a permission and/or priority of the end point(s), associated flows, and/or the external device; limiting communications according to an aggregated data value (e.g., corresponding to an associated data service provider for the communication; corresponding to a group of end points; corresponding to an associated flow; and/or corresponding to an entity related to any one or more of these), which may be aggregated according to time (e.g., daily, weekly, monthly, etc.), operating condition (e.g., trip, event, etc.), and/or where the data value includes one or more of a total data sent/received value, a data rate value, and/or combinations of these; and/or limiting communications according to an external data access type (e.g., cellular, WiFi, Bluetooth, hardware/port plug-in, etc.); and/or combinations of any one or more of the foregoing.

The described operations of the CND 1912 may be included, in whole or in any part, in embodiments set forth throughout the present disclosure. It will be understood that permissions and/or priority relative to any aspect, including end points, related entities (e.g., owner, manufacturer, operator, service personnel, OEM, third-party, etc.), flows, devices (e.g., controllers, actuators, sensors, tools and/or external devices, switches, gateways, etc.), may vary according to the operating condition of the mobile application, and/or the status of one or more devices (e.g., the same device where a permission or priority is being considered, or a different device). Further, the permissions and/or priority may vary according to the operations and/or communications being performed. For example, a given flow may have a high priority and/or permission level to see published available services, but a low priority and/or permission level to publish available services and/or subscribe to available services. In another example, a given end point may have a high priority to communicate a data value to another end point (e.g., on a distinct network zone) during one operating condition (e.g., high power acceleration), but a low priority to communicate the data value to the other end point during another operating condition (e.g., steady state cruise control operation). A priority, as set forth herein, generally relates to a comparison between competing interests for a resource (e.g., network bandwidth, response time, data storage, access to limited data resources, etc.), while a permission, as set forth herein, generally relates to an ability to perform the requested operation, such as the ability to request certain data, metadata, data rates, data storage, access to devices and/or external devices, etc. Accordingly, an aspect may have a separate priority and permission, such as a high priority and low permission level (e.g., the aspect has a high priority to access a limited number of data values, functions, etc.), or any other combination.

Resolution of competing priority interests may be performed in any manner, such as always favoring the highest priority requestor, providing a weighted response based on the priority (e.g., servicing a high priority request more often than a lower priority request), and/or utilizing a credit based scheme that allows lower priority requests to be serviced after a period of time and/or number of requests.

As utilized herein, the mission of a device (e.g., a controller, end point, vehicle, mobile application, etc.) should be understood broadly, and includes at least the related functions, structures, capability, and operations of the device to support operation of the mobile application to perform the intended function or primary function of the mobile application. Without limitation to any other aspect of the present disclosure, an intended function or primary function of the mobile application includes one or more of: motive operation of the mobile application, in accordance with the designed motive capabilities (e.g., with specified torque, speed, responsiveness, etc.); and/or non-motive operation (e.g., industrial operations, vocational operations, pumping operations, provision of shaft power, movement range, and control thereof) of the mobile application, with the designed non-motive capabilities. In certain embodiments, the intended function or primary function of the mobile application includes off-nominal operational response that may be less capable than the designed motive or non-motive capabilities, such as operation in a limp home mode, communication of fault or failure conditions, and/or prevention of further degradation of the vehicle and/or mobile application. In certain embodiments, the intended function or primary function of the mobile application includes sending and/or receiving external data, performing update operations, facilitating service operations, facilitating update and/or upgrade operations, or the like. Accordingly, the mission of a device may vary between mobile applications, according to the current operating condition of the mobile application, and/or according to the current status of the mobile application and/or components, devices, and/or controllers thereof. One of skill in the art, having the benefit of the present disclosure and information ordinarily available when contemplating a specific mobile application, will readily understand the mission of the mobile application, the mission of devices of the mobile application, and the variability of these across operating conditions and status conditions of the mobile application.

Figure 20:
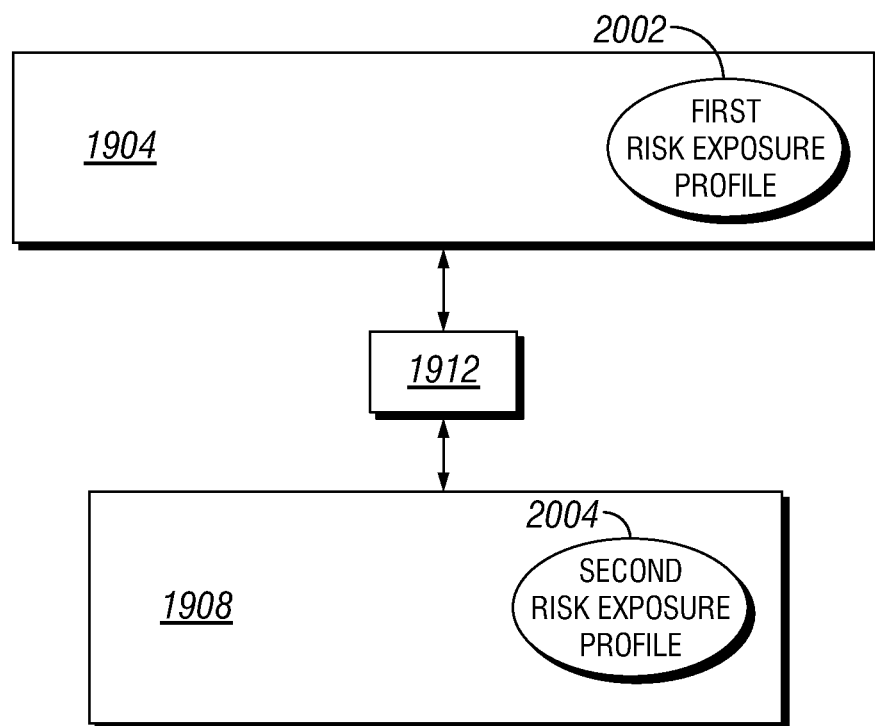
FIG. 20 is a schematic diagram depicting network zones in distributed risk profiles.

Referencing FIG. 20, an example system includes a first network zone 1904 having a first risk exposure profile 2002, and a second network zone 1908 having a second risk exposure profile 2004. In the example of FIG. 20, the first risk exposure profile 2002 is distinct from the second risk exposure profile 2004. A risk exposure profile, as utilized herein, includes a risk profile experienced by the related component (e.g., the first network zone 1904 and/or second network zone 1908, in the example of FIG. 20), contemplated in at least one dimension such as: geometrical risk (e.g., risk to the component by virtue of position within the mobile application as installed); environmental risk (e.g., risk to the component from environmental factors as installed, such as temperatures, contaminants, NVH, EMI, heat transfer environment (e.g., exposure to radiant energy, conductive heat transfer, and/or convection or lack of convection), and/or exposure to environmental disturbances such as service technician impacts, tool drops, or the like; a failure mode risk (e.g., any identified or evident failure mode of the mobile application or components thereof, such as but not limited to: exposure to short circuit events, open wire events, and/or failed components of the mobile application (e.g., exhaust components, engine components, aftertreatment components, and/or any other components having failure inducing energy such as elevated temperature, electrical potential, rotational energy, mechanical energy, or the like); a likely risk type (e.g., where a given risk may affect multiple areas or systems of the vehicle, components positioned in those areas or coupled to those systems may share a risk type, whereas a component isolated from those areas or systems may not share a risk type, regardless of the proximity or other consideration of those components); and/or a likely disturbance risk (e.g., where a given disturbance, such as a particular service event, operating condition, weather event, off-nominal charging voltage, etc. may affect multiple areas or system of the vehicle, components positioned in those areas or coupled to those system may share a disturbance risk, whereas a component isolated from those areas or systems may not share the disturbance risk, regardless of the proximity or other consideration of these components).

In certain embodiments, the first risk exposure profile 2002 is distinct from the second risk exposure profile 2004 in at least one aspect of the risk exposure profiles, such as being positioned in distinct positions on the vehicle (e.g., one on the left side, one on the right side); installed such that a given environmental risk is unlikely to affect both network zones; installed such that a given failure mode is unlikely to affect both network zones; installed such that a contemplated risk (e.g., an impact, accident, operational failure, off-nominal operation of a component, etc.) is unlikely to affect both network zones; and/or installed such that a contemplated disturbance is unlikely to affect both network zones. In certain embodiments, a distinction in one risk dimension is sufficient for the risk exposure profiles to be distinct—for example one or more failures (e.g., complete loss of electrical power) may be likely to affect both network zones, but the network zones may nonetheless have distinct risk exposure profiles with regard to other potential failures. Additionally, each network zone may have exposure to the same type of risk, such as a first network zone that is exposed to a frontal impact, and a second network zone that is exposed to a rear impact, but the network zones may nonetheless be considered as having distinct risk profiles.

In the example of FIG. 20, a CND 1912 is interposed between the first network zone 1904 and the second network zone 1908, and is configured to regulate communications between the network zones 1904, 1908. In the example of FIG. 20, the CND 1912 is capable to communicate with a remaining one of the network zones 1904, 1908 if the other one of the network zones 1904, 1908 experiences a failure or degradation event. Accordingly, the CND 1912 is capable to re-route communications away from the failed network zone 1904, 1908, for example to back-up controllers (not shown), other network zones (not shown), or the like. The example of FIG. 20 allows for division of risk of the network zones 1904, 1908, allowing for designed redundancy and continued operation of the mobile application (whether compliant with the mobile application mission, or in a reduced capability operation) if one of the network zones 1904, 1908 experiences failure or degradation.

Figure 21:
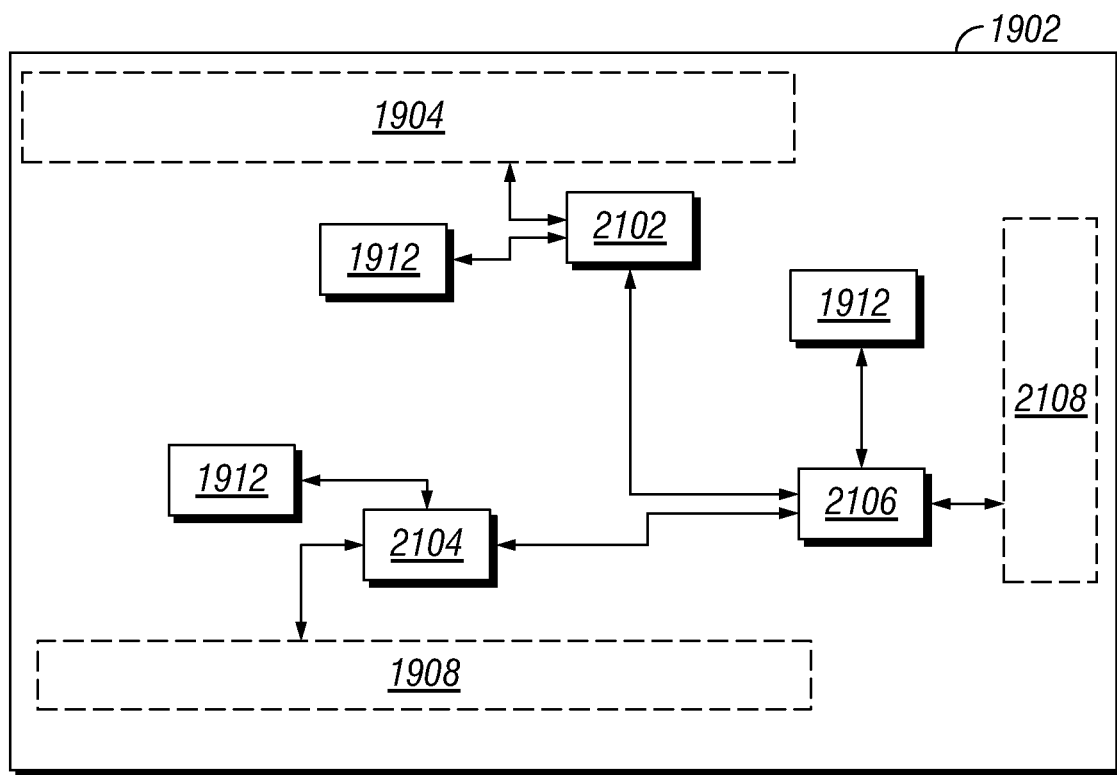
FIG. 21 is a schematic diagram of a system for regulating networks on a vehicle according to certain embodiments of the present disclosure.

Referencing FIG. 21, an example system includes a mobile application 1902 having a first network zone 1904, a second network zone 1908, and a third network zone 2108. The network zones 1904, 1908, 2108 may have distinct risk exposure profiles, and/or any two of the network zones 1904, 1908, 2108 may have distinct risk exposure profiles. The example system includes a CEG 2102 communicatively coupled to the first network zone 1904, a CES 2104 communicatively coupled to the second network zone 1908, and a second CES 2106 communicatively coupled to the third network zone 2108. In the example of FIG. 21, the CND 1912 is distributed, with a portion of the CND 1912 configured to regulate communications of each network zone 1904, 1908, 2108. The example of FIG. 21 describing the components as a CEG 2102, a CES 2104, and a second CES 2106 is a non-limiting example, and the network zones 1904, 1908, 2108 may be of any type, with communications operated by any components. In certain embodiments, the corresponding operating components (CEG 2102, CES 2104, and CES 2106, in the example of FIG. 21) may share a risk exposure profile with the associated network zone 1904, 1908, 2108, or may have a distinct risk exposure profile with the associated network zone 1904, 1908, 2108. Additionally or alternatively, the corresponding portions of the CND 1912 may share a risk exposure profile with the associated network zone 1904, 1908, 2108. The embodiment of FIG. 21 illustrates the division of risk to network zones and components, and the scheduled application of redundancy therebetween, that may be applied in any manner. For example, networks of a same type (e.g., network zone 1908, 2108) may have distinct risk exposure profiles, while single instance networks (e.g., network zone 1904) may have yet another risk exposure profile, or a shared risk exposure profile with one of the other networks (e.g., network zone 1908, 2108)—for example because the single instance network does not have a backup network available, and is already a single point failure mode in the system. In certain embodiments, one or more of the networks (e.g., network zone 2108) may be installed to have a very low risk exposure profile (e.g., a centered position, isolated from environmental, disturbance, and/or failure mode risks, etc.), and may be configured to operate backup operations for one or more other networks (e.g., network zone 1908). In certain embodiments, configuration to operate backup operations include one or more of: redundant connectivity to end points for other networks; provision of backup controllers and/or stored executable commands to perform backup control operations; provision in the related operating component (e.g., CES 2106) to perform data communication operations for the other networks; and/or provision in the related CND 1912 portion to perform any or all operations of the other CND 1912 portion(s). In certain embodiments, any or all of the networks may be configured to operate backup operations for one or more, or all, of the other networks. In certain embodiments, one or more portions of the CND 1912 may be co-located with associated ones of the operating components, positioned within a housing with associated ones of the operating components, and/or positioned on a same board with associated ones of the operating components. In certain embodiments, one or more portions of the CND 1912 may be co-located with controller(s) distributed throughout the vehicle, positioned within a housing with controller(s) distributed throughout the vehicle, and/or positioned on a same board controller(s) distributed throughout the vehicle. In certain embodiments, one or more portions of the CND 1912 may be provided as executable instructions stored on another device (e.g., an operating component, a vehicle controller, and/or another controller), wherein a processor executing the instructions thereby causes the device to perform one or more operations of the CND 1912 portion(s). In the example of FIG. 21, the CES 2104 regulates communications between the second network zone 1908 and the third network zone 2108, communicating, for example, at a port of the CES 2106. In the example of FIG. 21, the CEG 2102 regulates communications between the first network zone 1904 and the third network zone 2108, communicating, for example, at a separate port of the CES 2106.

Example and non-limiting network types of each network zone include one or more of: a Controller Area Network (CAN), a Media Oriented Systems Transport (MOST) network, a Local Interconnect Network (LIN), a FlexRay network, a Time-Triggered Protocol (TTP) network, a Low-Voltage Differential Signaling (LVDS) network, an Audio Video Bridging (AVB) compliant network, a customized version of any one or more of the foregoing, and/or a proprietary version of any one or more of the foregoing.

Figure 22:
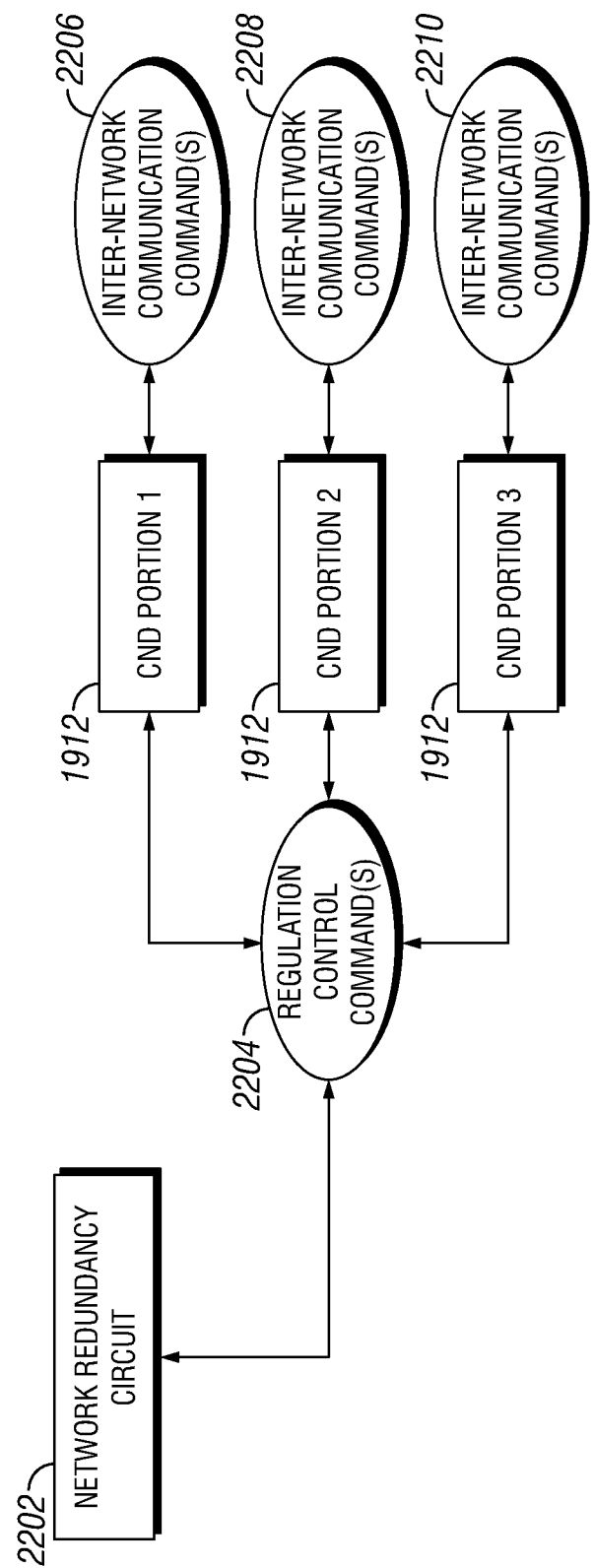
FIG. 22 is a schematic diagram depicted a distributed CND with a network redundancy circuit.

Referencing FIG. 22, an example apparatus to execute network redundancy operations is depicted. The example of FIG. 22 is consistent with an embodiment of FIG. 21, but may be applied to any systems and/or mobile applications as set forth throughout the present disclosure. The example apparatus includes a network redundancy circuit 2202 that selectively provides a regulation control command 2204, where one or more CND portions 1912 are responsive to the regulation control command 2204 to implement inter-network communications 2206, 2208, 2210 between network zones (e.g., 1904, 1908, 2108) of the mobile application. Example and non-limiting inter-network communications 2206, 2208, 2210 include re-routing of data between network zones, shifting of end points between network zones, a first CND portion assuming regulation of a different network zone associated with a second CND portion, utilization of alternate data sources and/or backup control operations, and/or operations to shift, mirror, and/or suppress one or more data values between and/or on one or more network zones.

Example and non-limiting regulation control commands 2204 include an indication that one or more end points of a network zone are unavailable, one or more end points of a network zone are in a fault condition, and/or one or more end points of a network zone are unable to perform mission operations of the respective end point, and/or are providing invalid communications. In certain embodiments, regulation control commands 2204 include one or more of: commands to utilize alternative data sources and/or backup control operations; commands to shift end points between available network zone(s); and/or commands to shift, mirror, and/or suppress one or more data values between and/or on one or more network zones. In certain embodiments, regulation control commands 2204 may include state conditions, such as "Network Zone One Failed", a listing of one or more end points, or other values indicating the status of end points and/or network zones, where one or more CND portions 1912 are responsive to the regulation control commands 2204 to implement communication and/or control redundancy operations according to stored configuration information.

Figure 23:
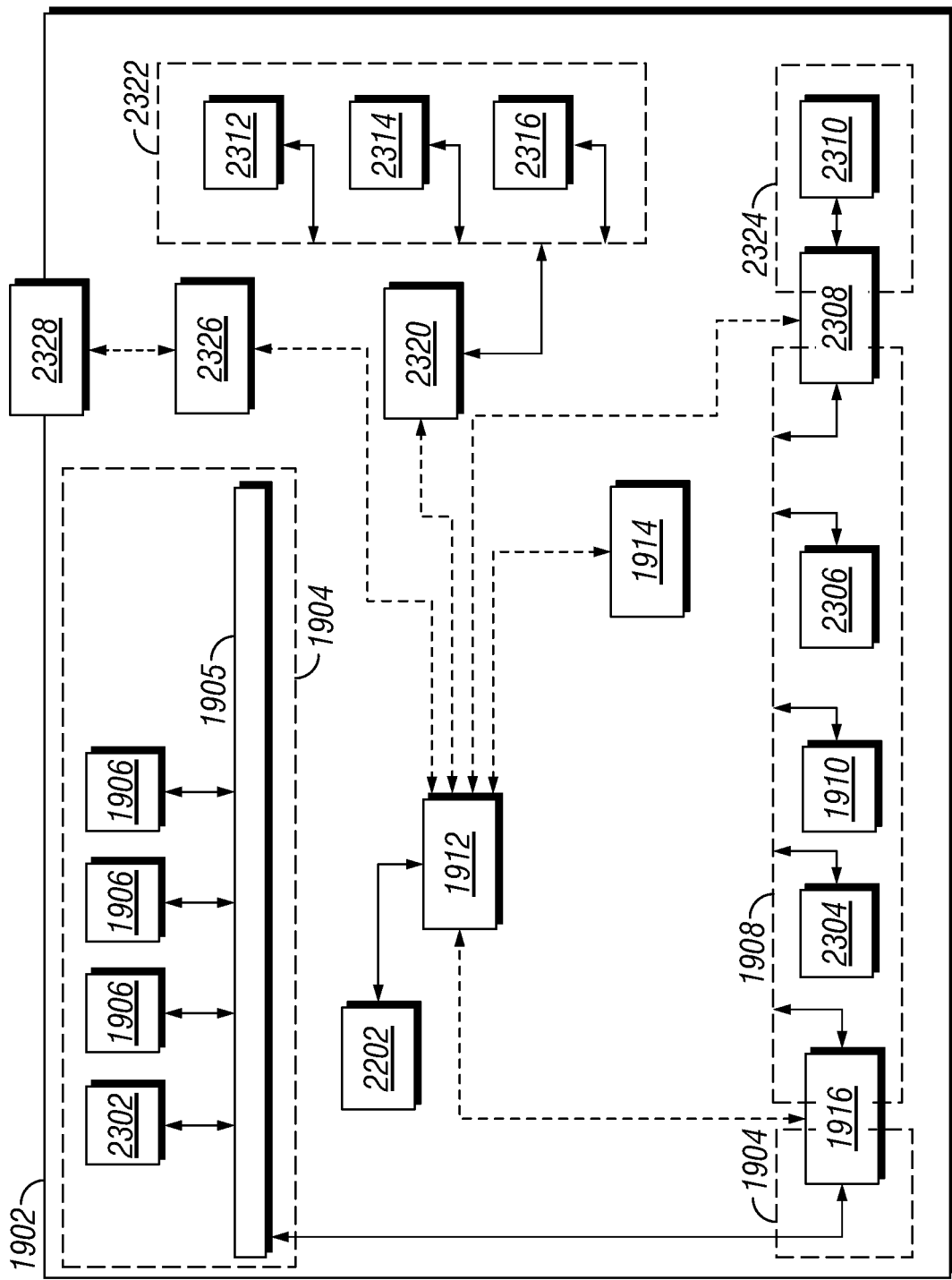
FIG. 23 is a schematic diagram of a system for regulating networks on a vehicle according to certain embodiments of the present disclosure.

Referencing FIG. 23, an example mobile application 1902 includes a first network zone 1904, a second network zone 1908, a third network zone 2322, and a fourth network zone 2324. The network zones may be of any type. In the example of FIG. 23, the first network zone 1904 is a CAN network type, the second network zone 1908 is an ethernet network type, the third network zone 2322 is an ethernet network type, and the fourth network zone 2324 is an electrical signal zone. The example network zones 1904, 1908, 2322, 2324 are selected to depict certain aspects of the present disclosure, and are non-limiting.

In the example of FIG. 23, a CND 1912 regulates communications between end points of the network zones by: communicating with a first CEG 1916 providing communications between end points of the first network zone 1904 and the second network zone 1908, by providing communications at a port of a first CES 1914; communicating with a second CEG 2308 providing communications between end points of the fourth network zone 2324 and the second network zone 1908, by providing communications at a port of the first CES 1914; communicating with the first CES 1914 that is communicatively couplable to the second CES 2320, thereby allowing communications between the second network zone 1908 and the third network zone 2322 (and further with the first network zone 1904 and the fourth network zone 2324 by virtue of the CEG 1916, 2308 communications); and communicating with a second CES 2320 providing communications between end points of the third network zone 2322 and the other network zones 1904, 1908, 2324 (through the second network zone 1908, in the example of FIG. 23). The CND 1912 further regulates communications between end points of the network zones 1904, 1908, 2322, 2324 and an external communication device 2326, for example by communicating permissions, priority information, and the like to the first CES 1914 and/or the second CES 1916, which are selectively able to communicate with the external communication device 2326 (e.g., a head unit). The CND 1912 in the example of FIG. 23 is depicted as interposed between the CES 1914, 1916 devices and the external communication device 2326, although the CES 1914, 1916 devices may be directly coupled to the external communication device 2326, and/or the external communication device 2326 may be coupled to a port of one of the network zones 1908, 2322. The example of FIG. 23 depicts a transmitter/receiver 2328 that performs communication operations with external devices (e.g., a cloud server, service tool, manufacturing tool, operator device, etc.). In certain embodiments, the transmitter/receiver 2328 may be integrated with the external communication device 2326, and/or more than one transmitter/receiver 2328 may be present. Additionally or alternatively, multiple external communication access routes may be available, such as but not limited to, a physical port access on one or more of the network zones 1904, 1908, 2322, a WiFi transmitter/receiver, a Bluetooth transmitter/receiver, etc.

The CND 1912 is depicted as a separate device, but may be positioned with one or more of the network operating components 1916, 1914, 2308, 2320, with a vehicle controller (not shown), and/or distributed across several devices. The example of FIG. 23 further includes a network redundancy circuit 2202, depicted separately for convenience of the present description, that selectively provides a regulation control command(s), providing for redundancy and data re-routing commands to the network operating components 1916, 1914, 2308, 2320 responsive to a degradation or loss of a network zone and/or end point of a network zone. An example operation of the network redundancy circuit 2202 includes routing a communication from a first end point 2302 on the first network zone 1904 to a second end point 2304 on the second network zone 1908 (e.g., during nominal operations), and changing the routing from the first end point 2302 on the first network zone 1904 to a third end point 2312 on the third network zone 2322 (e.g., in response to a failure or off-nominal operation of the second end point 2304).

An example operation of the CND 1912 includes providing for differential priority and/or permission access for a second end point 2304 on the second network zone 1908 relative to a third end point 2306 on the second network zone 1908, where the differential priority and/or permission access relates to communications with the external communication device 2326, storage of data (e.g., in a buffer, and/or in a memory storage on any device of the mobile application 1902), and/or data communication throughput, collection rate, etc.

An example operation of the CEG 2308 includes an operation to perform analog/digital (A/D) processing of communications on the fourth network zone 2324. For example, end point 2310 may be a sensor providing an electrical signal representative of a sensed value, and/or an actuator responsive to an electrical signal from the CEG 2308. In certain embodiments, the end point 2310 may include more than one electrical signal, such as a diagnostic signal, a heartbeat or status signal, etc. In certain embodiments, the CEG 2308 performs signal processing of communications from the end point 2310, such as de-bouncing, filtering, saturation (e.g., reserving high or low values for diagnostic information), re-scaling, linearizing, or other operations. In certain embodiments, the CEG 2308 generates a processed payload of the electrical signal, which may include one or more of: translating the electrical signal into a sensed value (e.g., a pressure, a temperature, a speed, etc.), changing units of the sensed value (e.g., ° F. to K, or to ° C.), adjusting a bit depth of the sensed value (e.g., preparing a 32-bit equivalent of a nominal 16-bit value provided by the end point 2310 or a lookup table associated with the end point 2310), a normalization of the sensed value (e.g., providing a 0-1 value having an agreed meaning for the sensed parameter, and/or providing a voltage equivalent for a sensed voltage, such as when an algorithm operated on a receiving end point such as 2314 on the third network zone 2322 utilizes a different sensor having a different scaling, etc.), applying a time shift to the sensed value (e.g., compensating for a sensor response time, network communication time, etc.), and/or converting a sensed value between floating point and fixed point, and/or re-scaling a fixed point value of the sensor. One of skill in the art, having the benefit of the present disclosure and information ordinarily available when contemplating an electrical signal based end point 2310 and a data recipient end point (any other end point), can readily determine payload processing operations to be performed that provide a configured payload for the recipient end point from the electrical signal provided by the contemplated end point 2310. It will be understood that payload processing may be performed in the reverse, for example taking an incoming payload from a communication and configuring an electrical signal for the end point 2310 from the incoming payload (e.g., a command to adjust an actuator, an electrical signal that may not be configured for the particular end point 2310, etc.). The example CEG 2308 further generates a communication, for example to be provided at a port of the CES 1914, by providing a communication frame, encapsulating the processed payload, and having a protocol configured for the second network zone 1908 (in the example). In certain embodiments, the CEG 2308 processes at least a portion of the frame of the communication, for example by adjusting a time stamp (e.g., where the end point 2310 provides a time stamp that is not configured properly for the mobile application 1902), applying a time stamp (e.g., where a time stamp is desired, but the end point 2310 does not provide one), providing or adjusting a source indicator of the communication (e.g., where the end point 2310 does not have the capability to provide a source indicator, and/or utilizes a source indicator that is not configured properly for the mobile application 1902), and/or providing or adjusting a destination indicator of the communication.

An example operation of the CEG 1916 includes processing a payload of a communication from an end point device 1906, 2302, for example adjusting units, and/or performing any other payload processing operations set forth in the present disclosure. An example operation of the CEG 1916 includes encapsulating a payload of a communication from an end point device 1906, 2302, and/or encapsulating all or a portion of a frame of a communication from the end point device 1906, 2302 into a communication having a protocol configured for the second network zone 1908 (in the example). In certain embodiments, encapsulated portions of the frame of the communication from the end point device 1906, 2302 may additionally be processed, for example to apply or adjust a time stamp, to apply or adjust a source indicator, and/or to apply or adjust a destination indicator. In certain embodiments, the encapsulation of the frame or portions thereof, with or without processing, allow for communications between CAN devices, for example, on separate network zones, including where one or more CAN devices is not coupled directly to a CAN network, but is interfacing through another end point (e.g., end point 2316 on the third network zone 2322, which is an ethernet network in the example of FIG. 23).

In certain embodiments, the CEGs 1916, 2308 may share a port of the CES 1914, and/or may be coupled to the second network zone 1908 utilizing separate ports. Network zones of the mobile application may have any selected topology, including, without limitation, a bus topology, a serial topology, a mesh topology, a hub topology, a ring topology, and/or a star topology. An example mobile application includes a first network zone provided as a first virtual local area network, and a second network zone provided as a second virtual local area network. In the example, the first and second network zones may share network physical hardware and/or portions thereof.

Again referencing FIG. 23, an example system includes a first vehicle controller (e.g., end point 2302) on the first network zone 1904, a second vehicle controller (e.g., end point 2304) on the second network zone 1908, and a network redundancy circuit 2202 that selectively provides a regulation control command, where the CND 1912 adjusts regulating communications between the first network zone 1904 and the second network 1908 zone in response to the regulation control command. Example and non-limiting regulation control commands include one or more of: an off-nominal condition corresponding to the first vehicle controller 2302; a loss of a data element relating to the first vehicle controller 2302; and/or a lost control function of the first vehicle controller 2302. Example and non-limiting adjustments to the regulating communications include one or more operations such as: providing an alternate data element to the first vehicle controller 2302 (e.g., from a different end point that provides the same data, similar data, and/or back-up data); providing a data element corresponding to the lost control function to the second vehicle controller 2304 (e.g., where the second vehicle controller 2304 is configured to perform backup operations for all or a portion of the lost control function); and/or providing a data value ordinarily available on the first network zone 1904 to the second network zone 1908 (e.g., to provide the second vehicle controller 2304 with data utilized to perform backup operations for all or a portion of the lost control function). An example adjustment to the regulating communications includes suppressing a communication of a data value ordinarily available on the first network zone 1904 (e.g., where the suppressed data value is no longer required on the first network zone 1904, and/or where the suppressed data value is no longer indicated as valid data) in response to the lost control function of the first vehicle controller 2302. The example system includes the CND 1912 providing the data value ordinarily available on the first network zone 1904 to the second network zone 1908 (e.g., to provide the data to the second vehicle controller 2304 to perform backup operations for all or a portion of the lost control function) as a processed data value (e.g., to configure the data value for utilization by the second vehicle controller 2304) to the second vehicle controller 2304. The lost control function includes one or more or: a whole or partial loss of a control function nominally performed by the first vehicle controller 2302; a lost communication with an end point 1906 of the first network zone (e.g., an end point 1906 providing a data value utilized to perform the lost control function); a loss of function of the first vehicle controller 2302 (e.g., due to a fault code, failure condition, and/or invalid communications provided by the first vehicle controller 2302); and/or a loss of communication with the first vehicle controller 2302.

The example system includes the first vehicle controller 2302 positioned in a first risk exposure profile, and the second vehicle controller 2304 positioned in a second risk exposure profile, where the first risk exposure profile is distinct from the second risk exposure profile. Example and non-limiting distinctions between the risk exposure profiles include one or more of: a geometric distinction; an environmental distinction; a failure mode distinction; a likely risk type distinction; and/or a likely disturbance distinction.

Certain alternative and/or additional regulation control commands provided by the network redundancy circuit 2202 include one or more of: an off-nominal condition corresponding to the first network zone 1904; a loss of communication between at least one end point 1906 of the first network zone and the first network zone 1904; a physical failure of at least a portion of the first network zone 1904; and/or a bandwidth limitation of the first network zone 1904. Example and non-limiting adjustments to the regulating communications include one or more of: routing at least one communication from the first network zone 1904 to the second network zone 1908; repeating at least one communication from the first network zone 1904 to the second network zone 1908; shifting at least one end point (e.g., 1906) from the first network zone 1904 to the second network zone 1908; shifting and/or repeating relevant communications with the at least one end point (e.g., 1906) from the first network zone 1904 to the second network zone 1908; and/or shifting and/or repeating relevant communications with the at least one end point (e.g., 1910) from the second network zone 1908 to the first network zone 1904 (e.g., utilizing the end point 1910 as an alternate data source for a lost end point 1906 of the first network zone 1904). Operations are described between the first network zone 1904 and the second network zone 1908 for purposes of illustration, but operations may be performed between the first-second network zone, first-third network zones, and/or second-third network zones. Additionally or alternatively, certain operations (e.g., shifting an end point from one network zone to another) imply that an associated end point is moveable between network zones, which may be available in circumstances that will be understood, but include at least: where the end point is coupled or couplable to more than one network zone, where the end point is reconfigurable to provide valid communications to more than one network zone (e.g., where the end point can detect network protocols, frame configurations, etc., and/or where the end point is responsive to commands from the network redundancy circuit 2202 and/or CND 1912 to adjust network protocols, frame configurations, etc.), where the network zones are compatible (e.g., consistent protocols, frame configurations, etc., and/or capable to communicate utilizing some variability of protocols, frame configurations, etc.), and/or where the network zones are separate virtual local area networks (e.g., where separation between the respective network zones is at least partially logical rather than physical).

In certain embodiments, the CND 1912 may be co-located, and/or have portions co-located with one or more vehicle controllers (not shown) of the system. For example, reference FIG. 15 and the related descriptions. The example system includes a vehicle controller 2302 on the first network zone 1904, a first portion of the CND 1912 co-located with the vehicle controller 2302, where the first portion of the CND 1912 includes non-transient computer readable instructions configured to, when executed by a process of the vehicle controller 2302, perform at least a portion of the operations of regulating the communications.

In certain embodiments, the CND 1912 includes a portion co-located with a vehicle controller (not shown), where the portion of the CND includes an ethernet switch (e.g., 1914), where a network zone 1908 includes an ethernet network, where communications between end points of the network zone 1908 and another network zone 1904 are routed through the ethernet switch 1914 (e.g., with CEG 1916 providing communications from network zone 1904 through a port of the CES 1914), and where the ethernet switch 1914 is positioned within a housing with the vehicle controller, and/or positioned on a same board with the vehicle controller.

In certain embodiments, the CND 1912 includes a portion co-located with a vehicle controller (not shown), where the portion of the CND includes a CEG (e.g., 1916), where a network zone 1904 includes an ethernet network, where communications between end points of the network zone 1904 and another network zone 1908 are routed through the CEG 1916 (e.g., with CEG 1916 providing communications from network zone 1904 through a port of the CES 1914 to network zone 1908), and where the CEG 1916 is positioned within a housing with the vehicle controller, and/or positioned on a same board with the vehicle controller.

An example system includes a second vehicle controller 2304 on the second network zone 1908, where the CND 1912 includes a first portion co-located with a vehicle controller (not shown), and a second portion co-located with the second vehicle controller 2304. Each of the first portion or second portion of the CND 1912 may include one or more of: a CES, a CEG, and/or non-transient computer readable instructions configured to, when executed by a process of the respective vehicle controller (e.g., vehicle controller and/or second vehicle controller 2304), perform at least a portion of the operations of regulating the communications between network zones 1904, 1908 (and/or 2322, 2324). Each of the first portion or the second portion of the CND 1912 may be positioned within a housing of the respective vehicle controller, and/or positioned on a same board with the respective vehicle controller.

Certain aspects of the present disclosure are set forth as procedures to perform operations related to the present disclosure. Operations may be performed, without limitation, by any controllers, circuits, devices, components, sensors, actuators, logic circuits, or other aspects as set forth in the present disclosure. Procedures are depicted schematically as illustrative examples, and operations may be omitted, combined, divided, and/or re-ordered in whole or part. In certain embodiments, one or more operations of a first procedure may be combined with one or more operations of another procedure.

Figure 24:
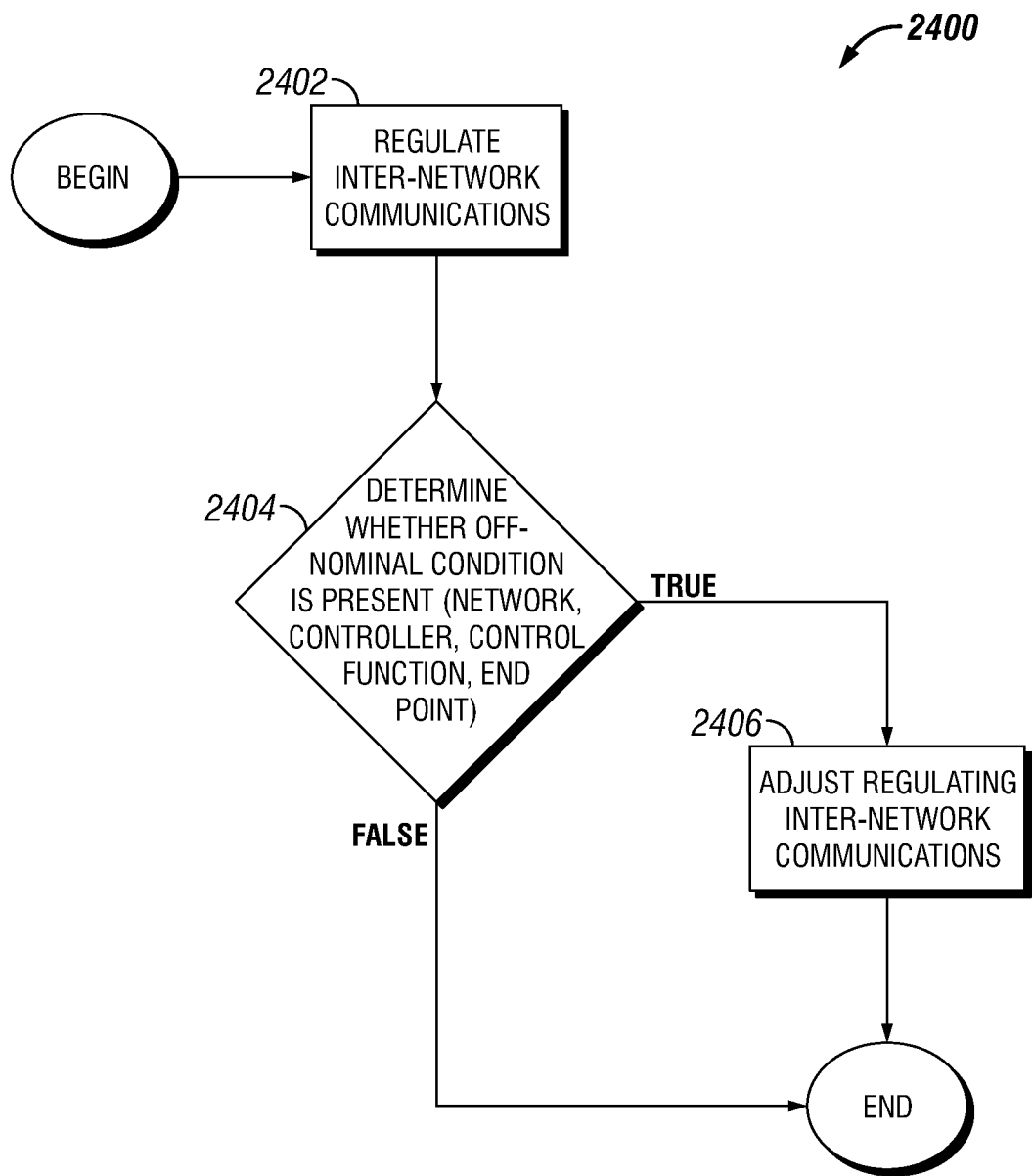
FIG. 24 is a schematic flow diagram depicting an example procedure for adjusting inter-network communication regulation.

Referencing FIG. 24, a schematic flow diagram of a procedure 2400 for regulating inter-network communications (e.g., between distinct network zones of a mobile application) is schematically depicted. The example procedure 2400 includes an operation 2402 to regulate inter-network communications (e.g., as referenced throughout the present disclosure, including at least with reference to FIG. 19 and the related description) between a first network (and/or network zone) and a second network (and/or network zone) of a mobile application. The example procedure 2400 further includes an operation 2404 to determine whether an off-nominal condition is present, where the off-nominal condition includes, without limitation, a condition of any network, an end point, a controller, and/or a control function. In response to operation 2404 determining TRUE, the procedure 2400 includes an operation 2406 to adjust the regulating of the inter-network communications. Without limitation to any other aspect of the present disclosure, operation 2406 to adjust the regulating of the inter-network communications include any one or more of the following: routing a communication from a first network to a second network; repeating, sharing, or mirroring a communication nominally on a first network additionally onto a second network; shifting an end point from a first network to a second network; suppressing a communication on one of the networks; adjusting a data sampling rate and/or communication rate of a communication and/or end point on one of the networks; adjusting control operations, at least in part, from a first controller on the mobile application to a second controller on the mobile application, and/or providing the second controller with data nominally provided to the first controller, and/or with alternate data determined in response to the adjusted control operations; and/or providing a communication to a controller on the mobile application from an alternate data source.

Figure 25:
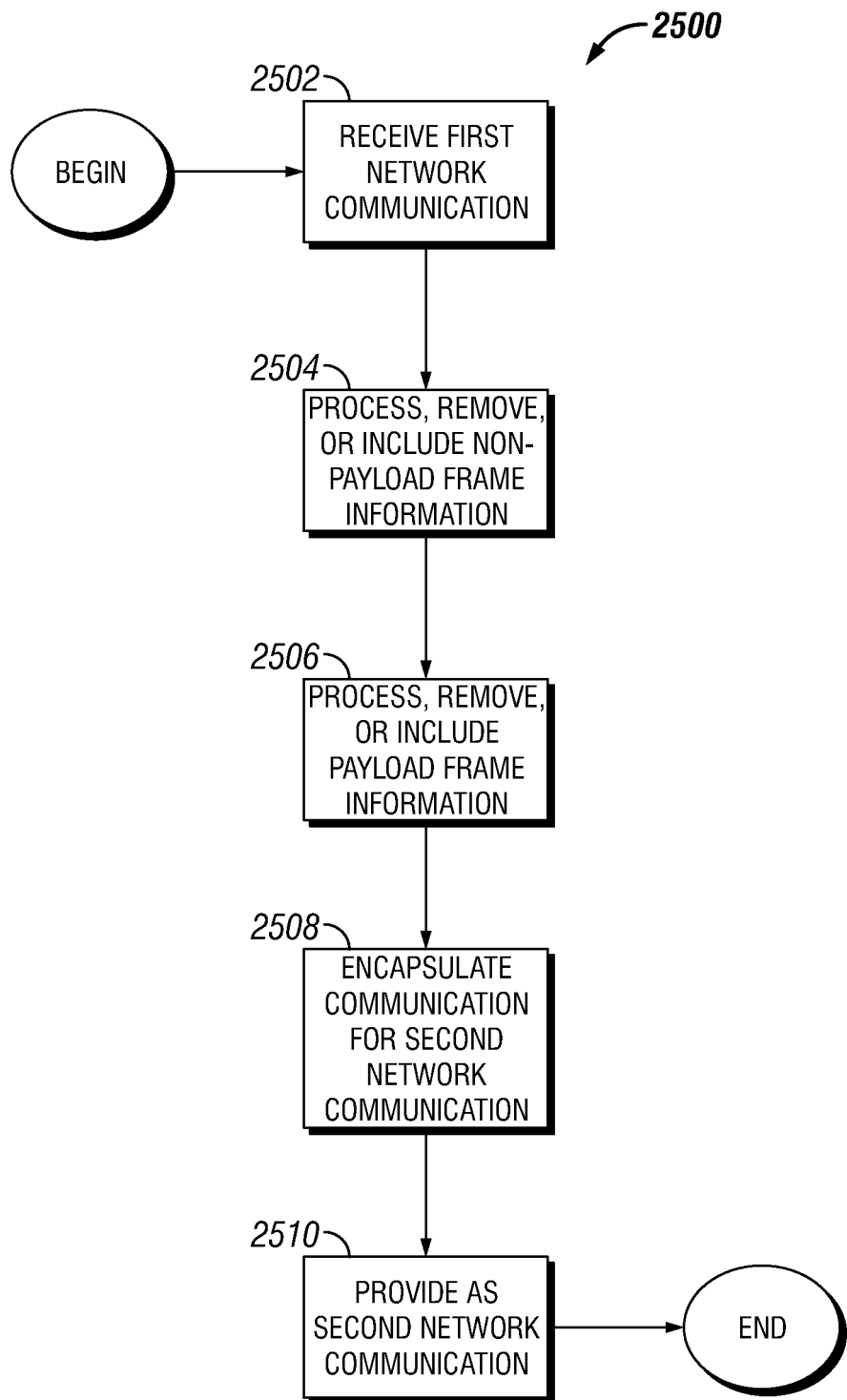
FIG. 25 is a schematic flow diagram depicting an example procedure for encapsulating communications.

Referencing FIG. 25, a schematic flow diagram of a procedure 2500 for encapsulating and/or processing communications from a first network for communication onto a second network for a mobile application (e.g., communications between end points on separate network zones) is schematically depicted. The example procedure 2500 includes an operation 2502 to receive a first network communication (e.g., a communication provided by any end point on any network zone of a mobile application), an operation 2504 to process, remove, or include non-payload frame information of the communication (e.g., metadata, identifiers, time stamps, and/or any other information of the communication that is not the payload, or base data, for the communication). The example procedure 2500 further includes an operation 2506 to process, remove, or include payload frame information from the communication (e.g., removing the payload, for example where the communication is utilized for reasons other than the payload, such as in network monitoring operations; and/or changing the payload units, resolution, bit depth, data type, etc.), and an operation 2508 to encapsulate the communication for communication onto a second network of the mobile application. The example procedure 2500 further includes an operation 2510 to provide the encapsulated communication as a second network communication on a second network of the mobile application. In certain embodiments, procedure 2500 provides for operations to provide messages between end points on separate networks having incompatibilities (e.g., network protocols, message characteristics, network addressing, etc.), and/or between end points having otherwise incompatible data usage (e.g., payload units, data types, bit depths, etc.). In certain embodiments, operations of procedure 2500 allow for encapsulation of messages from a first network (e.g., a CAN network) to a second network (e.g., an ethernet network), and/or to tunnel messages from a first network having a first network type to another network having the first network type, by passing through an intermediary network having a second network type.

Figure 26:
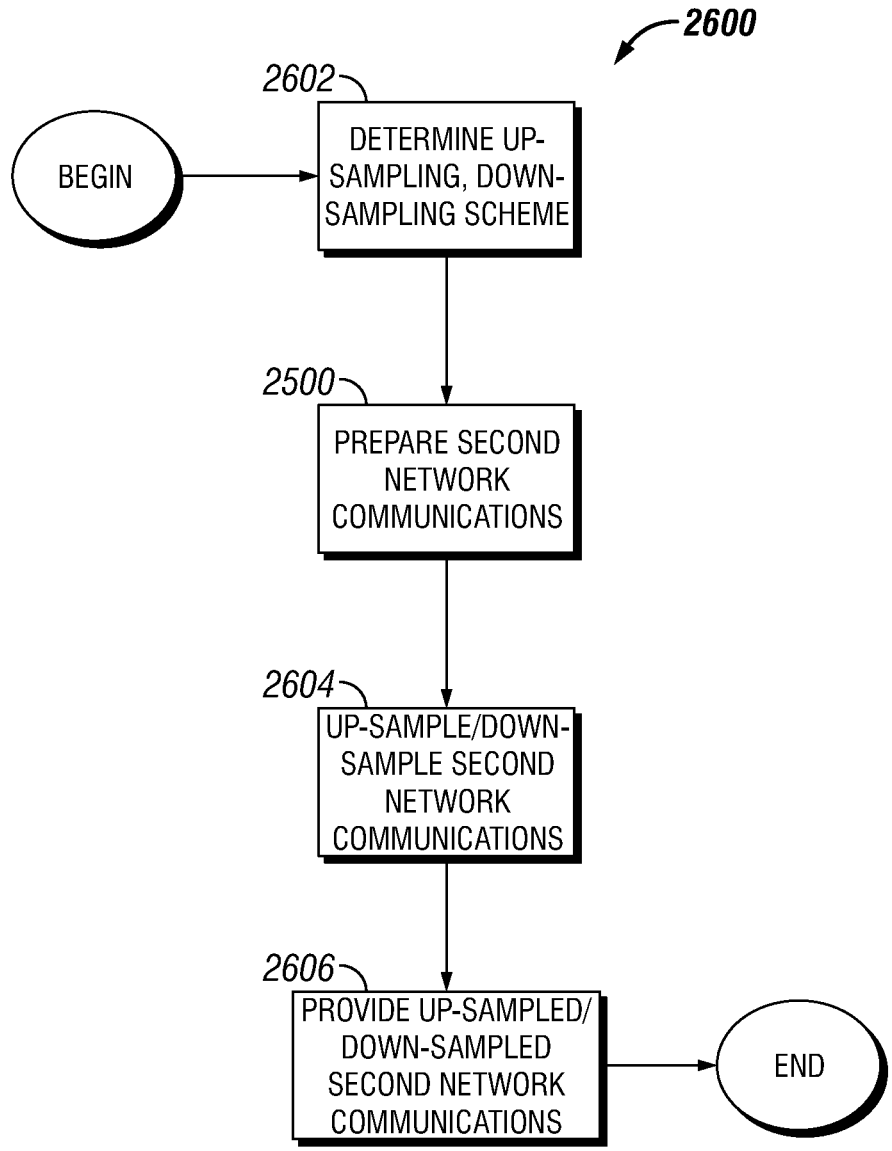
FIG. 26 is a schematic flow diagram depicting an example procedure for processing communications.

Referencing FIG. 26, an example procedure 2600 for providing up-sampled and/or down-sampled communications from an end point on a network of a mobile application is schematically depicted. The example procedure 2600 includes an operation 2602 to determine an up-sampling and/or down-sampling scheme for a communication (e.g., from a first network). Example operations 2602 include, without limitation to any other aspect of the present disclosure, determining the up-sampling and/or down-sampling scheme in response to a requested data rate for the communication, a data capability rate for a network and/or for a source end point for the communication, a data storage value for a device in the system (e.g., a communication buffer storage, and/or a long-term data storage location), and/or a priority for the communication (e.g., relative to competing communications, according to operating conditions for the mobile application, and/or according to a related priority for a flow, end point, vehicle function, or the like).

The example procedure 2600 further includes an operation 2500 to prepare second network communications (e.g., reference FIG. 25 and procedure 2500), including, for example, processing payload and/or non-payload information of the communications, and encapsulating the (processed or unprocessed) payload and/or non-payload information into a communication prepared for the second network.

The example procedure 2600 further includes an operation 2604 to up-sample and/or down-sample the second network communications. Without limitation to the general notion that all operations for procedures described herein can be re-ordered, divided, omitted, and/or combined, operations 2500 and 2604 of procedure 2600 may be performed in any order, including iteratively, simultaneously, and/or progressively together, as it will be understood that up-sampling and/or down-sampling operations 2604 may render operation 2500 unnecessary for certain communications (e.g., an excluded down-sampled communication, and/or excluded spanning or non-spanning communications) and/or operations 2604 may create payloads and/or non-payload information for communications (e.g., added up-sampled communications, and/or added spanning or non-spanning communications) that are then prepared in operation 2500. Without limitation to any aspect of the present disclosure, operation 2604 may include any operations described in relation to FIGS. 17 and 18, and the related description. The example procedure 2600 further includes an operation 2606 to provide the up-sampled and/or down-sampled communications to the second network. Operations for procedure 2600 are recited in terms of providing communications from an end point on a first network to an end point on a second network for clarity of the present description, but it will be understood that procedure 2600 is applicable to any communications on a mobile application, including published communications for a data service (e.g., reference FIG. 27 and the related description), communications passed to an external device, and/or communications within a same network (e.g., from a first end point on a first network to a second end point on the second network).

Figure 27:
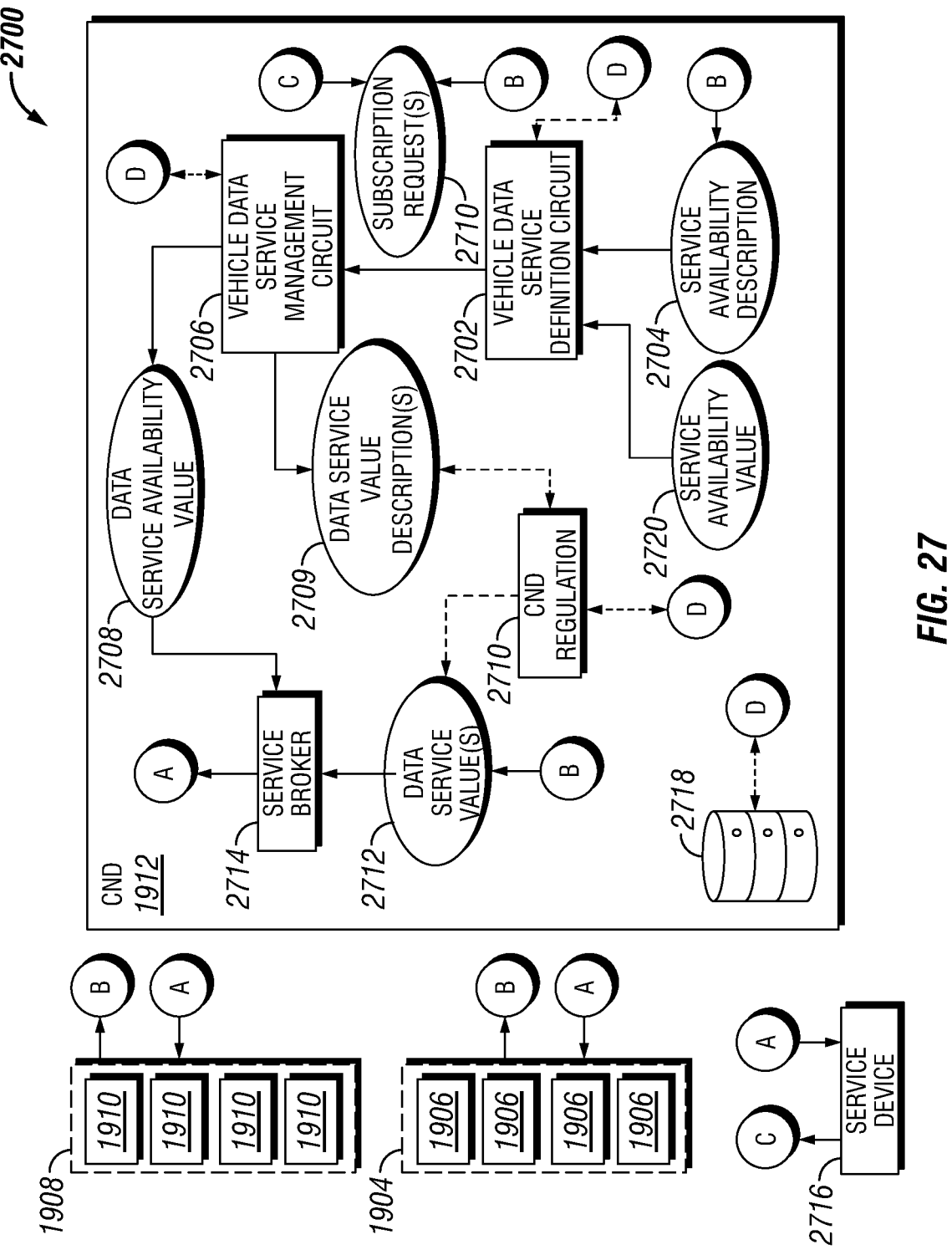
FIG. 27 is a schematic diagram of a system for providing a data service.

Referencing FIG. 27, an example apparatus 2700 for providing a service oriented architecture for a mobile application having a mixed network environment is schematically depicted. The example apparatus 2700 includes a vehicle data service definition circuit 2702 that interprets a service availability description 2704 including available data values from end point(s) 1906, 1910 on network(s) 1904, 1908 of a vehicle. For example, the vehicle data service definition circuit 2702 may receive communications from end point(s) 1906, 1910 that provide an indicator that one or more data values are available for communication, and/or read an indicator from a configuration file 2718 (depicted as a data store in the example of FIG. 27) of data values available for communication. The service availability description 2704 may include any type of data value available on the vehicle, including sensed values, actuator feedback values (e.g., position, state, fault values, etc.), parameters from any controller in the system, virtual sensor values, control parameters (e.g., set points, reference points, determined state values, reference error values, etc.), and/or stored values (e.g., accumulated parameters, snapshot information, calibrations, etc.). A service availability description 2704 may be associated with a single end point, a group of end points, a flow, or any other data provider or group of data providers in the system. The data associated with a service availability description 2704 may be a raw data value and/or a processed version of a data value (e.g., a filtered, low sampling rate, time lagged data, etc.).

The example apparatus 2700 further includes a vehicle data service management circuit 2706 that publishes a data service availability value 2708 in response to the service availability description 2704. In certain embodiments, the data service availability value 2708 may include the same data, or a formatted version of the data, as provided by the service availability description 2704. In certain embodiments, the data service availability value 2708 may include a redacted or adjusted version (e.g., fewer parameters, reduced data rates, reduced resolution, etc., than provided in the service availability description 2704) of the service availability description 2704, for example when a device providing the service availability description 2704 does not have full permissions (e.g., as determined from configuration file 2718) to publish all of the listed parameters, to publish at the planned data rates, and/or to publish with the indicated sampling rates. In certain embodiments, the vehicle data service management circuit 2706 determines that a publishing device (and/or end point, flow, etc.) does not have permissions to provide a service advertised in the service availability description 2704, and accordingly the vehicle data service management circuit 2706 does not provide a corresponding data service availability value 2708 for that service availability description 2704. In certain embodiments, the vehicle data service management circuit 2706 determines that certain data service availability values 2708 are restricted to only certain subscribing devices, and accordingly configures the data service availability value 2708 (e.g., applying tags, encryption schemes, metadata, or the like) such that unauthorized devices are unable to see the corresponding data service availability value 2708 and/or are unable to subscribe to the corresponding data service availability value 2708. The example vehicle data service management circuit 2706 generates a data service value description 2709 in response to a subscription request 2710 to the data service availability value 2708, and data values from end point(s) 1906, 1910. For example, the data service value description(s) 2709 describe parameters to be collected, grouped, and/or processed, and may further include end point descriptions, etc. The data service value description(s) 2709 provide collection parameters utilizable by the CND 1912 to support the services having active valid subscriptions, and further allows for management of collection operations, such as screening of authorized data access and/or consolidation of redundant parameters (e.g., where more than one service may provide a same data element as a part of the service, where multiple data rates for a parameter can be serviced with a single high rate collection operation, etc.).

The example apparatus 2700 includes a CND 1912 that performs operations to regulate communications between networks 1904, 1908 of the vehicle. In the example apparatus 2700, the circuits 2702, 2706 are depicted as being positioned with the CND 1912 for clarity of the depiction, but it will be understood that one or more of the components, circuits, communication flows, data elements, and/or other aspects depicted in FIG. 27 may be distributed across devices in the system. The example CND 1912 includes a regulation circuit 2710 (e.g., which may include and/or be in communication with network operation components such as a CES, CEG, or other operational component) that regulates communications between the first network 1904 and the second network 1908, and that generates a data service value 2712 in response to the data service value description(s) 2709 and data values from the end point(s), and publishes the data service value(s) 2712 in response to the data service value description(s) 2709.

An example regulation circuit 2710 collects the data from end points directly, and publishes the data as a broadcast (e.g., visible to all end points) and/or multi-cast (e.g., provided to subscribing end points) parameter, for example according to permissions, network capacity, importance and/or usage breadth of the parameter, etc. In certain embodiments, the example regulation circuit 2710 provides the data service value(s) 2712 to a service broker 2714 that manages communication of the data service value(s) 2712 to subscribing end points or devices. An example embodiment having a service broker 2714 additionally or alternatively utilizes the service broker 2714 to communicate the data service availability value(s) 2708 to end points or devices, and/or to receive subscription request(s) 2710 from devices. In certain embodiments, the vehicle data service management circuit 2706 communicates with the service broker 2714 to determine the subscription request(s) 2710. In certain embodiments, the vehicle data service management circuit 2706 receives subscription request(s) from end point devices on a network 1904, 1908.

An example apparatus 2700 includes the vehicle data service management circuit 2706 and/or the service broker 2714 receiving subscription request(s) 2710 from an external device, such as a service device 2716. In the example, the vehicle data service management circuit 2706 determines data service value description(s) 2709 responsive to the subscription request(s) 2710 from the external device (e.g., including determining permissions, etc.), and the external device receives parameters according to the subscribed service, as with subscribing on-vehicle end points, devices, flows, and the like.

In certain embodiments, the service availability description 2704 further includes an authorization description (e.g., when the end point and/or device publishing the service availability applies a permission level), and the vehicle data service management circuit 2706 further limits publication of the data service availability value 2708, and/or limits acceptance of a corresponding subscription request 2710, responsive to the authorization description. Additionally or alternatively, the vehicle data service management circuit 2706 may determine the authorization description from the configuration file 2718. An example vehicle data service management circuit 2706 limits publication of the data service availability value (and/or limits acceptance of a corresponding subscription request 2710) in response to one or more of: an end point identifier of the subscription requestor; an application identifier (e.g., motive power management; entertainment management; climate control; stability control; etc.) of the subscription requestor; a flow identifier of the subscription requestor; a user identifier (e.g., an identity of a service technician, a personnel role associated with the requesting device, application, flow, etc.) of the subscription requestor; and/or an entity identifier (e.g., an entity name, entity role, manufacturer, OEM, service entity, owner entity, operator entity, third-party entity, etc.) of the subscription requestor.

An example vehicle data service definition circuit 2702 further interprets a service availability value 2720, and updates the service availability description 2704 in response to the service availability value 2720. For example, the service availability value 2720 may provide an indication that the published service is unavailable, such as during certain operating conditions, due to a fault or failure of an end point or device providing the data for the service, due to a change in permissions of the system (and/or a conditional permission where the permission criteria are not currently met), due to the service appearing in the configuration information 2718 but referencing end points, devices, applications, flows, or the like that are not present on the vehicle, an expiration of a permission, etc. In a further example, the service availability value 2720 further includes an authorization description, where the vehicle data service definition circuit 2706 limits updating of the service availability description 2704 in response to the authorization description. An example vehicle data service management circuit 2702 limits updating of the service availability description in response to one or more of: an end point identifier of the service availability value provider; an application identifier of the service availability value provider; a flow identifier of the service availability value provider; a user identifier of the service availability value provider; and/or an entity identifier of the service availability value provider. An example vehicle data service definition circuit 2702 receives a service availability value 2720 from a data collection management device external to the vehicle (e.g., but not limited to, the service device 2716). Accordingly, the apparatus 2700 allows for provision and updating of services by external devices, such as utilized by an operator, owner, service entity, manufacturing entity, third-party applications, fleet owner, etc., including (depending upon permissions) updating the configuration information, intra-vehicle permissions, etc.

Figure 28:
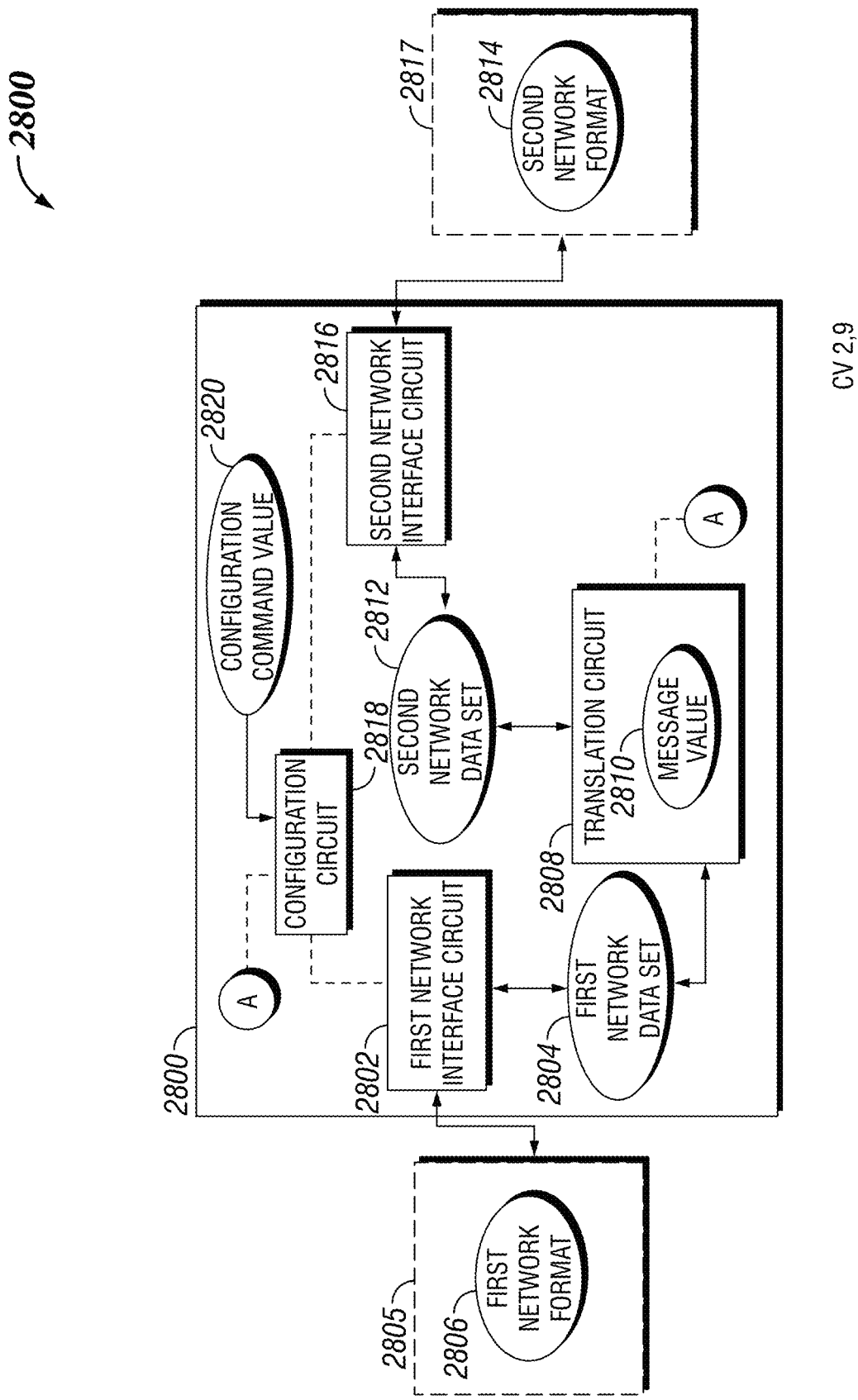
FIG. 28 is a schematic diagram of a system for regulating networks on a vehicle.

Referencing FIG. 28, an apparatus 2800 for encapsulating network communications to support moving communications between mixed networks on a mobile application is schematically depicted. The example apparatus 2800 includes a first network interface circuit 2802 that interprets a first network data set 2804 (e.g., messages from end points on a first network 2805) having a first network format 2806 (e.g., protocols, message parameters, beginning and/or terminating bits or information, payload formatting, message types, message confirmation protocols, and/or network layers), and a translation circuit 2808 that determines a message value 2810 from the first network data set 2804, and encodes the message value 2810 in a second network data set 2812 having a second network format 2814. A message data set, as used herein, should be understood broadly, and may include a single message, a group of related messages, a group of messages present on an associated network over a period of time, operating condition, or the like. A message value, as utilized herein, includes any selected aspects of a message, including a payload, a frame, portions of a frame, metadata, or the like.

The example apparatus 2800 further includes a second network interface circuit 2816 that transmits the second network data set 2812 (e.g., as a message to a second network 2817). The apparatus 2800 includes the first network interface circuit 2802, the translation circuit 2808, and the second network interface circuit 2816 defined by either a single device, or by two devices, with the first device and/or two devices capable to be incorporated into a vehicle. For example, a CND may include all of the first network interface circuit 2802, the translation circuit 2808, and the second network interface circuit 2816. In another example, a CEG may include the first network interface circuit 2802 and the translation circuit 2808, and a CES may include the second network interface circuit 2816. In another example, a CEG may include the first network interface circuit 2802, and a CES may include the translation circuit 2808 and the second network interface circuit 2816. In another example, a CEG may include all of the first network interface circuit 2802, the translation circuit 2808, and the second network interface circuit 2816.

In the example of FIG. 28, the first network format 2806 is distinct from the second network format 2814 in at least one aspect. An example apparatus 2800 includes one of the first network format 2806 or the second network format 2814 as a CAN network. An example apparatus 2800 includes the first network format 2806 as a CAN network, and the second network format 2814 as an ethernet network.

An example apparatus 2800 further includes a configuration circuit 2818 that modifies the first network interface circuit 2802, the translation circuit 2808, and/or the second network interface circuit 2816 in response to a configuration command value 2820. Example and non-limiting configuration command values 2820 include one or more of: which messages of the first network data set 2804 are to be communicated to the second network; up-sampling and/or down-sampling operations to be performed on messages of the first network data set 2804; translation parameters for determining the message value 2810 (e.g., which aspects of the message such as the payload, frame portions, metadata, etc. are to be considered the message value 2810) and/or encoding the message value into the second network data set 2812 (e.g., encapsulation operations, source and/or destination identifiers, unit conversions, etc.); and/or network regulation operations (e.g., reference FIG. 19 and the related description). An example configuration circuit 2818 is defined by the first device, or by the second device (optionally, and if present), such as a CND, CEG, and/or CES. In certain embodiments, the configuration circuit 2818 further selectively configures which of one or more portions of the first network interface circuit 2802, the translation circuit 2808, and/or the second network interface circuit 2816 are defined by the first device and/or the second device (e.g., allowing the configuration circuit 2818 to adjust operations between devices, to repurpose a device such as a CEG or CES, and/or to shift network operation and/or regulation functions in response to system changes, topology changes, and/or off-nominal operating conditions). In certain embodiments, the configuration circuit 2818 receives a configuration command value 2820 from a CND, from an external device, and/or by accessing a configuration file.

Figure 29:
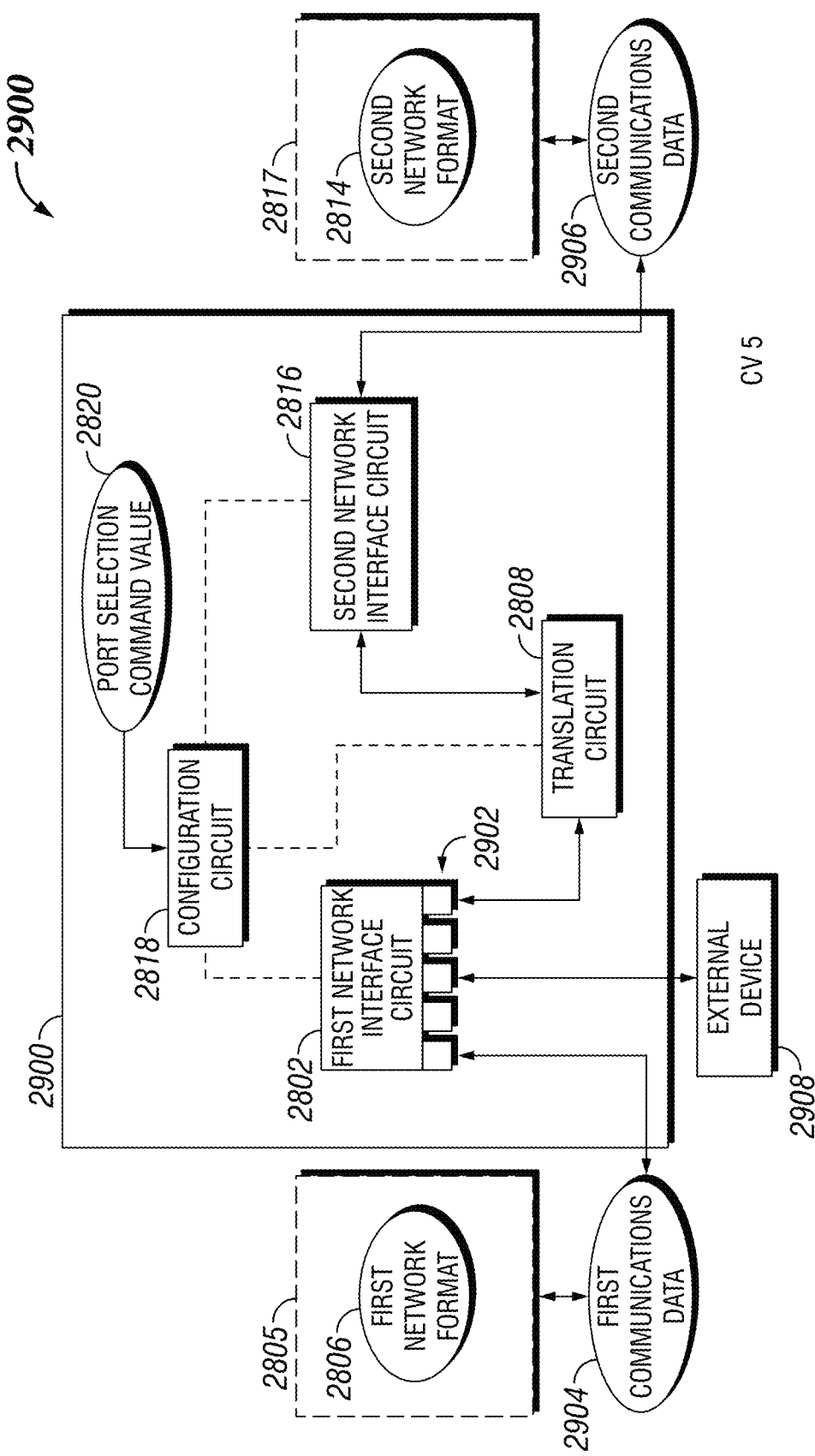
FIG. 29 is a schematic diagram of a system for regulating networks on a vehicle.

Referencing FIG. 29, an apparatus 2900 for mirroring a port, providing communications from a first network to a second network on a mobile application, is schematically depicted. The example apparatus 2900 includes a first network interface circuit 2802 having a number of ports 2902 that interpret first communications data 2904 of first network 2805 onboard a vehicle. The ports 2902 may be physical ports, logical ports, and/or a combination of physical and logical ports. The example apparatus 2900 includes a second network interface circuit 2816 that interprets second communications data 2906 from a second network 2817 onboard the vehicle. The second network 2817 is of a different type than the first network 2805 (e.g., a CAN network versus an ethernet network, networks having distinct network formats 2806, 2814, and/or any other type difference as set forth herein and/or understood in the art). The apparatus 2900 further includes a translation circuit 2808 that relays the second communications data 2906 (e.g., which may include processing, encapsulating, and/or otherwise configuring the second communications data 2906 for communication on the first network 2805) to the first network interface circuit 2802 for transmission on the first network 2805 via at least one of the ports 2902. An example first network interface circuit 2802 mirrors a first port of the ports 2902 to a second port of the ports 2902, for example allowing an external device 2908, data collection operation (not shown), and/or other device in the vehicle to observe and/or take data from the second port thereby receiving data that is the same as the data communicated at the first port. Without limitation to any other aspect of the present disclosure, the port mirroring operation allows for network monitoring operations, data collection of any parameter from any end point of a network in the vehicle (e.g., without requiring knowledge of the requesting device about the network configuration, communication protocols, and/or position of end points distributed throughout the vehicle).

An example apparatus 2900 further includes a configuration circuit 2818 that interprets a port selection command value 2820, and assigns which ports 2902 are the first port and the mirrored port. Accordingly, the configuration circuit 2818 can provide communication values from any of the ports 2902, which may include any selected end points on the first network 2805, and/or may include all of the second communications data 2906 (e.g., where the translation circuit 2808 relays the second communications data 2906 to a single one of the ports 2902), to the selected mirrored port. In certain embodiments, the configuration circuit 2818 receives the port selection command value 2820 from a CND, from a configuration file, and/or from a requesting external device 2908 (e.g., a service tool, OBD device, vehicle and/or network monitoring device, etc.), and/or from any controller on the vehicle having sufficient permissions to provide a port selection command value 2820.

An example configuration circuit 2818 interprets a port assignment command value 2820 identifying: an assigned port and a device (e.g., an end point, controller, flow, application, etc.) on the second network 2817, portions of the second communications data 2906 corresponding to the identified device, and transmits (and/or commands the first network interface circuit 2802 to perform the transmitting) the identified portions of the second communications data 2906 to the assigned port. In certain further embodiments, the device on the second network 2817 may additionally or alternatively include communications data on other networks (e.g., the first network 2805, such as when an application, flow, or other device on the second network 2817 includes aspects operating on other networks) corresponding to the identified device, and the operations of the configuration circuit 2818 and first network interface circuit 2802 further support providing the corresponding communications data from all related networks at the assigned port.

Figure 30:
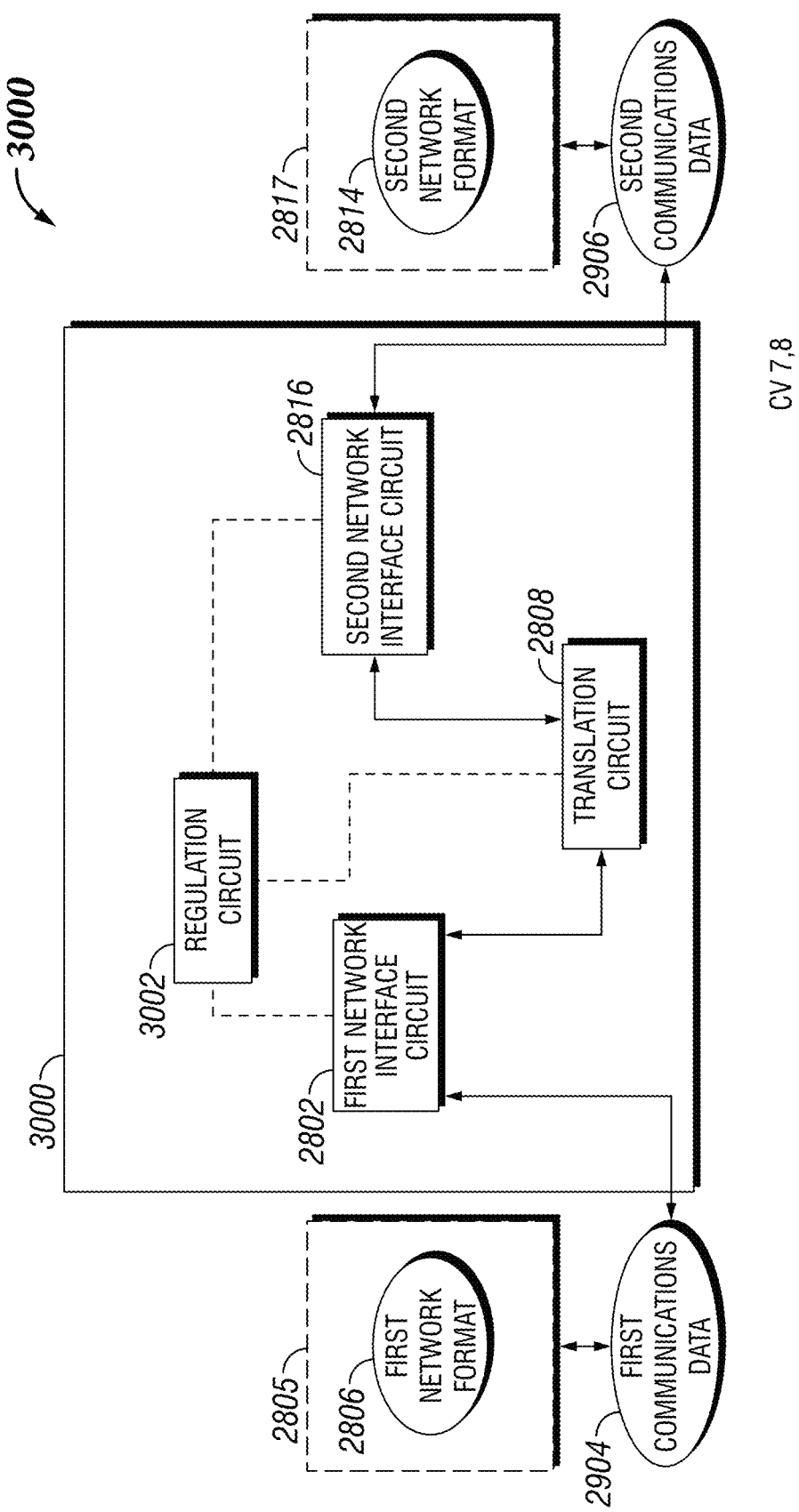
FIG. 30 is a schematic diagram of a system for regulating networks on a vehicle.

Referencing FIG. 30, an apparatus for controlling intra-network traffic on a mobile application is schematically depicted. The example apparatus 3000 includes a first network interface circuit 2802 that interprets first communications data 2904 of a first network 2805 onboard a vehicle, and a second network interface circuit 2816 that interprets second communications data 2906 of a second network 2817 onboard the vehicle. The second network 2817 is of a different type than the first network 2805 (e.g., a CAN network versus an ethernet network, networks having distinct network formats 2806, 2814, and/or any other type difference as set forth herein and/or understood in the art). The example apparatus 3000 further includes a translation circuit 2808 that selectively relays first communications data 2904 to the second network interface circuit 2816 for transmission on the second network 2817, and/or second communications data 2906 to the first network interface circuit 2802 for transmission on the first network 2805. The example translation circuit 2808 further configures the messages from each network for the other network, for example processing, encapsulating, and/or otherwise configuring the messages before relaying the messages. The example apparatus 3000 further includes a regulation circuit 3002 that regulates the second network interface circuit 2816, the first network interface circuit 2802, and/or the translation circuit 2808, including, without limitation, performing any one or more operations such as regulating operations described in relation to FIG. 19 and the related description. An example regulation circuit 3002 restricts an amount of the first communications data 2904 relayed to the second network interface circuit 2816, and/or an amount of the second communications data 2906 relayed to the first network interface circuit 2802. An example regulation circuit 3002 restricts an amount of communications data by limiting a data rate (e.g., an amount of data per unit time, and/or an amount of data over a period of time), by limiting an amount of data based on a saturation rate (e.g., utilization of available bandwidth, utilization of a portion of bandwidth permitted for the related communications, etc.), limiting an amount of data based on a storage capacity, based upon a capability of a receiving device (e.g., an end point on one of the networks), and/or based upon a requested data rate of a receiving device.

An example regulation circuit 3002 restricts transmission of one or more portions of the first communications data 2904 and/or the second communications data 2906, for example restriction transmission of data corresponding to selected end points, flows, applications, and/or according to an operating condition of the vehicle, an off-nominal condition of a network and/or end point, or the like. In certain embodiments, combinations of these restrictions may be present—for example where a specified vehicle operating conditions indicates that transmissions to or from certain end points are to be restricted, and/or transmissions related to certain data flows are to be restricted. Restriction operations include, without limitation to any other aspect of the present disclosure, include operations such as: limiting communications, limiting communication rates, suppressing communications (at least for a time period and/or during certain operating conditions), performing down-sampling on certain messages (e.g., reducing communicated message traffic), and/or performing up-sampling on certain messages (e.g., which may shift operational workloads between components, including reducing the workload of some components, such as utilizing up-sampling to reduce an actual data sampling rate, performing up-sampling to generate configured messages to reduce encapsulation workloads, and the like). In certain embodiments, restriction operations of the regulation circuit 3002 include considering associated priority information for messages, end points, flows, networks, or the like, and/or prioritizing portions of the relayed first communications data 2904 and/or second communications data 2906.

Figure 31:
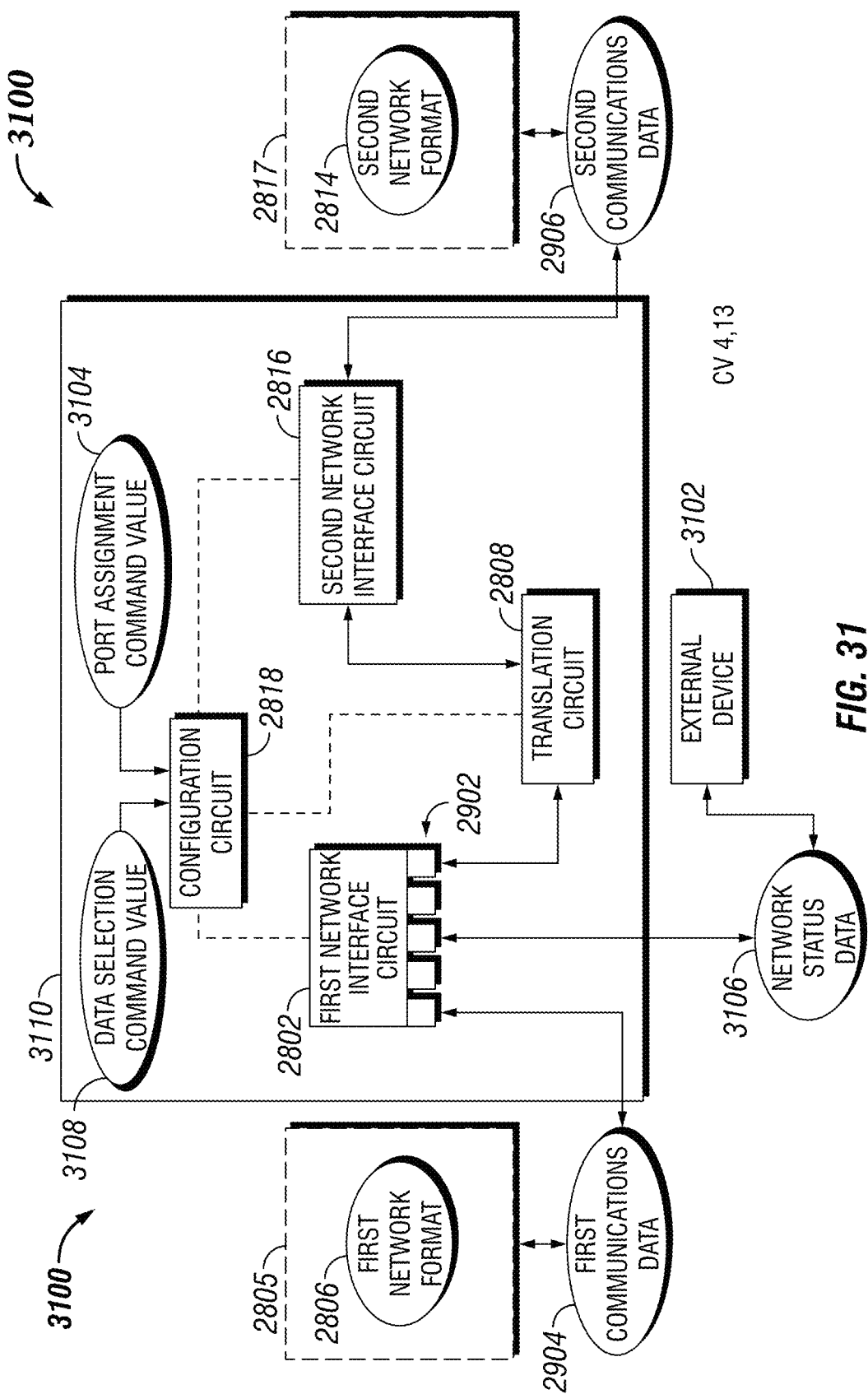
FIG. 31 is a schematic diagram of a system for regulating networks on a vehicle.

Referencing FIG. 31, an apparatus to support configurable network status monitoring for a mobile application having a mixed network is schematically depicted. The example apparatus 3100 includes a first network interface circuit 2802 that interprets a first communications data 2904 of a first network 2805 onboard a vehicle, and a second network interface circuit 2816 that interprets a second communications data 2906 of a second network 2817 onboard the vehicle. The second network 2817 is of a different type than the first network 2805 (e.g., a CAN network versus an ethernet network, networks having distinct network formats 2806, 2814, and/or any other type difference as set forth herein and/or understood in the art). The example apparatus 3100 further includes a network status circuit 3102 that generates network status data 3106 by monitoring portions of the first communications data 2904 and/or second communications data 2906. In the example of FIG. 31, the network status circuit 3102 is depicted in communication with a port 2902 of the first network interface circuit 2802 to collect the network status data 3106, but it will be understood that the network status circuit 3102 may be positioned at other locations in the system, and may collect network status data 3106 from the translation circuit 2808, the second network interface circuit 2816, and/or may access the network status data 3106 as stored data on a memory storage of the apparatus 3100.

The example apparatus 3100 further includes a configuration circuit 2818 that configures at least one of the ports 2902 to mirror at least another one of the ports 2902, for example to provide the network status data 3106 at selected ports 3902 of the first network interface circuit 2802. An example configuration circuit 2818 interprets a port assignment command value 3104 that identifies the selected port (e.g., to provide the network status data 3106), and further identifies portions of the first communications data 2904 and/or second communications data 2906 (e.g., based on monitored devices, networks, end points, flows, etc.), and transmits (and/or command the first network interface circuit 2802) to communicate the identified portions of the communications to the selected port. An example apparatus 3100 includes the configuration circuit 2818 that modifies the network status data 3106, for example responsive to selected devices, end points, flows, applications, controllers, networks, a system of the vehicle, or the like. An example apparatus 3100 includes the configuration circuit 2818 modifying the network status data 3106 in response to a data selection command value 3108 (e.g., provided by the network status circuit 3102, a CND, an external device, a configuration file, and/or other controller or component of the system), and adjusting data provided to the selected port (or otherwise to the network status circuit 3102) responsive to the data selection command value 3108. In certain embodiments, the data selection command value 3108 additionally or alternatively identifies one or more protocols (e.g., data collection rates, time values and/or ranges, selected processing, selected portions of message frames, metadata, a protocol type such as TCP, UDP, AVB, etc.). The example apparatus 3100 depicts the circuits 2802, 2808, 2816, 2818 positioned within a same housing 3110, and the network status circuit 3102 separated from the housing 3110 (e.g., as an external device), in a non-limiting example. The example apparatus 3100 may include the circuits 2802, 2808, 2816, 2818 and/or sub-groups of the circuits 2802, 2808, 2816, 2818 positioned on a same circuit board.

With further reference to FIG. 31, an example first network 2805 is an ethernet network, and an example second network 2817 is a CAN network. In the example, the translation circuit 2808 is interposed between the first and second network interface circuits 2802, 2816, and translates ethernet communications data into CAN communications data, and/or CAN communications data into ethernet communications data. The network status circuit 3102 generates the network status data 3106 by monitoring ethernet communications data 2904 and/or CAN communications data 2906. In certain embodiments, the network status data 3106 is based at least in part on one or more of: a bandwidth across the translation circuit 2808; a number of messages in the ethernet and/or CAN communications data having an address corresponding to a same device, a same application, and/or a same flow; and/or a number of communication errors (e.g., dropped packets, delay events, bad checksums, invalid data, failed handshakes or acknowledgements, etc.).

Figure 32:
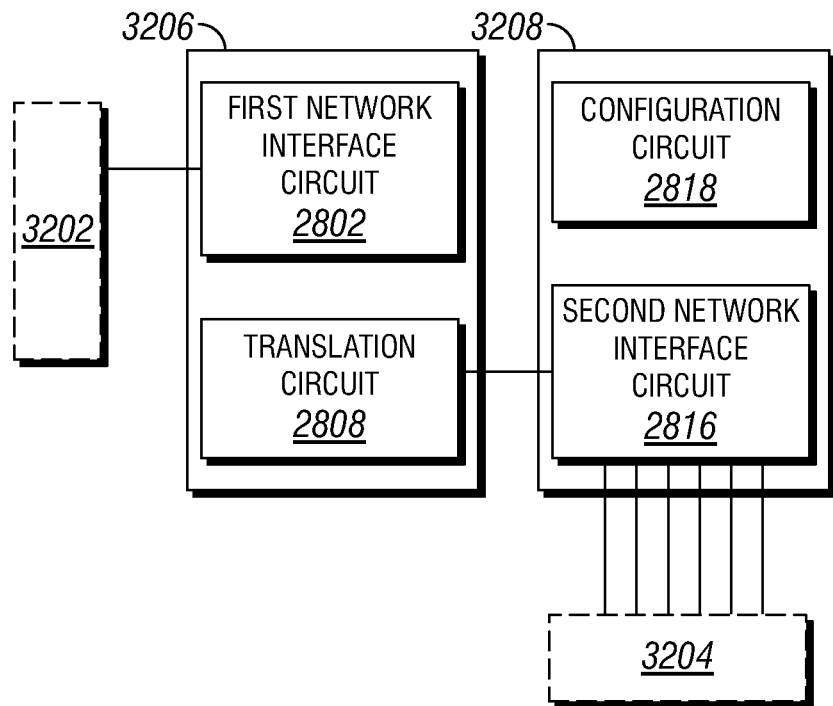
FIG. 32 is a schematic diagram depicting example network regulating components.
Figure 33:
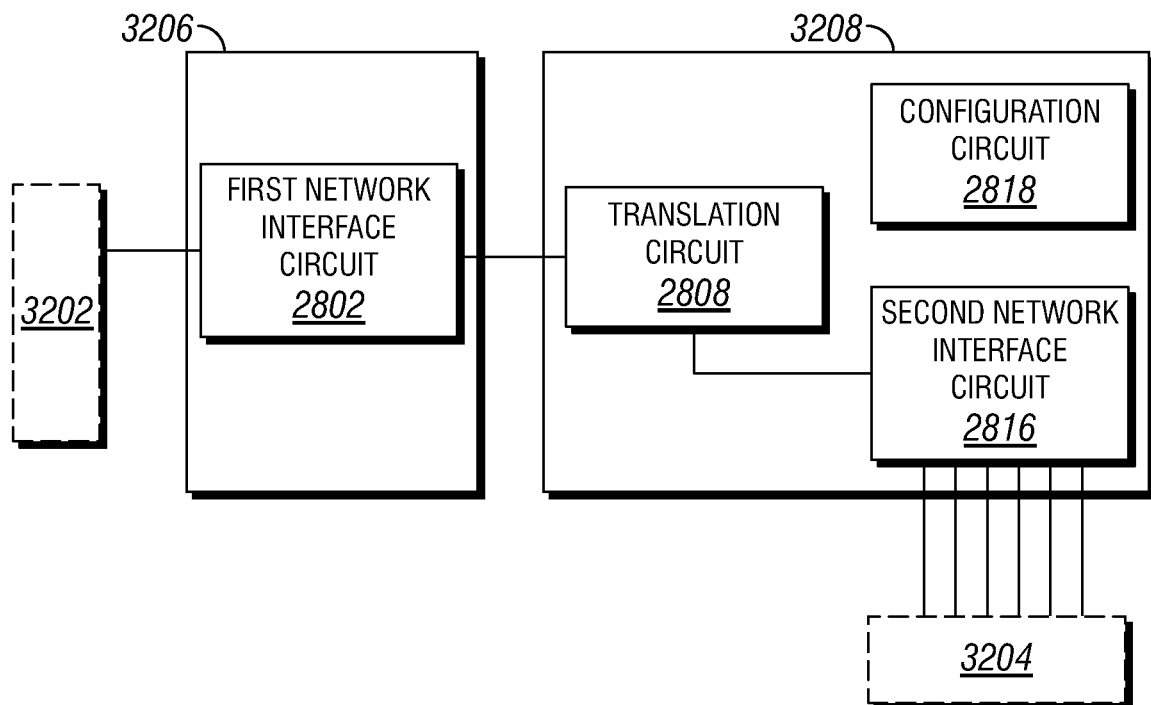
FIG. 33 is a schematic diagram depicting example network regulating components.
Figure 34:
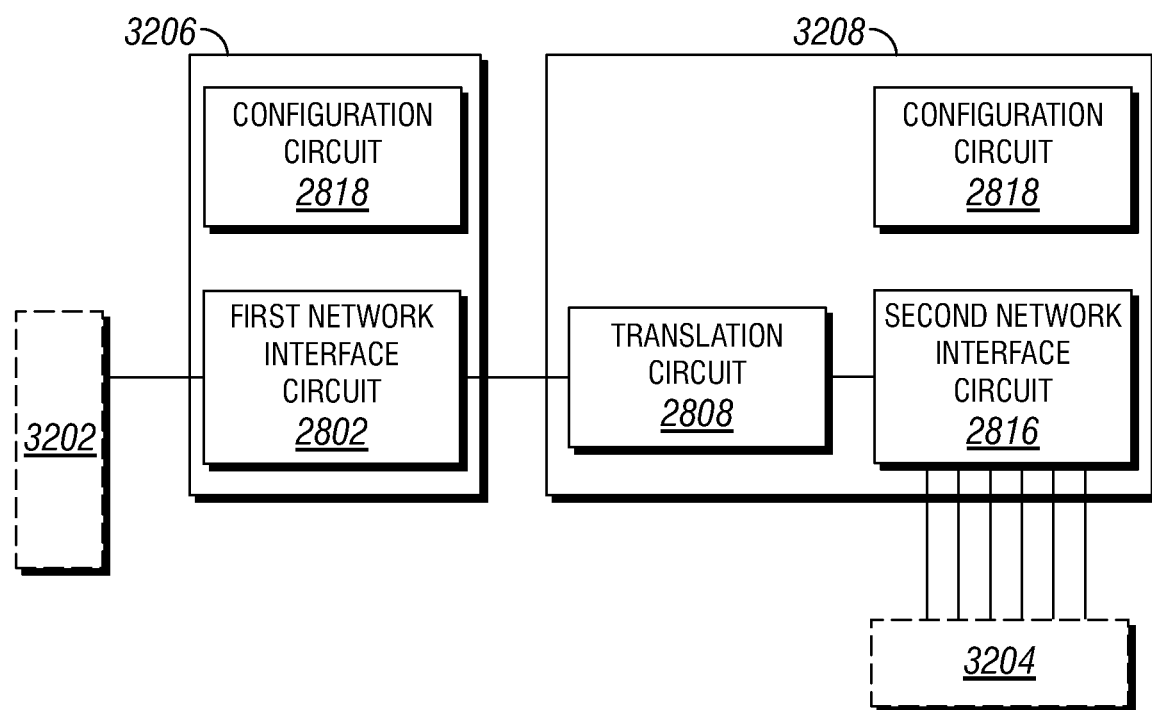
FIG. 34 is a schematic diagram depicting example network regulating components.

Referencing FIGS. 32-34, example arrangements of apparatuses for regulating communications between networks on a mobile application having mixed networks are depicted for illustration.

Referencing FIG. 32, an example arrangement includes a CEG 3206 (e.g., a configurable edge gateway, and/or a CAN gateway) having a first network interface circuit 2802 that communicates with a CAN network 3202, and a translation circuit 2808 that passes selected messages between the CAN network 3202 and a port of a second network interface circuit 2816. The example arrangement includes a CES 3208 that includes the second network interface circuit 2816 that communicates with an ethernet network 3204, and includes a configuration circuit 2818 that performs operations to regulate communications between the networks 3202, 3204. The arrangement of FIG. 32 may form all or a portion of a CND as set forth throughout the present disclosure, and/or may perform operations to regulate communications between the networks 3202, 3204 responsive to CND commands, where the CND is distributed elsewhere in the system.

Referencing FIG. 33, an example arrangement is depicted that may form all or a portion of a CND as set forth throughout the present disclosure, and/or may perform operations to regulate communications between the networks 3202, 3204 responsive to CND commands, where the CND is distributed elsewhere in the system. The example of FIG. 33 is distinct from the example of FIG. 32, where the translation circuit 2808 is positioned with the CES 3208, and receives CAN messages directly from the first network interface circuit 2802.

Referencing FIG. 34, an example arrangement is depicted that may form all or a portion of a CND as set forth throughout the present disclosure, and/or may perform operations to regulate communications between the networks 3202, 3204 responsive to CND commands, where the CND is distributed elsewhere in the system. The example of FIG. 34 is distinct from the example of FIG. 33, where the configuration circuit 2818 is distributed between the CES 3208 and the CEG 3206. In the example of FIG. 34, one of the configuration circuits 2818 may be a primary, passing configuration information to the other one of the configuration circuits 2818. In certain embodiments, each configuration circuit 2818 may operate independently, for example receiving configuration information from a configuration file, through communications with a CND, or the like. The examples of FIGS. 32-34 are non-limiting illustrations to depict certain aspects and arrangements of the present disclosure.

Figure 35:
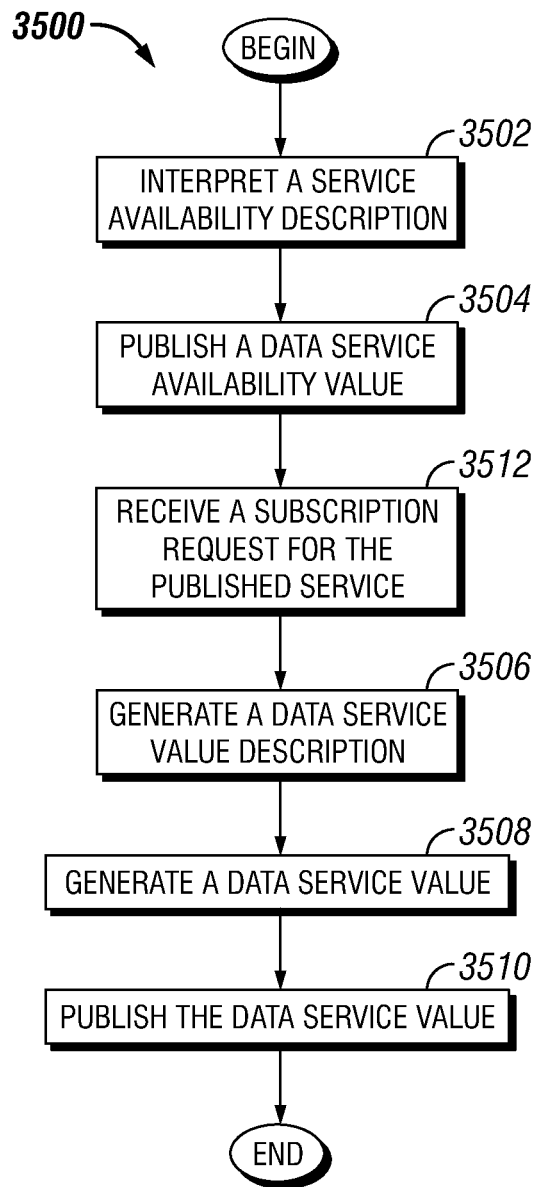
FIG. 35 is a schematic flow diagram of a procedure for publishing a data service.

Referencing FIG. 35, an example procedure 3500 to provide a service oriented architecture for a vehicle having a mixed network is schematically depicted. The example procedure 3500 includes an operation 3502 to interpret a service availability description, the service availability description comprising available data values from a first end point device on one of a first network or a second network of a vehicle, an operation 3504 to publish a data service availability value in response to the service availability description, an operation 3506 to generate a data service value description in response to a subscription request to the data service availability value, an operation 3508 to generate a data service value in response to the data service value description and data values from the first end point device, and an operation 3510 to publish the data service value in response to the data service value description. An example operation 3510 to publish the data service value includes providing the data service value to second end point device, for example an end point device on another network from the first end point device. An example operation 3510 further includes publishing the data service value by providing network communications to subscribing end point devices, each of the subscribing end point devices on one of the first network or the second network, and wherein the network communications comprise the generated data service value. An example data service availability value includes a name for a service, a list of data parameters provided by the service, a list of available commands provided by the service, etc. (e.g., from providing devices to a CND), and the data service value description includes a name for a service, a list of data parameters provided by the service, a list of available commands provided by the service, etc. (e.g., from the CND to potential subscribing devices), where the data service value description may match the data service availability value, or may be configured differently from the data service availability value (e.g., simplified, enhanced, standardized, etc.). An example data service value includes data values corresponding to a data service availability value.

In certain embodiments, the procedure 3500 further includes an operation 3512 to receive subscription requests from end point devices on both the first network and the second network. An example operation 3512 includes receiving a subscription request from a device external to the vehicle, such as a service device, web application, cloud-based application, and/or third party application, where operations 3508 and/or 3510 are performed in response to operation 3512 (e.g., only generating the data service value and/or publishing the data service value where a subscribing device is available for the service). An example procedure 3500 includes the service availability description further including an authorization description, where operation 3504 includes limiting publication of the data service availability value in response to the authorization description (e.g., where unauthorized devices cannot see the data service). An example operation 3504 includes limiting publication of the data service availability value in response to an identifier of the subscription requestor (e.g., an end point, flow, vehicle function, application, service group, and/or an entity associated with any of these).

An example procedure 3500 includes the service availability description further includes an authorization description, where operation 3510 includes limiting publication of the data service value in response to the authorization description (e.g., not allowing a subscription to the published service). An example operation 3510 includes limiting publication of the data service value in response to an identifier of the subscription requestor (e.g., an end point, flow, vehicle function, application, service group, and/or an entity associated with any of these).

An example operation 3502 includes interpreting a service availability value, and updating the service availability description in response to the service availability value. For example, the service availability value may be updated by a providing device (e.g., an end point, flow, vehicle function, application, service group, external device, etc.) and/or may be updated by a change in the policy adding a service to the available services, and/or removing a service from the available services. An example operation 3502 further includes limiting the updating of the service availability description in response to the authorization description (e.g., verifying an authorization of the updating device before updating the service availability description), and/or in response to an identifier of the updating device.

Figure 36:
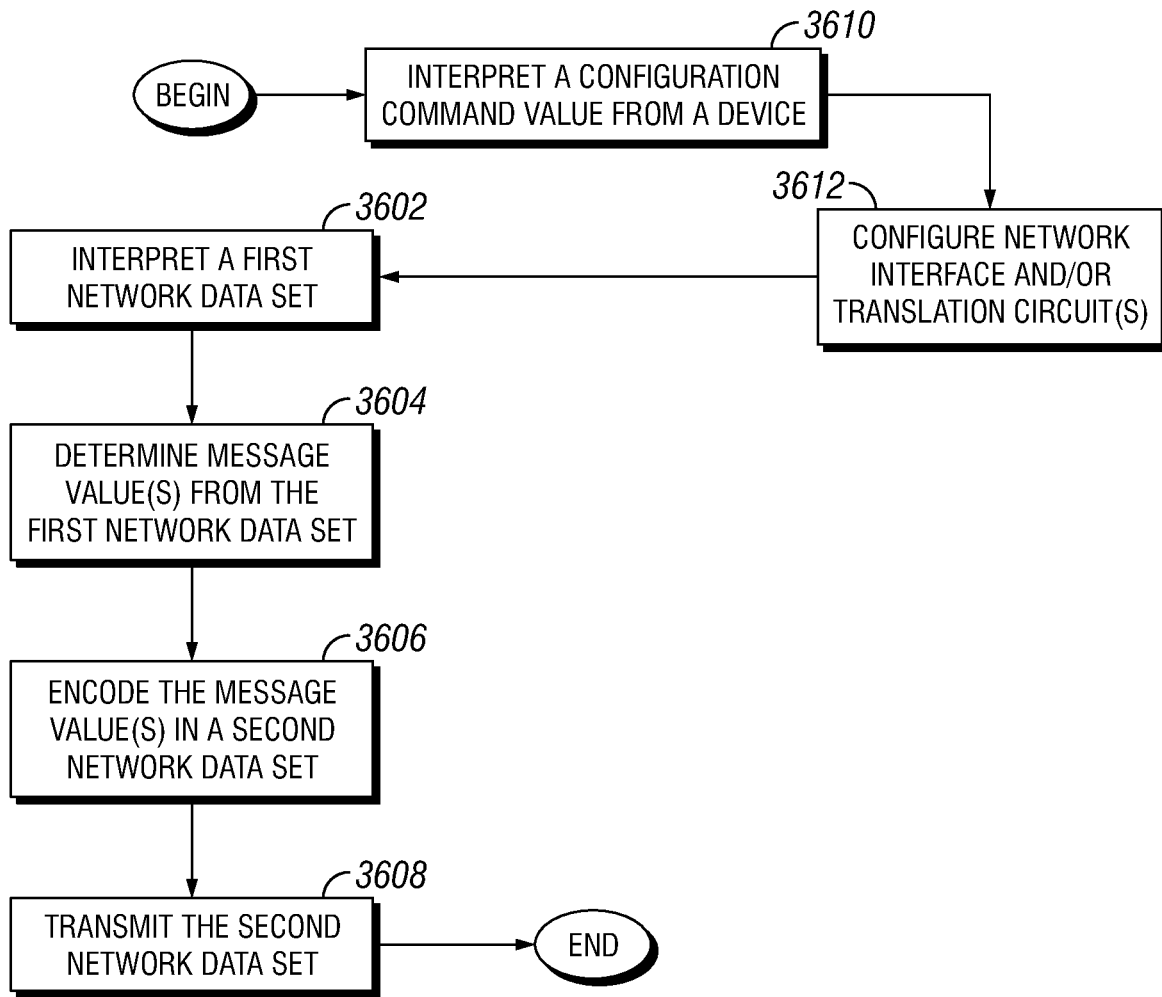
FIG. 36 is a schematic flow diagram of a procedure for encoding a first network data set into a second network data set.

Referencing FIG. 36, an example procedure 3600 to provide messages between networks for a vehicle having a mixed network is schematically depicted. The example procedure 3600 includes an operation 3602 to interpret a first network data set having a first network format, an operation 3604 to determine a message value from the first network data set in response to operation 3602, an operation 3606 to encode the message value in a second network data set having a second network format, and an operation 3608 to transmit the second network data set (e.g., onto the second network). An example procedure 3600 includes the networks having vehicle data formats, where the vehicle data formats are different formats (e.g., CAN, MOST, LIN, FlexRay, TTP, LVDS, AVB, and/or electrical signal formats). An example first network format is a CAN based format, and an example second network format is an ethernet based format. An example procedure 3600 further includes an operation 3610 to interpret a configuration command value from a device external to a vehicle (e.g., via a policy update provided by the external device), the vehicle including a first network interface circuit that interprets the first network data set, a translation circuit that determines the message value from the first network data set and encodes the message value in the second data set, and a second network interface circuit that transmits the second network data set, and an operation 3612 to configure, based at least in part on the configuration command value, the first network interface circuit, the second network interface circuit, and/or the translation circuit, e.g., such that operations 3602, 3604, 3606, 3608 are performed according to the configuration command value.

An example operation 3606 includes encapsulating the message value (e.g., a payload), encapsulating entire messages (e.g., a portion or all of the frames of the message(s)), processing the message value, and/or processing a portion or all of the frames of the message(s). Example operations 3606 include one or more of: configuring an encapsulation scheme for message(s), configuring an address description for message(s) (e.g., translating addresses according to a target device to receive the data on a separate network), and/or configuring a sample rate (e.g., performing an up-sampling and/or down-sampling operation on the first network data set).

Figure 37:
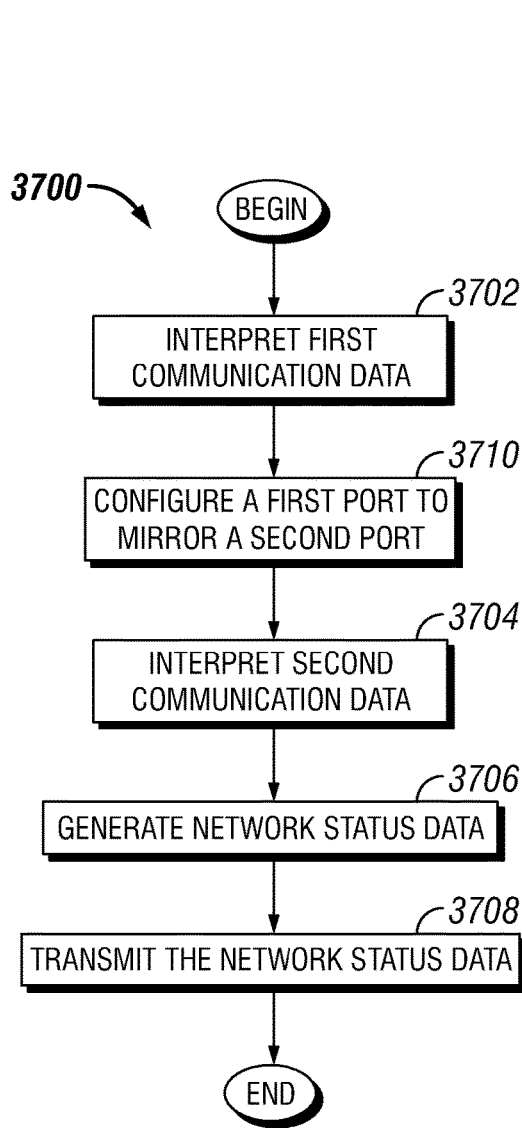
FIG. 37 is a schematic flow diagram of a procedure for providing network status data.

Referencing FIG. 37, an example procedure 3700 to configure a CND for monitoring a network of a vehicle having a mixed network is schematically depicted. The example procedure 3700 includes an operation 3702 to interpret first communication data of a first network onboard a vehicle, an operation 3704 to interpret second communication data of a second network onboard a vehicle, the second network of a different type than the first network, an operation 3706 to generate network status data by monitoring the first and second communication data, and an operation 3708 to transmit the network status data (e.g., storing the data, communicating the data to an external device, service tool, cloud server, etc.). An example procedure 3700 further includes an operation 3710 to configure a first port (e.g., a port on a network of the vehicle) to mirror a second port (e.g., another port on the network of the vehicle), where the first port provides the first communication data, for example to provide the first communication data as available messages on the second network, and/or to provide the second port as a monitoring port for the first communication data. An example operation 3710 includes interpreting a port assignment value (e.g., from a policy, configuration file, determined according to requested data and providing end points for the requested data, and/or determined according to a port corresponding to a service tool, monitoring device, or the like) that identifies a selected port, where the operation 3704 includes identifying portions of the second communication data corresponding to an identified device (e.g., an end point, port, flow, etc. to be monitored) and operation 3708 includes transmitting the identified portions of the second communications data via the selected port.

An example operation 3706 further includes modifying the network status data. Example operations to modify the network status data include modifying the network status data in response to a selection command value, and including data in the network status data that corresponds to at least one device, application, vehicle function, flow, service group, network, protocol, and/or system identified by the data selection command value. Example and non-limiting protocols include CAN network and/or OBD protocols.

Figure 38:
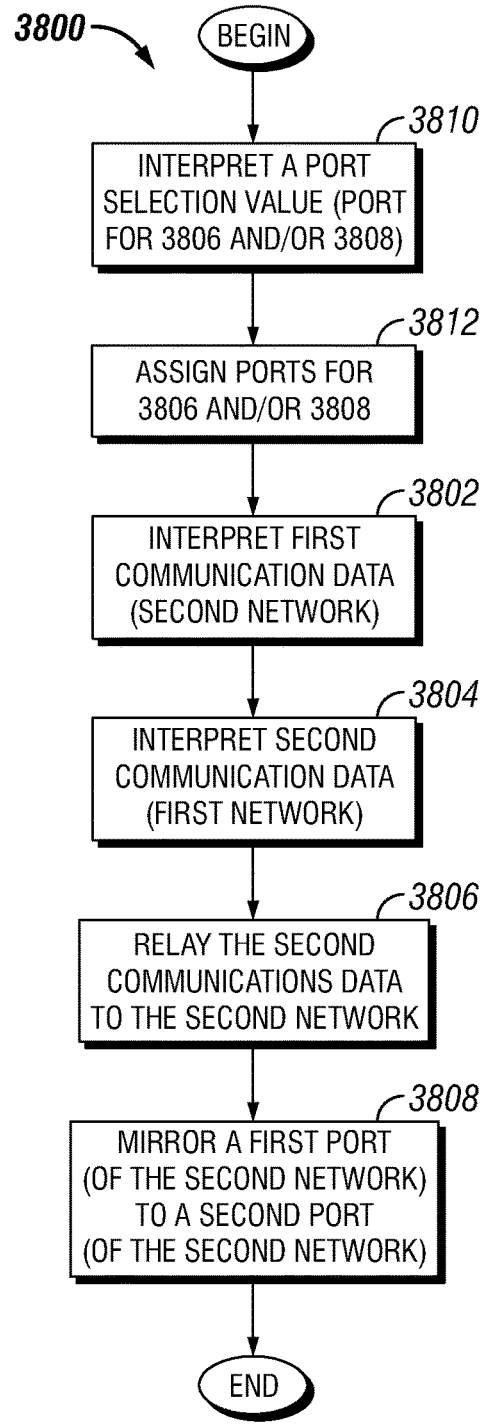
FIG. 38 is a schematic flow diagram of a procedure for mirroring a port.

Referencing FIG. 38, an example procedure 3800 to mirror ports using a CND for a vehicle having a mixed network is schematically depicted. The example procedure 3800 includes an operation 3802 to interpret first communications data of a first network at a number of ports of a CND, an operation 3804 to interpret second communications data of a second network (of a different type), an operation 3806 to relay the second communications data to the first network using at least one of the number of ports (e.g., from a CEG to a CES), and an operation 3808 to minor a first one of the ports to a second one of the ports. An example procedure 3800 further includes an operation 3810 to interpret a port selection command value (e.g., the receiving port and/or the sending port of the mirrored communications data) and an operation 3812 to assign the first and/or second one of the ports in response to the port selection command value. An example operation 3810 includes a port assignment command value that identifies an assigned port, identifies a device on the second network, and where operation 3806 and/or operation 3808 includes transmitting identified portions of the second communications data via the assigned port (e.g., to the second network, and/or to the mirrored port).

Figure 39:
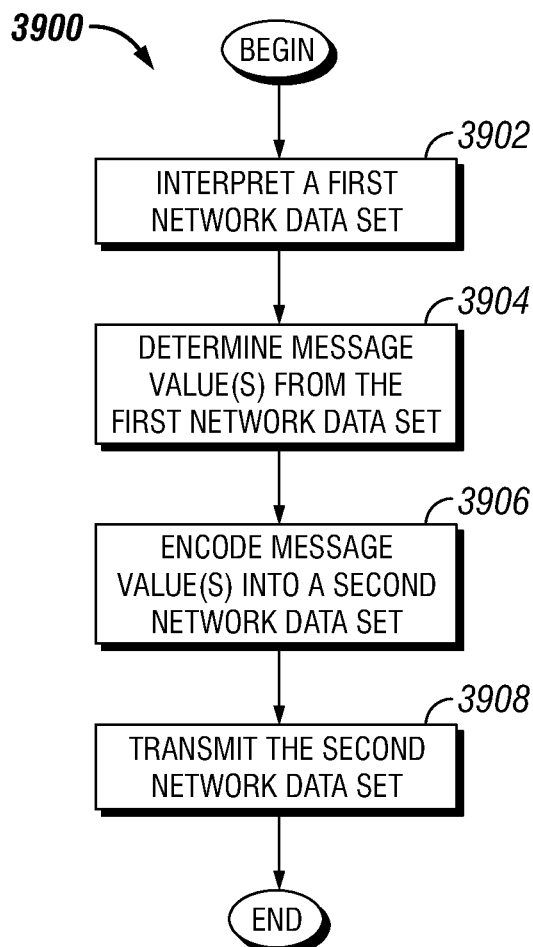
FIG. 39 is a schematic flow diagram of a procedure for encoding a first network data set.

Referencing FIG. 39, an example procedure 3900 to configure a CND for a vehicle having a mixed network is schematically depicted. The example procedure 3900 includes an operation 3902 to interpret, via a first interface circuit of a converged network device (CND), a first network data set having a first network format, an operation 3904 to determine, via a translation circuit of the CND, a message value from the first network data set in response to interpreting the first network data set, an operation 3906 to encode, via the translation circuit, the message value in a second network data set having a second network format different from the first network format, and an operation 3908 to transmit, via a second interface circuit of the CND, the second network data set. An example procedure 3900 further includes an operation 3910 to interpret a configuration command value, and an operation 3912 to modify the CND in response to the configuration command value.

Example operations 3912 include interpreting a configuration command value, and modifying the CND in response to the configuration command value. Example operations to modify the CND include selectively configuring which of one or more portions of the first interface circuit, the translation circuit, and/or the second interface circuit are defined at least in part by the first device and/or the second device (e.g., shifting translation and/or interface responsibilities between different network interface circuits, and/or between a CEG and/or a CES). An example operation 3912 includes generating the configuration command value external to the vehicle (e.g., from an external device, and/or through a policy update), and transmitting the configuration command value to the vehicle (and/or to the CND).

Figure 40:
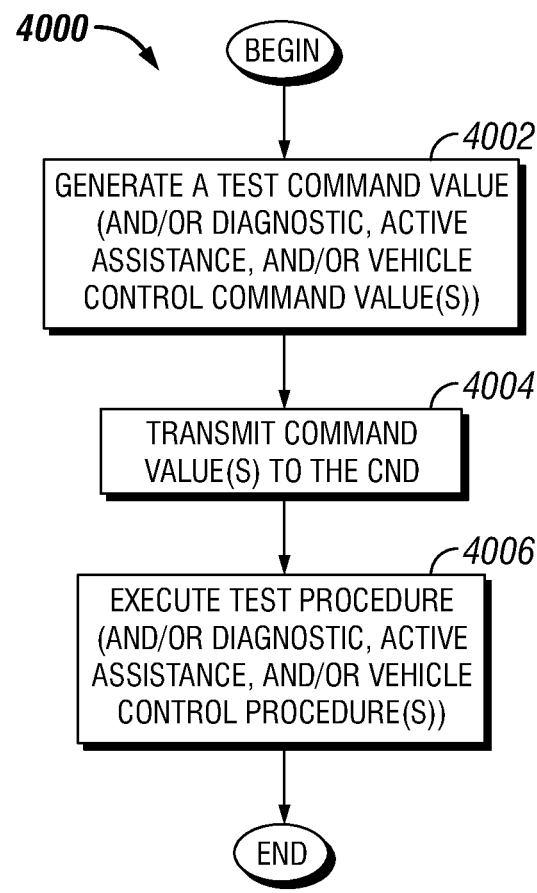
FIG. 40 is a schematic flow diagram of a procedure for executing an active test procedure.

Referencing FIG. 40, an example procedure 4000 to perform a test operation, diagnostic operation, and/or vehicle control operation is schematically depicted, including operations to configure a CND to perform the operations. The example procedure 4000 may be performed in addition to operations for procedure 3900, and/or separately in whole or part. The example procedure 4000 includes an operation 4002 to generate a test command value external to the vehicle, an operation 4004 to transmit the test command value to the CND, and an operation 4006 to execute a test procedure involving a device (e.g., one of the first or second devices of procedure 3900, and/or a third device on the first or second network). The example procedure 4000 may be performed, additionally or alternatively, utilizing a diagnostic command value, an active assistance command value, and/or a vehicle control value (e.g., commanding an actuator, vehicle function, or the like). In certain embodiments, procedure 4000 allows for remote configuration of the CND, and/or operation of tests, diagnostics, vehicle control functions, or the like, without requiring knowledge from the external device about the network topology, end point locations, and/or end point local addresses of devices on the vehicle.

Figure 41:
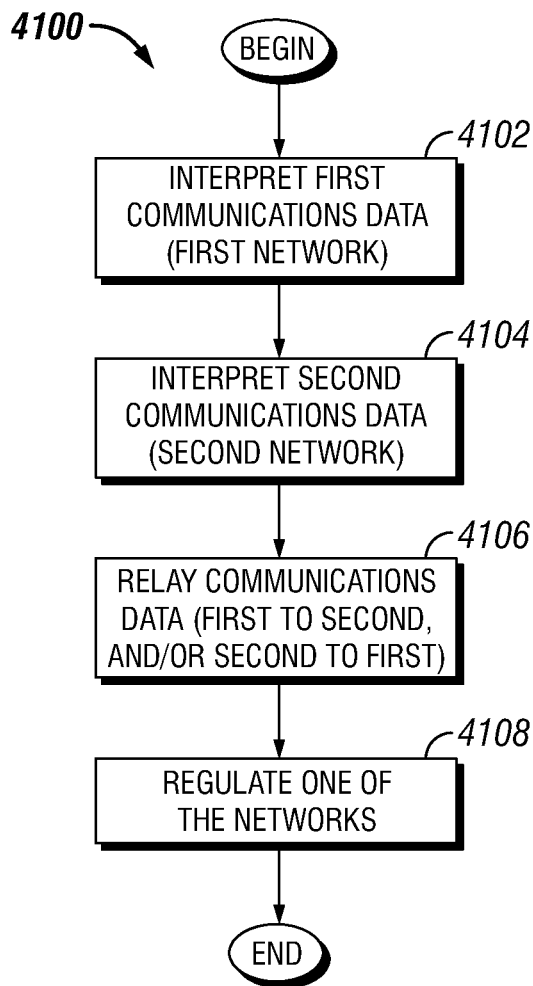
FIG. 41 is a schematic flow diagram of a procedure for regulating a network of a vehicle.

Referencing FIG. 41, an example procedure 4100 to regulate a network of a vehicle having a mixed network is schematically depicted. The example procedure 4100 includes an operation 4102 to interpret first communications data of a first network of the vehicle, an operation 4104 to interpret second communications data of a second network of the vehicle, an operation 4106 to relay the first communications data to the second network (and/or vice versa), and an operation 4108 to regulate the second network. Example operations 4108 include restricting the relaying of the first communications data (e.g., limiting a rate, disabling and/or pausing communications, restricting devices that can send and/or receive relayed data, etc.). Example operations 4108 are performed in response to a data quantity per unit of time, per operating event (e.g., per trip, during certain operating conditions, etc.), based on a saturation rate of the first network and/or second network, and/or based on maximum bandwidth of the first network and/or second network (e.g., keeping to a total bandwidth limit, limiting relayed communications to a selected fraction of available bandwidth, etc.). Example operations 4108 include prioritizing portions of the first communications data and/or the second communications data for the relaying, according to any prioritizing operations and/or grouping (e.g., end points, flows, applications, vehicle functions, service groups, etc.) set forth throughout the present disclosure. Example operation 4108 include up-sampling, down-sampling, encapsulating, and/or processing relayed messages and/or portions thereof (e.g., payloads, selected messages, frame portions, metadata, etc.).

Figure 42:
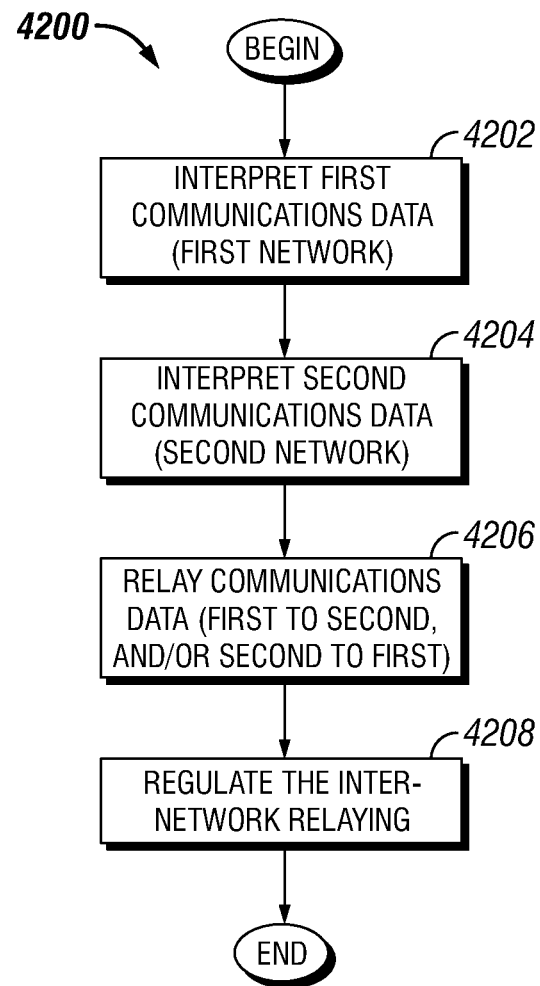
FIG. 42 is a schematic flow diagram of a procedure for regulating inter-network communications of a vehicle.

Referencing FIG. 42, an example procedure 4200 to regulate inter-network communications of a vehicle having a mixed network is schematically depicted. The example procedure 4200 includes an operation 4202 to interpret first communications data of a first network onboard a vehicle, an operation 4204 to interpret second communications data of a second network onboard the vehicle, an operation 4206 to relay the first communications data to the second network (and/or vice versa), and an operation 4208 to regulate the relaying of the first communications data and/or the second communications data. Operation 4208 includes any regulating operations described throughout the present disclosure, and may be performed in response to the first network, second network, a relaying device (e.g., a CEG, a CES, and/or a network interface circuit), a memory storage (e.g., a buffering memory and/or a short term memory storage for network communications), including characteristics of these, operating conditions of these and/or the vehicle, and/or off-nominal conditions present for any of these and/or for the vehicle.

Figure 43:
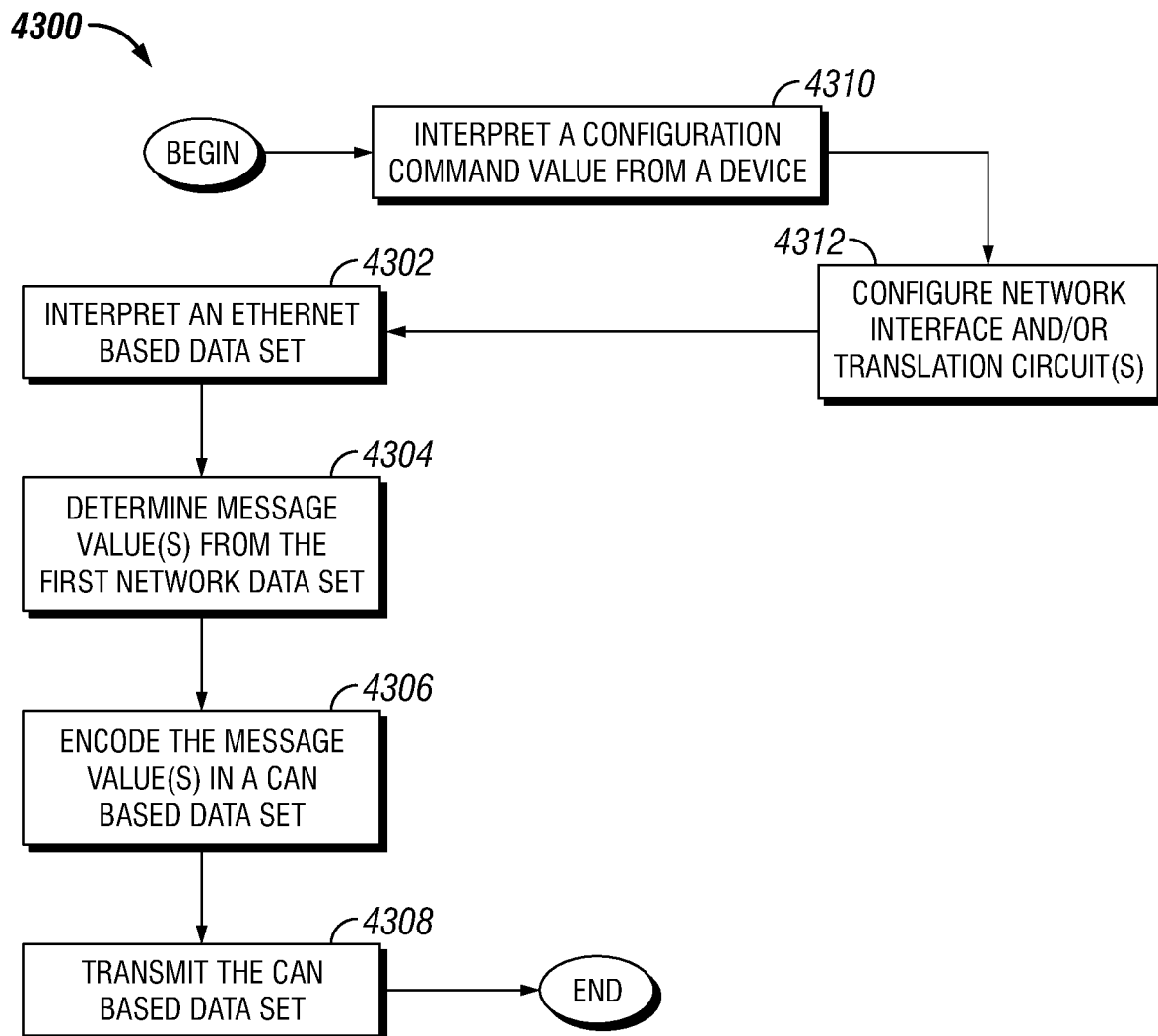
FIG. 43 is a schematic flow diagram of a procedure for encoding an ethernet based data set.

Referencing FIG. 43, an example procedure 4300 to support CAN status determination using ethernet based monitoring is schematically depicted. The example procedure 4300 includes an operation 4302 to interpret an ethernet based data set via one or more physical ports of a first interface circuit of an ethernet switch (e.g., forming a CES) disposed on a vehicle, an operation 4304 to determine a message value from the ethernet data set using a translation circuit (e.g., on the ethernet switch and/or on a CAN gateway and/or CEG), an operation 4306 to encode message(s) from the ethernet based data set into messages for a CAN based data set. Operations 4304, 4306 are described going from the ethernet based data set to the CAN based data set, but operations may additionally or alternatively go from the CAN based data set to the ethernet based data set. The example procedure 4300 further includes an operation 4308 to transmit the CAN data set (e.g., thereby sending an ethernet message to a CAN based device, and/or sending a CAN message to an ethernet device) using a second interface circuit. An example procedure 4300 further includes an operation 4310 to interpret a configuration command value, and an operation 4312 to modify the translation circuit in response to the configuration command value (e.g., changing message processing, addressing, encapsulation characteristics, up-sampling values, down-sampling values, maximum data rates, etc.). An example operation 4310 includes receiving the configuration command value from an external device (e.g., as a request, message, policy update, etc.). An example operation 4312 includes providing the configuration command value to an ethernet switch, CEG, configurable CAN gateway, or the like. The example procedure 4300 may be utilized to perform testing, active diagnostics, active assistance, and/or vehicle control, where devices across a mixed network are utilized to perform the operations. Example operations may utilize any end point, vehicle function, application, flow, service group, or the like of the vehicle. Example operation may utilize a system, and/or a component related to a system, such as a prime mover of the vehicle, an engine of the vehicle, a driveline of the vehicle, a transmission of the vehicle, a braking system of the vehicle, a fuel system of the vehicle, and/or an electrical system of the vehicle.

Figure 44:
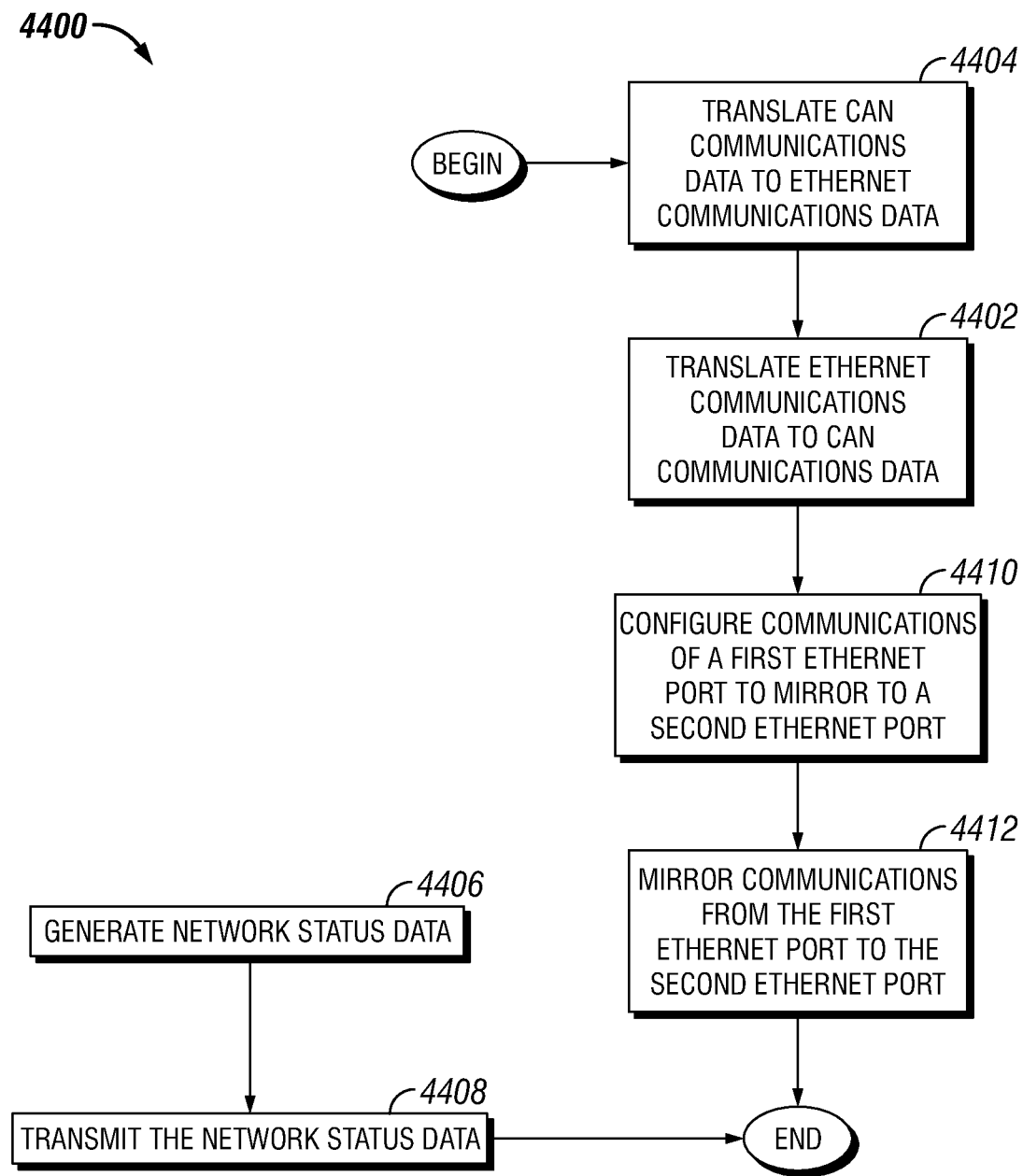
FIG. 44 is a schematic flow diagram of a procedure for providing network status data.

Referencing FIG. 44, an example procedure 4400 to provide ethernet monitoring on a vehicle having a mixed network is schematically depicted. The example procedure 4400 includes an operation 4402 to translate ethernet communications data into CAN communications data, an operation 4404 to translate CAN communications data into ethernet communications data, and an operation 4406 to generate network status data by monitoring the translated CAN and ethernet communications data. The procedure 4400 further includes an operation 4408 to transmit the network status data—for example by storing the data, communicating the data to an external device, and/or transmitting the data to a service tool, web application, cloud server, third party application, etc.

An example procedure 4400 further includes an operation 4410 to configure a first ethernet port interpreting the first ethernet data, and an operation 4412 to mirror communications of the first ethernet port to a second ethernet port. In certain embodiments, the first ethernet port may be a port whereby CAN communications data (e.g., from operation 4404) is provided to the ethernet network. In certain embodiments, operation 4408 to transmit the network status data includes operation 4412 to mirror the communications of the first ethernet port to the second ethernet port. Additionally or alternatively, the operation 4406 to generate the network status data is performed on at least a portion of the data provided at operation 4412, and operation 4406 to generate the network status data may be performed on-vehicle, off-vehicle, and/or a combination thereof.

Figure 45:
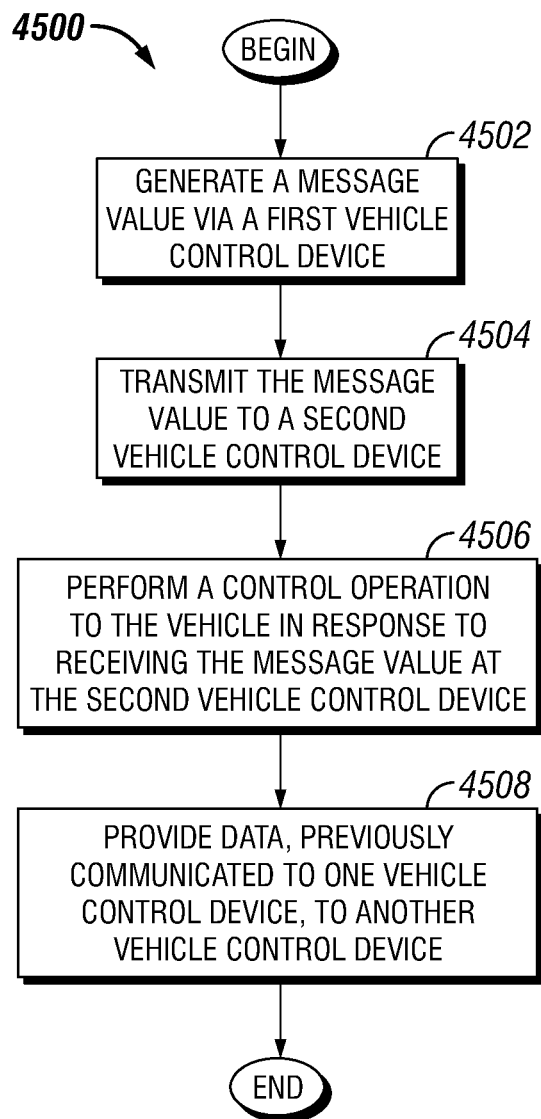
FIG. 45 is a schematic flow diagram of a procedure for performing a control operation.

Referencing FIG. 45, an example procedure 4500 to operate a mixed network system on a vehicle is schematically depicted. The example procedure 4500 includes an operation 4502 to generate a message value via a first vehicle control device on a first network disposed onboard a vehicle, an operation 4504 to transmit the message value to a second vehicle control device on a second network disposed onboard the vehicle, and an operation 4506 to perform a control operation to the vehicle (e.g., moving a sensor and/or actuator, performing a vehicle function, and/or collecting specified data) in response to receiving the message value at the second vehicle control device. Example and non-limiting vehicle control device(s) include any sensor, actuator, and/or controller onboard the vehicle. Example and non-limiting vehicle control device(s) include a system, and/or a component related to a system, such as a prime mover of the vehicle, an engine of the vehicle, a driveline of the vehicle, a transmission of the vehicle, a braking system of the vehicle, a fuel system of the vehicle, and/or an electrical system of the vehicle. In certain embodiments, the first vehicle control device and/or second vehicle control device may be capable to perform, in whole or part, one or more operations of the other one of the vehicle control devices. In certain embodiments, operation 4502 includes generating a message to command one of the vehicle control devices to take over, in whole or part, one or more operations of the other one of the vehicle control devices. In certain embodiments, the vehicle control devices are positioned on networks of different types. In certain embodiments, the procedure 4500 includes an operation 4508 to provide data, previously communicated to one of the vehicle control devices, to the other one of the vehicle control devices. Operation 4508 may be performed in addition to the previous communications (e.g., both vehicle control devices receive the data), and/or as a replacement to the previous communications (e.g., in response to a failure of the previous communications, and/or ceasing the previous communications when operations 4508 are commenced). In certain embodiments, operation 4508 includes providing alternate data (e.g., data for a different executable operation of the replacement control device, which is nevertheless a substitute in whole or part of the original control device), data from a different source (e.g., from a different end point than a source of the previous communications), and/or data processed distinctly (e.g., having a different resolution, communication rate, units, etc.) from the previous communications. In certain embodiments, operations 4508, including vehicle controller substitutions and/or communication changes, are performed in response to requests from the control devices (e.g., separate data requests are sent from the control devices in response to operational changes) and/or according to a configuration file and/or policy.

An example procedure 4500 includes operation 4504 to transmit the message value over one or more intermediate networks (e.g., from a CAN network on the first network zone to a CAN network on a third network zone, tunneling through an ethernet network on a second network zone). In certain embodiments, the intermediate network may be a distinct type of network relative to the first network and/or the second network. Example and non-limiting operations 4506 include one or more of: acquiring data from a component of the vehicle; actuating a component of the vehicle; and/or controlling another vehicle control device. Example operations 4506 may utilize any end point, vehicle function, application, flow, service group, or the like of the vehicle. Example operations 4506 may utilize a system, and/or a component related to a system, such as a prime mover of the vehicle, an engine of the vehicle, a driveline of the vehicle, a transmission of the vehicle, a braking system of the vehicle, a fuel system of the vehicle, and/or an electrical system of the vehicle. Example operations 4506 may utilize a system, and/or a component related to a system, such as an infotainment system of the vehicle, an environmental system of the vehicle, a safety system of the vehicle, and/or a security system of the vehicle.

Figure 46:
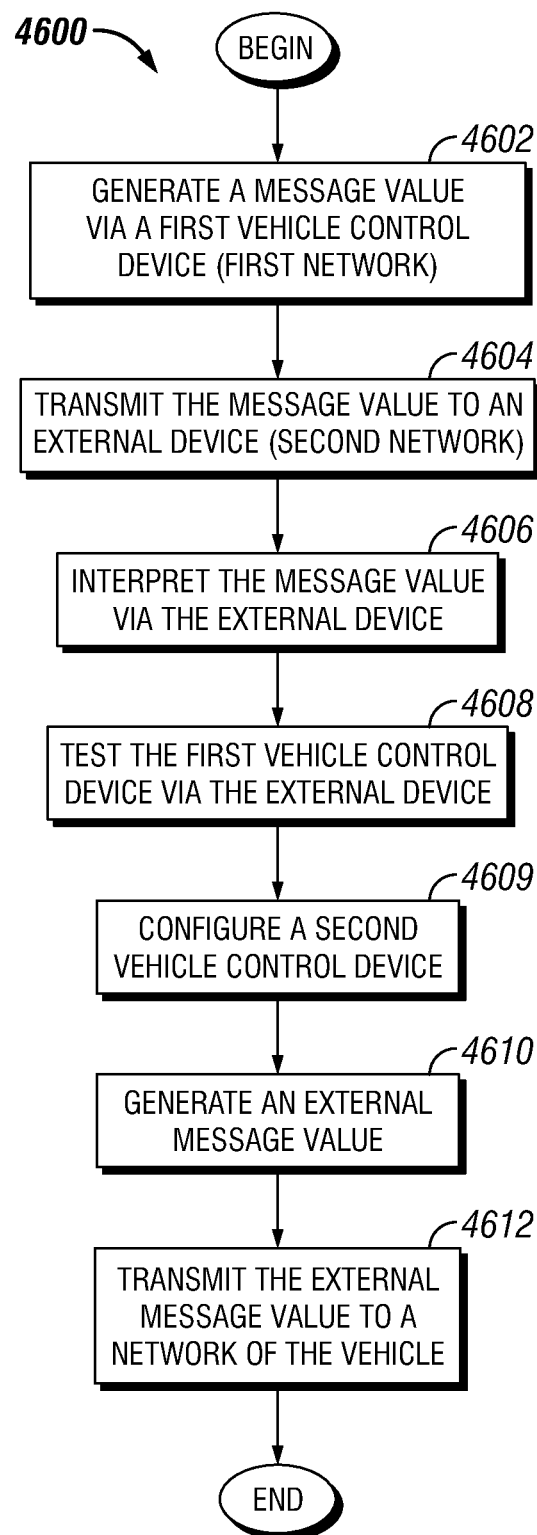
FIG. 46 is a schematic flow diagram of a procedure for providing an eternal message value.

Referencing FIG. 46, an example procedure to 4600 to operate a mixed network system on a vehicle is schematically depicted. The example procedure 4600 includes an operation 4602 to generate a message value via a first vehicle control device on a first network of the vehicle, an operation 4604 to transmit the message value (and/or a processed and/or encapsulated version of the message value) via a second network to an external device at least selectively communicatively coupled to the vehicle, and an operation 4606 to interpret the message value via the external device. The example procedure 4600 includes an operation 4608 to test the first vehicle control device via the external device, and/or to configure the first vehicle control device via the external device (e.g., providing direct commands or requests, updating a policy, and/or updating a configuration file). An example procedure 4600 includes an operation 4609 to configure a second vehicle control device on the second network via the external device, which may be responsive to operation 4604, 4606, and/or 4608.

An example operation 4604 includes translating the message value (e.g., using a CND, CEG, CES, and/or a network interface circuit) from a first format (e.g., for the first network) to a second format (e.g., for the second network). An example operation 4608 includes configuring the CND (and/or a CEG, CES, and/or a network interface circuit) via the external device. The example procedure 4600 may additionally or alternatively include transmitting one or more message values over an intermediate network interposed between the first and second networks (e.g., reference FIGS. 4, 23, 45 and the related descriptions).

An example procedure 4600 includes an operation 4610 to generate an external message value via the external device, and an operation 4612 to transmit the external message value to the first network. Operation 4612 may further include interpreting the external message via a vehicle control device (e.g., which may be the first vehicle control device and/or another vehicle control device(s), such as to determine the external message content, and thereby perform a control operation, data collection operation, active diagnostic operation, active assistance operation, test operation, updating operation for a configuration file and/or policy, etc.). Example operations 4612 may utilize any end point, vehicle function, vehicle controller, application, flow, service group, or the like of the vehicle. Example operations 4612 may utilize a system, and/or a component related to a system, such as a prime mover of the vehicle, an engine of the vehicle, a driveline of the vehicle, a transmission of the vehicle, a braking system of the vehicle, a fuel system of the vehicle, and/or an electrical system of the vehicle. Example operations 4612 may utilize a system, and/or a component related to a system, such as an infotainment system of the vehicle, an environmental system of the vehicle, a safety system of the vehicle, and/or a security system of the vehicle.

Figure 47:
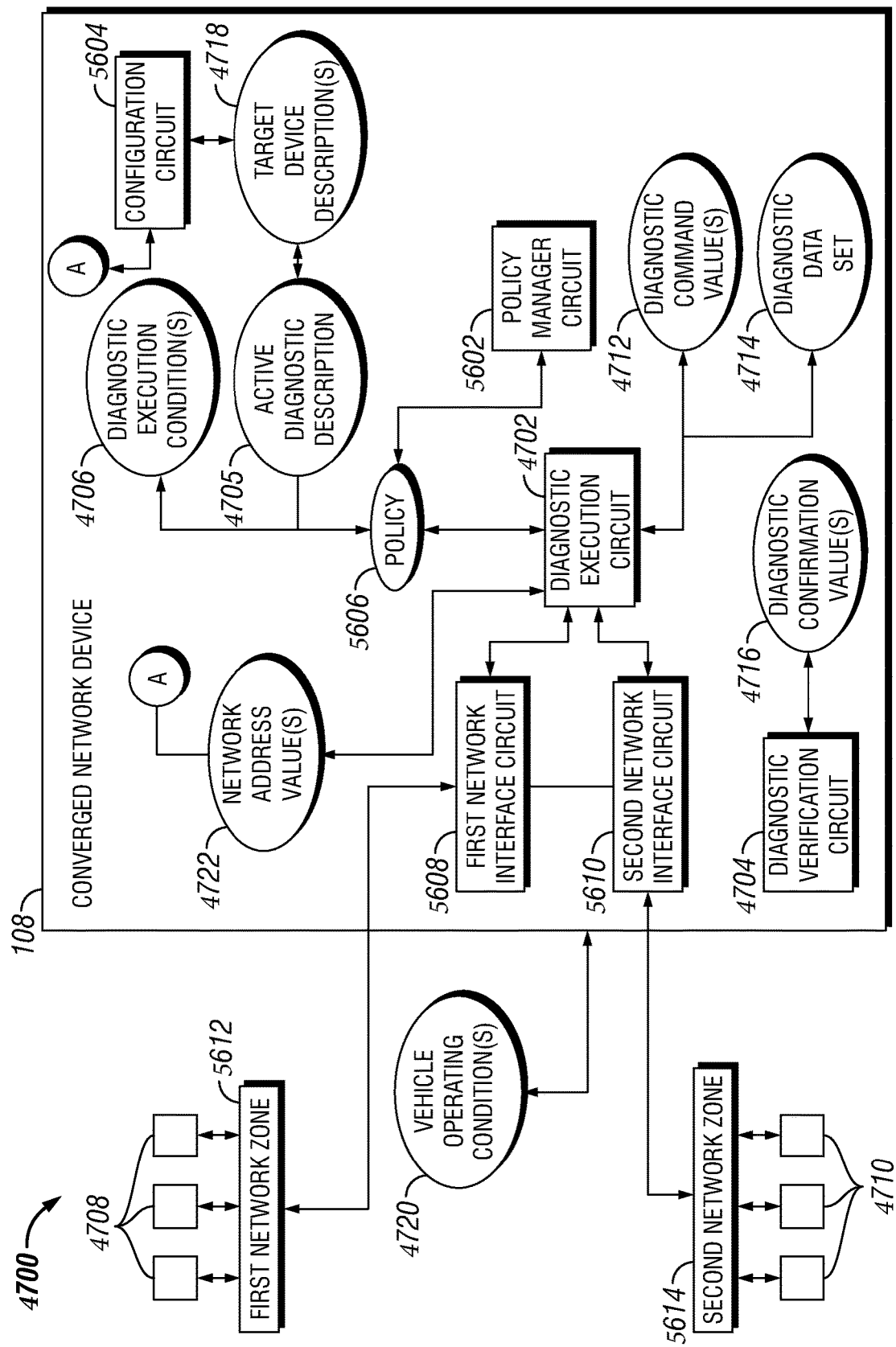
FIG. 47 is a schematic diagram of a CND.

Referencing FIG. 47, an example system 4700 is provided for providing extra-vehicle communication control, consistent with embodiments of the present disclosure. The example system includes a vehicle 102 having a first network zone 5612 and a second network zone 5614, where the second network zone 5614 is of a different type than the first network zone 5612. The example system 4700 includes a CND 108 interposed between the first network zone 5612 and the second network zone 5614. The CND 108 interposed between the network zones 5612, 5614, includes physical interposition (e.g., communications between the network zones 5612, 5614 pass through the CND 108, and/or through a device controlled by the CND 108 such as a CEG, CES, or other network interface circuit) and/or a logical interposition (e.g., where communications between the network zones 5612, 5614 pass through a device controlled by the CND 108, and/or where the CND 108 regulates communications between the network zones 5612, 5614 such as data values passed, configuration of the data values, data rates, up-sampling and/or down-sampling of data, encapsulation operations, frame inclusion and/or processing of passed communications, etc.).

The example system 4700 further includes a policy manager circuit 5602 that interprets a policy 5606 including an active diagnostic description 4705, and a diagnostic execution circuit 4702 that provides a diagnostic command value 4712 to an end point of a network zone 5612, 5614 in response to the active diagnostic description 4705. The example system 4700 includes end points of the first network zone 5612 (end points 4708) and end points of the second network zone 5614 (end points 4710). In the example system 4700, an end point 4708, 4710 includes a device responsive to the diagnostic command value 4712. Example and non-limiting diagnostic command values 4712 include: a command to collect one or more data values; a command to operate an actuator; and/or a command to operate a vehicle function (e.g., provide an engine speed, power level, or higher level function such as executing a regeneration mode, scheduled test operation, etc.). The example system 4700 allows for the execution of an active diagnostic test, requested by an external device, to be successfully performed regardless of the distribution of end points 4708, 4710 throughout networks of the vehicle, including where an end point has moved between networks, and/or where a given diagnostic command value 4712 is utilized to perform active diagnostic tests across a range of vehicles having varying network configurations and distribution of end points 4708, 4710.

Figure 48:
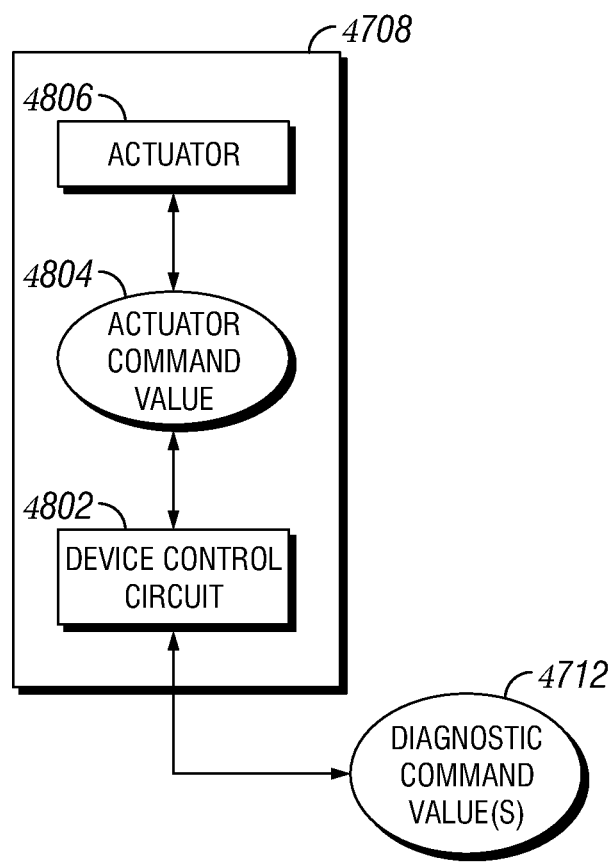
FIG. 48 is a schematic diagram of an end point of a network responsive to an actuator command value.

Referencing FIG. 48, an example end point 4708 includes a device control circuit 4802 that interprets the diagnostic command value 4712, and provides an actuator command value 4804 in response to the diagnostic command value 4712. The example end point 4708 includes, or is associated with, an actuator 4806 responsive to the actuator command value 4804. For example, a diagnostic command value 4712 may include a command such as "lock the driver door", "close an exhaust gas recirculation valve", "raise a motor temperature to 80° C.", etc., allowing for an abstraction between the diagnostic command value 4712 and actuator 4806 responses to achieve the diagnostic command value 4712. Additionally or alternatively, the diagnostic command value 4712 may be associated with a complex operation or series of operations, such as a full test sequence or the like, and accordingly numerous end points 4708, 4710 and/or actuators 4806 throughout the system 4700 may be implicated by a single diagnostic command value 4712.

An example system 4700 further includes the diagnostic execution circuit 4702 determining whether a vehicle operating condition 4720 is consistent with the diagnostic command value 4712 before providing the diagnostic command value 4712 to the end point(s) 4708, 4710. For example, the diagnostic command value 4712 may include a diagnostic test that adjusts torque delivery of a prime mover of the vehicle, and associated vehicle operating conditions 4720 may include parameters such as: ensuring the vehicle is out-of-gear; ensuring the vehicle is not in a motive power mode; and/or ensuring the vehicle is in a selected test mode. In certain embodiments, the vehicle operating conditions 4720 for a given diagnostic command value 4712 may be set forth in the active diagnostic description 4705, allowing for active control of vehicle operating conditions 4720 for test performance (e.g., target temperatures; diagnosing specific conditions such as vehicle launch, altitude operation, or the like) and/or extra-test considerations (e.g., operator or service personnel safety, fuel economy or emissions, impact to network communication rates, processing demand, and/or memory storage, etc.). In certain embodiments, the vehicle operating conditions 4720 for the given diagnostic command value 4712 may be enforced by another flow, application, vehicle function, or the like associated with the vehicle (e.g., torque commands cannot be adjusted separate from operator commands unless specified vehicle conditions 4720 are present, etc.). An example system 4700 includes the policy 5606 including a diagnostic execution condition 4706, where the diagnostic execution circuit 4702 further determines whether the vehicle operating condition(s) 4720 are consistent with the diagnostic command value 4712 in response to the diagnostic execution condition(s) 4706.

An example system 4700 includes the diagnostic execution circuit 4702 further performing a diagnostic data collection operation in response to the active diagnostic description 4705, and storing a diagnostic data set 4714 in response to the diagnostic data collection operation. For example, the active diagnostic description 4705 may include a number of data parameters to be collected, vehicle state conditions to be monitored, and/or parameter threshold values to be determined (e.g., a temperature above a threshold value). The stored diagnostic data set 4714 may include the collected data, vehicle state conditions determined based on the collected data, parameter threshold confirmation values determined based on the collected data, or combinations of these. The collected data may be from end points 4708, 4710 responsive to the diagnostic command values 4712 (e.g., confirmation that actuators have responded to commands, diagnostic data or fault codes associated with responsive actuators, etc.), or from end points 4708, 4710 apart from those responsive to commands (e.g., observation of a temperature, pressure, speed value, state confirmation, etc. that is not associated directly with the actuating end points 4708, 4710).

An example diagnostic execution circuit 4702 performs a processing operation on data collected in the diagnostic data collection operation, and stores the diagnostic data set 4714 in response to the processing operation. For example, the stored diagnostic data set 4714 may include state information, virtual sensor information, negative information (e.g., only storing data associated with operations where a threshold is not met), up-sampled and/or down-sampled values for the data collected, and/or any other processing operations set forth throughout the present disclosure. Example and non-limiting processing operations for the data collected, or portions thereof, include: compressing the data collected; summarizing the data collected; operating a virtual sensor utilizing the data collected; determining a vehicle operating condition parameter in response to the data collected; determining the diagnostic data set in response to a determined vehicle operating parameter; performing an up-sampling operation on the data collected; and/or performing a down-sampling operation on the data collected.

An example diagnostic execution circuit 4702 further communicates the diagnostic data set 4714 to an external device (e.g., 5618) in response to the diagnostic data collection operation. The external device receiving the diagnostic data set 4714 may be the same or a different external device than an external device supplying the active diagnostic description 4705. An example diagnostic execution circuit 4702 further processes the collected data before communicating to the external device, which may include the initial processing to determine the stored diagnostic data set 4714, and/or a further processing operation on the stored diagnostic data set 4714 before communicating to the external device. For example, the diagnostic execution circuit 4702 may store the diagnostic data set 4714, and send a portion of the diagnostic data set 4714 (e.g., selected parameters, active diagnostic outcomes, etc.) to the external device. The example diagnostic execution circuit 4702 then performs selected operations such as: further processing the diagnostic data set 4714 before communicating it to the external device (e.g., to reduce external data communications, in response to selected data for transmission by the external device, etc.); communicates the diagnostic data set 4714 to the external device (e.g., responsive to availability of an external communication such as a WiFi connection, connected external device, or the like; and/or responsive to a request from the external device for all of the diagnostic data set 4714); communicates selected additional portions of the diagnostic data set 4714 (e.g., requested data by the external device); keeps the diagnostic data set 4714 and/or a further processed form of the diagnostic data set 4714 stored for a selected time period; and/or deletes the diagnostic data set 4714 after the diagnostic execution operation (e.g., according to an outcome of the active diagnostic test, and/or according to a request of the external device). It can be seen that operations of system 4700 allow for execution of active diagnostic operations by an external device (e.g., a service tool, service application, cloud-based application, fleet service computing device, and/or third party application) that engages end points on a vehicle across a mixed network, allowing for diagnostic operations that do not require knowledge of the location and/or organization of end points on the vehicle, that can support multiple configurations of a vehicle, and/or can support changing configurations of the vehicle. Additionally or alternatively, operations of system 4700 allow for scheduled transmission of data, including reduction of data transmitted while achieving robust active diagnostic capability, and scheduled consumption of processing, memory, and inter-network communication resources on the vehicle while achieving the robust active diagnostic capability.

An example system 4700 includes a diagnostic verification circuit 4704 that determines a diagnostic confirmation value 4716 based on a response of the actuator to the diagnostic command value 4712 (e.g., confirming whether the actuator performed the commanded function, and/or across a group of actuators whether the vehicle has performed the active diagnostic according to the active diagnostic description 4705). The example diagnostic verification circuit 4704 stores the diagnostic confirmation value 4716 (e.g., as a part of the diagnostic data set 4714) and/or communicates the diagnostic confirmation value 4716 to an external device. In certain embodiments, the diagnostic verification circuit 4704 adjusts storage and/or communication of the diagnostic data set 4714 in response to the diagnostic confirmation value 4716—for example ensuring that the diagnostic data set 4714 is related to a performance of the active diagnostic. In certain embodiments, the diagnostic execution circuit 4702 may store all or a portion of the diagnostic data set 4714 as a rolling buffer of data, saving a selected portion of the diagnostic data set 4714 in response to the diagnostic verification circuit 4704 providing the diagnostic confirmation value 4716 (e.g., where a diagnostic has a timed value or actuator position as a part of the diagnostic execution, allowing the diagnostic to be determined complete when the timer or other accumulating condition is completed).

An example active diagnostic description 4705 includes a target device description 4718 (e.g., a fueling actuator, engine controller, door actuator, mirror position adjustment actuator, etc.) that does not identify which network zone 5612, 5614 that an end point corresponding to the target device description 4718 is positioned on. The example system includes a configuration circuit 5604 that determines a network address value 4722 for the end point in response to the target device description 4718 (e.g., a port number of an ethernet network, a message ID for a CAN network, etc.), and the diagnostic execution circuit 4702 provides the diagnostic command value 4712 to the end point further in response to the network address value 4722. For example, the target device description 4718 may include a standardized description for the end point (e.g., engine speed, ambient temperature, passenger seat occupancy sensor, etc.), and the configuration circuit 5604 may access a configuration table relating the standardized description to the local network address for the intended component. Additionally or alternatively, the target device description 4718 may have a description that matches a baseline product (e.g., a 2020 LX version of a given vehicle), a description that matches an original version of the vehicle (e.g., as the vehicle was configured after manufacture), and/or a description that matches an earlier version of the vehicle (e.g., as the vehicle was configured as of a certain date). In certain embodiments, the configuration table or other information utilized by the configuration circuit 5604 to determine the network address value 4722 may be one or more configuration file(s) maintained by a network interface circuit, a configuration file maintained by a policy manager circuit, a configuration file maintained by the CND, and/or a configuration file maintained as a part of the policy 5606.

An example active diagnostic description 4705 includes a target device description 4718 (e.g., a fueling actuator, engine controller, door actuator, mirror position adjustment actuator, etc.) that identifies the end point is on one network zone (e.g., the first network zone 5612), and the configuration circuit 5604 determines the end point is on another network zone (e.g., the second network zone 5614) in response to the target device description 4718. For example, the configuration circuit 5604 may determine that the target device description 4718 is pointing to the wrong device, or a non-existent device, and/or may further determine that the external device is utilizing a previous, different, and/or standardized configuration file to provide the target device description 4718, where the configuration circuit 5604 utilizes a local configuration file to determine the proper network address value and/or network zone for the end point intended by the target device description 4718. In certain embodiments, the configuration circuit 5604 determines the proper network address value and/or network zone for the end point utilizing other information from the target device description 4718, such as parameter names, intended functions, or the like. Similarly, the configuration circuit 5604 can correct the target device description 4718 indicating an incorrect address other than the wrong network zone, such as an address on a first network zone, where the correct address is another address on the first network zone.

The operations of the configuration circuit 5604 allow for simplification of active diagnostic definition (e.g., external devices do not require system-specific information about end point locations and network distribution); adaptation of diagnostic execution as end points and/or local communicating devices of the vehicle are moved and/or upgraded; and/or allow for a layer of abstraction between external devices and the configuration of the vehicle. The simplification and/or abstraction of the active diagnostic definition from the vehicle network configuration allow for reduced cost of active diagnostic development and roll-out, and increased user base for active diagnostic development (e.g., with enhanced protection of confidential information such as vehicle configuration information and/or data compartmentalization) which can enhance overall diagnostic capability, enhance vehicle operator experience, and increase competition and implied competition for active diagnostic development and implementation.

Figure 49:
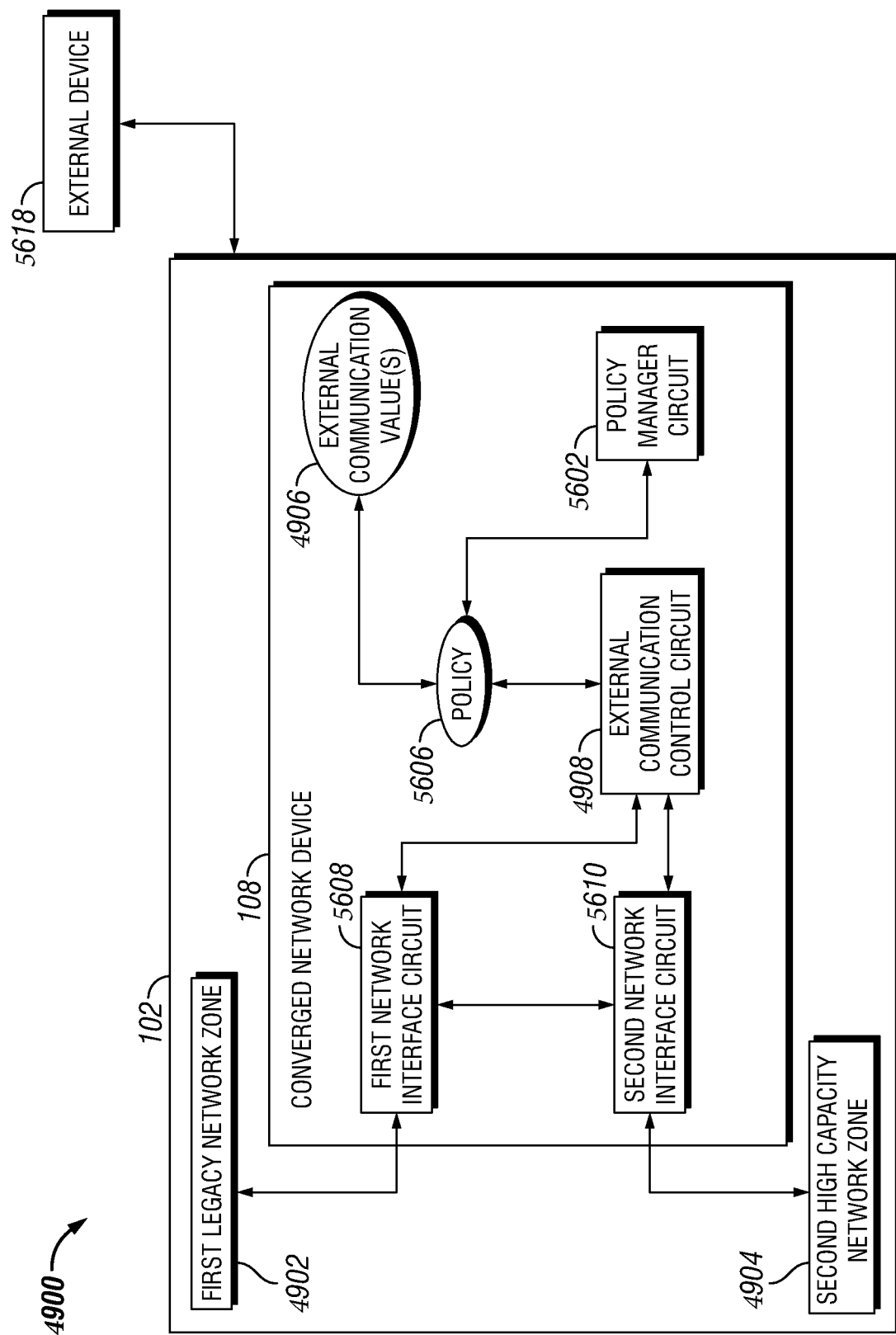
FIG. 49 is a schematic diagram of a system for regulating network communications of a vehicle.

Referencing FIG. 49, an example system 4900 includes a vehicle 102 having a first legacy network zone 4902 and a second high capability network zone 4904. For example, the first legacy network zone 4902 may be a first network type, such as a CAN bus, and the second high capability network zone 4904 may be a second network type, such as an ethernet network. In certain embodiments, the second high capability network zone 4904 may be of the same type as the first legacy network zone 4902, but may be a higher capability version such as a high speed CAN bus, a higher speed ethernet network, or the like. In certain embodiments, a system 4900 such as that depicted in FIG. 49 may be present where a vehicle is migrating to an upgraded network type, such as during a transition over a number of model years of the vehicles, as new components are added to a vehicle that utilize a higher capability network, and the like.

The example system 4900 includes CND 108 interposed between the first legacy network zone 4902 and the second high capability network zone 4904, where the CND 108 includes a policy manager circuit 5602 that interprets a policy 5606 including an external communication value 4906, and an external communication control circuit 4908 that regulates communications between an external device 5618 and end points of the first legacy network zone 4902 and/or end points of the second high capability network zone 4904 in response to the external communication value 4906. For example, external communications between end points of the first legacy network zone 4902 may be limited to reduce traffic on the first legacy network zone 4902 that are created by communications to and from the external device 5618, and/or due to a sensitivity of end points on the first legacy network zone 4902 (e.g., where vehicle controls and/or proprietary information are maintained on the first legacy network zone 4902, and/or where security protocols associated with the first legacy network zone 4902 are more limited than those available with the second high capability network zone 4904). In another example, external communications between end points of the second high capability network zone 4904 may be limited to reduce external transmissions (e.g., through a transceiver of the vehicle, utilizing a particular data provider, etc.) from the vehicle (e.g., where higher capability devices on the second high capability network zone 4904 may have the capability to generate high data rates), due to the potentially large number of devices on the second high capability network zone 4904, including devices that may be recently added to the vehicle (and accordingly do not have a long history of know usage, security vetting, and/or vehicle operations impact data) and/or devices that may be added by entities that are not as closely controlled as providers of devices on the first legacy network zone 4902 (e.g., devices that may be provided by third parties, that relate to recently developed vehicle capabilities, and/or that are not related to core vehicle functions, such as entertainment providers). The provided reasons for limiting external traffic between end points on various networks and external devices are non-limiting and provided for illustration, but the external communication control circuit 4908 may regulate communications between end points of any network zone and any external device for any reason.

An example system 4900 includes the external communication value 4906 including an active diagnostic description—for example diagnostic operations and/or data collection to be performed as a diagnostic operation, and which may involve commands to, data collected from, and/or communications with any end point on any network zone of the vehicle. An example system 4900 includes the external communication value 4906 including an active test description—for example a test operation (e.g., a test of any end point, actuator, sensor, flow, application, vehicle function, and/or vehicle controller on the vehicle), and which may involve commands to, data collected from, and/or communications with any end point on any network zone of the vehicle. An example system 4900 includes the external communication value 4906 including a data request value (e.g., collection of a data parameter from any end point, and/or including processing of the data parameter) and/or a vehicle command value (e.g., command of any actuator, display, controller, etc. with any end point). Example and non-limiting external device(s) 5618 include a service tool, a manufacturer tool, a dealer tool, and/or a cloud based tool.

An example external communication value 4906 includes a target device description including an identification of a target end point (e.g., a network zone, local address, sensor name, actuator name, data parameter name, etc.), where the external communication control circuit 4908 determines that the end point has a different configuration (e.g., a different network zone, local address, sensor name, actuator name, data parameter name, etc.) than the identification provided in the target device description. In certain embodiments, the external communication control circuit 4908 may include or utilize a configuration circuit 5604 (e.g., reference FIGS. 56, 47 and the related descriptions) to determine the proper identification for the target end point. An example external communication value 4906 does not include an identification of a target end point, and the external communication control circuit 4908 provides a proper identification for the target end point based on the external communication value 4906 (again referencing FIGS. 56, 47, and the related descriptions, including operations of the configuration circuit 5604). It can be seen that the operations of system 4900 allow for external devices 5618 to operate across a number of vehicle configurations, without specific knowledge of end point locations, parameter names, local addresses, or the like, to implement active diagnostics, testing, and data collection. The vehicle configurations may represent changes of a vehicle after servicing, replacement of components (e.g., end points), upgrading of components and/or executable instructions stored on a computer readable medium, changes over the course of model years, and/or changes to a vehicle due to campaigns, upgrades, and/or remanufacturing.

Figure 50:
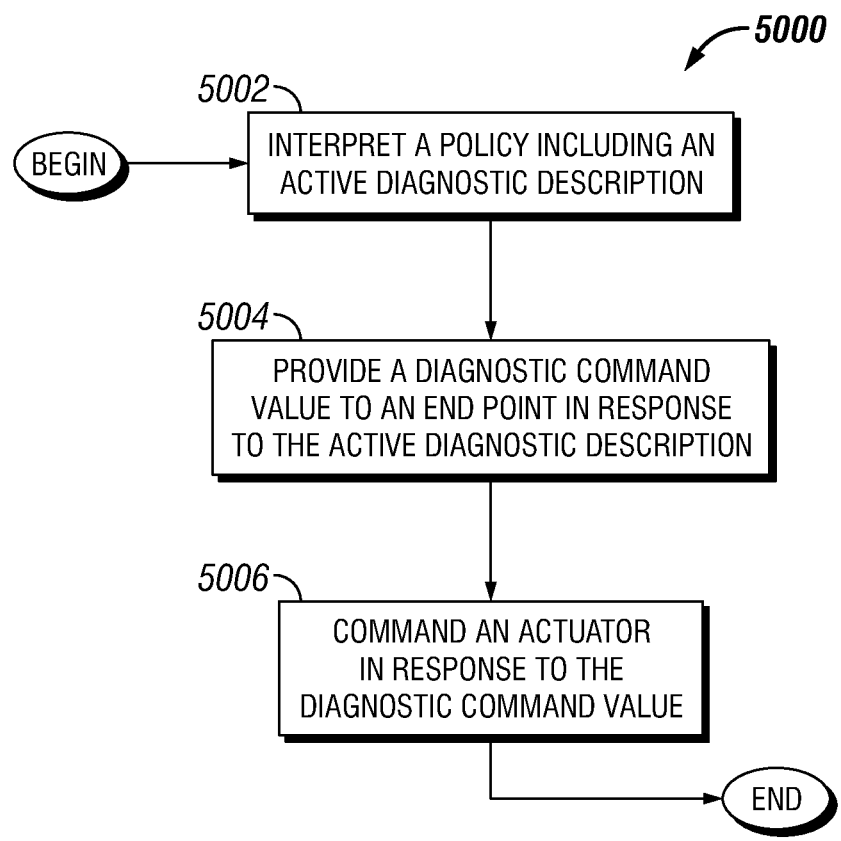
FIG. 50 is a schematic flow diagram of a procedure for commanding an actuator.

Referencing FIG. 50, an example procedure 5000 to command an actuator in response to a diagnostic command value is schematically depicted. The example procedure 5000 includes an operation 5002 to interpret a policy including an active diagnostic description, an operation 5004 to provide a diagnostic command value to an end point in response to the active diagnostic condition, and an operation 5006 to command an actuator in response to the diagnostic command value.

Figure 51:
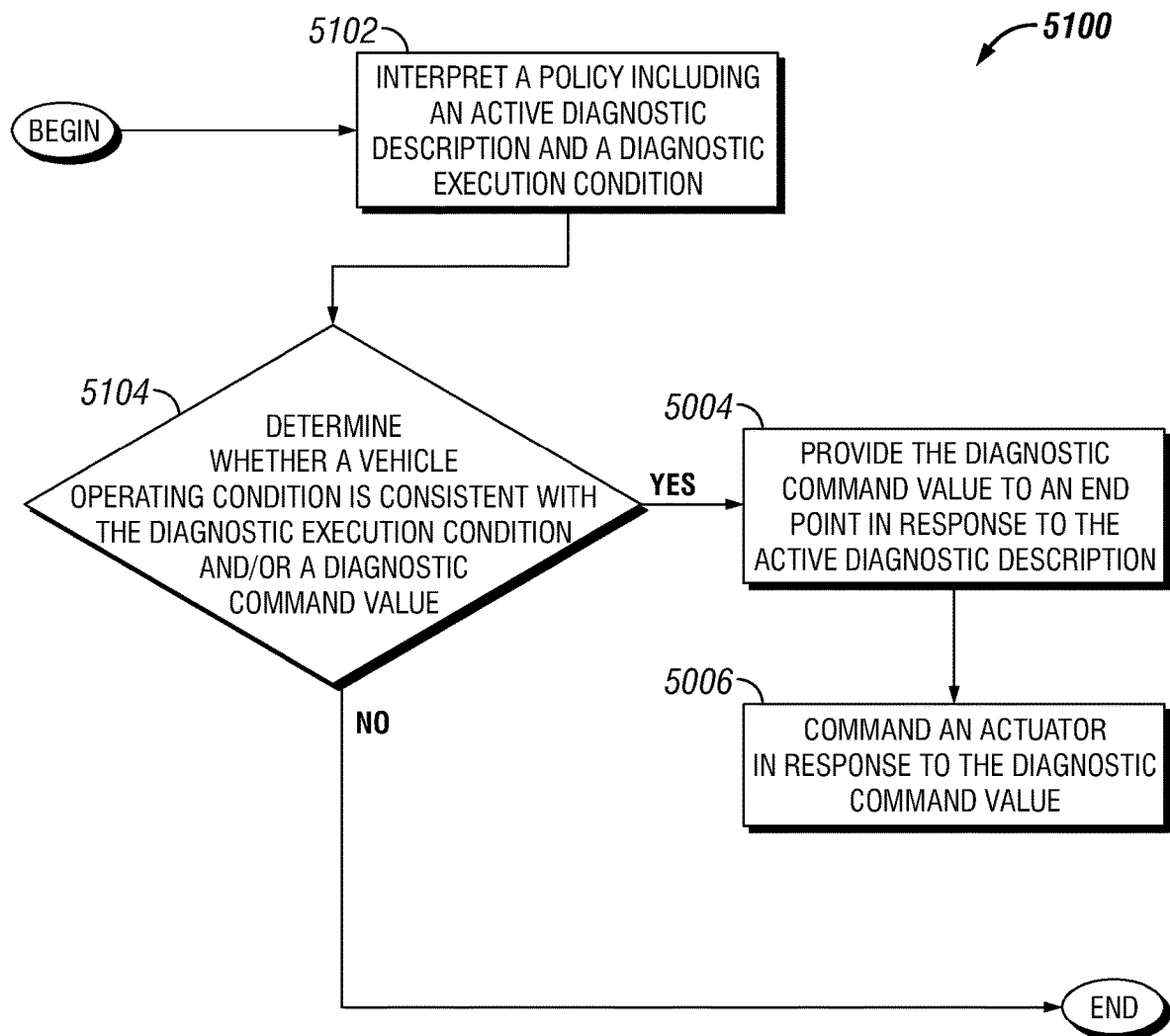
FIG. 51 is a schematic flow diagram of a procedure for commanding an actuator.

Referencing FIG. 51, an example procedure 5100 to command an actuator in response to a diagnostic command value is schematically depicted. The example procedure 5100 includes an operation 5102 to interpret a policy including an active diagnostic description and a diagnostic execution condition, and an operation 5104 to determine whether a vehicle operating condition is consistent with the diagnostic execution condition and/or a diagnostic command value (e.g., determined from the active diagnostic description). In response to the operation 5104 determining YES, the procedure 5100 includes an operation 5004 to provide a diagnostic command value to an end point in response to the active diagnostic condition, and an operation 5006 to command an actuator in response to the diagnostic command value.

Figure 52:
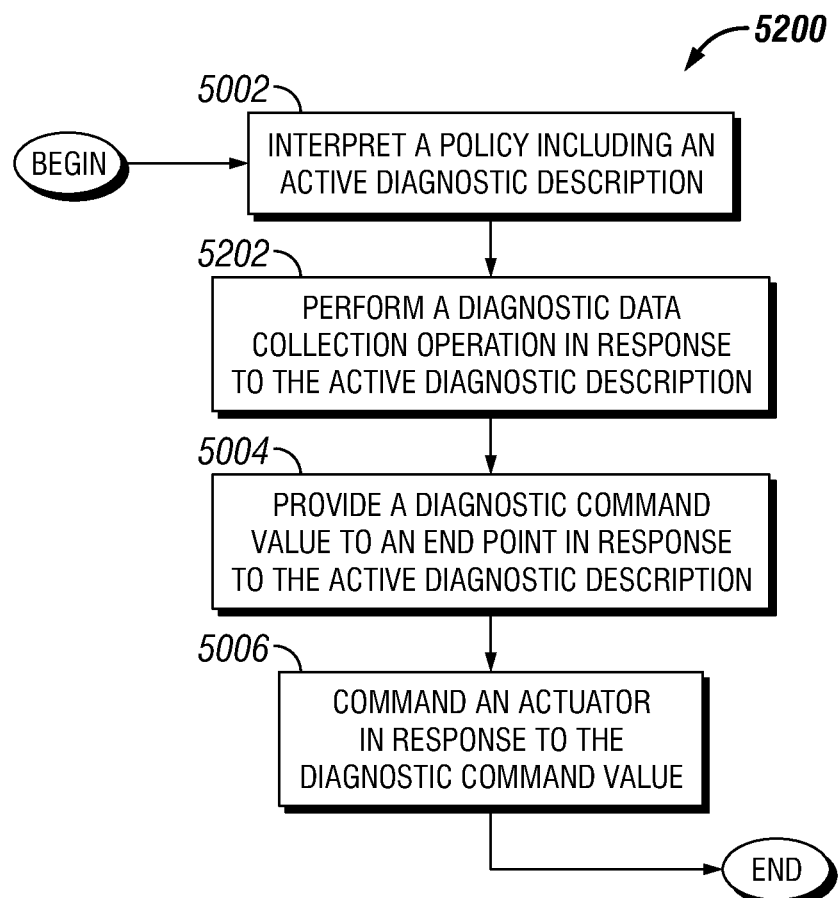
FIG. 52 is a schematic flow diagram of a procedure for commanding an actuator.

Referencing FIG. 52, an example procedure 5200 to command an actuator in response to a diagnostic command value is schematically depicted. The example procedure 5200 includes an operation 5002 to interpret a policy including an active diagnostic description, and an operation 5202 to perform a diagnostic data collection operation in response to the active diagnostic description. The example procedure 5200 further includes an operation 5004 to provide a diagnostic command value to an end point in response to the active diagnostic condition, and an operation 5006 to command an actuator in response to the diagnostic command value.

Figure 53:
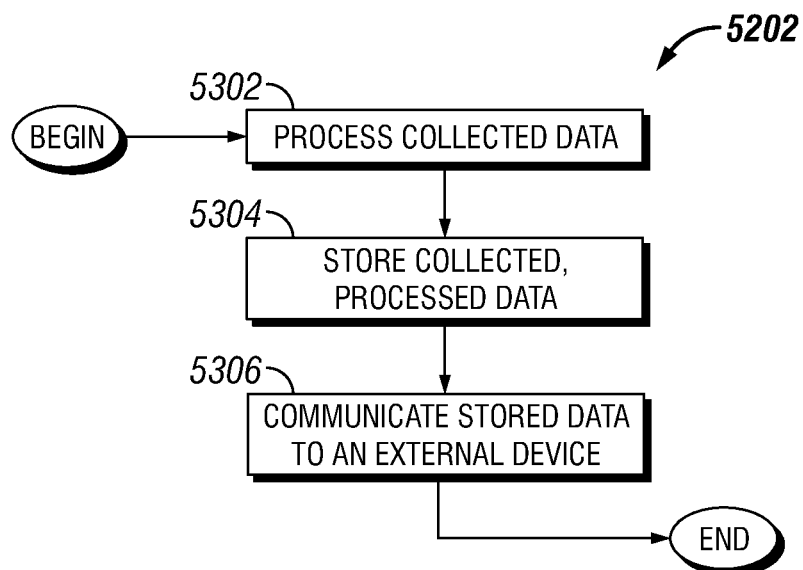
FIG. 53 is a schematic flow diagram of a procedure for transmitting collected data to an external device.

Referencing FIG. 53, an example procedure 5202 to perform a diagnostic data collection operation is schematically depicted. The example procedure 5202 includes an operation 5302 to process collected data (e.g., processing a payload and/or frame information of messages of the collected data), an operation 5304 to store the collected, processed data, and an operation 5306 to communicate at least a portion of the stored data to an external device.

Figure 54:
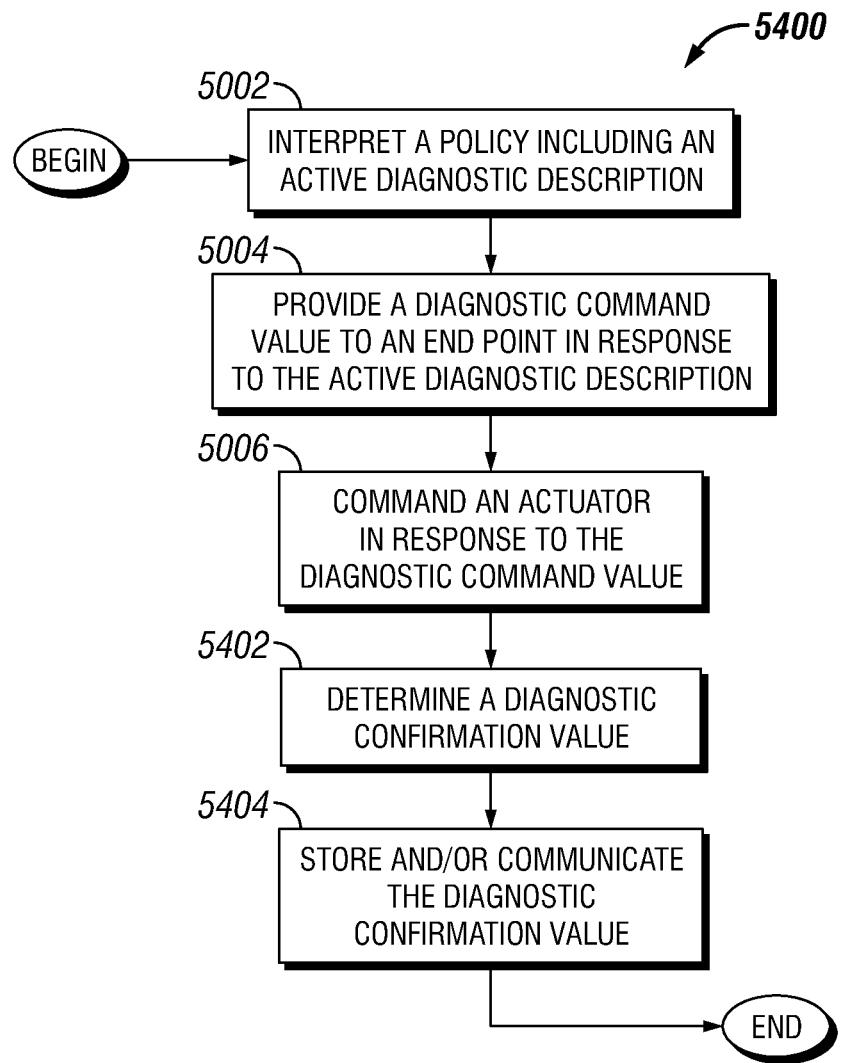
FIG. 54 is a schematic flow diagram of a procedure for performing an active diagnostic.

Referencing FIG. 54, an example procedure 5400 to store and/or communicate a diagnostic confirmation value is schematically depicted. The example procedure 5400 includes an operation 5002 to interpret a policy including an active diagnostic description, an operation 5004 to provide a diagnostic command value to an end point in response to the active diagnostic condition, and an operation 5006 to command an actuator in response to the diagnostic command value. The example procedure 5400 further includes an operation 5402 to determine a diagnostic confirmation value, and an operation 5404 to store and/or communicate the diagnostic confirmation value to one or more external devices.

Figure 55:
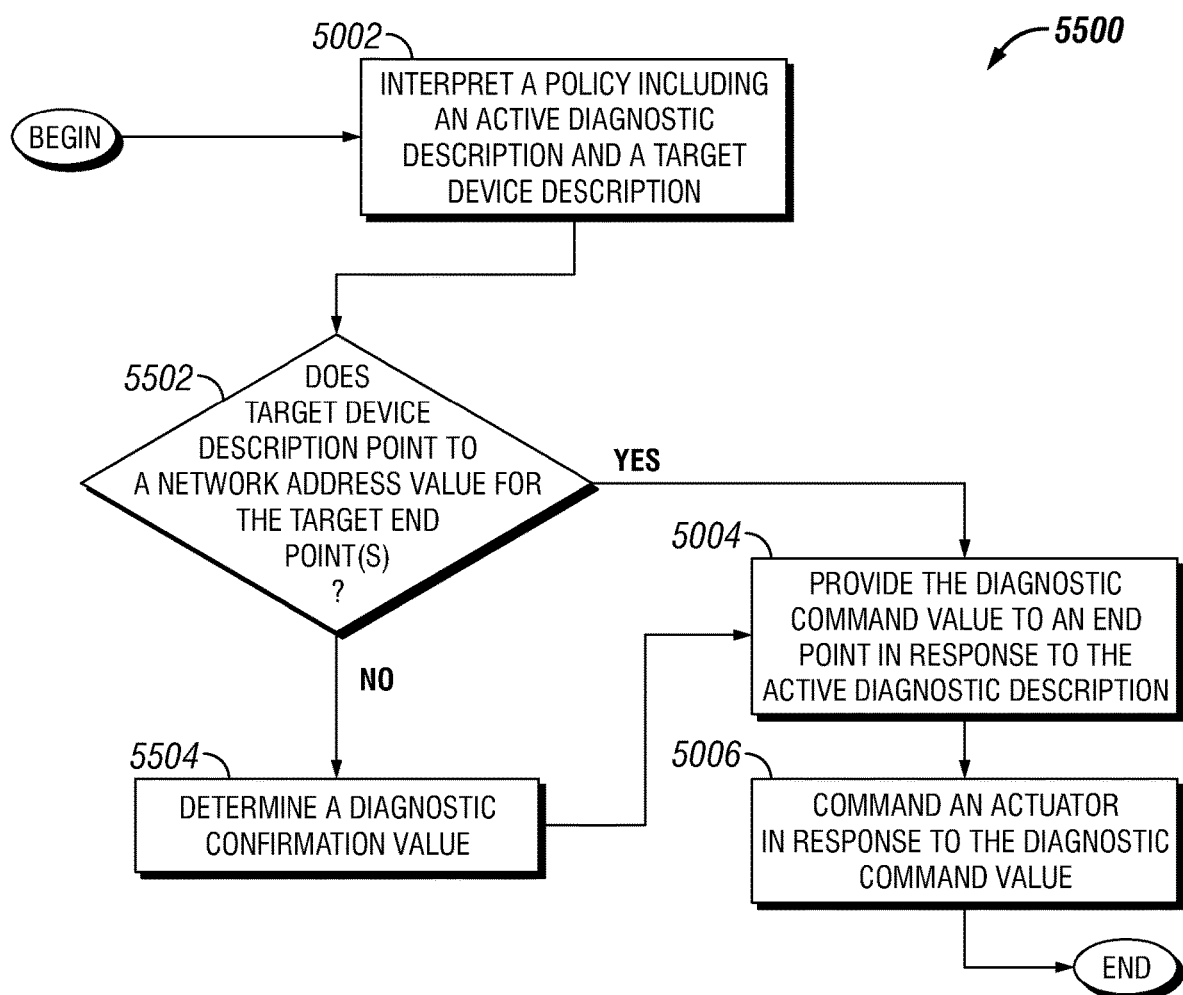
FIG. 55 is a schematic flow diagram of a procedure for commanding an actuator.

Referencing FIG. 55, an example procedure 5500 to command an actuator in response to a diagnostic command value is schematically depicted. In addition to operations recited in relation to FIG. 50 preceding, the example procedure 5500 includes an operation 5502 to determine whether a target device description points to a network address value for the target end point(s) related to a commanded actuator (e.g., if the target device description does not point to a network address value, or points to an incorrect network address value, then operation 5502 determines NO). In response to operation 5502 determining YES, the procedure 5500 proceeds to operation 5004. In response to operation 5502 determining YES, the procedure 5500 includes an operation 5504 to supply or adjust a network address value for the target end point(s), and then to operation 5004.

Figure 56:
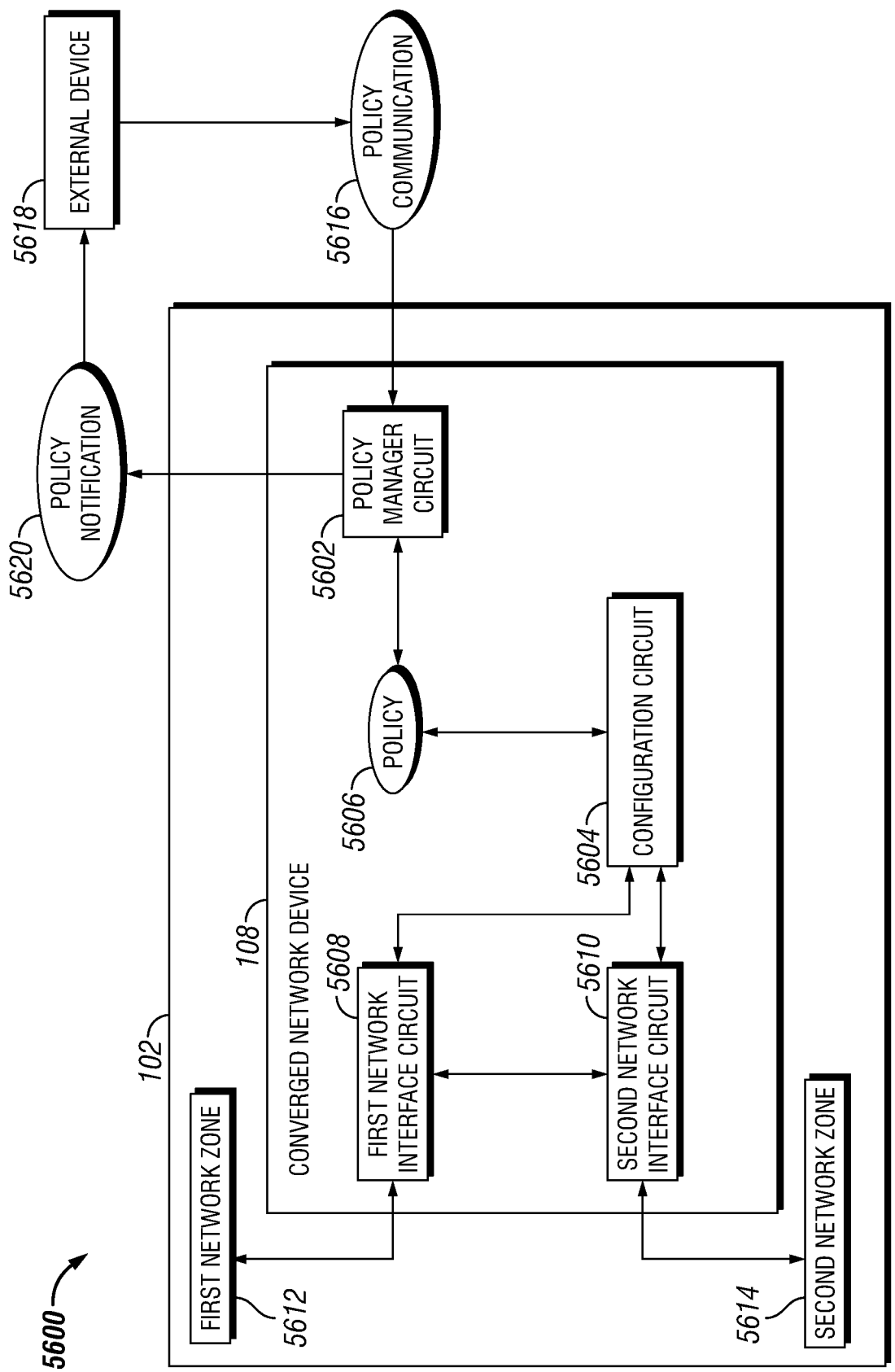
FIG. 56 is a schematic diagram of a system for regulating network communications of a vehicle.

Referencing FIG. 56, an example system 5600 is provided for providing extra-vehicle communication control, consistent with embodiments of the present disclosure. Systems described throughout the present disclosure may be provided on a mobile application such as a vehicle or as described throughout the present disclosure. Example systems herein recite particular arrangements, for example of a converged network device (CND) 108, circuits, controllers, or other components. The arrangements are provided for clarity of the present description, but components may be distributed, combined, divided, and/or have distinct relationships to those depicted to form systems and to perform procedures described herein.

Circuits, controllers, processors, or other devices set forth herein are configured to functionally perform operations as described herein, and may include computing components such as processors, memory, and/or communications components. Additionally or alternatively, such devices may include logic circuits, hardware configured to perform one or more functions of the device, sensors, actuators, and/or display devices of any type. A given circuit, controller, processor, or other such device may be distributed and/or grouped, in whole or part, with other such devices.

Certain operations herein are described as interpreting or receiving parameters, or obtaining parameter values using other similar language depending upon the context. Any such operations include receiving the parameter value as a network communication; receiving the parameter value from a sensor; receiving the parameter value as a feedback value (e.g., an actuator position, a reported fault code value, etc.); retrieving the parameter value from a memory location accessible to the interpreting or receiving device; receiving the parameter value as a command; receiving the parameter value as a response to a request from the receiving or interpreting device; and/or receiving pre-cursor values from which the parameter is, at least in part, determined (e.g., operating a virtual sensor using other information to determine the interpreted or received parameter value; determining a state value based upon the received information, where the state value is the received or interpreted value for the purpose of the description; and/or using received information to infer the interpreted value). Any such operations may further include more than of these (e.g., interpreting a parameter value in distinct ways at different times, operating conditions, during off-nominal conditions, depending upon a source of the parameter value, and/or depending upon the usage or purpose of the interpreted parameter value at a given time or during certain operating conditions), and/or combinations of these (e.g., operating a virtual sensor on received information to determine a pre-cursor value, and determining the interpreted parameter value in response to the pre-cursor value).

The example system 5600 includes a vehicle 102 having a first network zone 5612 and a second network zone 5614, where the first network zone 5612 and the second network zone 5614 are different types of networks. Without limitation to any other aspect of the present disclosure, different types of networks as described herein contemplates any difference in the networks, such as: a difference in a network capability (e.g., band width, message size, latency, noise sensitivity, etc.); a difference in a network protocol at any layer (e.g., hardware type; message frame requirements; addressing schemes; acknowledgement types, requirements, or capabilities; casting availability such as unicast, multicast, and/or broadcast); a network standard type (e.g., Controller Area Network (CAN); Media Oriented Systems Transport (MOST) network; Local Interconnect Network (LIN); FlexRay network; Time-Triggered Protocol (TTP) network; Low-Voltage Differential Signaling (LVDS) network; Audio Video Bridging (AVB) compliant network; a customized version of any one or more of the foregoing; and/or a proprietary version of any one or more of the foregoing). An example network zone includes an electrical signal zone (e.g., a network where a corresponding network interface circuit interprets an electrical signal value as a communication, and/or provides an electrical signal value as a communication to an end point of the electrical signal zone, such as a sensor providing certain electrical values indicating a sensed parameter value, a diagnostic value, or the like, and/or an actuator responsive to certain electrical values to move to a selected position and/or apply a selected force, and/or where the actuator may additionally or alternatively provide feedback information and/or diagnostic information on the electrical signal zone). Electrical signals for an electrical signal zone may be of any type, including at least: voltage values; frequency values; current values; and/or configured pulse-width modulated (PWM) values such as duty cycles, amplitudes, selected periods, and the like.

The example system 5600 further includes a policy manager circuit 5602 that interprets a policy 5606 including a network regulation description (not shown), and a configuration circuit 5604 that configures at least one network interface circuit (e.g., a first network interface circuit 5608 corresponding to the first network zone 5612 and/or a second network interface circuit 5610 corresponding to the second network zone 5610) in response to the policy 5606. For example, the policy 5606 may be provided by an external device 5618, and/or may be previously stored (e.g., at a time of manufacture, assembly, and/or during a previous update from the external device 5618), where the policy 5606 includes the network regulation description having selected indications of devices on the vehicle 102 for capability to utilize the network zones 5612, 5614, to communicate between zones, and/or to communicate with external devices 5618.

An example system 5600 includes the first network interface circuit 5608 provided as a part of a CEG, where the first network zone 5612 is a CAN bus network, and the second network interface circuit 5610 provided as a part of a CES, where the second network zone 5610 is provided as an ethernet network. In the example, the first network interface circuit 5608 provides selected communications from the first network zone 5612 to the second network interface circuit 5610 at a selected port of the ethernet network, and/or receives selected communications from the second network zone 5614 at the selected port of the ethernet network, thereby providing for inter-network communications between the first network zone 5612 and the second network zone 5614. In the example, communications from the first network zone 5612 to an external device 5618 may be provided through the second network zone 5614 (e.g., where the external device 5618 is coupled to the second network zone 5614 and/or connected wirelessly to the vehicle 102), or directly to the external device 5618 (e.g., where the external device 5618 is coupled directly to the first network zone 5612 or CAN bus).

An example system 5600 includes the first network zone 5612 as a virtual local area network (VLAN), logically separated from the second network zone 5614, but positioned on at least partially shared hardware with the second network zone 5614. In the example, the first network interface circuit 5608 and second network interface circuit 5610 may be operated as elements of a network switch or router, controlling communication between end points of the first network zone 5612 and second network zone 5614 in response to the policy 5606.

Devices on the vehicle 102 that are regulated by the policy include, without limitation, one or more of: an end point of a network zone; a flow associated with a communicating device (e.g., an end point or an application); an application associated with a communicating device (e.g., an end point). For example, an end point of the first network zone 5612 (e.g., a backup camera on the vehicle 102) may request or perform communications on a network of the vehicle, but may be associated with more than one application or flow (e.g., associated with a first flow relating to vehicle reverse movement operations at a first operating condition, and associated with a second flow relating to vehicle security operations at a second operating condition), and accordingly the communications of the backup camera on the vehicle 102 may have different regulation parameters depending upon the flow associated with the operations at the moment. In certain embodiments, an end point is associated with more than one application or flow, and the end point is regulated according to a highest priority one of the associated applications or flows (e.g., to reduce communication requirements, such as determining the application or flow that is requesting the immediate communication to be regulated, and/or to reduce processing time to determine which application or flow is requesting the immediate communication). In certain embodiments, an end point is associated with more than one application or flow, and the end point is regulated according to priority of the application or flow requesting the immediate communication.

Devices on the vehicle 102 that are regulated by the policy may be referenced herein, without limitation, as a local communicating device. Local communicating devices include, without limitation: an end point of a network zone; an application; a flow; a vehicle function (e.g., power management, cabin comfort, traction control, etc.); a sensor device; a service group; and/or a vehicle controller (e.g., an engine controller, a transmission controller, an anti-lock brake system (ABS) controller, an advanced driver assistance system (ADAS) controller, etc.). It can be seen that a given component, such as an end point of a network zone, may be a first local communicating device during one operating condition, and a second local communicating device during another operating condition—for example depending upon the vehicle operating condition (e.g., shutdown, motive operation, parked operation, etc.), and/or may be a first local communicating device for a first purpose (e.g., a brake controller performing active traction control operations) and a second local communicating device for a second purpose (e.g., the brake controller providing data to be stored for diagnostic operations). Additionally, it can be seen that the distribution of communication devices between applications, flows, controller, vehicle functions, and the like, depends upon the organizing strategy of the particular system, design choices made by a manufacturer or other entity having design and/or configuration control of the system, and the like. For example, traction control may be provided by a unified vehicle controller for a given system (e.g., which may treat the traction control as a vehicle controller for network regulation purposes); provided by distributed controllers for another system (e.g., which may treat the traction control as a vehicle function for network regulation purposes); and/or may be treated as a logically grouped set of operations for another system (e.g., which may have any hardware organization including the previously described organizations, and which may treat the traction control as an application or flow for network regulation purposes). One of skill in the art, having the benefit of the present disclosure and information ordinarily available when contemplating a particular system, can readily determine the organizational scheme and network regulation for local communicating devices of the system. The organizational scheme for local communicating devices includes the inclusion and/or association of end points of the network zones, and/or certain communications (including source or destination communications for the end point(s)) with one or more of: particular end points, vehicle controllers, vehicle functions, applications, and/or flows of the system.

Certain considerations to determine the organizational scheme include, without limitation: the number, types, capabilities, and inter-connection bandwidth of network zones of the system; the available size and/or granularity for policy(ies) of the system; the available processing power available for implementation of the policy(ies) of the system; the number and distribution of vehicle controllers and other controllers throughout the system; the expected change of the system over time (e.g., availability to reconfigure, remanufacture, and/or re-spec the vehicle; expected changes in coming model years associated with the vehicle; and/or the level of consumer and/or third-party customization of the vehicle that is available or expected); the number and distribution of sensors and/or actuators throughout the system, and the connectivity of the sensors and/or actuators to a network zone (e.g., consolidation at controllers, and/or consolidation using smart sensors/actuators capable to directly interface with a network zone); the presence, number, and distribution of multi-purpose communicating elements on the system (e.g., sensors, actuators, controllers, and/or data values that service multiple vehicle functions, flows, and/or applications); the presence, number, and distribution of multi-purpose data elements on the system (e.g., sensors, actuators, controllers, and/or data values that provide redundant capability to support a given vehicle function, flow, and/or application); and/or the expected utilization of a network aspect (e.g., communications on a network zone, external communication data rate and/or aggregate data communicated, inter-network communications, etc.) relative to a related capacity (e.g., a bandwidth of a network zone, external communication bandwidth, external communication data limit, inter-network communications, etc.).

An example policy manager circuit 5602 receives a policy communication 5616 from an external device 5618, and interprets the policy 5606 by performing an operation such as storing the policy 5606 (e.g., in a memory location accessible to the policy manager circuit 5602, and/or distributed throughout a number of memory locations) and/or updating a stored policy 5606. In certain embodiments, the policy manager circuit 5602 configures the policy 5606 for utilization by network regulating aspects of the system 5600, for example by updating a number of configuration files utilized by interface circuits 5608, 5610, adjusting high level descriptions of the policy communication 5616 (e.g., limit external communication data to 32 GB per month) to executable commands by network regulating aspects of the system 5600, adjusting reference values of the policy communication 5616 (e.g., associating a local address value of an end point referenced in the policy communication 5616, such as when an end point has moved without notification to the external device 5618, and/or where specific addressing information of local devices is abstracted from the external device 5618, etc.), associating system-specific nomenclature to elements of the policy description 5620 (e.g., local parameter value names or IDs, flow names or IDs, application names or IDs, etc.), or the like.

An example system 5600 includes the external device 5618 communicatively coupled to the policy manager circuit 5602 through at least one of the first network zone 5612 or the second network zone 5614—for example using a CAN bus port, OBD port, ethernet port, proprietary port, or other direct coupling to a network zone. An example system 5600 includes the external device 5618 communicatively coupled to the policy manager circuit 5602 through a wireless connection, such as a WiFi connection, cellular connection, and/or Bluetooth connection.

An example system 5600 includes the policy manager circuit 5602 verifying the policy 5606, as communicated by the policy communication 5616, before performing the storing and/or updating of the policy 5606. For example, the policy manager circuit 5602 may require an authentication of the external device 5618, and/or a determination of the permissions associated with the external device 5618, before performing a change to the policy 5606. In certain embodiments, the policy manager circuit 5602 may determine permissions associated with the external device 5618, an entity utilizing the external device 5618, an application or flow utilizing the external device 5618, or the like, before performing a change to the policy 5606. In certain embodiments, the policy manager circuit 5602 may reject the policy communication 5616 if the policy 5606 implied by the policy communication 5616 exceeds an authority associated with the external device 5618, and/or if the policy 5606 cannot be implemented (e.g., executing the policy 5606 would exceed the capability of the system 5600, such as a bandwidth of a network zone, an external communications limit, a memory storage limit, or the like). In certain embodiments, the policy manager circuit 5602 may partially implement the policy communication 5616 if the policy 5606 implied by the policy communication exceeds an authority associated with the external device 5618, and/or if the policy 5606 cannot be fully implemented. For example, the policy manager circuit 5602 may implement the authorized portions of the policy communication 5616, and/or implement portions of the policy communication 5616 than the system 5600 has capability to implement. In certain embodiments, the policy manager circuit 5602 implements portions of the policy communication 5616, for example where a system capability would be exceeded by a full implementation, according to: a priority of associated end points, flows, applications, vehicle functions, etc. of the policy communication 5616 (e.g., implementing higher priority aspects until a limit is reached); and/or maximizing an implementation value of the policy communication 5616 (e.g., associating a value for each aspect according to an associated priority, importance, benefit description, etc. of the given aspects; for example where meeting a group of slightly lower priority aspects of the policy would exceed the value of meeting only a single higher priority aspect of the policy).

An example policy manager circuit 5602 provides a policy notification 5620 to the external device 5618 in response to verifying the policy 5606. An example policy notification 5620 includes a confirmation that the policy 5606 is updated and/or stored according to the policy communication 5616. An example policy notification 5620 includes a notification that the policy 5606 has not been implemented (e.g., where the external device 5618 does not have authorization to implement the policy communication 5616). An example policy notification 5620 includes a reason for the rejection of the policy communication 5616 (e.g., a lack of authorization, lack of capability, etc.). An example policy notification 5620 includes one or more aspects of a partial implementation of the policy communication 5616, for example a description of which aspects of the policy communication 5616 have been implemented or rejected, and/or a reason for the partial implementation. In certain embodiments, the policy manager circuit 5602 may provide the policy notification 5620 to a separate external device (not shown), either instead of the policy notification 5620 to the first external device 5618, and/or in addition to the policy notification 5620 to the first external device 5618. In certain embodiments, the policy notification 5620 to separate external devices may have the same information, or separate information. For example, the policy manager circuit 5602 may provide a simple policy notification 5620 to the requesting external device 5618 (e.g., a rejection of the policy communication 5616), and a more detailed policy notification 5620 to a separate external device (e.g., indicating authorizations that prevent the implementation of the policy communication 5616, capacities that prevent the implementation of the policy communication 5616, and/or details related to a partial implementation of the policy communication 5616). In certain embodiments, the policy manager circuit 5602 may provide a more detailed policy communication 5616 to the requesting external device 5618, and a simpler policy communication 5616 to the separate external device(s).

In certain embodiments, the policy notification 5620 may include providing a prompt to a user interface of an external device (not shown), for example allowing an authorized external device, user, entity, or the like, to provide a permission to allow a policy 5606 update in response to the policy communication 5616. In a further example, the prompt to the user interface of the external device may include a prompt to one or more of a vehicle owner, a vehicle operator, a vehicle manufacturer, an administrator related to the vehicle (e.g., a network administrator, fleet owner, fleet service operator, compliance personnel associated with the vehicle, etc.).

Without limitation to any other aspect of the present disclosure, example aspects of a policy 5606 include: a data collection parameter (e.g., data available to at least one network zone of the vehicle, such as data from any sensor, actuator, controller, and/or end point at least selectively couplable to a network zone and/or in communication with an end point of a network zone); a data collection permission value (e.g., a sampling or communication rate; a permission to provide the data value to a network zone; a permission to request the data value from a network zone; a resolution value associated with the data; a time lag permission associated with the data; a storage permission associated with the data such as an amount of data storage authorized, data expiration criteria, and aged data treatment parameters such as compression and/or summarization operations to be performed on aging data and/or to be performed if permitted storage becomes limited due to inability to communicate the stored data externally or competing storage priorities intervene with the planned available storage); a service publication permission value (e.g., an authorization to publish the availability of a service, which may include scheduled authorization to publish to some local communicating devices, external applications, and the like, but not to others; and/or an authorization to publish details of the available service such as data parameters provided, actuators available, etc.); a service subscription permission value (e.g., published services that are visible to the associated local communicating device; service details that are available to the associated local communicating device; and/or permissions to subscribe to services for the associated local communicating device); and/or an external communication permission value (e.g., data rates, associated parameters, external addresses allowed, APNs allowed, aggregate data communication permissions, etc.). The policy 5606 includes any one or more of the foregoing associated with local communicating devices (e.g., end points, controllers, vehicle functions, flows, applications, sensor devices, etc.), external devices (e.g., specific devices or device categories, entities, and/or applications). In certain embodiments, a given flow, application, or vehicle function may include aspects associated with a local communicating device, and other aspects associated with an external device (e.g., a route predictor application that utilizes local communicating devices combined with an external application such as a cloud based application or a web based application).

Figure 57:
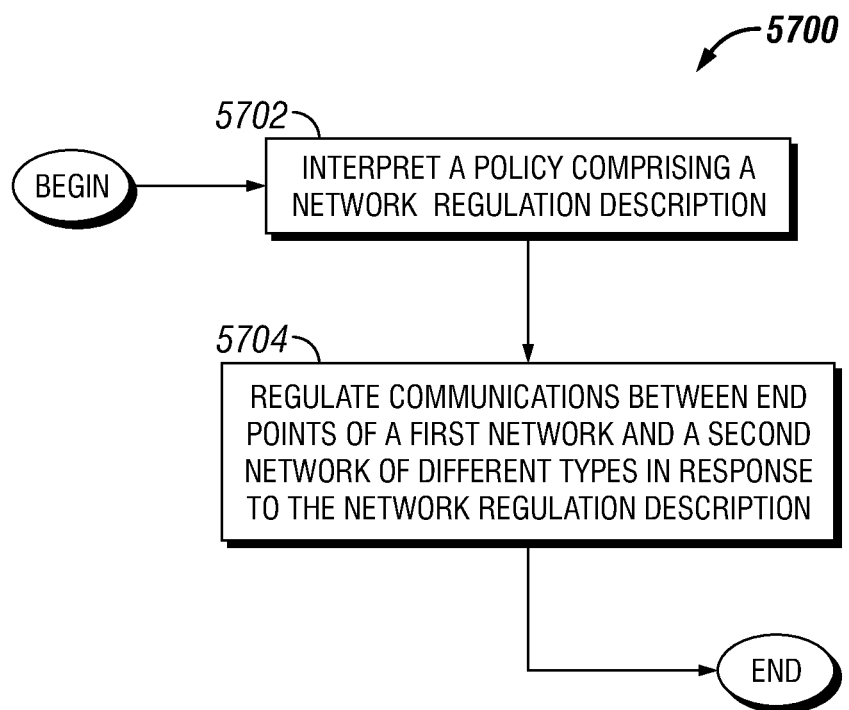
FIG. 57 is a schematic flow diagram of a procedure for regulating network communications of a vehicle.

Referencing FIG. 57, an example procedure 5700 to regulate communications between networks of a different type on a vehicle is schematically depicted. The example procedure 5700 includes an operation 5702 to interpret a policy including a network regulation description, and an operation 5704 to regulate communications between end points of a first network and end points of a second network in response to the network regulation description.

Figure 58:
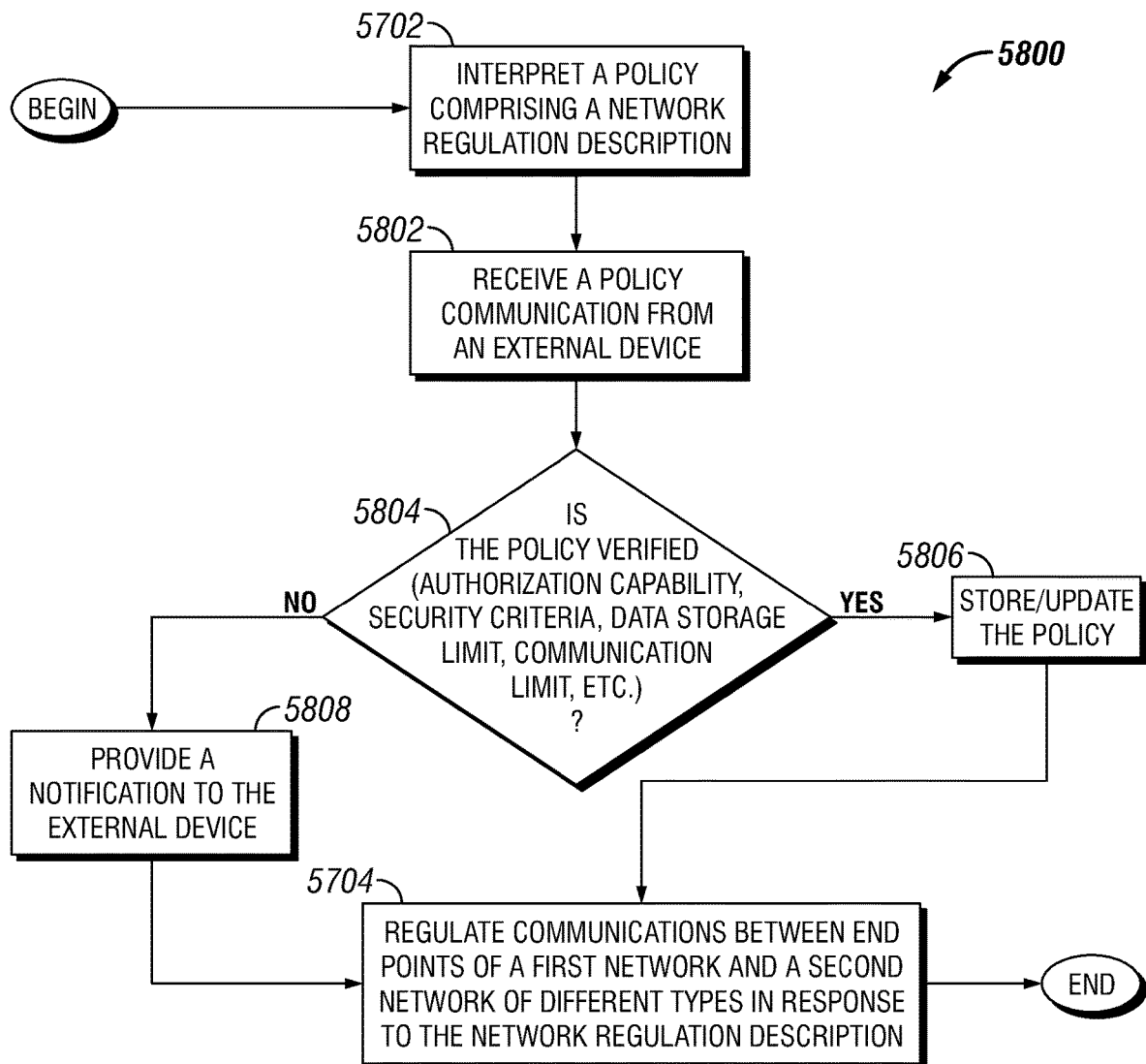
FIG. 58 is a schematic flow diagram of a procedure for regulating network communications of a vehicle.

Referencing FIG. 58, an example procedure 5800 to regulate communications between networks of a different type on a vehicle is schematically depicted. The example procedure 5800 includes an operation 5702 to interpret a policy including a network regulation description, and an operation 5802 to receive a policy communication from an external device. The procedure 5800 includes an operation 5804 to determine whether the policy is verified—for example if the external device is authorized to update the policy, if the system is capable to perform according to the policy, if the policy violates any security criteria, if the performance of the policy would exceed a data storage limit or a communication limit, etc. In response to operation 5804 indicating YES, the procedure 5800 includes an operation 5806 to store and/or update the policy, and the operation 5704 to regulate communications between end points of a first network and end points of a second network in response to the network regulation description. In response to operation 5804 indicating NO, the procedure 5800 optionally includes an operation 5808 to provide a notification to the external device (and/or to other external devices), and the operation 5704 to regulate communications between end points of a first network and end points of a second network in response to the network regulation description (e.g., utilizing the previous policy, a default policy, or the like).

Figure 59:
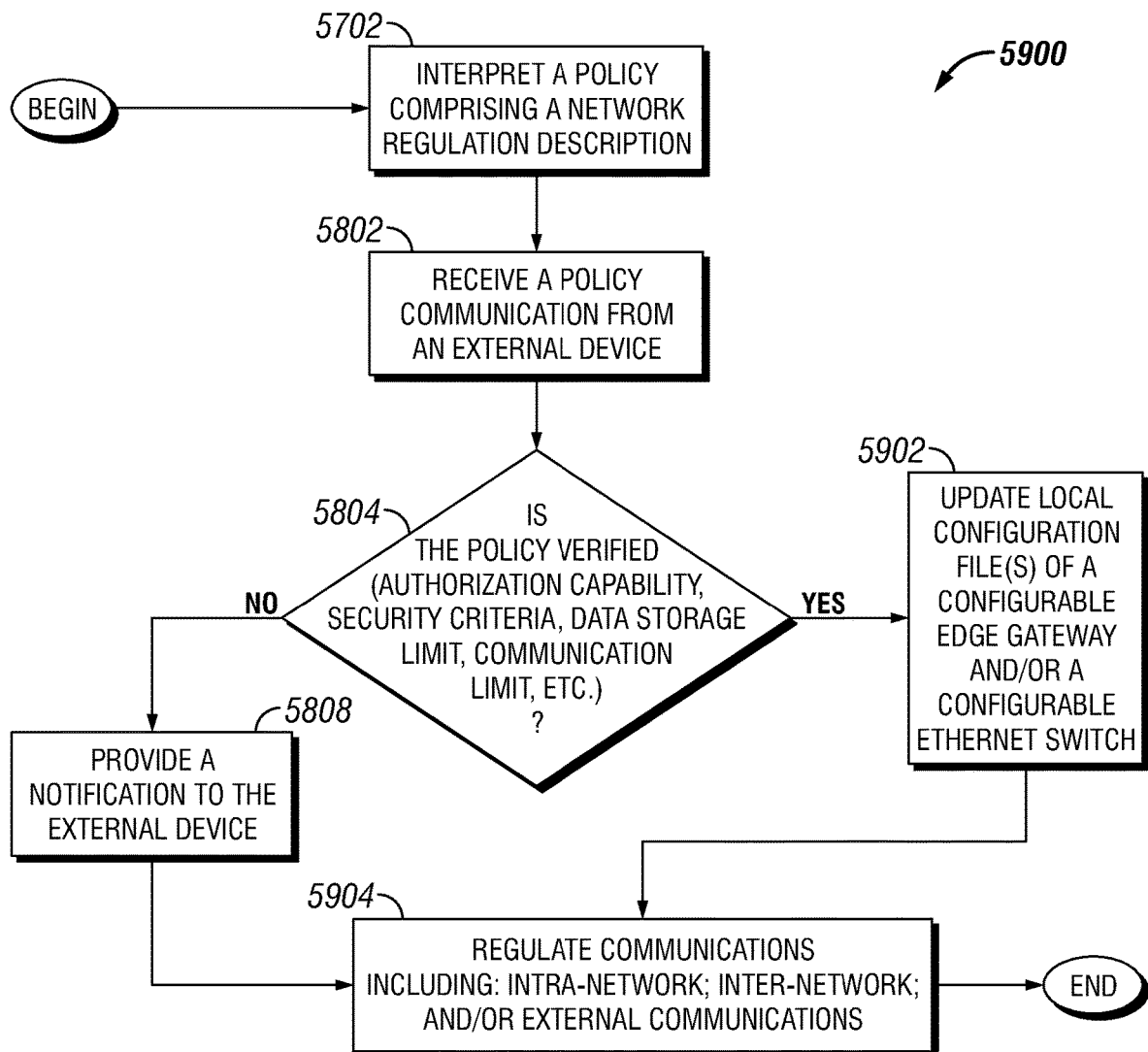
FIG. 59 is a schematic flow diagram of a procedure for regulating network communications of a vehicle.

Referencing FIG. 59, an example procedure 5900 to regulate communications between networks of a different type on a vehicle is schematically depicted. The example procedure 5900 includes an operation 5702 to interpret a policy including a network regulation description, and an operation 5802 to receive a policy communication from an external device. The procedure 5900 includes an operation 5804 to determine whether the policy is verified—for example if the external device is authorized to update the policy, if the system is capable to perform according to the policy, if the policy violates any security criteria, if the performance of the policy would exceed a data storage limit or a communication limit, etc. In response to operation 5804 indicating YES, the procedure 5900 includes an operation 5902 to update local configuration files of one or more of: a network interface circuit, a CEG, a CES, and/or gateway interface circuit. In response to operation 5804 indicating NO, the procedure 5900 optionally includes an operation 5808 to provide a notification to the external device (and/or to other external devices). The procedure 5900 includes an operation 5904 to regulate intra-network, inter-network, and/or external communications, using the network interface circuit(s), CEG(s), CES(s), and/or gateway interface circuit(s) (e.g., whether updated or not).

The procedures 5700, 5800, 5900 are described in reference to regulating communications between networks on a vehicle, but may additionally or alternatively be adapted to regulate communications between one or more networks on a vehicle and extra-vehicle communications (e.g., communications between a network and an external communication portal and/or an external device).

Figure 60:
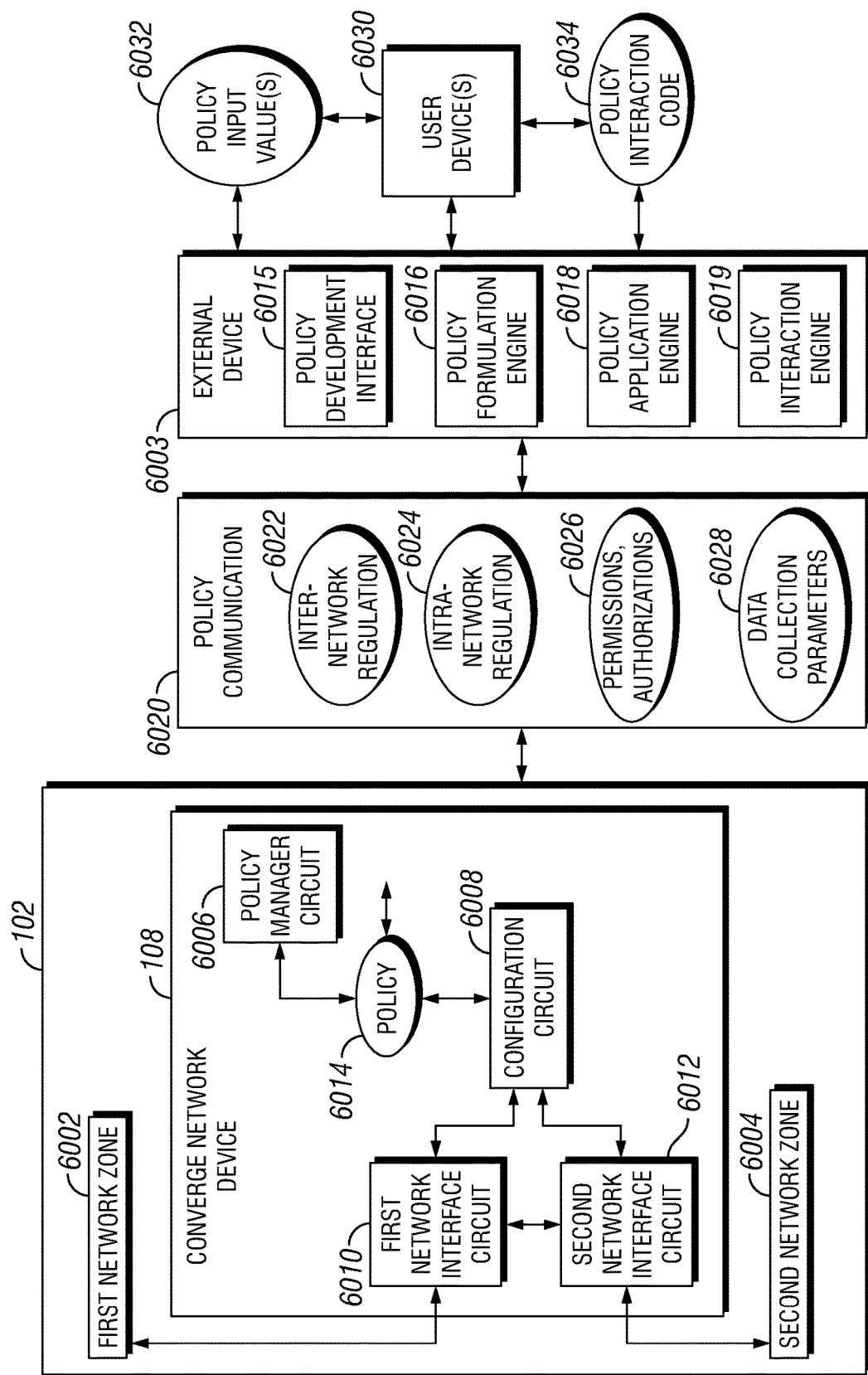
FIG. 60 is a schematic diagram of a system for regulating network communications of a vehicle using a scheduled policy.

Referencing FIG. 60, an example system 6000 is depicted for regulating network communications on a vehicle using a CND that is externally configured. The example system 6000 includes a vehicle 102 having a first network zone 6002 and a second network zone 6004, for example network zones of a different type, such as in a vehicle having a mixed network. The example system 6000 includes a CND 108 interposed (physically and/or logically) between the network zones 6002, 6004, and having a policy manager circuit 6006 that interprets a policy 6014, where the policy 6014 is communicated to the CND 108 from an external device 6003 (e.g., with the external device 6003 providing a policy communication 6020, where the CND 108 determines the policy 6014 in response to the policy communication 6020). The example system 6000 includes a configuration circuit 6008 that configures network interface circuit(s) (e.g., a first network interface circuit 6010 and a second network interface circuit 6012) in response to the policy 6014. The system 6000 includes the network interface circuit(s) 6010, 6012 regulating communications between end points of the first network zone 6002 and the second network zone 6004, for example as configured by the configuration circuit 6008. Regulating operations may be performed on inter-network communications (e.g., between network zones), intra-network communications (e.g., between devices on a given network zone), or other communications (e.g., communications to external devices, service tools, user devices, etc.). Any regulating operation described throughout the present disclosure are contemplated for system 6000. The example of FIG. 60 includes the policy communication 6020 having aspects such as inter-network regulation 6022 parameters, intra-network regulation 6024 parameters, permissions and/or authorizations 6026 related to the policy, and/or data collection parameters 6028 related to the policy. The example aspects of the policy communication 6020, and the corresponding implementation of these aspects in the policy 6014 on-vehicle, are non-limiting examples provided for illustration. A given embodiment may include additional aspects of the policy, and/or may omit one or more of the depicted aspects.

An example system 6000 includes the external device 6003 being a cloud application (e.g., operating on a cloud server or other computing device, at least intermittently in communication with the vehicle), a web based tool, combinations of these, and/or having portions of the external device 6003 being one of these, with other portions provided through other implementations (e.g., a service tool, fleet tool, operator mobile device, etc.).

An example external device 6003 includes a policy development interface 6015 that accepts policy input value(s) 6032 from a number of users (e.g., via user input device(s) 6030), a policy formulation engine 6016 that compiles the policy input value(s) 6032 into a policy 6014 (and/or into one or more aspects of a policy communication 6020 utilized to provide the policy to the CND 108), and a policy application engine 6018 that communicates the policy 6014 (and/or the policy communication 6020) to the CND 108. An example policy development interface 6015 interacts with user devices 6030 to accept policy input value(s) 6032, for example operating a GUI with the user devices 6030, operating an interacting application such as a web based tool, cloud application, mobile application, etc. to receive the policy input value(s) 6032. In certain embodiments, the policy development interface 6015 accepts a configuration file (e.g., an XML file, standardized format file, etc.) from a user device 6030 as a policy input value 6032. In certain embodiments, accepting the policy input value(s) 6032 includes operations such as: determining whether a policy input value 6032 is proper (e.g., formatting, permissions associated with the user device and/or entity associated with the user device, compatibility of the policy input with available parameters, functions, sampling rates, etc. on the vehicle, and the like); parsing the policy input value 6032 into portions (e.g., data collection, network usage permission, external vehicle communication permissions, associations such as flows, applications, vehicle functions, service groups, and the like for policy portions, etc.); associating metadata with the policy input value 6032 or portions thereof (e.g., time stamps; versions of a policy, related applications, etc.; identifiers associated therewith, such as a user, user role, related entity, user device identifier, etc.); and/or prioritizing between policy input values 6032 (e.g., such as when policy input values 6032 are not compatible, and/or cannot all be included such as when an aggregate policy size limitation would be exceeded, and which may be according to any aspect of the policy input value such as data type or related vehicle function, and/or according to any association with the policy input value 6032 such as an associated entity, etc.).

An example system 6000 includes a policy interaction engine 6019 that generates policy interaction code 6034, such as header file(s), parameter definition(s), and/or an API declaration. The policy interaction engine 6019 facilitates a user-friendly development of a policy and/or portions of a policy by users, applications, and/or tools, allowing users to conveniently interact with aspects of the policy that they are authorized to develop, to select available parameters, functions, control commands, and the like, and to minimize vehicle-specific knowledge requirements for users developing the policy and/or aspects of the policy.

An example system 6000 includes a policy 6014 having a data collection definition (e.g., data parameters to be collected, and/or including information such as processing to be performed, data formats for individual data elements, data formats for storage of the data such as a file type for the stored data, communication parameters such as data rates, timeliness, treatment of aging data and/or expiration of data, etc., including any data collection parameters set forth throughout the present disclosure). An example data collection definition includes at least one local communicating device (e.g., an end point, flow, application, network zone, vehicle function, service group, etc. as described throughout the present disclosure) corresponding to at least one data collection parameter. An example system 6000 further includes a user entering an identifier, address, and/or port for a source and/or for a destination of the collected data (e.g., identifying the local communicating device(s) that is(are) the source for the collected data, and/or identifying a destination for the collected data)—e.g., by the user providing the data collection definition as a policy input value 6032 that is thereby implemented as a part of the policy 6014. An example system 6000 includes the CND 108 performing a data collection operation utilizing the data collection definition, thereby collecting data from the vehicle according to the user entered parameters for the generated data source and/or destination.

An example system 6000 includes an operation to provide all or a portion of the data collection definition, which may be performed instead of utilizing user-defined portions (e.g., where addresses or other information are intentionally hidden from the user for security purposes and/or to facilitate ease of implementation of user entry of policy input values), and/or in addition to utilizing user-defined portions (e.g., to correct a user-defined portion that may have an incorrect value, to translate a user-defined portion that may be utilizing a legacy addressing value for an end point, etc.). In certain embodiments, the CND 108 may perform operations to provide all or a portion of the data collection definition, for example utilizing translating information provided in the policy 6014 available to the CND 108, to translate addresses where an end point of the vehicle has moved (e.g., between network zones and/or to a different address), or the like. In certain embodiments, the policy formulation engine 6016 may perform operations to provide all or a portion of the data collection definition, for example to mask addresses from a user device, to allow reference to data parameters according to an industry standard, simplified description, or the like, and/or where certain responsibilities to perform operations for providing, updating, and/or correcting the data collection definition are divided between the CND 108 and the policy formulation engine 6016. For example, the CND 108 may perform certain operations to provide, update, and/or correct the data collection definition (e.g., local, vehicle-specific operations such as local address translations), and the policy formulation engine 6016 may perform other operations to provide, update, and/or correct the data collection definition (e.g., server-side operations such as data destination locations off-vehicle, providing scheduled information availability and/or capability to different users, user devices, applications, entities, and the like, etc.).

Figure 69:
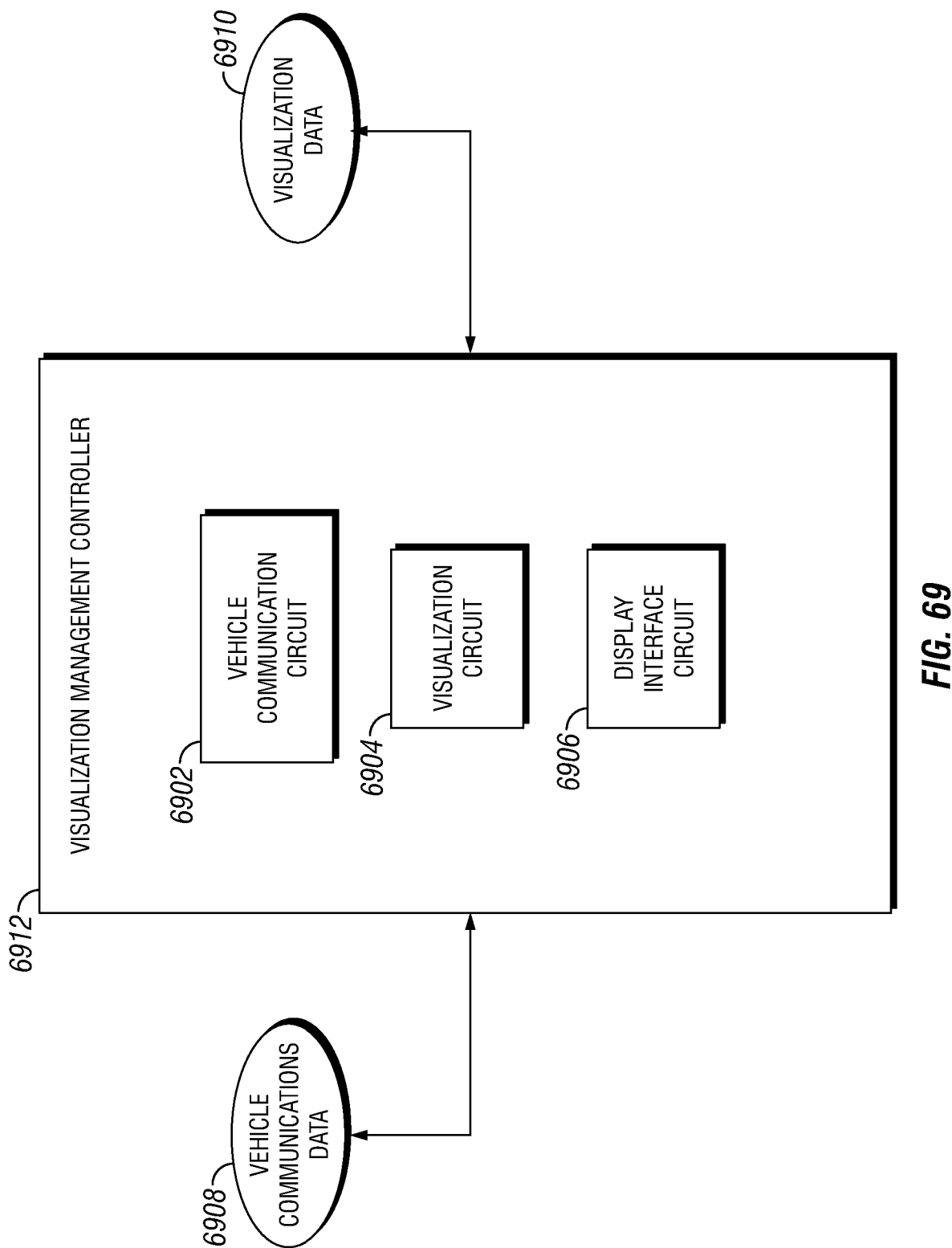
FIG. 69 is a schematic diagram of a visualization management controller.

Referencing FIG. 69, an example visualization management controller 6912 is depicted, which is configured to functionally execute operations to depict data flows on the vehicle, and/or to provide visualizations of the vehicle network and aspects of the network utilization, CND, end points, or the like. The example visualization management controller 6912 may be utilized with any system throughout the present disclosure, and/or to perform one or more aspects of operations throughout the present disclosure. The visualization management controller 6912 may be distributed across one or more vehicle controllers, the CND, and/or an external device, and/or may be provided on a single one of these. The aspects of the visualization management controller 6912 that are provided on-vehicle and/or external to the vehicle may vary depending upon the characteristics of the system, the entities (e.g., controllers, applications, flows, external devices, third-party applications, etc.) that are expected to access vehicle network data (and/or that will have capability to access vehicle network data), the communication plan (e.g., the scheme to communicate network data and/or visualization data from the vehicle and/or from a cloud storage location), and/or the processing plan (e.g., the scheme to process monitoring data into visualization data, the types of processing to be performed, and the number of distinct types of processing to be performed for various clients of the visualization data). A visualization management controller 6912 may be utilized to monitor vehicle networks (e.g., to diagnose issues on one or more networks, to monitor communications from local communicating devices, and/or to diagnose secondary issues that may be presented by unusual network utilization and/or data flow on the vehicle).

The example visualization management controller 6912 includes a vehicle communication circuit 6902 that interprets vehicle communications data 6908 (e.g., data flow on a network zone, between network zones, through the CND or other regulating components, and/or related to particular end points, flows, service groups, vehicle controllers, vehicle functions, applications, etc.). Example vehicle communications data 6908 includes one or more of the following: communications between end points of a network zone of the vehicle (e.g., on the same or on different network zones); and/or communications between local communicating device (e.g., on the same or on different network zones, and/or distributed across more than one network zone). The example visualization management controller 6912 includes a visualization circuit 6904 that generates visualization data 6910 (e.g., reference FIGS. 61-68 and the related descriptions), and a display interface circuit 6906 that transmits the visualization data 6910, for example to an external device, to a user device (e.g., a service tool, network monitoring tool, a third-party application, and/or an application utilized by a user monitoring the network(s) of the vehicle and/or other aspects of the vehicle related to the networks and/or data flows of the vehicle). An example visualization management controller 6912 includes the vehicle communication circuit 6902 positioned, in whole or part, on the vehicle (e.g., on the CND, on a vehicle controller, and/or on a network interface circuit), where the vehicle communication data 6908 is provided to a port of a network zone (e.g., a monitoring port, a mirrored port, and/or a port otherwise accessible to an external device). An example visualization management controller 6912 includes the visualization circuit positioned on an external device, where the display interface circuit 6906 provides the visualization data 6910 to a user device communicatively coupled to the external device. Without limitation to any other aspect of the present disclosure, example visualization data 6910 includes one or more of the following: a graphical representation of at least a portion of communications between local communicating devices of the vehicle; a graphical flow representation of at least a portion of communications passing through the CND; a graphical flow representation of at least a portion of communications regulated by at least one of the first network interface circuit or the second network interface circuit; and/or a graphical flow representation of at least a portion of communications passing between the first network zone and the second network zone. Example and non-limiting graphical flow representations include a data table depicting data flows, and/or any aspects of data flows as described throughout the present disclosure.

Figure 61:
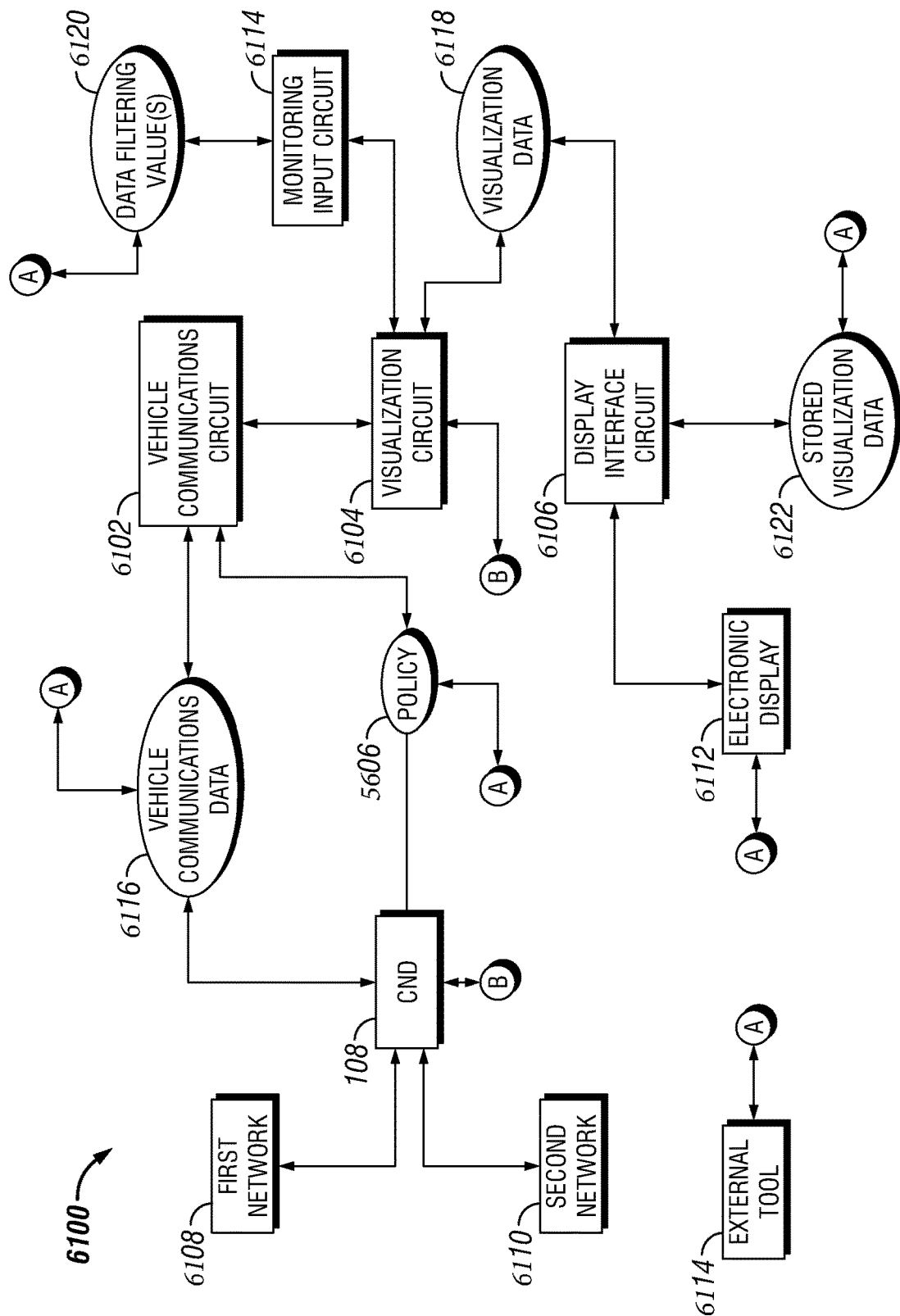
FIG. 61 is a schematic diagram of a system for providing visualization data of a network of a vehicle.

Referencing FIG. 61, an example apparatus 6100 is depicted for providing an external network view for one or more networks of a vehicle having a mixed network. The example apparatus 6100 may be utilized in conjunction with any vehicle described throughout the present disclosure, and aspects of the apparatus 6100 may be positioned on the vehicle, on an external device at least selectively in communication with the vehicle, on a cloud server, and/or on a web application.

The example apparatus 6100 includes a vehicle communication circuit 6102 that interprets vehicle communications data 6116, which may be data collected from the vehicle and/or data to be provided to the vehicle. The example apparatus 6100 further includes a visualization circuit 6104 that generates visualization data 6118 in response to the vehicle communications data 6116. Example visualization data 6118 includes a first network identifier (e.g., identifying a network zone, end point, or other network identifier for corresponding data) and a second network identifier. Example visualization data 6118 can include network identifiers corresponding to each of at least two distinct network zones of the vehicle, and/or each of at least two distinct end points of the vehicle. An example network identifier includes an ethernet based protocol and/or a CAN based protocol. Another example network identifier includes one or more of a cellular based protocol, a WiFi based protocol, and/or a Bluetooth based protocol.

The example apparatus 6100 further includes a display interface circuit 6106 that transmits the visualization data 6118, providing stored visualization data 6122 and/or providing the visualization data 6118 to an electronic display 6112. The transmission of the visualization data 6118 may include any one or more operations selected from the operations such as: transmitting the visualization data 6118 from the vehicle to a tool; transmitting the visualization data 6118 from the vehicle to a cloud server; transmitting the visualization data 6118 from the vehicle to a display device (e.g., an electronic display 6112 such as a vehicle display, a service tool, an external computing device such as an operator device, a service device, a manufacturer device, a fleet owner or service device, a vehicle communications administrator device, and/or a third-party device, etc.); transmitting the visualization data 6118 from a cloud server to a tool; transmitting the visualization data 6118 from a cloud server to a display device; and/or transmitting the visualization data 6118 from a first cloud server to a second cloud server (e.g., allowing separate storage criteria for the stored visualization data 6122 between the cloud servers, including anonymization of data, aggregation of data, compartmentalization of aspects of the data, etc.). In certain embodiments, transmission of the visualization data 6118 may include transmitting the visualization data 6118 to an on-vehicle storage (e.g., a dedicated memory space available for the stored visualization data 6122 for later access, requested access, and/or later transmission to an off-vehicle location), and/or to a closely coupled storage (e.g., a USB device coupled to the vehicle, to a mobile device such as an operator's mobile phone, and/or to a computing device in close-range wireless communication such as a WiFi or Bluetooth connection). Additionally or alternatively, the transmission of the visualization data 6118 may include any one or more operations selected from the operations such as: storing the visualization data 6118 on a shared storage of the vehicle; storing the visualization data 6118 on a shared storage of the vehicle, and selectively transmitting the stored visualization data 6122 to an external device; transmitting the visualization data 6118 to a secured cloud storage; and/or transmitting the visualization data 6118 to a secured cloud storage, and providing selected access to the stored visualization data 6122 to a monitoring tool, an external application, a service tool, and/or a user device.

An example apparatus 6100 includes an electronic display 6112 that interprets and displays the visualization data 6118. An example electronic display 6112 accesses the stored visualization data 6122 and displays at least a portion thereof, and/or a processed visualization element determined from the visualization data 6118 and/or stored visualization data 6122. Example visualization data 6118 includes topology data corresponding to a network topology of the first network and/or second network (e.g., depicting the network(s) and/or selected end points associated with each of the networks). The topology data may include a visual representation, a table listing, or other visualization of the topology data.

An example visualization circuit 6104 is further structured to include portion of meta-data of the vehicle communications data 6116 in the visualization data 6118. Example and non-limiting meta-data of the vehicle communications data 6116 includes data such as a source address, destination address, time stamp, vehicle operating condition or state condition, fault code information, status parameters for end points, flows, applications, and/or vehicle functions, or the like. In certain further embodiments, meta-data of the vehicle communications data 6116 includes information relating to the trajectory of the vehicle communications data 6116 through the vehicle network, for example frame data related to an originating communication (e.g., frame data from a communication on a first network 6108, where communication is encapsulated and passed to the vehicle communication circuit 6102 from the second network 6110), processing information for a payload and/or frame of the vehicle communications data 6116 (e.g., processing operations performed on the payload and/or the frame of the communication, for example allowing reverse calculation of the processing, an up-sampling and/or down-sampling description, or the like). In certain embodiments, the meta-data may have predetermined values, for example a first data value associated with a first processing operation (e.g., filtering, a resolution change, etc.), a second data value associated with a second processing operation, whereby the meta-data communicates the processing operation (or other operations) according to the value of selected portions (e.g., specified bits) of the vehicle communications data 6116.

An example apparatus 6100 includes a monitoring input circuit 6114 that interprets a data filtering value 6120 (e.g., a description of filtering operations, such as: a selection of certain end points and/or local communicating devices; a selection of certain network zones; communications meeting specified criteria; a down-sampling description for selected communications; communications relating to off-nominal conditions such as end points, flows, vehicle functions, and/or applications having an associated fault value, and/or communications relating to end points having lost packets, high or low expected communication rates, etc.). Example and non-limiting data filtering values 6120 include a network address association, a vehicle control device association, a vehicle system association, a network protocol type, an end point identifier, a data type, an application association, and/or a flow association. Example and non-limiting data filtering values 6120 include a reference to a system, such as an engine system, a steering system, a braking system, a fuel system, a prime mover system, an anti-lock braking system, a traction control system, and/or a drivetrain control system. Still further example and non-limiting data filtering values 6120 include a reference to a system such as a security system, a lighting system, a safety system, an environmental control system, an ADAS, and/or an infotainment system.

The example apparatus 6100 includes the visualization circuit 6104 filtering, based at least in part on the data filtering value 6120, portions of the vehicle communications data 6116 to generate the visualization data 6118. In certain embodiments, the data filtering value 6120 may be provided in a policy 1606, communicated from an external device 1618, and/or received through a user interface operated (e.g., by the display interface circuit 6106) on an electronic display 6112, external tool 6114, and/or a user device such as a device of a vehicle owner or operator, service personnel, manufacturer, fleet owner, fleet service personnel, vehicle communications administrator, and/or an interaction with a cloud-based or web-based application.

Referencing FIG. 63, an example user interface to retrieve and filter vehicle communications data 6116 is depicted. The example user interface may be implemented on an external device, web application, cloud-based application, external tool, or the like. In the example of FIG. 63, "Switch 0" corresponds to a first network zone, and "Switch 1" corresponds to a second network zone, allowing a user to select end points from each network zone that are to be monitored. In the example, filter selections allow for reduction from monitored end points (e.g., selections on the left side) according to filtering criteria, such as including only selected end points, flows, applications, etc. (selections on the right side). In the example of FIG. 63, monitored parameters may be further down-sampled (selections at the bottom). Further in the example of FIG. 63, a selected mirroring timeout may be set (e.g., where monitoring is performed using port mirroring). The example user interface of FIG. 63 illustrates certain aspects of the network monitoring and filtering operations described herein, and is not limiting to the present disclosure.

An example apparatus 6100 includes the visualization data 6118 including a traffic monitoring visualization. For example, a traffic monitoring visualization can provide a visualization corresponding to one or more of: an end point on one of the first network or the second network (e.g., showing incoming and/or outgoing traffic from the end point); a vehicle system; an application; a flow; a vehicle controller; a vehicle function; a selected one of the first network or the second network; or a port of one of the first network or the second network. An example visualization data 6118 includes a port counter visualization, for example displaying messaging traffic corresponding to a port (a physical port or a logical port) of one of the network zones. An example visualization data 6118 includes an end point data flow monitoring visualization, for example displaying messaging traffic corresponding to an end point of one of the network zones.

Figure 64:
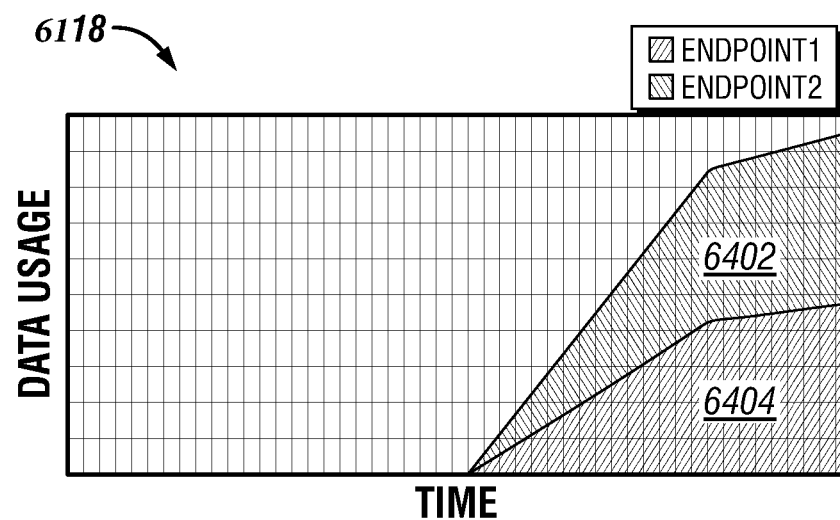
FIG. 64 is a schematic, illustrative, example of visualization data.

Referencing FIG. 64, an example visualization data 6118 is depicted including a traffic monitoring visualization. The example of FIG. 64 depicts network traffic (e.g., messages, bits, etc.) for a first end point 6402 and a second end point 6404. The example of FIG. 64 is a non-limiting example, and traffic monitoring may be depicted in any manner, and may be organized according to any grouping, such as per-network, per-port, all traffic associated with an application, all traffic associated with a flow, all traffic associated with a vehicle function, all traffic associated with a service group, etc.

An example apparatus 6100 includes the visualization data including a network activity profile, where the network activity profile is provided for one or more of: an end point on one of the first network or the second network; a vehicle system; an application; a flow; a vehicle controller; a vehicle function; a selected network zone; and/or a selected port of one of the network zones.

Figure 65:
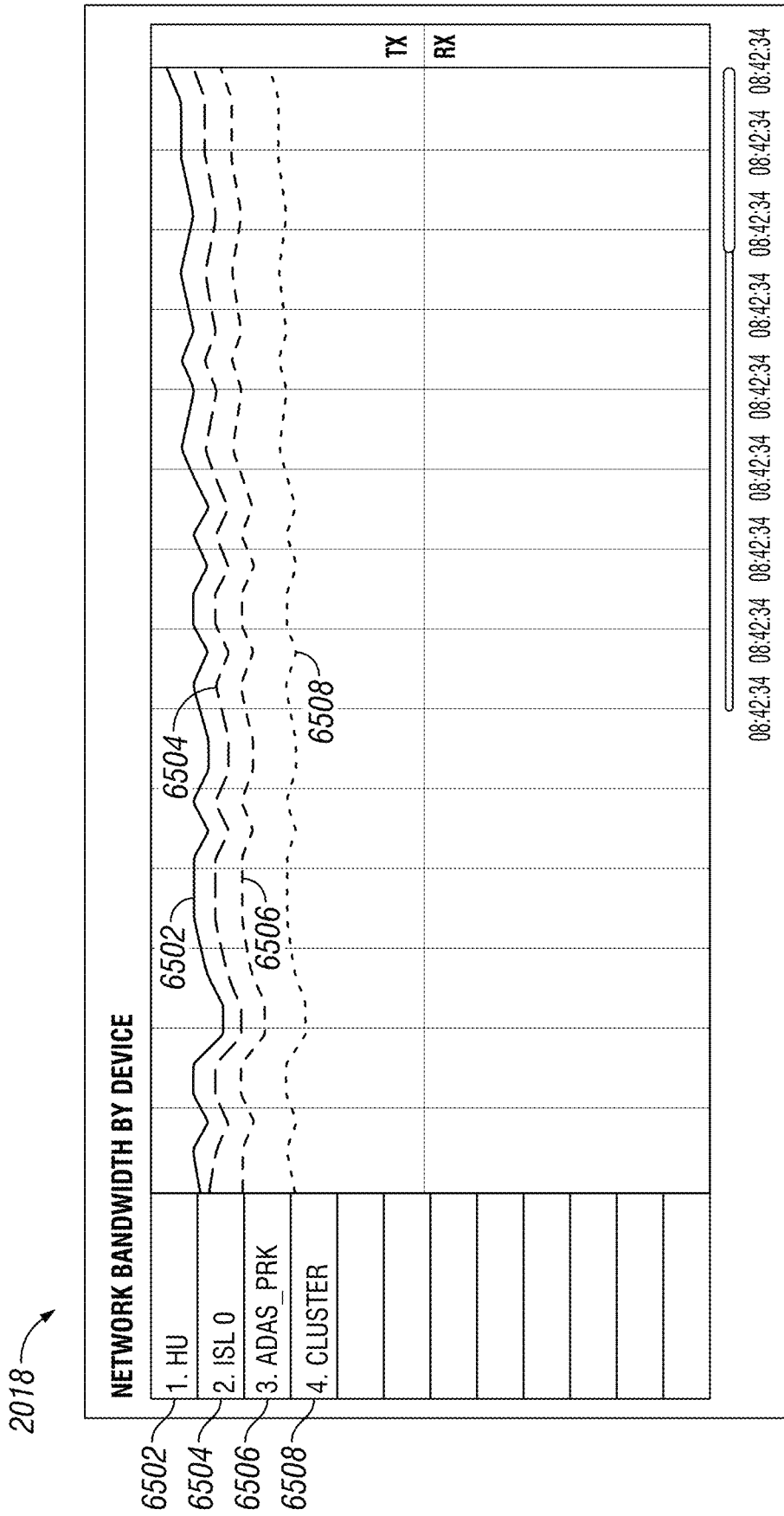
FIG. 65 is a schematic, illustrative, example of visualization data.
Figure 66:
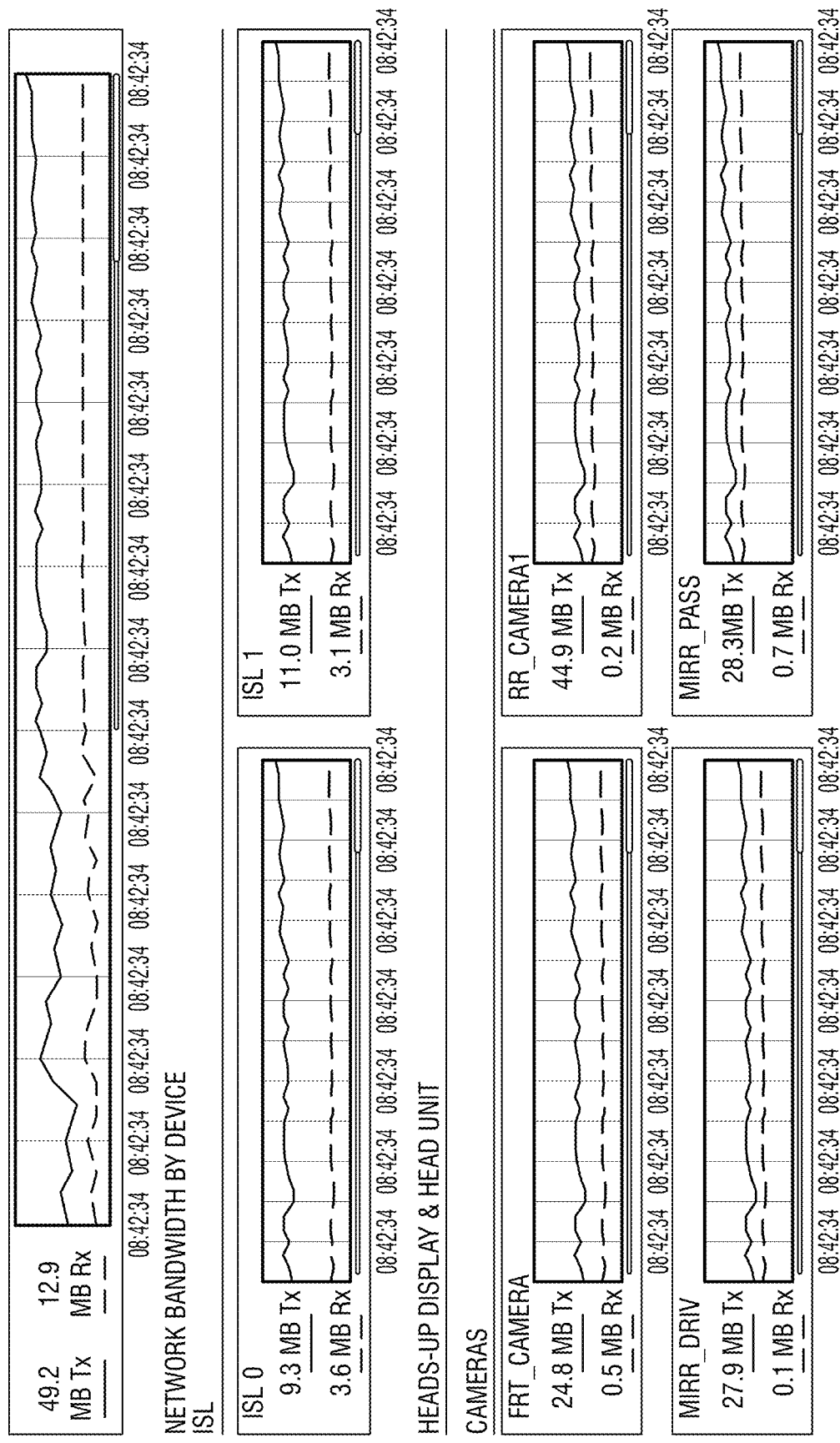
FIG. 66 is a schematic, illustrative, example of visualization data.

Referencing FIG. 65, an example visualization data 6118 is depicted including a network activity profile. The example of FIG. 65 depicts network bandwidth utilization for a selected network zone, with a number of utilization plots 6502, 6504, 6506, 6508, each associated with an end point of the selected network zone. Referencing FIG. 66, an example visualization data 6118 is depicted including a network activity profile for a selected network zone. The example of FIG. 65 depicts a total activity for the network zone at the top, a network bandwidth utilization for particular devices (e.g., ISL 0, ISL 1) in the middle, and network bandwidth utilization for a vehicle controller (e.g., a Heads-up display and head unit) at the bottom, with the network bandwidth utilization for the vehicle controller further depicting utilization for a number of specific devices broken out (e.g., various cameras, in the example). The example of FIGS. 65 and 66 are non-limiting, and network activity profile data may be determined and displayed in any manner, and further may be grouped and/or sub-grouped in any manner, including by end point, flow, application, vehicle function, vehicle controller, etc.

An example vehicle communication circuit 6102 interprets the vehicle communications data 6116 by performing one or more operations such as: interpreting the vehicle communications data 6116 from a policy 1606 stored on a memory positioned on the vehicle and communicatively coupled to the vehicle communication circuit 6102; receiving the vehicle communications data 6116 from a service tool communicatively coupled to vehicle communication circuit 6102; receiving the vehicle communications data 6116 from an application communicatively coupled to the vehicle communication circuit 6102; or receiving the vehicle communications data 6116 from a monitoring tool communicatively coupled to the vehicle communication circuit 6102.

In certain embodiments, retrieving vehicle communications data 6116 including traffic monitoring, network activity, and/or messages corresponding to an end point of a network zone and/or corresponding to a port of a network zone includes mirroring traffic from a first port of a network zone to a second port of the network zone, and monitoring the second port of the network zone to determine the vehicle communications data 6116. For example, a first port of the second network zone 6110 may correspond to an end point to be monitored, where the operation to retrieve the vehicle communications data 6116 includes an operation to mirror the first port of the second network zone 6110 to a second port of the second network zone 6110 (e.g., where the vehicle communications circuit 6102 and/or a monitoring tool such as external tool 6114 are communicatively coupled to the second port), and monitoring the second port of the second network zone 6110 to determine the vehicle communications data 6116.

Figure 67:
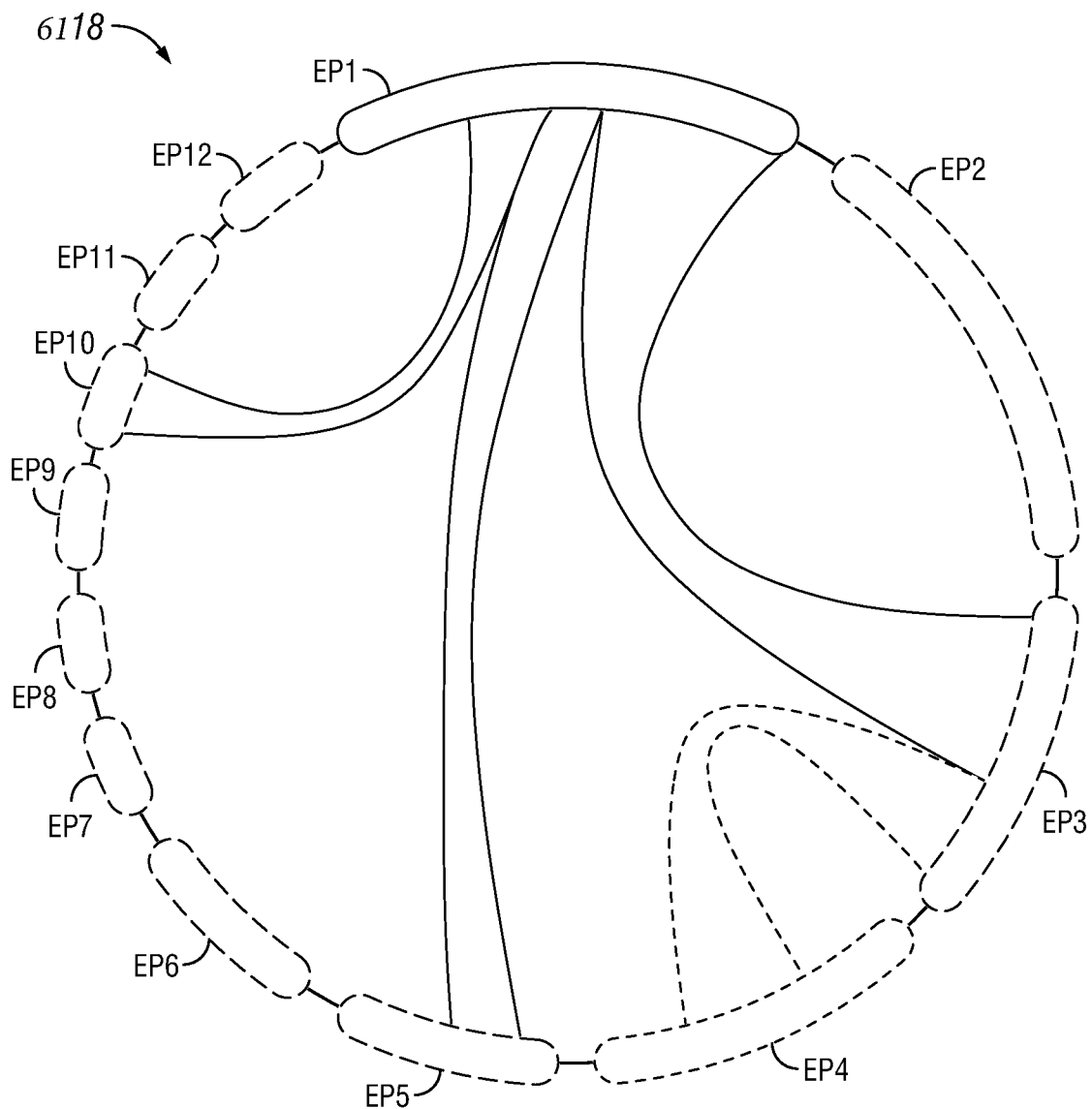
FIG. 67 is a schematic, illustrative, example of visualization data.
Figure 68:
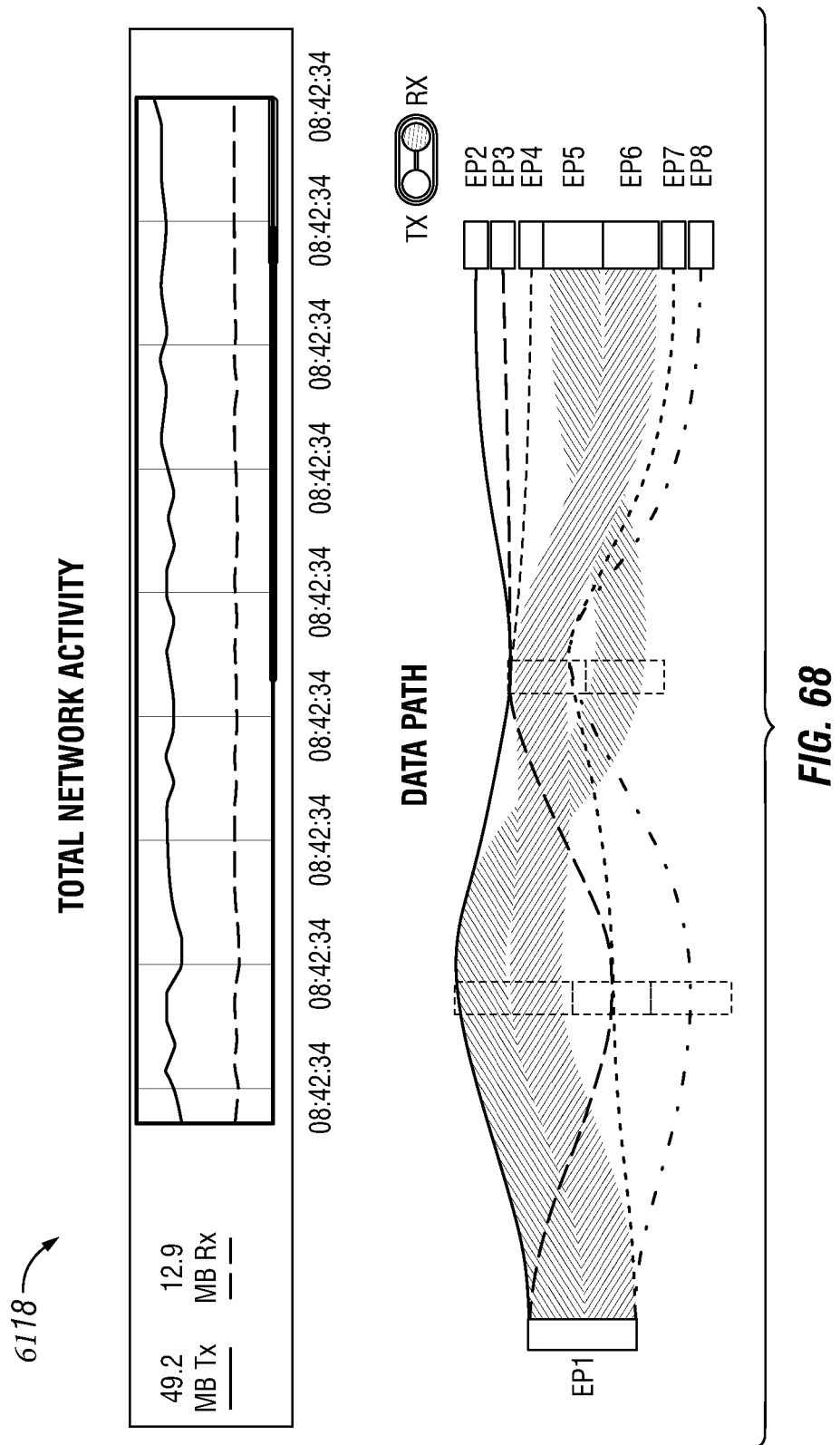
FIG. 68 is a schematic, illustrative, example of visualization data.

Referencing FIG. 67, an example visualization data 6118 is depicted including data flows between selected network participants (e.g., end points, flows, applications, vehicle controllers, etc.). The example of FIG. 67 depicts data flows between selected end points, in the example depicting data flows with the "EP1" (e.g., an end point, such as a head unit) and the other end points (e.g., EP3, EPS, EP10, in the example, such as an ADAS related component, a parking controller, etc.). The example of FIG. 67 allows monitoring of the network to determine if expected data flows are occurring, if off-nominal data flow is occurring, and the like. Referencing FIG. 68, an example visualization data 6118 is depicted showing total network activity for a selected network zone (at the top), and data pathing from a selected end point to other end points (the data path at the bottom) in the system. In the example, user interface elements may be provided, for example allowing selection of a time (top depiction) that is utilized for the data pathing depiction at the bottom, allowing for selection of the target end point (e.g., EP1 at the left), and/or whether transmission, receipt, or both, are depicted. In certain embodiments, the visualization data 6118 may be presented as a user interface, for example allowing a user to select components and have the related data flows depicted. It can be seen that a visualization such as those depicted in FIGS. 67 and 68 can be utilized to confirm expected operations, to diagnose issues (e.g., degraded operation of a component, diagnoses of a network issue, and/or detect off-nominal operating conditions such as those indicated by communication between components that more substantially communicate during certain off-nominal operating conditions). Additionally or alternatively, a visualization such as that depicted in FIG. 67 can be utilized to: improve network topology design, hardware selection, and/or protocol selection; to consolidate applications, flows, vehicle functions, etc. on vehicle controllers (e.g., to reduce network traffic requirements); and/or to identify potential redundant or unnecessary network communications.

Referencing FIG. 62, an example local address table 6200 is depicted, schematically depicted configuration information consistent with various embodiments of the present disclosure. The example local address table 6200 may be part of the policy 1606 and/or a configuration file (e.g., accessible in whole or part by interface circuit(s) and/or a configuration circuit). The local address table 6200 may be provided as a data structure in a memory location accessible to the interface circuit(s), configuration circuit(s), and/or other implementing components described throughout the present disclosure. The local address table 6200 may be provided as a distributed data structure, with portions of the local address table 6200 provided as a data structure in memory location(s) accessible to the implementing components. The example local address table 6200 is depicted schematically to provide an illustration of the type of local address information that may be utilized to implement aspects of the present disclosure, but the details of the stored information and the organization of data structures implementing the local address table 6200 may be configured according to the implemented embodiments. The example local address table 6200 includes an end point identifier 6202, which may be a local identifier of end points present in the system. In a further example, non-local end point identifiers (not shown) may further be included, for example to allow external devices to reference end points using an industry-standard terminology, or other selected terminology. The example local address table 6200 includes a network zone identifier 6204, for example indicating which network zone the end point is considered to be a part of. The example address table 6200 further includes a local address value 6206, for example indicating how the respective end point is addressed on the appropriate network zone. In certain embodiments, the local address value 6206 may be a TCP/IP address, a port number, or other identifier. In certain embodiments, for example on a logical bus architecture such as a CAN bus, the local address value 6206 may include a message identifier, such as a value included in a message that indicates the intended recipient (or the source) of messages to or from the end point. The example local address table 6200 includes an external address value 6208, which may, for example, include an address utilized to identify the end point by external devices.

The utilization of the external address value 6208 allows for external devices to abstract knowledge of the end point, including local addressing and/or associated network zones, from operations to utilize and/or collect data from the corresponding end points. It can be seen that further information may be included in a local address table 6200, such as additional external address values (e.g., to allow for multiple external addresses to associate with a given end point of the system), and/or the inclusion of one or more additional non-local end point identifiers (e.g., to allow for multiple industry standards, proprietary nomenclature, informal nomenclature, etc., to successfully associate with a given end point of the system). In certain embodiments, one or more of the external addresses 6208 and/or non-local end point identifiers may further be associated with versions (e.g., interface versions, vehicle model descriptions, etc.), allowing for the implementing components using the local address table 6200 to interpret data commands and/or requests from external applications, algorithms, etc. to properly associate a desired end point to the data command and/or request, as changes occur within the vehicle (e.g., end points move between network zones and/or addresses) or external to the vehicle (e.g., external applications are updated for updated vehicle configurations that are no longer applicable to the specific vehicle of the system).

It can be further seen that the utilization of the local address table 6200 allows for multiple addressing support for end points of the vehicle, for example providing both IPv4 and IPv6 addressing for end points of the vehicle. In certain embodiments, the local address table 6200 can be expanded, or alternatively a separate data structure maintained, allowing for association of end points with applications, flows, vehicle functions, vehicle controllers, APNs, external data routing paths, network zone trajectories, or the like. The example local address table 6200 may be utilized in a network address translation (NAT) operation. Accordingly, a given application such as "route management" can be associated with particular end points of the vehicle, and the associations can survive through a movement of the end point (e.g., from one network zone to another network zone). The utilization of a local address table 6200, and/or extended or alternate data structures as described herein, allows for configuration of priorities, permissions, subscription management (both publishing of services and subscribing to services), and/or any other communication regulating activities as set forth herein.

In certain embodiments, the local address table 6200 can be expanded, or alternatively a separate data structure maintained, allowing for addresses of external devices to be configured according to end points, applications, flows, vehicle functions, and/or vehicle controllers. For example, a given vehicle function may be allowed access to a given external resource (e.g., a routing function that accesses an external resource having maps, traffic reporting, etc.), with an associated external address associated with the vehicle function that provides access to the external resource. In the example, other vehicle functions may not be allowed access to the given external resource, with an associated external address associated with those vehicle functions (and/or with a lacking association for those other vehicle functions, depending upon the implementation), such that when those other vehicle functions request access to the external resource, a default address, protected space, null communication, or other selected behavior is instead implemented. Accordingly, a first application of the vehicle requesting accessing to an external resource, such as https://www.google.com may receive a typical expected access to the external IP address corresponding to the Google website, where a second application of the vehicle requesting access to the same external resource may receive an access denied indication, a default external resource indication (e.g., a cloud-based resource in a protected space indicating the requested resource is not permitted), or other selected response from the system. Accordingly, the local address table 6200, and/or an expanded, extended, or alternate version thereof, may be utilized as a local DNS and/or an external DNS. In certain embodiments, for example where access to an external resource is requested, where the external DNS does not have an address for the resource, and where a permission to the requestor (e.g., end point, application, flow, vehicle function, and/or vehicle controller) is not denied to access the external resource, an off-vehicle external DNS (e.g., on a cloud server, from an internet provider, etc.) may be accessed to provide the external address. In certain embodiments, the on-vehicle external DNS may be updated based on an address retrieved from the off-vehicle external DNS.

Figure 70:
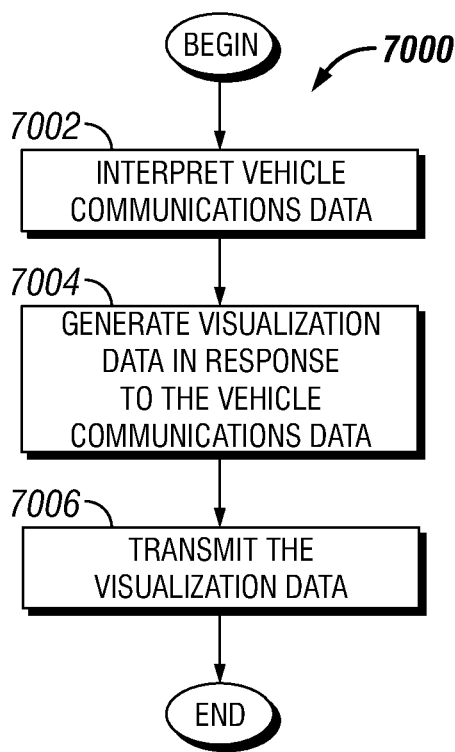
FIG. 70 is a schematic flow diagram of a procedure for providing visualization data.

Referencing FIG. 70, an example procedure 7000 to transmit visualization data is schematically depicted. The example procedure 7000 includes an operation 7002 to interpret vehicle communications data, an operation 7004 to generate visualization data in response to the vehicle communications data, and an operation 7006 to transmit the visualization data.

Figure 71:
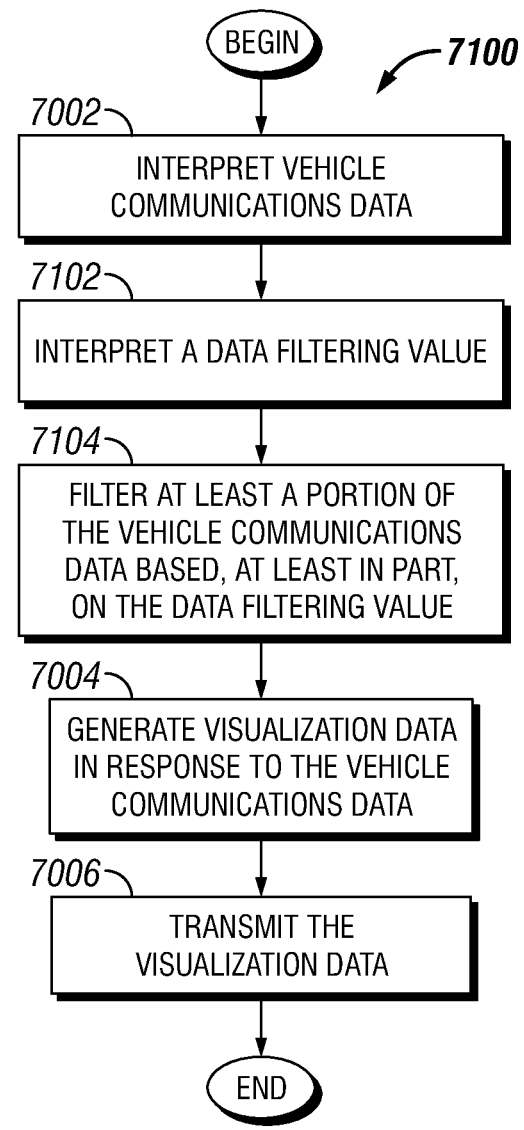
FIG. 71 is a schematic flow diagram of a procedure for providing visualization data.

Referencing FIG. 71, an example procedure 7100 to transmit visualization data is schematically depicted. The example procedure 7100 includes an operation 7002 to interpret vehicle communications data, an operation 7102 to interpret a data filtering value, and an operation 7104 to filter at least a portion of the vehicle communications data based, at least in part, on the data filtering value. The example procedure 7100 further includes an operation 7004 to generate visualization data in response to the vehicle communications data, and an operation 8006 to transmit the visualization data.

Figure 77:
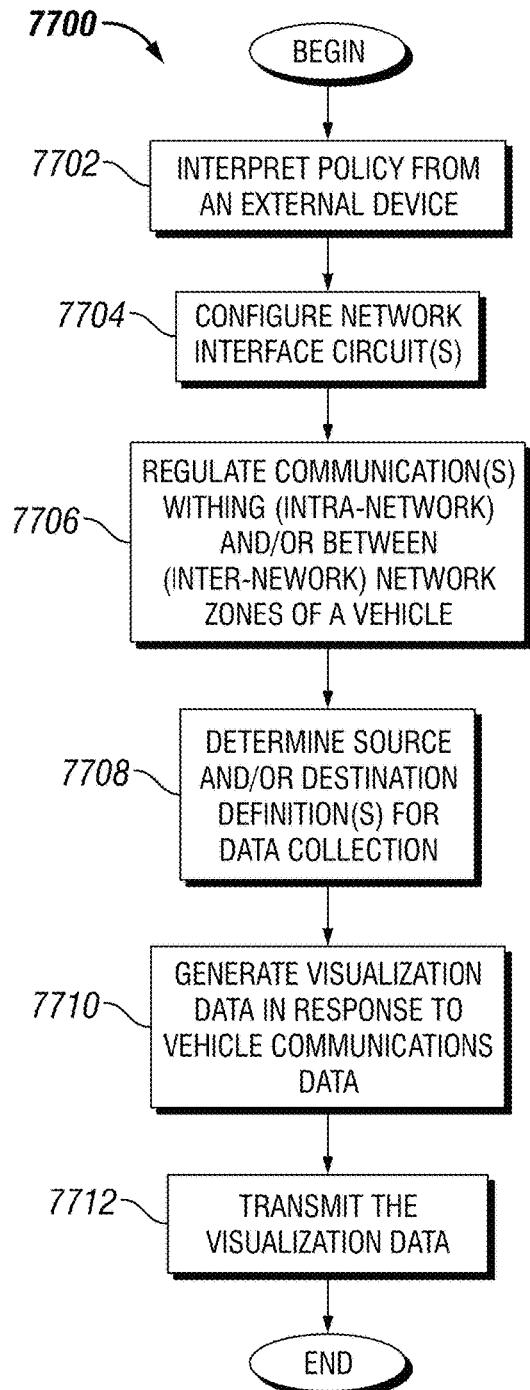
FIG. 77 is a schematic flow diagram of a procedure for providing visualization data.

Referencing FIG. 77, an example procedure 7700 to transmit visualization data to an external device and/or a user device is schematically depicted. The example procedure 7700 includes an operation 7702 to interpret a policy from an external device, and an operation 7704 to configure network interface circuit(s) in response to the policy. The example procedure 7700 includes an operation 7706 to regulate communications on the vehicle (inter-network and/or intra-network communications), and an operation 7708 to determine source and/or destination definitions for data collection. The example procedure 7700 includes an operation 7710 to determine visualization data in response to the vehicle communications data (e.g., collected in response to the policy, and the source/destination definitions for the collected data), and an operation 7712 to transmit the visualization data (e.g., to an external device, user device, data storage, application, etc.).

Figure 78:
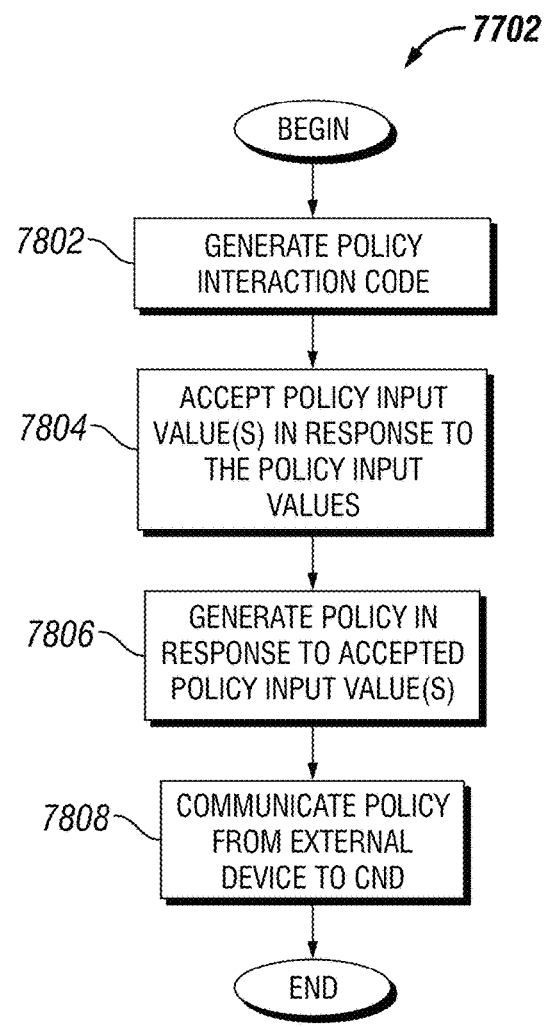
FIG. 78 is a schematic flow diagram of a procedure for updating a policy.

Referencing FIG. 78, an example procedure 7702 to interpret a policy for configuring regulation of inter-network and/or intra-network communications is schematically depicted. The example procedure 7702 includes an operation 7802 to generate a policy interaction code, an operation 7804 to accept policy input value(s) in response to the policy interaction code, and an operation 7806 to generate a policy in response to the accepted input value(s). The example procedure 7702 further includes an operation 7808 to communicate the generated policy to a CND using an external device.

Figure 72:
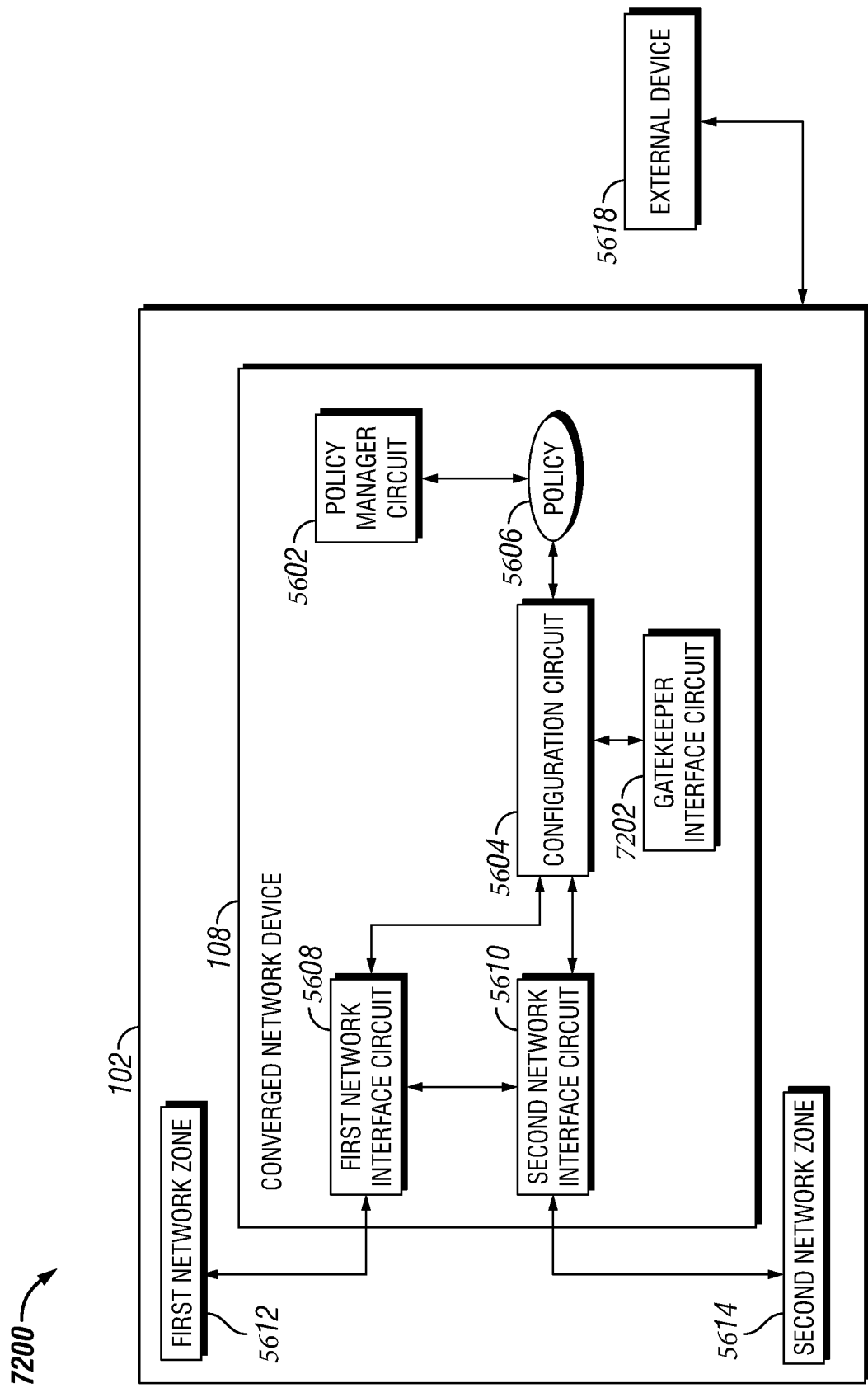
FIG. 72 is a schematic diagram of a system for regulating network communications of a vehicle.

Referencing FIG. 72, an example system 7200 includes a vehicle 102 having a first network zone 5612 and a second network zone 5614 is depicted, where the first network zone 5612 and the second network zone 5614 are of different types. The example of FIG. 72 includes a CND 108 interposed between the network zones 5612, 5614. The example CND 108 includes a policy manager circuit 5602 that interprets a policy 5606 including a network regulation description, a configuration circuit 5604 that configures a first network interface circuit 5608 in response to the network regulation description, where the first network interface circuit 5608 regulates communications between end points of the first network zone 5612 and end points of the second network zone 5614. Additionally or alternatively, the configuration circuit 5604 configures a gatekeeper interface circuit 7202 in response to the network regulation description, where the gatekeeper interface circuit 7202 regulates communications between end points of at least one of the network zones 5612, 5614 and external communication portal(s) and/or the external device 5618. An example first network interface circuit 5608 includes a CEG, where the first network zone 5612 is not a primary network (e.g., the first network zone 5612 is a CAN network, and the second network zone 5614 is an ethernet network), and where the first network interface circuit 5608 is communicatively coupled to a port of the second network zone 5614 to send and receive communications that are passed between the network zones 5612, 5614.

Figure 73:
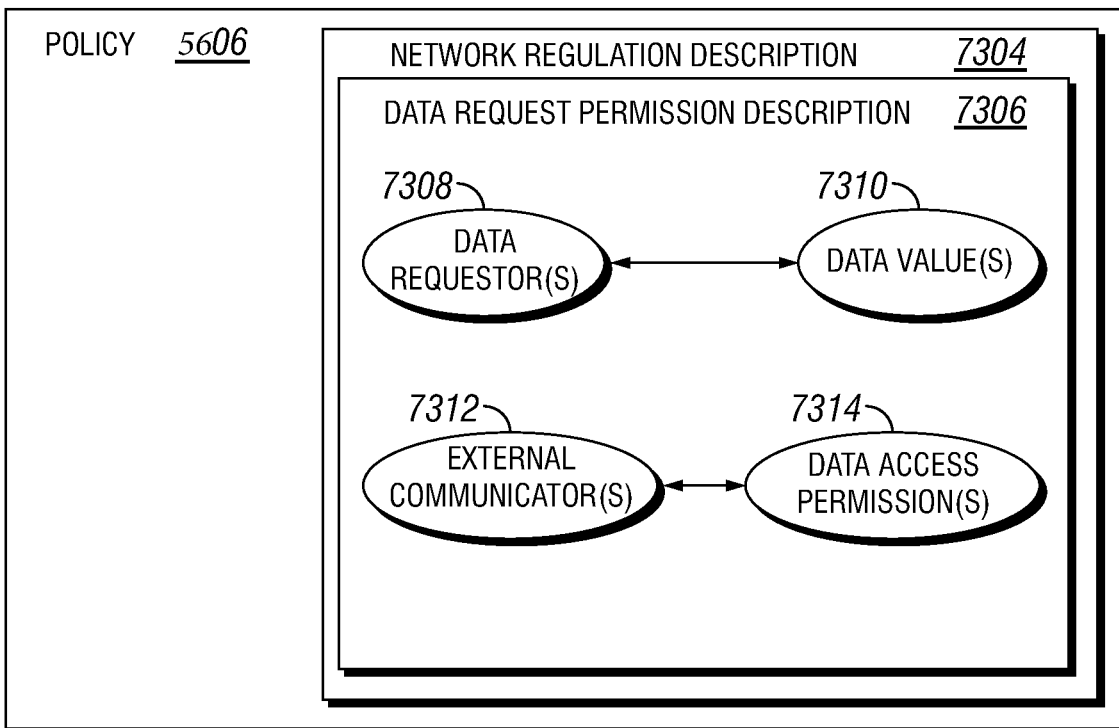
FIG. 73 is a schematic, illustrative, example of a policy.

Referencing FIG. 73, an example network regulation description 7304 includes a data request permission description 7306 including data values 7310 associated with data requestors 7308 (e.g., end points each on one of the network zones 5612, 5614). An example first network interface circuit 5608 regulates communications between end points of the first network zone 5612 and the second network zone 5614 in response to the data request permission description 7306, for example limiting associated data requestors 7308 to authorized data values 7310, and/or preventing associated data requestors 7308 from accessing unauthorized data values 7310. In certain embodiments, the first network interface circuit 5608 further regulates communications between end points of the first network zone 5612 (e.g., from a first end point to a second end point, both on the first network zone 5612) in response to the data request permission description 7306.

An example system 7200 further includes the configuration circuit 5604 configuring the second network interface circuit 5610 in response to the network regulation description, where the second network interface circuit 5610 regulates communications of end points of the second network zone 5614. Again referencing FIG. 73, an example second network interface circuit 5610 regulates communications between end points of the second network zone 5614 and the first network zone 5612 in response to the data request permission description 7306, for example limiting associated data requestors 7308 to authorized data values 7310, and/or preventing associated data requestors 7308 from accessing unauthorized data values 7310. In certain embodiments, the second network interface circuit 5610 further regulates communications between end points of the second network zone 5614 (e.g., from a first end point to a second end point, both on the second network zone 5614) in response to the data request permission description 7306.

An example system 7200 further includes the configuration circuit 5604 configuring a gatekeeper interface circuit 7202 in response to the network regulation description 7304, where the gatekeeper interface circuit 7202 regulates communications between end points of both the first network zone 5612 and the second network zone 5614 with an external device 5618. The example external device 5618 may be coupled to the first network zone 5612, the second network zone 5614, or both. Additionally or alternatively, the external device 5618 may be coupled to a transceiver (not shown) of the vehicle 102, which may be a cellular, WiFi, and/or Bluetooth transceiver. In certain embodiments, the transceiver may be communicatively coupled to a network zone, for example as a port on one of the network zones. In certain embodiments, the first network zone 5612 is a non-primary network zone, the second network zone 5614 is a primary network zone, and the transceiver is communicatively coupled to the second network zone 5614. In a further example embodiment, the second network zone 5614 is an ethernet network, and the transceiver is coupled to the second network zone 5614 by communicating with the second network interface circuit 5610 through a port of a CES including the second network interface circuit 5610.

Example and non-limiting external devices 5618 include one or more of: a cloud server based application, a web based application, and/or a mobile device application. Again referencing FIG. 73, an example data request permission description 7306 includes a data access permission 7314 associated with each one of a number of external communicators 7312. Example external communicators 7312 include identified external devices 5618, external applications, external flows, external entities (e.g., service, manufacturer, owner, operator, etc.), external addresses, etc. Example and non-limiting data access permissions 7314 include permissions to communicate with particular end points, flows, applications, vehicle functions, network zones, vehicle controllers, and the like. In certain embodiments, the data access permissions 7314 may be distinct for transmitted and received communications—for example a given external communicator 7312 may not have permissions to request data from a first end point on the vehicle, but the first end point on the vehicle may have permissions to send data to the given external communicator 7312. An example data request permission description 7306 includes data access permissions associated with one or more of: an external device; an external communicator; a flow associated with an end point, external device, and/or external communicator; a vehicle function associated with an end point, external device, and/or external communicator; and/or an application associated with an end point, external device, and/or external communicator. Example and non-limiting data access permissions 7314 include one or more of: an ability to request, transmit, and/or publish data; an ability to request, transmit, and/or particular data values; and/or an external communication bandwidth limitation (e.g., a data rate, aggregated data amount per unit time, and/or a share of an available bandwidth). An example system 7200 further includes the gatekeeper interface circuit 7202 regulating communications between end points of the network zones 5612, 5614 with external devices 5618 (and/or external communicators 7312) in response to the data request permission description 7306 and/or the data access permissions 7314.

An example gatekeeper interface circuit 7202 further regulates communications with external device(s) 5618 (and/or external communicator(s) 7312) in response to one or more of: a flow associated with the regulated communication(s) (e.g., adjusting permissions based on a priority of the associated flow, a role of the associated flow and/or current operation conditions, etc.); a data type associated with the regulated communication(s) (e.g., prioritizing or de-prioritizing certain data types, limiting certain data types to certain communication conditions such as availability of high data rate communications, typing data according to criteria such as age of the data and adjusting permissions accordingly, etc.); a data service provider associated with the regulated communication(s) (e.g., configuring data rate, bandwidth, and/or aggregate data values in response to an associated data service provider for the data); a vehicle function associated with the regulated communication(s) (e.g., prioritizing certain vehicle functions); and/or a connection type of a communicative coupling with the external device(s) 5618 (and/or external communicator(s) 7312) (e.g., allowing for greater communication rates when a high rate and/or low cost data connection is available).

An example system 7200 includes a configuration circuit 5604 that receives a policy update (e.g., from the policy manager circuit 5602) including a change to the network regulation description 7304, and updating the configuration(s) of the first network interface circuit 5608, second network interface circuit 5610, and/or gatekeeper interface circuit 7202 in response to the change to the network regulation description 7304. In a further example, the policy manager circuit 5602 interprets an authorization associated with the policy update, for example based on a permission of an external device 5618 and/or external communicator 7312 providing the policy update. The example policy manager circuit 5602 suppresses the policy update, in whole or part, in response to the authorization indicating the requesting unit (e.g., the external device 5618 and/or external communicator 7312) is not authorized to make the change to the network regulation description of the policy update. In certain embodiments, policy manager circuit 5602 may additionally or alternatively provide one or more policy notifications 5620, to the requesting unit and/or to other external devices 5618 or external communicators 7312, in response to suppressing or partially suppressing the policy update (e.g., reference FIG. 56 and the related description). Example and non-limiting requesting units include one or more of: an entity associated with the policy update; an application associated with the policy update; a flow associated with the policy update; a vehicle function associated with the policy update; an identifier of the external device communicating the policy update; and/or an identifier of an external communicator associated with the policy update.

Figure 74:
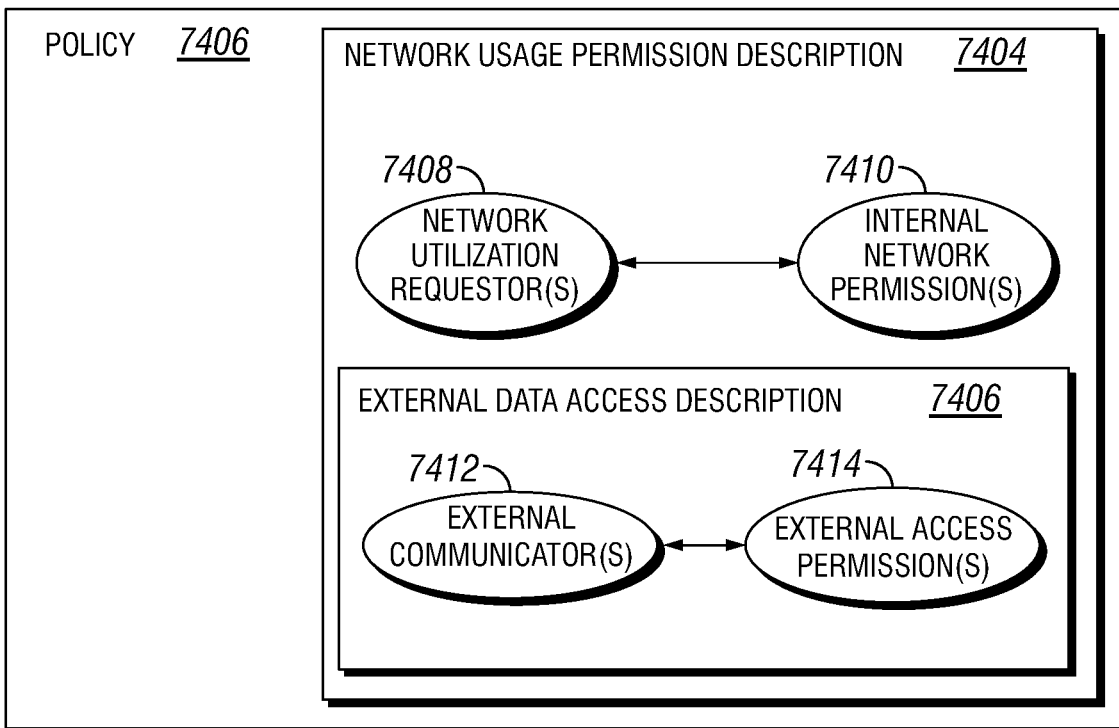
FIG. 74 is a schematic, illustrative, example of a policy.

Again referencing FIG. 72, an example policy manager circuit 5602 interprets a policy 5606 including a network usage permission description 7404 (reference FIG. 74). An example network usage permission description 7404 includes an external data access description 7406, where the configuration circuit 5604 further configures the gatekeeper interface circuit 7202 in response to the external data access description 7406, and where the gatekeeper interface circuit 7202 regulates communications with an external device 5618 in response to the external data access description 7406. An example external data access description 7406 includes external access permission(s) 7414 associated with external communicator(s) 7412, such as identified external devices 5618, external applications, external flows, external entities (e.g., service, manufacturer, owner, operator, etc.), external addresses, etc. In certain embodiments, external communicators(s) 7412 include one or more local communicating devices requesting an external communication, such as a flow of the vehicle, an application, a network zone of the vehicle, an end point of a network zone, or the like. For example, an example gatekeeper interface circuit 7202 regulates external communications based on a flow association of a communicating one of the end points of the first network zone and/or the second network zone (e.g., limiting external communications to permitted communications according to the external access permission(s) 7414, and/or allowing external communications that are not excluded by the external access permission(s) 7414). An example gatekeeper interface circuit 7202 regulates external communications based on an application association of a communicating device (e.g., an external device 5618, and/or an end point), for example limiting external communications to permitted communications according to the external access permission(s) 7414 and/or allowing external communications that are not excluded by the external access permission(s) 7414. An example gatekeeper interface circuit 7202 regulates external communications based on a network zone association of a communicating device (e.g., a network zone associated with an end point that requests the external communication, or source zone; and/or that is the target of an external communication, or destination zone), for example limiting external communications to permitted communications according to the external access permission(s) 7414 and/or allowing external communications that are not excluded by the external access permission(s) 7414. In certain embodiments, the first network zone and the second network zone may be separate virtual local area networks of the vehicle, and may have separate external access permissions 7414.

An example policy 5606 includes an external data quantity description (not shown), where the configuration circuit 5604 configures the gatekeeper interface circuit 7202 in response to the external data quantity description. An example external data quantity description includes a data limit for an application, and where the gatekeeper interface circuit further regulates external communications based on an association of a communicating device with the application. An application may be a vehicle operation related application (e.g., an application operating on the vehicle, and/or operating on an external device with communicative interactions with the vehicle) or an application not related to vehicle operation (e.g., a infotainment application, an operator application, web browsing utilizing a network zone of the vehicle, a third party application communicating with the vehicle, etc.). An example external data quantity description includes a data limit for an end point of one of the network zones, and the gatekeeper interface circuit regulates communications based on a source or a destination end point of regulated communications. An example external data quantity description includes a data limit for a flow, and the gatekeeper interface circuit regulates external communications based on an association of a communicating device with the flow.

Example and non-limiting data limits include one or more of: an amount of communicated data corresponding to a selected time period (e.g., MB per hour, GB per month, etc.); an amount of communicated data corresponding to a selected vehicle operating condition (e.g., MB per trip; data rate during idling operation; data rate at rated operation; data rate during high transient operation; etc.); an amount of communicated data corresponding to a data provider associated with the application, end point, and/or flow; a bandwidth share of the transceiver utilized for the communications; a bandwidth volume of the transceiver utilized for the communications; a bandwidth share of a channel of the transceiver (e.g., where the transceiver includes more than one channel, where the bandwidth share is limited for channel(s) servicing external communications for the application, end point, and/or flow); and/or a bandwidth volume of a channel of the transceiver (e.g., where the transceiver includes more than one channel, where the bandwidth volume is limited for channel(s) servicing external communications for the application, end point, and/or flow).

Figure 75:
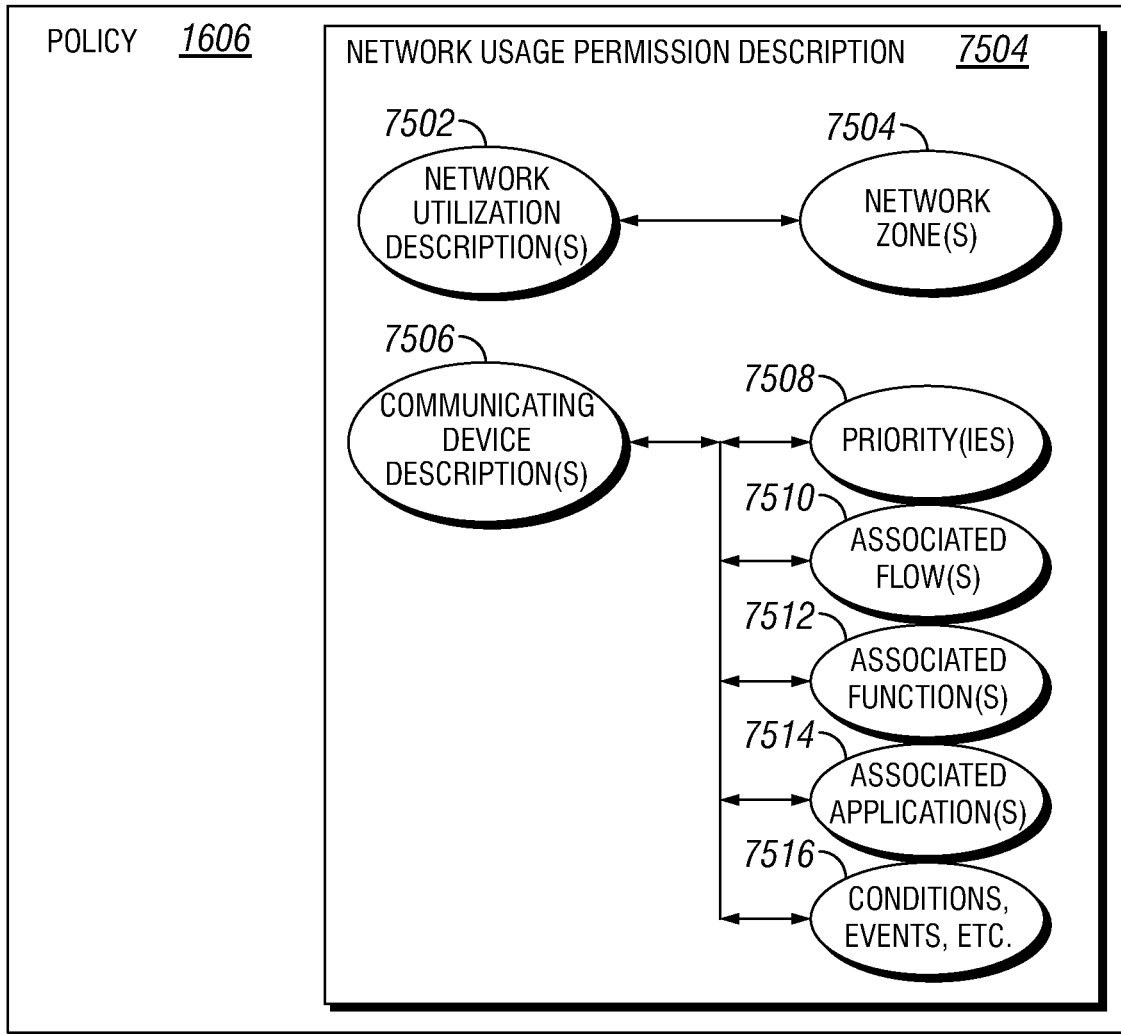
FIG. 75 is a schematic, illustrative, example of a policy.

Referencing FIG. 75, an example network usage permission description 7504 includes a network utilization description 7502 corresponding to a network zone 7504, and a communicating device description 7506 corresponding to a local communicating device, such as an end point, a flow, a vehicle function, sensor device, and/or an application. In the example, the gatekeeper interface circuit 7202 further regulates external communications based on the network utilization description 7502, and an associated communicating device (e.g., corresponding to the communicating device description 7506) with the regulated communication. An example network utilization description 7502 includes determining a priority 7508, an associated flow 7510, an associated vehicle function 7512, an associated application 7514, and/or an associated condition or event 7516 (e.g., a triggering event to implement an aspect of the policy 5606, vehicle or other conditions to be present to allow implementation of the aspect of the policy 5606, and/or vehicle or other conditions which, if present, adjust or suppress an aspect of the policy 5606) with the communicating device to regulate the external communications. The network utilization description 7502 may include one or more of: a bandwidth of the network zone 7504 available to be utilized to support external communications; a data rate on the network zone 7504 available to be utilized to support external communications; a bandwidth limitation of the network zone 7504 (e.g., where external communications would cause a general exceedance, they may be suppressed or reduced); and/or a data rate limitation of the network zone 7504 (e.g., where external communications would cause a general exceedance, they may be suppressed, reduced, or delayed). In certain embodiments, priorities 7508 or other information related to the external communications may be compared with priorities of on-vehicle communications utilizing the network zone, and an external communication may take priority over the on-vehicle communication, which may be suppressed, reduced, or delayed until the external communication is serviced. In certain embodiments, service requirements (e.g., QoS parameters) for on-vehicle end points, flows, applications, vehicle functions, etc. (e.g., local communicating devices), may be considered in determining an external communication permission, and the external communication may be allowed while the service requirements can be met.

Figure 76:
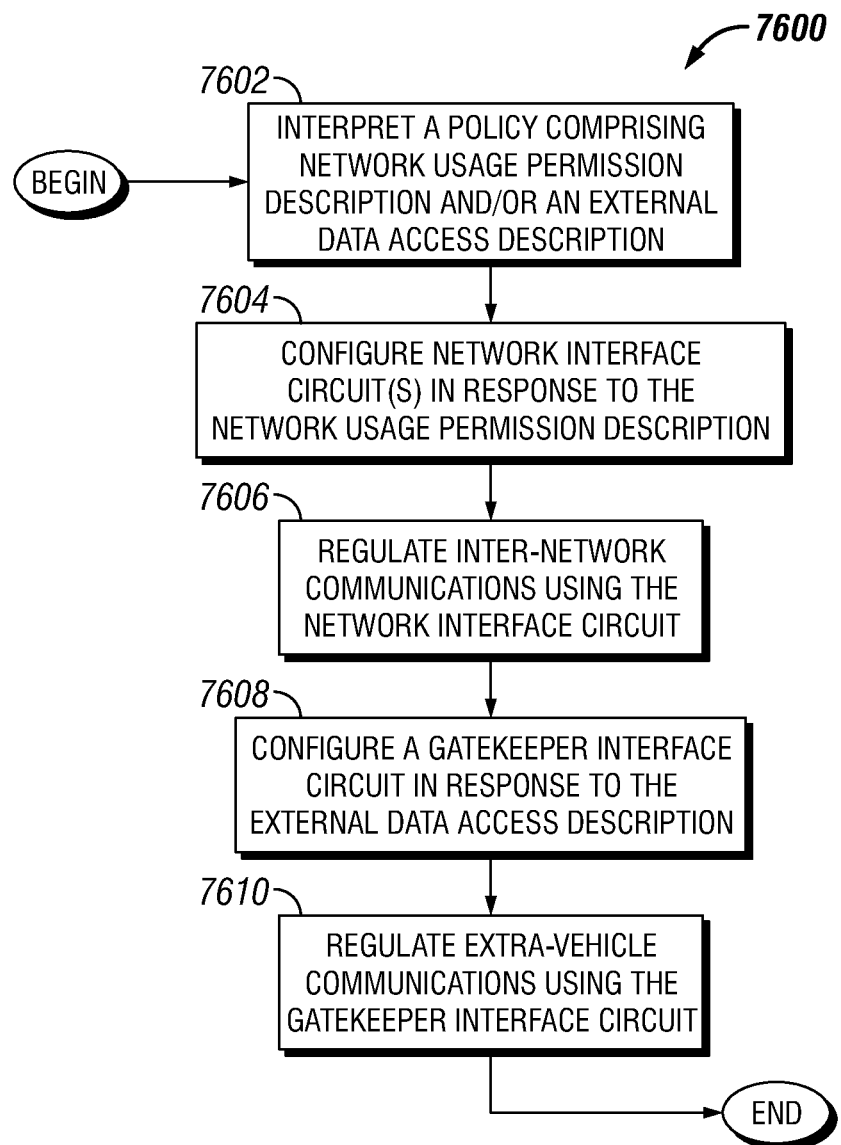
FIG. 76 is a schematic flow diagram of a procedure for regulating network communications of a vehicle.

Referencing FIG. 76, an example procedure 7600 to regulate extra-vehicle communications is schematically depicted. The example procedure 7600 includes an operation 7602 to interpret a policy including a network usage permission description and/or an external data access description, an operation 7604 to configure network interface circuit(s) in response to the network usage permission description, and an operation 7606 to regulate intra-network and/or inter-network communications using the network interface circuit(s). The example procedure 7600 includes an operation 7608 to configure a gatekeeper interface circuit in response to external data access description, and an operation 7610 to regulate extra-vehicle communications using the gatekeeper interface circuit.

Figure 79:
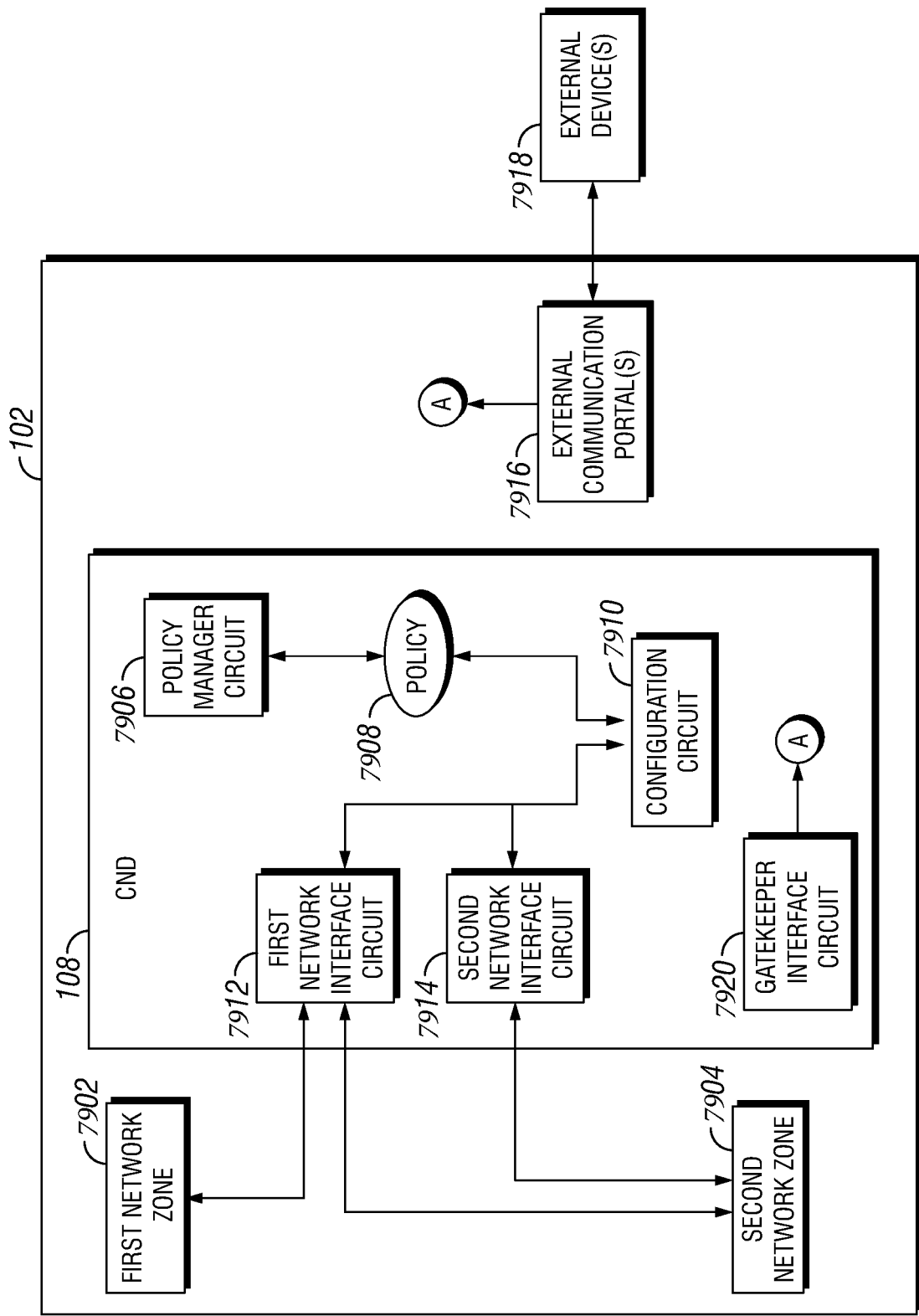
FIG. 79 is a schematic diagram of a system for regulating network communications of a vehicle.

Referencing FIG. 79, an example system for controlling inter-network communications, intra-network communications, and/or extra-vehicle communications utilizing a scheduled policy scheme is schematically depicted. The example system includes a vehicle 102 having at least one network (a first network zone 7902 and a second network zone 7904, in the example of FIG. 79), a policy manager circuit 7906 that interprets a policy 7908 including external data communication parameters, such as an external data routing description and/or an external data service description. The example system includes a configuration circuit 7910 that configures a gatekeeper interface circuit 7920 in response to the policy 7908, and that regulates communications between end points of the network zones 7902, 7904 and an external communication portal 7916. The external communication portal 7916 is selectively coupled to an external device 7918. The external communication portal 7916 includes an external communication portal 7916 as set forth herein, including at least any one or more of the examples depicted in relation to FIG. 41 and the related description. In the example of FIG. 79, the gatekeeper interface circuit 7920 is depicted as coupled to the external communication portal(s) 7916. However, the gatekeeper interface circuit 7920 may regulate communications in any manner, for example by further configuring the network interface circuit(s) 7912, 7914 to allow selected communications, and/or communications having a selected processing, encapsulation, data file format, communication protocol, authorization, and/or any other regulation descriptions as described throughout the present disclosure. In the example of FIG. 79, the policy manager circuit 7906, configuration circuit 7910, and network interface circuit(s) 7912, 7914 are depicted as positioned on the CND 108. As described elsewhere herein, the CND 108 may provide instructions or otherwise regulate components, and the depicted components (and/or the CND 108) may be distributed elsewhere on the vehicle 102 separate, in whole or part, from the CND 108.

Figure 80:
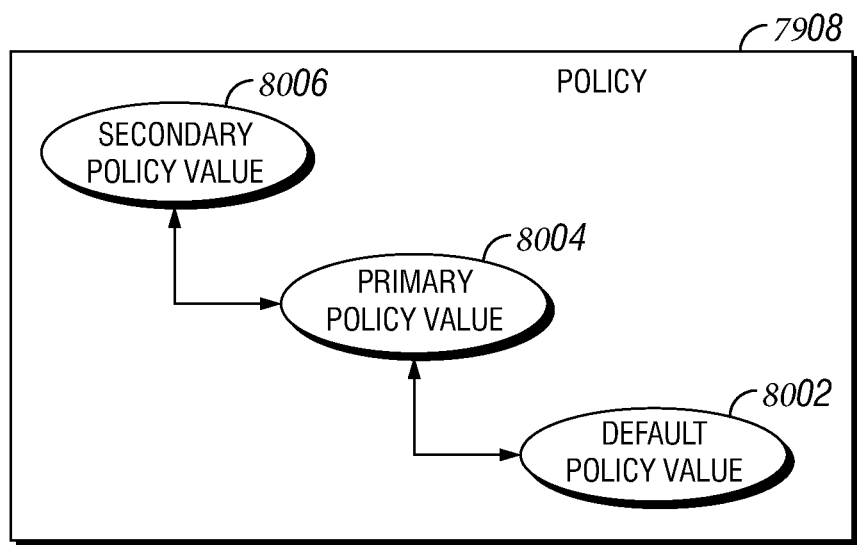
FIG. 80 is a schematic, illustrative, example of a policy.

Referencing FIG. 80, an example policy 7908 includes one or more of a secondary policy value 8006, a primary policy value 8004, and/or a default policy value 8002. An example configuration circuit 7910 configures the gatekeeper interface circuit 7920 in response to the default policy value 8002 if there is no primary policy value 8004 and/or secondary policy value 8006 present (and/or if the primary policy value 8004 and/or secondary policy value 8006 are not valid), in response to the primary policy value 8004 if there is no secondary policy value 8006 present (and/or valid), and utilizing the secondary policy value 8006 if present (and valid). An example configuration circuit 7910 configures the network interface circuit(s) 7912, 7914 in response to the default policy value 8002 if there is no primary policy value 8004 and/or secondary policy value 8006 present, in response to the primary policy value 8004 if there is no secondary policy value 8006 present, and utilizing the secondary policy value 8006 if present. An example configuration circuit 7910 applies the policies if present in the order described (e.g., using the secondary policy value 8006 if present, and ignoring any remaining policy values 8004, 8002). An example configuration circuit 7910 applies more than one policy value if the policy values are compatible and/or consistent (e.g., applying a secondary policy value 8006, and applying portions of the primary policy value 8004 that are not in conflict with the secondary policy value 8006). In the example of FIG. 80 the default policy value 8002 may be a permanent storage policy (e.g., a policy stored with main executable instructions stored on a computer readable medium that include instructions for at least a portion of operations of the CND 108 and/or associated circuits therefore). In certain embodiments, the primary policy value 8004 and/or the secondary policy value 8006 include policy values that are readily updated in real time, for example stored as data files (e.g., provided at selected memory locations, selected OS logic location, according to certain naming conventions, and/or stored with selected header information, metadata, or the like identifying each policy value as a primary policy value 8004 or a secondary policy value 8006), stored as a part of a calibration set, trim set, or the like.

An example primary policy 8004 is a tool supplied policy, such as a manufacturer tool, OEM tool, service tool, or the like. In certain embodiments, the secondary policy value 8006 is a downloaded policy value, for example a policy value received from an external device through an external communications portal, and from a web based tool, cloud application, or the like. The recited examples are non-limiting, and any of the policy values may be received from any external communications portal. An example implementation includes the default policy value 8002 provided at a time of initialization of the CND 108 or related control components (e.g., a first image file applied to a controller housing executable portions of the CND 108, policy manager circuit 7906, or the like), and which is not generally updated except, for example, as a part of an entire instruction set update (e.g., updating the executable instructions provided for the CND 108 and/or portions thereof). An example implementation includes the primary policy value 8004 provided at a time of manufacture, assembly, or other initial pre-mission service or assembly operation on the vehicle. An example implementation includes the secondary policy value 8006 provided as a downloaded operation, and/or provided during a service operation, trimming and/or application configuration operation (e.g., by an OEM, body builder, or the like). The utilization of the scheduled policy values 8002, 8004, 8006 allows for the implementation of a minimum capability (and/or lowest risk) policy, providing sufficient capability for devices of the vehicle to communicate externally, for example to download and/or act on a replacement policy such as a primary policy value 8004 and/or secondary policy value 8006. The utilization of the scheduled policy values allows for various stakeholders in a manufacture, remanufacture, re-configuration, service, sale or transfer, mission change, or other vehicle related operation to ensure that policy requirements (e.g., permissions for local communicating devices to communicate within a network, across a network, to store data, and/or to communicate with external devices) are met, while allowing for ease of policy updates, implementations, and interfaces for third-parties, owner/operators, fleet owners, and the like to adjust policy values and resulting communication regulation operations. The utilization of the scheduled policy values 8002, 8004, 8006 allows for ease of policy updates, verification, and implementation. The utilization of scheduled policy values 8002, 8004, 8006 allows for re-configuration of a policy and/or regulatory response of communications to be adjusted in real time with a low impact to the mission of the vehicle (e.g., without controller reset operations, adjustment of primary executable instruction files, or the like), for example to adjust policies in response to regulatory characteristics such as geography (e.g., location of the vehicle), jurisdiction (e.g., jurisdictional location of the vehicle), and/or operations where direct control of the vehicle may not be available (e.g., after an accident, towing event, sale or other transfer, etc.). In certain embodiments, the scheduled policy values 8002, 8004, 8006 may be applied by one of a number of devices at different times, for example a default policy value 8002 applied by a first device, the primary policy value 8004 applied by a second device, and the secondary policy value 8006 applied by a third device. In certain embodiments, a given external device may apply more than one of the scheduled policy values 8002, 8004, 8006, and/or apply a later version of one of the scheduled policy values 8002, 8004, 8006 at a later time relative to application of an earlier version. In certain embodiments, more than one version of a given policy value may be present (e.g., a secondary policy value 8006) with a selected one of the versions utilized in response to operating conditions (e.g., vehicle operating conditions, geography, jurisdiction, off-nominal conditions and/or fault code conditions, etc.). In certain embodiments, a given policy value 8006 may include more than one version of an aspect of the policy, for example providing for different data collection operations for a given local communicating device, controller, flow, application, end point, etc., an selecting a version of the aspect of the policy in response to operating conditions.

Figure 81:
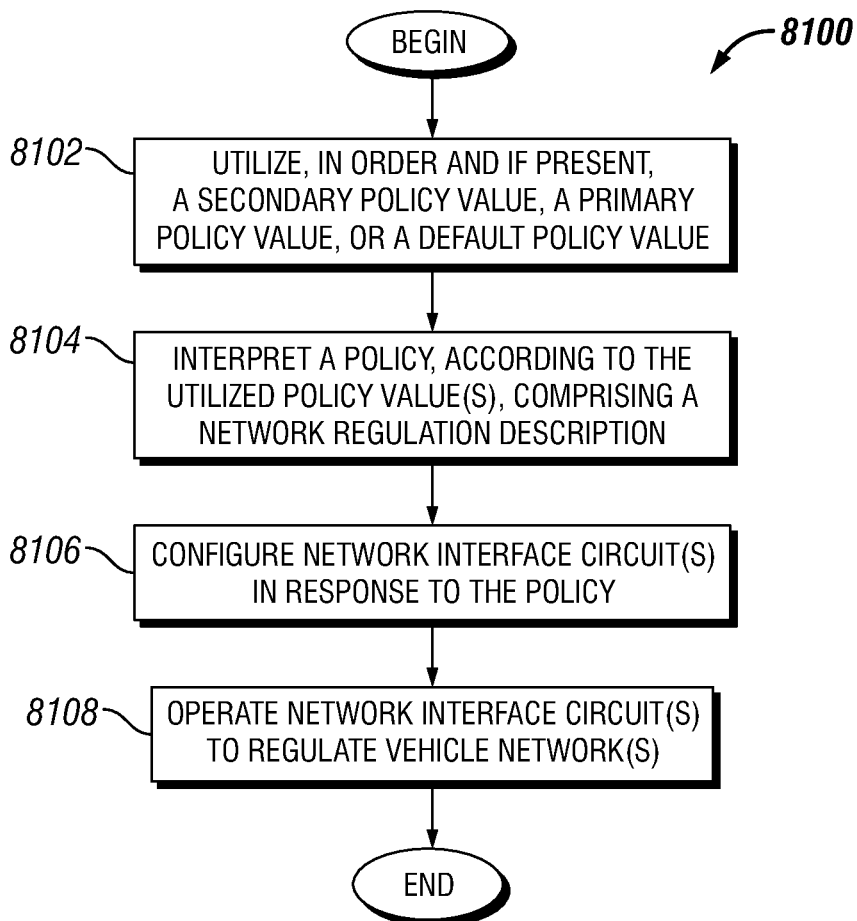
FIG. 81 is a schematic flow diagram of a procedure for regulating network communications of a vehicle.

Referencing FIG. 81, an example procedure 8100 for regulating network(s) on a vehicle is schematically depicted. The example procedure 8100 includes an operation 8102 to utilize, in order and if present, a secondary policy value, a primary policy value, and a default policy value. The example procedure 8100 further includes an operation 8104 to interpret a policy, according to the utilized policy value(s), where the policy includes a network regulation description, and an operation 8106 to configure network interface circuit(s) in response to the policy. The example procedure 8100 further includes an operation 8108 to operate the network interface circuit(s) to regulate network(s) of the vehicle.

An example system includes a CND disposed onboard the vehicle, defined at least in part by an Ethernet switch (e.g., a CES) and/or a CAN gateway (e.g., a CEG). The example CND encapsulates at least a portion of a CAN based message from the CAN based network in an Ethernet based message, and/or encapsulates at least a portion of an Ethernet based message from the Ethernet based network in a CAN message. The example system includes a configuration circuit disposed onboard the vehicle that modifies the CND in response to a configuration command value from a service device external to the vehicle. The configuration circuit may be disposed on the CES and/or the CEG (in whole or part). The example CES includes a number of ports on the ethernet based network, where the configuration circuit configures a first port of the number of ports to mirror a second port of the number of ports (e.g., allowing for a monitoring tool, service tool, other external device to monitor the first port, and/or allowing operations of the CND to store at least a portion of the data at the first port, thereby monitoring the second port). An example configuration circuit modifies the CND by adjusting which port is the first port (e.g., the monitoring port) and/or the second port (e.g., the monitored port).

In an additional or alternative example (e.g., reference FIGS. 45-55 and the related descriptions), the system includes a service device (e.g., any external device described throughout the present disclosure) including a CAN message generation circuit that communicates onto the ethernet based network and/or the CAN based network, where the CAN message generation circuit generates a CAN message and transmits the CAN message to a device (e.g., a local communicating device) onboard the vehicle. The example CAN message generation circuit can transmit a CAN message regardless of the connectivity of the service device, for example where the connection is to an ethernet based network, the CND (and/or CEG, CES, gatekeeper interface circuit, and/or a network interface circuit) encapsulates the CAN message, passes it through the ethernet based network, and de-encapsulates the message as a CAN message onto the CAN based network.

In an additional or alternative example (e.g., reference FIGS. 45-55 and the related descriptions), the system includes a service device including a testing circuit that communicates onto the ethernet based network and/or the CAN based network, where the testing circuit generates one or more test command values that collectively test devices distributed across more than one network on the vehicle (e.g., a first device on the ethernet based network and a second device on the CAN based network).

[Illustrative Language for CVS 46-48, 72, 77, Include in PCT]

An example system includes a first network zone of a vehicle having a first interconnected number of end points, and a second network zone having a second interconnected number of end points. The example system further includes a converged network device (CND) interposed between the first network zone and the second network zone, where the CND is configured to regulate communications between end points of the first network zone and the second network zone.

One or more certain further aspects of the example system are described following, any one or more of which may be incorporated in certain embodiments. The example system includes the first network zone positioned in a first risk exposure profile, and the second network zone positioned in a second risk exposure profile, where the first risk exposure profile is distinct from the second risk exposure profile. Example and non-limiting distinctions between the risk exposure profiles include one or more of: a geometric distinction; an environmental distinction; a failure mode distinction; a likely risk type distinction; and/or a likely disturbance distinction. The example system includes the CND distributed between a first portion positioned at a first location in the vehicle, and a second portion positioned at a second location in the vehicle. In certain embodiments, the first portion of the CND regulates communications between end points of the first network zone and the second network zone, and in certain further embodiments the system includes a network redundancy circuit that selectively provides a regulation control command, where the second portion of the CND selectively regulates at least a portion of the communications between the end points of the first network zone and the second network zone in response to the regulation control command.

The example system includes the CND having a configurable edge gateway (CEG), and where communications between end points of the first network zone and the second network zone are routed through the CEG. The example system further includes the CND having an Ethernet switch, where the first network zone includes an Ethernet network, and where communications between end points of the second network zone and the first network zone are routed through the Ethernet switch. The example system further includes the CEG configured to provide communications between end points of the first network zone and the second network zone at a port of the Ethernet switch. Example and non-limiting network types of the second network zone include one or more of: a Controller Area Network (CAN), a Media Oriented Systems Transport (MOST) network, a Local Interconnect Network (LIN), a FlexRay network, a Time-Triggered Protocol (TTP) network, a Low-Voltage Differential Signaling (LVDS) network, an Audio Video Bridging (AVB) compliant network, a customized version of any one or more of the foregoing, and/or a proprietary version of any one or more of the foregoing. The example system includes a third network zone, where the CEG provides communications between end points of the first network zone and the third network zone at a port of the Ethernet switch, which may be provided at a shared port with communications between of the first network zone and the second network zone, or which may be a separate port.

The example system includes the CEG configured to encapsulate a communication from the second network zone into an Ethernet communication, and to provide the encapsulated communication to the port of the Ethernet switch. The encapsulated communication includes one or more of: a payload of the communication; a processed payload of the communication; a portion of a frame of the communication; a processed portion of a frame of the communication; the entire frame of the communication; and/or the entire frame of the communication, having one or more portions thereof provided as processed portions. In certain embodiments, the second network zone includes an electrical signal zone. An example CEG further performs analog/digital processing of communications with the second network zone, and/or signal processing operations of communications with the second network zone. The example system includes the CEG configured to generate a processed payload by performing one or more of: a unit change of the payload; a bit depth change of the payload; a normalization of the payload; and/or a time shift of the payload. The example system includes the CEG configured to generate a processed portion of a frame of the communication by performing one or more of: adjusting a time stamp of the communication; applying a time stamp to the communication; adjusting a source indicator of the communication; and/or adjusting a destination indicator of the communication.

The example system includes the second network having a bus topology, and/or the first network having a topology such as: a serial topology, a mesh topology, a hub topology, a ring topology, and/or a star topology. The example system includes the first network including a first virtual local area network (VLAN), and the second network including a second VLAN.

The example system includes the CND provided as a first portion in a first location of the vehicle, and as a second portion in a second location of the vehicle. The example system further includes the first portion of the CND positioned in a first risk exposure profile, and the second portion of the CND positioned in a second risk exposure profile, where the first risk exposure profile is distinct from the second risk exposure profile. Example and non-limiting distinctions between the risk exposure profiles include one or more of: a geometric distinction; an environmental distinction; a failure mode distinction; a likely risk type distinction; and/or a likely disturbance distinction.

The example system includes an external transmitter communicatively coupled to the CND, and configured to, at least intermittently, communicate with an external device. The example system includes the CND configured to regulate communications between end points of the first network zone and the external device, and between end points of the second network zone and the external device.

The example system includes a first vehicle controller on the first network zone, a second vehicle controller on the second network zone, and a network redundancy circuit that selectively provides a regulation control command, where the CND if further configured to adjust regulating communications between the first network zone and the second network zone in response to the regulation control command. Example and non-limiting regulation control commands include one or more of: an off-nominal condition corresponding to the first vehicle controller; a loss of a data element relating to the first vehicle controller; and/or a lost control function of the first vehicle controller. Example and non-limiting adjustments to the regulating communications include one or more operations such as: providing an alternate data element to the first vehicle controller; providing a data element corresponding to the lost control function to the second vehicle controller; and/or providing a data value ordinarily available on the first network zone to the second network zone. An example adjustment to the regulating communications includes suppressing a communication of a data value ordinarily available on the first network zone in response to the lost control function of the first vehicle controller. The example system includes providing the data value ordinarily available on the first network zone to the second network zone as a processed data value to the second vehicle controller. The lost control function includes one or more or: a whole or partial loss of a control function nominally performed by the first vehicle controller; a lost communication with an end point of the first network zone; a loss of function of the first vehicle controller; and/or a loss of communication with the first vehicle controller.

The example system includes the first vehicle controller positioned in a first risk exposure profile, and the second vehicle controller positioned in a second risk exposure profile, where the first risk exposure profile and the second risk exposure profile, where the first risk exposure profile is distinct from the second risk exposure profile. Example and non-limiting distinctions between the risk exposure profiles include one or more of: a geometric distinction; an environmental distinction; a failure mode distinction; a likely risk type distinction; and/or a likely disturbance distinction.

Certain alternative and/or additional regulation control commands include one or more of: an off-nominal condition corresponding to the first network zone; a loss of communication between at least one end point of the first network zone and the first network zone; a physical failure of at least a portion of the first network zone; and a bandwidth limitation of the first network zone. Example and non-limiting adjustments to the regulating communications include one or more of: routing at least one communication from the first network zone to the second network zone; repeating at least one communication from the first network zone to the second network zone; shifting at least one end point from the first network zone to the second network zone; shifting and/or repeating relevant communications with the at least one end point from the first network zone to the second network zone; and/or shifting and/or repeating relevant communications with the at least one end point from the second network zone to the first network zone.

The example system includes a vehicle controller on the first network zone, and the CND at least partially co-located with the vehicle controller.

The example system includes a first portion of the CND co-located with the vehicle controller, where the first portion includes non-transient computer readable instructions configured to, when executed by a process of the vehicle controller, perform at least a portion of the operations of regulating the communications.

The example system includes a first portion of the CND co-located with the vehicle controller, where the first portion includes an Ethernet switch, where the first network zone includes an Ethernet network, where communications between end points of the second network zone and the first network zone are routed through the Ethernet switch, and where the Ethernet switch is positioned within a housing with the vehicle controller, and/or positioned on a same board with the vehicle controller.

The example system includes a first portion of the CND co-located with the vehicle controller, where the first portion includes a configurable edge gateway (CEG), and where communications between and points of the first network zone and the second network zone are routed through the CEG, and where the CEG is positioned within a housing with the vehicle controller, and/or positions on a same board with the vehicle controller.

The example system includes a second vehicle controller on the second network zone, where the CND includes a first portion co-located with the vehicle controller, and a second portion co-located with the second vehicle controller. Each of the first portion and the second portion of the CND may include one or more of: an Ethernet switch; a configurable edge gateway (CEG); and/or non-transient computer readable instructions configured to, when executed by a process of the respective vehicle controller, perform at least a portion of the operations of regulating the communications. Each of the first portion and the second portion of the CND may be positioned within a housing of the respective vehicle controller, and/or on a same board with the respective vehicle controller.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A system comprising:
   a vehicle having a first network and a second network of a different type than the first network;
   a converged network device (CND) interposed between the first network and the second network and comprising a plurality of ports on the first network; and
   a sensor device external to the vehicle;
   wherein:
   the CND facilitates communications between the first and the second networks;
   a first port of the plurality mirrors a second port of the plurality;
   the CND is structured to, based at least in part on a port selection command value from the sensor device, assign:
   which port, of the plurality of ports, is the first port; and/or
   which port, of the plurality of ports, is the second port; and
   the sensor device is structured to monitor a flow between end points on at least one of the first or second networks via communicatively coupling with the first port.

2. The system of claim 1, wherein the first port of the plurality mirrors a third port of the plurality.

3. The system of claim 1, wherein the sensor device is structured to monitor one or more devices on the first and/or the second networks via communicatively coupling with the first port.

4. The system of claim 1, wherein the CND is further structured to:
   assign a first device, of a plurality of devices on the second network, to a first assigned port of the plurality of ports;
   identify communications data on the second network corresponding to the first device; and
   transmit the identified communications data corresponding to the first device on the first network via the first assigned port.

5. The system of claim 4, wherein the CND is further structured to:
   assign a second device, of the plurality of devices on the second network, to the second assigned port of the plurality of ports;
   identify communications data on the second network corresponding to the second device; and
   transmit the identified communications data corresponding to the second device on the first network via the second assigned port.

6. The system of claim 4, wherein the CND is further structured to:
   assign a second device, of the plurality of devices on the second network, to the first assigned port;
   identify communications data on the second network corresponding to the second device; and
   transmit the identified communications data corresponding to the second device on the first network via the first assigned port.

7. The system of claim 1, wherein the CND further comprises an Ethernet switch that includes the plurality of ports.

8. The system of claim 1, wherein the first network is Ethernet based.

9. The system of claim 1, wherein the second network is controller area network (CAN) based.

10. The system of claim 1, wherein the first network is Ethernet based and the second network is controller area network (CAN) based.

11. An apparatus comprising:
    a first network interface circuit having a plurality of ports structured to interpret first communications data of a first network onboard a vehicle;
    a second network interface circuit structured to interpret second communications data of a second network onboard the vehicle, the second network of a different type than the first network;
    a translation circuit structured to relay the second communications data to the first network interface circuit for transmissions on the first network via at least one port of the plurality; and
    a configuration circuit structured to:
    interpret a port selection command value from a sensor device external to the vehicle; and
    in response to, and based at least on part on, the port selection command value, assign:
    which port, of the plurality of ports, is the first port; and/or
    which port, of the plurality of ports, is the second port;
    wherein the first port of the plurality mirrors the second port of the plurality to provide for the sensor device to monitor a flow between end points on at least one of the first or second networks via communicatively coupling with the first port.

12. The apparatus of claim 11,
    wherein the configuration circuit is further structured to:
    interpret a port assignment command value that identifies both an assigned port, of the plurality of ports, and a device on the second network;
    identify portions of the second communications data corresponding to the identified device; and
    transmit the identified portions of the second communications data via the assigned port.

13. The apparatus of claim 11, wherein the first communications data is Ethernet based.

14. The apparatus of claim 11, wherein the second communications data is controller area network (CAN) based.

15. The apparatus of claim 11, wherein the first communications data is Ethernet based and the second communications data is controller area network (CAN) based.

16. A method comprising:
    interpreting, via a plurality of ports of a converged network device (CND), first communications data of a first network onboard a vehicle;

interpreting, via the CND, second communications data of a second network onboard a vehicle, the second network of a different type than the first network;

relaying, via the CND, the second communications data to the first network via the plurality of ports;

interpreting, from a sensor device external to the vehicle, a port selection command value;

in response to, and based at least in part on, the port selection command value, assigning:

which port, of the plurality of ports, is a first port; and/or which port, of the plurality of ports, is the second port; and mirroring the first port of the plurality via the second port of the plurality to provide for the a sensor device external to the vehicle to monitor a flow between end points on at least one of the first or second networks via communicatively coupling with the first port.

17. The method of claim 16 further comprising;

interpreting a port assignment command value that identifies both an assigned port, of the plurality of ports, and a device on the second network;

identifying portions of the second communications data corresponding to the identified device; and transmitting the identified portions of the second communications data via the assigned port.

* * * * *

UNITED STATES PATENT AND TRADEMARK OFFICE
CERTIFICATE OF CORRECTION

| | |
|---|---|
| PATENT NO. | : 12,058,003 B2 |
| APPLICATION NO. | : 17/675340 |
| DATED | : August 6, 2024 |
| INVENTOR(S) | : Fang et al. |

It is certified that error appears in the above-identified patent and that said Letters Patent is hereby corrected as shown below:

In the Specification

In Column 17, Line 19, delete "18" and insert --108-- therefor

In Column 57, Line 9, delete "2702" and insert --2706-- therefor

In Column 78, Line 45, delete "5610)" and insert --5614)-- therefor

In Column 78, Line 59, delete "5610" and insert --5614-- therefor

In the Claims

In Column 113, Line 15, in Claim 16, delete "the a" and insert --the-- therefor

Signed and Sealed this
Fifteenth Day of October, 2024

Katherine Kelly Vidal
*Director of the United States Patent and Trademark Office*